(12) United States Patent
Ulmer et al.

(10) Patent No.: US 9,784,887 B1
(45) Date of Patent: Oct. 10, 2017

(54) METEOROLOGICAL SENSING SYSTEMS AND METHODS

(71) Applicant: Physical Optics Corporation, Torrance, CA (US)

(72) Inventors: Christopher Ulmer, San Pedro, CA (US); Dmitry Starodubov, Reseda, CA (US); Gregory Peng, Redondo Beach, CA (US); Rodion Tikhoplav, Santa Monica, CA (US); David Miller, San Pedro, CA (US); Andrew Kostrzewski, Garden Grove, CA (US); Koyiro Minakata, Irvine, CA (US); Gabriel Kaplan, Calabasas, CA (US); Tomasz Jannson, Torrance, CA (US); Edward Patton, Torrance, CA (US); Sookwang Ro, Glendale, CA (US); Ihor Berezhnyy, La Jolla, CA (US)

(73) Assignee: Physical Optics Corporation, Torrance, CA (US)

( * ) Notice: Subject to any disclaimer, the term of this patent is extended or adjusted under 35 U.S.C. 154(b) by 416 days.

(21) Appl. No.: 14/457,511

(22) Filed: Aug. 12, 2014

Related U.S. Application Data

(60) Provisional application No. 61/865,069, filed on Aug. 12, 2013, provisional application No. 61/923,457, filed on Jan. 3, 2014, provisional application No. 61/947,886, filed on Mar. 4, 2014, provisional application No. 61/953,603, filed on Mar. 14, 2014, provisional application No. 61/989,660, filed on May
(Continued)

(51) Int. Cl.
*G01W 1/02* (2006.01)
*B64D 1/08* (2006.01)
*G01S 17/95* (2006.01)
*G08B 21/18* (2006.01)

(52) U.S. Cl.
CPC ................. *G01W 1/02* (2013.01); *B64D 1/08* (2013.01); *G01S 17/95* (2013.01); *G08B 21/18* (2013.01)

(58) Field of Classification Search
CPC .......... G01W 1/02; G08B 21/18; G01S 17/95; B64D 1/08
USPC ............... 102/382, 385, 400, 401, 404, 411; 244/3.24–3.27, 173.1–173.3; 702/2, 3
See application file for complete search history.

(56) References Cited

U.S. PATENT DOCUMENTS 2,398,794 A * 4/1946 Maltby ................... F42B 22/44
102/411
3,246,864 A * 4/1966 Mack .................. B64C 29/0033
102/339
(Continued)

FOREIGN PATENT DOCUMENTS

GB 2496106 A * 5/2013 ............. G01V 1/166

*Primary Examiner* — Brian Wilson
(74) *Attorney, Agent, or Firm* — Sheppard, Mullin, Richter & Hampton LLP; Daniel Yannuzzi

(57) ABSTRACT

A portable weather station, including an lower body portion; an upper body portion disposed on the lower body portion in a spaced apart relationship thereby forming an open channel between the upper body portion and the lower body portion; and a plurality of weather condition sensors wherein a first set of one or more of the plurality of weather condition sensors is mounted on the upper body portion of the portable weather station and a second set of one or more of the plurality of weather condition sensors is mounted on the lower body portion of the portable weather station.

6 Claims, 61 Drawing Sheets

Related U.S. Application Data 7, 2014, provisional application No. 62/005,840, filed on May 30, 2014, provisional application No. 62/017,745, filed on Jun. 26, 2014, provisional application No. 62/020,574, filed on Jul. 3, 2014, provisional application No. 62/026,549, filed on Jul. 18, 2014.

(56) References Cited

U.S. PATENT DOCUMENTS

| | | | | |
|---|---|---|---|---|
| 3,870,263 A | * | 3/1975 | Hardiman | F16M 11/38 16/286 |
| 4,722,282 A | * | 2/1988 | Synofzik | F42C 1/14 102/493 |
| 4,946,172 A | * | 8/1990 | Wong | F42B 6/003 473/585 |
| 5,022,470 A | * | 6/1991 | Andersen | E21B 7/008 175/14 |
| 6,531,965 B1 | * | 3/2003 | Nelson | F42B 12/365 102/513 |
| 7,845,283 B2 | * | 12/2010 | Finneral | F41G 7/226 102/357 |
| 8,172,173 B2 | * | 5/2012 | Carlson | B64D 19/02 244/138 A |
| 9,024,238 B1 | * | 5/2015 | Stofko | F42B 30/10 244/3.24 |
| 2005/0051667 A1 | * | 3/2005 | Arlton | B64C 27/10 244/17.11 |
| 2005/0178220 A1 | * | 8/2005 | Kolarczyk | G01V 3/165 73/866.5 |
| 2007/0038395 A1 | * | 2/2007 | Green | G01D 9/005 702/62 |
| 2012/0134237 A1 | * | 5/2012 | Esteban-Campillo | G01V 1/00 367/136 |
| 2013/0308426 A1 | * | 11/2013 | Scarlatti | G01V 1/16 367/129 |

* cited by examiner

| Total Mass (g) | 3150 |
| Disk Diameter (cm) | 19 |
| Drag Coefficient | 0.75 |
| Deceleration Distance (cm) | 20 |

A (m^2)   0.034447
ρ (g/m^3)   1200
g (m/s^2)   9.8

$$v_t = \sqrt{\frac{2mg}{\rho A C_d}}$$

Terminal Velocity (m/s)   16.6

$$v(t) = v_t \cdot \tanh\left(t\sqrt{\frac{g \rho C_d A}{2m}}\right)$$

Time to 35% Vt (s)   1.66

| G-Shock on Impact (G) | 500 |
| Drop Height for Vt 35% (ft) | 40 |

Table 4. Example design parameters

METEOROLOGICAL SENSING SYSTEMS AND METHODS

CROSS-REFERENCE TO RELATED APPLICATIONS

This application claims the benefit of U.S. Provisional Application Nos. 61/865,069, filed Aug. 12, 2013; 61/923,457, filed Jan. 3, 2014; 61/947,886, filed Mar. 4, 2014; 61/953,603, filed Mar. 4, 2014; 61/989,660, filed May 7, 2014; 62/005,840, filed May 30, 2014; 62/017,745, filed Jun. 26, 2014; 62/020,574, filed Jul. 3, 2014; and 62/026,549, filed Jul. 18, 2014, each of which are hereby incorporated herein by reference in their entirety.

STATEMENT OF RIGHTS TO INVENTIONS MADE UNDER FEDERALLY SPONSORED RESEARCH

This invention was at least partially supported by the Government under Contract #H92222-11-C-0034 awarded by U.S. Special Operations Command.

TECHNICAL FIELD

The disclosed technology relates generally to meteorological sensing, and more particularly, some embodiments relate to portable, remote weather sensing devices.

DESCRIPTION OF THE RELATED ART

Meteorology, including fields of weather measurement, weather forecasting, climatology, atmospheric chemistry, and atmospheric physics has long been an important field of observation and study. Indeed, there is evidence that as early as 400 BC (and perhaps earlier), advanced societies attempted to predict weather and climate patterns. Since at least as early as the 15th century, there have been efforts to provide equipment to measure atmospheric variables with a fairly high degree of accuracy. Rain, wind, barometric pressure, temperature and humidity are examples of weather-related variables typically measured by meteorological sensing equipment. Early meteorological sensing equipment included items such as the rain gauge, the anemometer, and the hygrometer. Sometime later, equipment such as the barometer and the Galileo thermometer were developed. The 20th century brought with it developments in remote sensing devices such as weather radar, weather satellites, and other technologically advanced weather-sensing equipment.

In many cases, meteorological sensing equipment can be configured for remote operation, allowing sensing instruments to collect data regarding weather events at a location remote from the user's base of operations. Such remotely collected data can be transmitted back to the base of operations for collection, study and record keeping. The base of operations may include, for example, instrumentation and equipment to receive and analyze collected data. The analyzed data can be provided to personnel for operational purposes, or it can be observed and studied for purposes such as, for example, weather forecasting, climate study and so on.

Weather observation plays an essential role in human life. Precise detection and recording of key weather parameters such as wind, pressure, temperature, visibility, and cloud layer height are essential, for example, for the safety of airplane flights. As further examples, continuous weather recording is important for wild fire prevention and disaster response. Currently available weather observation systems such as the TMQ-53 Tactical Meteorological Observing System have sufficient accuracy to record weather parameters for aviation, however the system requires stationary power connectivity (external power source connection such as the grid) and larger than desirable, difficult to assemble, and too expensive for wide deployment. Alternatively, there are smaller handheld weather observation units, such as the Kestrel 4000 Pocket Weather Meter, which can record wind, temperature, pressure, and humidity. Such units cannot, however, measure visibility or cloud layer height and cannot operate remotely and independently from the operator. These deficiencies hinder the ability of current devices to function autonomously and or for use in automated weather recording.

Currently, there is no weather observation device that would be small and light enough for easy deployment (size, weight and power constrains), accurate enough for aircraft operation, and capable of providing sustainable weather recording and transmission from a remote location.

As noted above, the current weather sensor solutions are much heavier than desired for remote applications and are too large for easy transport and implementation. In addition, the typical configuration used in existing weather stations requires isolation of each component, which requires the use of separate arms mounted onto the base unit and adds to the bulk and size of the system. Various embodiments provide a Portable Imaging Weather Observation System (PIWOS) and features thereof, that can be configured addresses the need.

A key weather parameter that is desired to be measured in most full-capability weather monitoring stations is precipitation type and amount. Precipitation type refers to the identification of the falling moisture into categories such as drizzle, rain, hail, small hail, snow, etc. Precipitation amount is a volumetric assessment of the amount of moisture falling per unit of time, typically measured in inches per hour (or other like units). These parameters are often measured by existing sensors that use mechanical and optical means to assess precipitation type and amount, for the purposes of sensing microclimates.

BRIEF SUMMARY OF EMBODIMENTS

According to various embodiments disclosed herein, various novel configurations for a portable, field-operable weather station can be provided. Various embodiments also provide unique technologies for sensor configurations, data communication, information security and data analysis.

In various embodiments, a weather station device can be provided that utilizes thermal components for windspeed and wind direction measurement. For example, in various embodiments, a thermal anemometer can be configured to measure wind speed and wind direction with few or no moving parts. Heat generator(s) and thermal sensor(s) can be configured to take advantage of the cooling effects that generally accompany wind, and the understanding that the cooling effects are generally greater at higher wind speeds. In some embodiments, a novel apparatus and method can be included to simultaneously determine the wind direction as well as the velocity of the wind.

A thermal generator or other heat source can be included along with a plurality of thermal sensors (e.g., thermistors or thermocouples) disposed proximal to the heat source. In such embodiments, the system can be configured to determine the direction of the wind based on the temperature differentials among the sensors or the temperature changes detected by the sensors. This can be used to determine the direction in which heat from the heat source is most predominantly lost to the air. In some embodiments, this heat source could be a resistor or other resistive element heated by an electrical current. Other heat sources can be used as well.

Embodiments can be configured to use a plurality of thermal sensors arranged in a pattern (e.g., in a ring) around the heat source to determine the direction in which the heat from the heat source is blown. This design measures wind direction by allowing the heat emitted by the heat source to be detected by the thermal sensors around the heat source. Those thermal sensors that are downwind from the heat source will detect the heat that is carried by the wind from the heat source to the sensor.

Accordingly, in various embodiments, a new thermal sensor design can be implemented to enable the determination of wind speed and direction using purely thermal means allowing for extreme reduction in size of the device and the complete elimination of moving parts. Embodiments can be implemented to: Reduce size versus mechanical and acoustic approaches; eliminate binding due to dust contamination that is suffered by mechanical approaches; eliminate freezing due to ice accumulation environments that is suffered by mechanical approaches.

In some embodiments, a new micro visibility sensor configuration can be included to measure visibility in an extremely compact device with limited power.

Various embodiments can be configured to use a novel Co-Axial Configuration for the weather sensor that organizes the sensors into specific groups mounted co-axially so that the remote weather system can be combined as a single unit instead of multiple components connected through cables. Embodiments can be implemented to: Eliminate multiple setup steps required to assemble components in a conventional system; eliminate large, bulky towers; reduce overall system profile against wind loading; reduce cost by eliminating multiple enclosures and interconnections; efficiently enable protection of exposure-sensitive sensors by stacking them axially underneath sensors and components that require full exposure; enable potential air-droppable capability; improve ruggedness and durability.

A new precipitation sensor design can be implemented that uses an accelerometer to detect the contact of precipitation with the enclosure of the MWS enables detection of precipitation over a large area using a micro-size component. Embodiments can be implemented to: Analyze the impact signature to allow rain, hail, small hail, and drizzle to be distinguished; use electrodes embedded in hydrophobic plastic to enable detection of active moisture in the air rather than standing water; use the entire system body for detection to allow for a radical size reduction compared to conventional approaches.

A new camera system can be included. In some embodiments, the new camera system uses state-of-the art micro-optics allowing for panoramic images to be taken, digitally compressed, and transmitted via satellite from any location. Embodiments can be implemented to include: Mounting of micro cameras on a flexible printed circuit board enables positioning of cameras for panoramic operation; use of optical lenses and prisms allows for a plurality of camera configurations; compression of images followed by breakup into packets enables delivery of images via Iridium satellite connection.

A new power system design that coordinates the collection of solar power, recharge and discharge of batteries, temperature control, and sleep-cycle control enables the system to operate autonomously. Embodiments can be implemented to include: Use of hybrid system of batteries and electric double-layer capacitors (EDLC) enables high-power boost transmissions using a dramatically smaller battery source than can be achieved otherwise.

In various embodiments of the disclosed technology, systems and methods for deploying weather station equipment or other equipment or instrumentation may also be provided. For example, apparatus can be provided to deploy instrumentation from an aircraft or other airborne vehicle or platform, including, for example, fixed-wing or rotor aircraft. In another example, apparatus can be provided to integrate the instrumentation both physically and electronically with a fixed or moving platform such as a vehicle.

In various embodiments, aspects of the deployment systems disclosed herein can be configured to provide one or more of the following features for integration with fixed or moving platforms.

Allowance for a rigid mounting to a platform via common mounting features such as a single threaded insert or four standard screw holes in the weather station device Allowance for the weather station device to be powered by external sources, such as a vehicle battery Allowance for the weather station device to transmit data via cabling to an external screen such as a laptop or vehicle-mounted display Allowance for the weather station equipment to transmit data via radio frequency (HF, VHF, UHF, Bluetooth, etc) or existing external satellite communications.

In various embodiments, aspects of the deployment systems disclosed herein can be configured to provide one or more of the following features for the deployment of equipment (in some embodiments, sensitive equipment).

Protects the equipment from being damaged upon impact

Anchors the equipment to the ground upon impact

Creates a stable platform in non-penetrable soils

Can be used on uneven or sloped terrain

Ensures that the equipment will be oriented vertically

Raises the equipment to a desired height

Various aspects of the deployment systems can be configured to include several features that may work together to form a comprehensive device, but individual aspects of the technology can be used alone or in subsets to achieve desired results or objectives. Examples of such aspects of the design can include:

Aerodynamic Shape—the shape of the deployment device can be configured to ensure verticality (or near verticality) of the deployed system. The shape can also be configured to provide a consistent or somewhat consistent impact speed regardless of drop height. In other words, the shape can be configured to yield a terminal velocity at a desired speed or within a desired range of velocities.

Anchoring Mechanism—in various embodiments, the device can include an anchor mechanism to anchor the system into the ground in penetrable soils. For example, a weighted spike can be included at the bottom of the system (e.g., at the bottom of the mast) to penetrate the soil where the device lands, anchoring the device to the ground or with pneumatic cushioning, friction-based energy absorbers, or other means of absorbing impact energy.

Recoiling mast—the mass can be configured to absorb some or all of the shock of the impact to help protect the equipment upon impact. For example, a multi-segment mast can be provided with spring-loaded segment or segments to help absorb the shock of impact of the system with the ground.

Ratcheting Fins—fins can be included to provide single- or dual-functionality. For example, aerodynamic fins can be included to provide orientational stability to the system during travel from the deployment vehicle (e.g., the aircraft) to the deployment location (e.g., ground). Fins can also be included to provide a stable base for the system at the deployment location. Further, translatable fins can be provided to serve as stability fins during flight at the aft end of the system body, and to move along the body to the base upon impact with the deployment surface (e.g., the ground). A ratcheting or spring-like mechanism can be used to allow the fins to move along the body (e.g. the mast) of the device from the aft end to the base. For example, a ratcheting mechanism can be included that requires sufficient force to prevent the fins from moving from the aft end to the fore end during flight; and this force can be set at such a level that the momentum of the fins upon impact with the deployment surface allows the fins to overcome this force and travel along the body to the base of the device at the deployment surface. Additionally, the ratcheting mechanism can be configured to prevent the fins from moving back up the mast after deployment on the deployment surface to provide a stable base for the system. These fins can be used to provide stability to the system in both non-penetrable penetrable deployment surfaces.

Flash Parachute—a parachute can be included to arrest horizontal motion to facilitate more accurate placement for deployment from low-flying high-speed aircraft.

As noted above, the various aspects of the technology described herein can be used individually or in various combinations as may be desired or appropriate for a given application or situation. For example, it may be desirable to use fins without the parachute, the spike without fins, fixed rather than ratcheting fins, and so on.

Accordingly, in various embodiments the technology disclosed herein can provide systems and methods for deploying sensors, weather equipment, and other electronic equipment by aircraft without requiring hand installation by soldiers on the ground (or other ground personnel). After reading this description, it will become apparent to those of ordinary skill in the art how the systems and methods described herein can be used for deployment of other apparatuses as well. Other examples include, for example, seismic, chemical, radiological, reconnaissance, indications, image capture, weaponry, or other equipment or sensors. As will also become apparent to those of ordinary skill in the art after reading this description, the size and shape of the system can be varied from that depicted in the figures herein without departing from the spirit and scope of this technology.

It is desirable that weather system devices can be configured in various embodiments to include a design that is smaller and more compact than presently available options, while also weighing less (e.g., less than a pound). The weather sensor would ideally also have higher power efficiency than current solutions by two orders of magnitude. In addition, the device would ideally also be capable of automatic collection of weather data and transmission of the data via satellite communications, with the data capable of being reported hourly in a format suitable for conversion to the METAR weather format. The device would ideally also be operational in varying weather conditions, including in snow accumulation environments. Computation of dew-point, station pressure, and altimeter setting are desired features. The device would ideally be capable of operation over the entire range of terrestrial temperatures. Measuring capabilities should include temperature, pressure, humidity, wind velocity, wind direction, gust velocity, gust direction, and lightning. To prevent unauthorized access and data corruption, the device would ideally be capable of detecting tilt and tampering. For visualization, the device should be capable of collecting panoramic images of the surrounding area and be capable of transmitting those images over a satellite link.

In various embodiments, an apparatus for air-drop deployment of a payload comprising instrumentation or equipment is provided. The deployment apparatus includes, in various embodiments an elongate body member having a first end and a second end; a mounting ring disposed on and at least partially surrounding a portion of the body member at the first end; a fin assembly comprising a plurality of fins attached to the mounting ring; a weighted tip at the second end of the body member; and a connector at the first end configured to engage the payload.

The mounting ring may include, for example, a release mechanism and is slidably mounted to the elongate body, wherein the release mechanism is configured to maintain the mounting ring at the first end during flight and to release the mounting ring upon impact of the apparatus with a deployment surface, allowing the mounting ring to move from the first end toward the second end upon impact. A ratcheting mechanism may also be included to connect the fin assembly to the mounting ring, wherein the ratcheting mechanism allows the fin assembly to pivot from an in-flight position to a deployment position.

In various configurations, the elongate body may include a plurality of coaxially arranged sections slidably disposed in an end-to-end arrangement, a locking mechanism configured to retain the plurality of coaxially arranged sections in a retracted position; and a spring mechanism applying pressure against the coaxially arranged sections.

In other embodiments, a portable weather station includes a lower body portion; an upper body portion disposed on the lower body portion in a spaced apart relationship thereby forming an open channel between the upper body portion and the lower body portion; a plurality of weather condition sensors wherein a first set of one or more of the plurality of weather condition sensors is mounted on the upper body portion of the portable weather station and a second set of one or more of the plurality of weather condition sensors is mounted on the lower body portion of the portable weather station.

A wind sensing apparatus can include a thermal generator coupled to a power source; a plurality of temperature sensors arranged in a predetermined pattern with respect to the thermal generator; a detection module configured to determine or estimate wind speed or wind direction based on temperatures measured by the temperature sensors. The detection module may be configured to determine wind direction based on differences in temperatures sensed by one or more of the plurality of temperature sensors.

The wind direction may be determined, in some embodiments, based on an increase in temperature sensed at one or more of the plurality of temperature sensors. The wind direction may be determined based on a temperature differential measured at one or more of the plurality of temperature sensors relative to the other of the plurality of temperature sensors.

In various embodiments, the detection module may be configured to determine wind speed based on a temperature measured by one or more of the sensors relative to a predicted temperature for that sensor.

The wind sensing apparatus according to claim 6, wherein predicted temperature for said sensor is determined based on one or more of an amount of energy applied to the thermal generator, a distance between the thermal generator and said sensor and the ambient temperature.

In still further embodiments, a cloud-ceiling sensing apparatus may be provided an may include: an optical light source disposed to transmit light toward the cloud ceiling; a photodetector disposed in an orientation to receive light from the light source that has been reflected from the cloud ceiling; a shroud at least partially surrounding the optical light source at a predetermined height, wherein the predetermined height is selected based upon a height needed to prevent light from the optical light source from directly impinging on the photodetector.

The cloud-ceiling sensing may also include a ceiling height calculation module configured to determine a time of flight for the light to travel from the light source to the cloud ceiling and to the photodetector and to compute a distance from the cloud-ceiling sensing apparatus to the cloud ceiling based on the determined time of flight.

In yet further embodiments, systems and methods for detecting weather anomalous events using weather sensor fusion may be provided and may include: receiving at a cybersensor weather data samples from first weather sensing equipment; the cybersensor evaluating the weather data samples from the first weather sensing equipment against weather data in a database, determining whether or not the weather anomalous event exists based on the evaluation, generating the first alarm indicating the presence of a weather anomalous event when the determination is positive, and not generating the first alarm indicating the presence of a weather anomalous event when the determination is negative; and receiving at a second cybersensor a subset of the weather data samples, evaluating the weather data samples against weather data in a database, determining whether or not the weather anomalous event exists based on the evaluation, generating a second alarm indicating the presence of a weather anomalous event when the determination is positive, and not generating the second alarm indicating the presence of a weather anomalous event when the determination is negative; wherein the first cybersensor has a higher likelihood of a false positive determination than the second cybersensor; and generating a final alarm indicating the presence of a weather anomalous event when both the first and second cybersensors determined that the weather anomalous event exists, and not generating the final alarm indicating the presence of a weather anomalous unless both the first and second cybersensors determined that the weather anomalous event exists.

In various such embodiments, the subset of weather data samples received at the second cyber sensor comprises only those weather data samples for which the first cybersensor positively determined the presence of a weather anomalous event.

The systems and methods may further include receiving at the second cybersensor one or more additional weather data samples corresponding to weather anomalous events positively determined by one or more additional cybersensors. They may also include receiving at one or more successive cybersensors, a corresponding subset of the weather data samples, each corresponding subset of the weather data samples comprising weather data samples for which an immediately prior cybersensor determined a weather anomalous event exists, and wherein the final alarm indicating the presence of a weather anomalous event when is generated when all of the cybersensors have determined that the weather anomalous event exists, and not generated unless all of the cybersensors have determined that the weather anomalous event exists. In some configurations, the final alarm is the second alarm generated by the second cybersensor.

A system for detecting weather anomalous events may include a database storing weather events and corresponding weather data for the weather events; a plurality of cybersensors arranged in series relative to one another, each cybersensor having an input coupled to receive weather data samples generated by weather sensing equipment, and each cybersensor configured to evaluate the weather data samples against weather data in a database, determine whether or not a weather anomalous event exists based on the evaluation, generate a signal indicating the presence of a weather anomalous event when the determination is positive, and not generating the signal indicating the presence of a weather anomalous event when the determination is negative; wherein each successive cybersensor is configured as having a progressively lower likelihood of a false positive determination than its preceding cybersensor.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein is directed toward a devices and methods for providing weather condition sensing and reporting, including from remote locations. Further embodiments of technology disclosed herein include embodiments of a deployment mechanism for instrumentation, including weather sensing instrumentation. Still further embodiments of the technology disclosed herein include weather event detection systems and methods as well as data privacy and communication technology.

As previously discussed, one of the major limitations to current weather station designs is the use of separate mounting arms to allow isolation of each component implemented in the system. While embodiments can be implemented that use separate mounting arms, other embodiments can be configured to avoid such structures. For example, various embodiments of the technology disclosed herein can include a novel axial configuration that may be used to stack different sensor sets along a single vertical axis or otherwise vertically stack the components.

Figure 1:
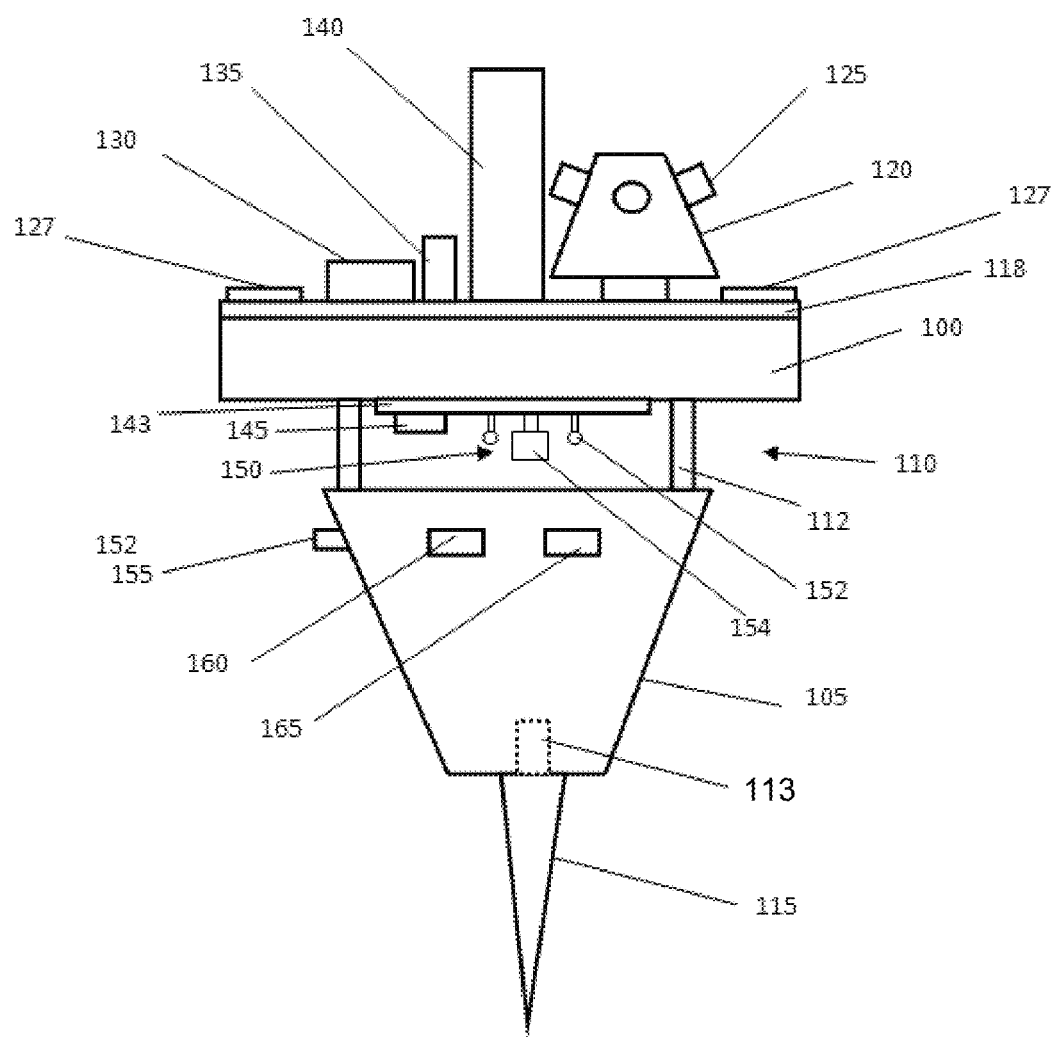
FIG. 1 is a diagram illustrating an example of stacked sensor sets in accordance with one embodiment of the technology disclosed herein.

FIG. 1 is a diagram illustrating an example of stacked sensor sets in accordance with one embodiment of the technology disclosed herein. In this example embodiment, the station includes an upper part 100 and lower part 105 separated by an air gap 110. The air gap 110 between the upper and lower portions of the device provides a shaded area for measurement of ambient temperature and humidity, and an air channel to allow for measurement of wind speed and direction. The upper part 100 and lower part 105 in this example are connected together by supports 112. The supports 112 could be made as an element of the upper part 100 or the lower part 105, or they could be separate components. Although 2 supports 112 can be seen in the example of FIG. 1, any of a number of supports can be used to separate upper part 100 and lower part 105 by a desired predetermined distance. The distance of separation can be chosen keeping in mind the goals of air gap 110, which can include providing adequate shade for ambient temperature and humidity measurement, and providing adequate space between upper part 100 and lower part 105 to allow sufficient airflow for measurement of wind speed and wind direction. The quantity, size and shape of supports 112 can also affect airflow in air gap 110, and can thus be chosen with this in mind.

Upper part 100 and lower part 105 can be fabricated using any of a number of different fabrication techniques including, for example, injection molding process. In other embodiments, the upper part 100 and lower part 105 could be machined or printed using 3D printing methods, or other well-known manufacturing techniques could be used. The lower part 105 may have a mounting means 113 for accepting or attaching desired mounting elements. For example, in some embodiments, mounting means 113 could be implemented as a hole or cavity at the bottom of lower part 105. In some embodiments, the cavity could include threads such a mounting element (e.g., a tripod) could be screwed into the cavity to attach the device to the mounting element. As a further example, the cavity could include a ¼" threaded hole that would allow mounting the device on commercially available tripods. This example illustrates, the cavity can have a coupling that is complementary to a coupling element of the mounting element such that the mounting device can be fixedly or removably attached to the meteorological device. For example, friction fit, screw fit, snap fit, socket/pin fit and other mounting and fitting configurations can be used.

In the illustrated embodiment, the mounting means 113 is a cavity that is used to accept a pin at the top of a spike 115. In such a configuration, Spike 115 can be secured to bottom part 105 such that the device can be secured by driving Spike 115 into the ground, into a tree, or in some other mounting location. In still further embodiments, the mounting means could be used to mount the weather device to a permanent structure (e.g., a building, a bridge, and so on), a moving vehicle, a manned or unmanned aircraft. In other embodiments, the mounting means could allow the weather device to be secured to additional larger auxiliary sensors or allow smaller auxiliary sensors to be mounted to the larger weather device. In yet other embodiments, the weather device could be mounted in a deployment mechanism such as, for example, that described below with reference to FIGS. 18-23.

The upper part 100 may have an upper surface element 118 attached to the top of upper part 100. This upper surface element 118 could include, for example, a printed circuit board (PCB). The upper surface element 118 could be used to mount sensor elements, including skyward facing sensor elements (125, 130, 135, and 140 as shown in FIG. 1) for purposes such as, for example, meteorological condition sensing. These weather condition sensors can include, for example, illumination measuring sensors to measure sunlight, moonlight, or lighting in general; precipitation measuring sensors; impact measuring sensors; cloud height sensors; visibility sensors; lightning measurement sensors; and other sensors that can be used to identify and measure weather conditions as they occur.

The device may also include solar panels 127 or other like photovoltaic cells to receive solar energy and convert it into electricity for operation of the weather station device. In the illustrated example, solar panels 127 are mounted on upper surface element 118 to provide exposure to the sun or other sources of optical energy. In other embodiments, other power sources can be used in place of or in addition to solar panels 127. For example, battery cells can be provided to power the device as can other renewable sources of energy such as, for example, wind energy.

In some embodiments, the meteorological measurement device can utilize a novel method to measure precipitation type and amount using a solid-state pressure or force sensor to sense the force of precipitation such as, for example, falling rain or hail. In other embodiments, an accelerometer can be used to sense the force of precipitation. For example, a piezo or other like sensor can be used to generate electrical current in response to impact made by precipitation impinging on the sensor. The electrical current can be proportional to an amount of displacement of the piezo electric material, which can be used to provide information in addition to merely the presence or absence of precipitation.

In addition, a moisture sensor can be provided and can include metal electrodes protruding from a hydrophobic material. The electrodes can be used to detect moisture by detecting increased electrical conductivity between the electrodes. The following scenarios illustrate examples of how a force sensor and conductivity sensor can be used to detect precipitation. When the solid-state force sensor detects impacts by the precipitation and the moisture sensor detects moisture, the device reports the presence of rain. When the solid-state force sensor detects impacts having the signature of precipitation and the moisture sensor detects no moisture, the device reports the presence of hail. When the solid-state force sensor detects no impact but the moisture sensor detects moisture, the device reports the presence of drizzle. Embodiments can be implemented to: Analyze the impact signature to allow rain, hail, small hail, and drizzle to be distinguished; use electrodes embedded in hydrophobic plastic to enable detection of active moisture in the air rather than standing water; use the entire system body for detection to allow for a radical size reduction compared to conventional approaches.

To estimate the amount of precipitation, the device measures the quantity and size of impacts and multiplies the collective total impact amount by a coefficient that depends on whether the type of precipitation is rain or hail. To estimate the size of hail stones, the device assesses the maximum impact strength recorded. Other embodiments can calculate the average or medium impact. Other computations can be used as well.

In another embodiment, the method for measuring the quantity and force of impacts by falling rain or hail can be implemented using one or more accelerometers mounted to one or more surfaces that are exposed to such precipitation. For example, mounting accelerometers to the enclosure of the MWS enables detection of precipitation over a large area using a micro-size component.

In various embodiments, one or more accelerometers can be mounted beneath upper surface element 118. For example, an accelerometer can be mounted on either side of the PCB without having a substantial adverse effect on measuring performance. For example, it could be mounted on the bottom side of upper surface element 118, so that it does not otherwise take up space they can be used for top side electronics and components such as sensors that rely on external exposure to sense whether parameters. The accelerometer setting may be sensitive enough to detect the vibration caused by rain or hail impacting any surface of the top exposed PCB or impacting any exposed component solidly attached to the PCB.

The quantity and strength of impacts are both detectable by the accelerometer and measurable with the signals output from the accelerometer. Analyzing the output signal to look for particular impact characteristics, such as vibration frequency and amplitude, can be done to filter out and disregard output from the accelerometer that is caused by non-precipitation sources, such as, for example, wind turbulence and physical movement. In some embodiments, the output can be digitized and analyzed by a DSP or other processing device to determine whether the impacts are due to precipitation and to identify or classify the precipitation.

Because the entire upper surface element 118 (including the components mounted thereon) can be used to detect precipitation, this technique offers a potentially larger surface area to provide detection of precipitation than does a dedicated Piezo (or other) element that would have to share space with other sensors mounted on the printed circuit board. Accordingly, this can result in more accurate precipitation estimates. In yet another embodiment, accelerometers can be mounted on support elements 112 to likewise detect precipitation impacting upper part 100.

Yet another alternative for measuring the quantity and force of impacts from precipitation uses a microphone or other like element to sense the impacts on the external surfaces of the device. A sound analysis module can be used to analyze the microphone output to detect and discern the sound of precipitation impacting upper surface element 118 and components mounted thereon from other sounds. For example, the microphone output can be digitized and a DSP or other processing device used to analyze the output to identify certain defined characteristics that indicate that detected sounds are from the impact of rain drops or hail stones on the device, and to classify the type of precipitation. Accordingly, the system can filter out and ignore detected sounds that are caused by non-precipitation sources such as wind and movement.

Whether by analog or digital (e.g., DSP or other processing device) means, a module can be included to quantify the quantity and force of impacts and evaluate the impact signature to distinguish between classify precipitation as rain, hail, small hail, drizzle, etc., and to filter out other impacts as non-precipitation impacts.

These and other various approaches for detecting and quantifying the presence of precipitation can be used as a sole sensor solution or in combination with other impact measurement solutions for precipitation sensing. The combination of several precipitation sensing solutions can be used to improve the reliability of detection and hence proper weather reporting.

Although any of a number of different moisture sensors can be used, as noted above one embodiment employs electrodes embedded in a hydrophobic material. The hydrophobic material encourages the transport of liquid away from the electrodes. Accordingly, the electrodes can remain dry during dry conditions, yet when any moisture is dropped on the sensor such as from precipitation, the sensor can respond to the moisture and produce a detectable electrical output signal indicating the presence of ongoing precipitation.

In various embodiments, the precipitation sensing system can be configured to use the following signals:

Disdrometer Average—Integrates both the quantity and strength of impacts of precipitation elements.
Disdrometer Peak—Measures the impact strength independent of quantity.
Moisture Sensor—Measures falling moisture of either rain or snow.
Temperature Sensor—Suggests whether falling moisture is rain or snow.

With one or more sensors, the following precipitation conditions can be distinguished:

No Precipitation: No signal is present on the disdrometer or moisture sensor.
Rain: Both the disdrometer and the moisture sensor detect a clear signal. The average disdrometer signal measures the quantity.
Hail: The disdrometer registers a signal (impacts) but the moisture sensor remains untriggered. The peak signal distinguishes it from ice pellets or snow pellets.
Ice Pellets or Snow Pellets: The disdrometer registers a signal (impacts) but the moisture sensor remains untriggered. The peak signal distinguishes it from hail.
Rain: The disdrometer registers no signal (no impact) but the moisture sensor detects falling moisture and the temperature is above 3° C.
Snow, Snow Grains, or Ice Crystals: The disdrometer registers no signal (no impact) but the moisture sensor detects falling moisture and the temperature is below −3° C.

With the hybrid sensor system in some applications, snow and drizzle may be difficult to distinguish from one another in the zone between −3° C. and 3° C., where snow can turn to drizzle and vice versa with slight changes in elevation and temperature. A second challenge is that the structural character of snow forms (snow, snow grains, and ice crystals) and small hail forms (ice pellets and snow pellets) may be difficult to distinguish without including optical detection and analysis modules. Nonetheless, even without optical detection and sensing, the system can be implemented to provide reliable and distinct determinations of six precipitation categories, including the "no precipitation" state.

Embodiments of the meteorological sensing device can utilize forward-scattering modules to estimate visibility, as is a common technique understood in the art. However, in some embodiments, the device uses a novel system and method to perform this measurement using a low-power, optical light emitting diode (LED) transmitter and a large-area photo-diode optical detector. The optical transmitter may be modulated on and off under microprocessor or other module control. The detector may be digitally sampled. With such apparatus, forward scattering can be measured by subtracting the sum of the detector output when the transmitter is off from the sum of the detector output when the transmitter is on. In some embodiments, a single LED transmitter can be used to limit the amount of power consumed by the sensor while the detector uses an array of photodiodes for increased sensitivity.

In various embodiments, the weather sensing device includes a module configured to calculate the cloud layer height. In some embodiments, the measurement is made using a laser based range finder approach. A pulsed laser source can be used to transmit a light pulse up toward the cloud layer. The light pulse reflects off the cloud layer and is returned to the weather station, which can also include a receiver to detect the reflected light pulse. A computing module measures the time of flight of the laser light pulse from the laser transmitter to the receiver and uses this time, based on the speed of light, to calculate the distance to the cloud layer. Other similar optical or sonic ranging techniques can be used. In various embodiments, the laser system can be implemented using a microchip laser with a passive Q switch that provides the high peak power of the laser pulse but requires very low electrical power. Typically, peak power will be in kilowatts. In some embodiments, the system can use a miniature pulsed laser of higher energy, i.e. hertz, that can operate in low frequency operating mode and can reach even higher peak powers. Typically, the even higher peak power can be in megawatts. The laser emitting aperture can be different from the detecting aperture to improve signal to noise ratio.

The receiver used to detect the reflected light pulse can be a high-speed detector with high sensitivity. In a preferred embodiment, the detector is an avalanche photodiode. In other embodiments, the detector can be a photomultiplier tube or photodiode. Optical filters can be used (e.g. bandpass filters at the bandwidth of the laser light) to filter out unwanted noise (e.g. ambient light) to prevent noise signals from impinging on the detector. This can improve the signal-to-noise ratio of the system and hence, the detectability of the ranging pulses.

The solar panels 127 can be arranged across the upper surface element 118 in a pattern that minimizes shadowing of the panels by the various sensor components mounted on and extending above upper surface element 118. Circuitry can be included with the photovoltaic elements 127 to allow electric power from illuminated elements to be collected while blocking electricity drainage by photovoltaic elements that may be in a shadow. The upper surface element 118 preferably should have four or more solar panels 127. In another embodiment, the solar panels 127 can be arranged in a vertical or semi-vertical orientation in order to increase efficiency of solar energy capture at higher latitudes. For example, solar panels can be configured vertically on lower part 105.

An antenna 140 can also be mounted on upper surface element 118. This antenna 140 could be used for receiving transmit signals between the weather device and external devices. Examples of received signals can include operating commands for the weather station from a control center or base of operations. For example, an operator (e.g. a human operator or computer control device) can send commands to the weather station to power on or off certain functions, to change operational parameters, or to otherwise affect the function or operation of the system. Such signals can be sent, for example, through a satellite network such as, for example, the Iridium satellite network and via GPS satellite signals. Examples of signals transmitted by the weather station device can include, for example, weather sensor readings, camera images, and GPS coordinates for weather station.

Imaging systems can be included as well to enhance the performance and capabilities of the weather station. The use of imaging for weather condition analysis can substantially improve awareness of the weather observation personnel and can also be used to assist in troubleshooting or verifying the performance of complex sensor sets. Imaging systems can also supplement the information received by the sensors and may be used to verify the information received by the sensors. Imaging capabilities implemented in the weather station device can therefore, in some embodiments, be implemented to improve the reliability of the remotely acquired data and can help to prevent or reduce false readings, tampering and damage related sensor misreading.

Accordingly, imaging systems can be implemented, in some cases with multiple cameras, to allow images to be taken in multiple directions, digitally compressed, and transmitted (e.g., via satellite) from the weather station device at its remote location. In the embodiment illustrated in FIG. 1 an example camera module 120 is included. This example camera module 120 includes four cameras 125 (three can be seen in the figure) facing in four different directions. Particularly, in this example, the cameras are arranged to be facing at 90° intervals from one another. The use of four cameras is not a requirement; the device may employ any quantity of cameras, but this quantity may be limited in some cases by size restrictions of the weather station device or data bandwidth constraints of the communications link.

In some embodiments, additional memory or data storage can be provided to allow images to be taken in excess of available bandwidth and stored for later transmission. In this manner, additional images of weather events can be captured and stored for transmission such a system is not purely bandwidth constrained. In various embodiments, regardless of whether such additional memory is included, sufficient buffering is provided to allow capture, processing (if any) and transfer of images without unduly burdening the system by processing and bandwidth constraints.

In some embodiments, the cameras may be oriented such that their viewing angle is slightly above horizontal. With such an orientation, images obtained from the cameras can include both the surrounding terrain and the sky. Typically, with weather station applications, it is desirable to be able to view the sky to enable the capture of current weather events and the possible prediction of future weather events.

In various embodiments, the one or more cameras included with the weather station can be mounted on an adjustable mount so that their viewing direction and angle can be changed. For example, in the illustrated embodiment, camera module 120 can be configured to rotate about its axis so that the cameras can scan beyond their normal horizontal field of view. Additionally, the cameras themselves can be adjustable in azimuth, elevation, and zoom so that the scene detected by the cameras can be adjusted and chosen for a given situation. Optical zoom, electronic zoom, or a combination of both optical and electronic zoom can be used to change the focal length of the camera or cameras.

In the illustrated embodiment, the four cameras 125 are arranged to be facing 90° apart about the plane of the panorama. Imaging of the sky allows for verification of the sensor readings and enables an operator to visually verify weather conditions. For example, imaging the clouds may be used to identify cloud coverage and determine the presence, direction and the type of an incoming storm. Typical up tilt angles for the cameras could be from 5 to 45 degrees with optimal angle around 10 to 20 degrees. Other angles above and even below the horizon can be used.

With the proper field of view (horizontal), the cameras can be configured to cover 360 degrees of view around the weather station device. In some embodiments, the cameras may have gaps in the field of view, which may be acceptable for various applications. For example, in one embodiment four cameras with 60-degree field of view can be provided, covering 240° of the total 360° degrees of surround with 30-degree gaps between the images of each camera. Other angles and gap spacing may be used in different embodiments and overlapping fields of view can also be provided.

The cameras may be mounted in different ways. In some embodiments, X-Y or azimuth-elevation mounts can be used to mount one or more cameras on the weather station to provide control of the directionality of the cameras. In other embodiments, the cameras, including those configured as illustrated in FIG. 1, may be mounted on a single rigid-flex or completely flexible PCB to allow flexibility in mounting. For example, the flexible printed circuit board can be folded or bent into the desired shape to provide proper camera orientation. This can also, in some embodiments, facilitate a compact shape for the module. A rigid-flex or completely flexible PCB can also be implemented to avoid requiring wire interconnects or board-to-board connections between multiple separate PCBs (e.g. one for each camera). Accordingly, this can provide ease of manufacturability and a compact size and shape. This mounting also allows for the manufacture of a single panorama camera system PCB, saving materials, cost, and time as compared to embodiments using multiple printed circuit boards.

In some embodiments, the cameras are oriented with inclines above the horizontal plane to achieve an image with more view of the sky than the ground. In the embodiment illustrated in the example of FIG. 1, the PCB board is folded into the shape of a four-sided truncated pyramid, with one camera on each face of the pyramid. In this example, each camera is positioned at the same corresponding location on each respective face of the pyramid. Other shapes may be used in different embodiments, including a conical shape with a circular base. In addition, the shape of the board may be modified to allow for the use of a different number of cameras and different orientations.

In some embodiments, supporting electronic components and circuitry are mounted on the flexible or rigid-flexible PCB, such as on the pyramids faces. In other embodiments, the supporting electronic components and circuitry are mounted on a "tail" section of the PCB board, where the tail section extends off the bottom of one or more of the pyramids faces. This tail may be foldable out of the way of the pyramid, either by folding the tail under the pyramid or to the side of a bottom edge. A shared common bus can be included to electrically connect all the camera sensors, thereby reducing the number of signal traces that must be routed. The shared bus extends from the camera on the "end" pyramid face, through each of the adjacent pyramid faces, and to the supporting electronics on the tail section. Circuitry can be provided to allow signals to be multiplexed onto this shared bus for data transfer. Likewise, separate buses can be used for parallel data transfer.

When the flexible or rigid-flexible PCB is used, the board may be maintained in the folded truncated pyramid shape by being mounted on a solid internal support structure. The support structure can be made of any of a number of different types of solid materials. Some example solid materials can include plastics, metals, or wood. The support structure may be sized and shaped to fit inside the folded PCB shape to contact and hold each pyramid face securely in its corresponding location and orientations. The structure can further include a lip that extends around the underside and front of the bottom edge of each pyramid face to hold that face in place against the internal structure.

The top edge of each pyramid face may be held in place in some embodiments using a removable cap secured by a screw or other fastener. The removable cap can be included to provide a non-permanent mounting for the rigid-flex or flex PCB into the support structure. In other embodiments, the flexible or rigid-flexible PCB can be secured to a simple internal support structure without a bottom lip and removable cap. This embodiment may be secured by means, such as, for example, glue or epoxy, screws, and other fasteners. As these examples serve to illustrate, any of a number of different support structures and mounting brackets can be used to secure the printed circuit board in place in the desired shape or configuration.

The rigid-flex or flex PCB can be designed to orient the cameras at other inclines or declines by adjusting the dimensions and shape of the PCB so that it folds into a one of the variety of potential shapes with the desired incline or decline tilt. The height of the PCB board can be sized to provide space required for the components and circuitry. As an illustration, a 0° incline would result in a folded shape with vertical faces and may include a vertically uniform footprint or horizontal plane shape that is constant from the bottom through to the top. Using a fully flexible circuit with a 0° incline of mounted components can also be implemented using a PCB formed into a cylindrical shape with a circular base. For incline angles above horizontal, a PCB formed into a conical shape with a circular base can also be used. As these examples serve to illustrate, there are number of different PCB configurations that can be provided to allow mounting of cameras at desired positions and orientations.

The use of cameras, including image sensors and optics (e.g. lenses), mounted on rigid-flex or flex PCBs is not limited to applications for capturing panoramic images or images about 360°. The rigid-flex or flex PCB can be designed to be bent or folded to orient any number of cameras in any position and any direction. This maintains the benefits of manufacturing and assembling a single or multi-camera system (with specific placement and orientation requirements) all as one PCB unit.

The use of a rigid-flex or flexible PCB is not limited to applications for mounting imaging devices. Indeed, in various embodiments, other sensors or other weather station components can be mounted on flexible printed circuit boards or rigid-flex printed circuit boards to accomplish the same or similar features as described above with respect to the cameras. Accordingly, the use of rigid-flex or flex PCBs for sensor mounting can allow mounting of sensors and other components in desired positions and orientations as described above. In some embodiments, other sensor components therefore can be mounted on a rigid-flex or flex PCB with the truncated pyramid, cone, or vertically uniform shape as described above.

The upper part 100 may also include a lower surface element 143, which in the example of FIG. 1, is shown as being mounted on the lower side of the upper part 100. This lower surface element 143 could be, for example, a PCB to which components of the weather station may be mounted. Because lower surface element 143 is below the "canopy" of upper part 100, or surface element 140 may in some embodiments be used to mount elements or components of the weather station that can be employed without requiring an upward facing orientation (e.g. they do not require direct sun or precipitation exposure has available on the top surface). Such elements could include, for example, sensor elements such as humidity sensor 145 and wind sensor 150, for example, which do not require precipitation or direct sun exposure that is available to components on the upper surface element 118. Other examples of such sensor elements include a temperature sensor, a pressure sensor, a thermal wind speed and thermal wind direction sensor (including, for example, wind sensors employing hot element or "hot wire" functionality as further described below).

The air gap between the upper and lower portions of the device provides a shaded area for measurement of ambient temperature and humidity, and an air channel for measurement of wind speed and direction. Although not illustrated in FIG. 1, sensors such as, for example, micro sensors for pressure, magnetic orientation, tilt, position (e.g. GPS), and a microprocessor can be included in internal portions of upper part 100.

The open area between the upper part 100 and the lower part 105 can be configured to provide an area for wind sensing by thermal, mechanical, sonic, or other methods, and which can be heated to avoid accumulation of freezing rain, snow, or other precipitation. In some embodiments, the wind sensor 150 includes a thermal element 154 surrounded by temperature sensors 152 arranged in a pattern (only two shown). Preferably, temperature sensors 152 are arranged in a ring pattern evenly spaced equidistant from thermal element 154, but other patterns and arrangements can be used. The preferred quantity of temperature sensors is four or greater, but other quantities of temperature sensors 152 may be employed in various embodiments. In some embodiments, a constant energy is applied to thermal element 154 to raise its temperature, and reductions in temperature of the thermal element 154 due to removal of the heat by wind is used to calculate wind speed. The temperature of the air around thermal element 154 is measured by temperature sensors 152, which are arranged in a pattern about thermal element 154. Analysis of the temperature readings from the various temperature sensors 152 can be performed to determine a pattern of air flowing from the thermal element 154 to the various temperature sensors 152. Heat generated by thermal element 154 is carried by the wind to one or more temperature sensors 152 that are downwind from thermal element 154. Accordingly, changes in absolute temperature readings for temperature sensors 152 or relative temperature readings among temperature sensors 152 can be used to identify wind direction. For example, if the northernmost temperature sensor 152 is reading at a higher temperature relative to the remaining temperature sensors 152, this indicates a southerly wind carrying the heat from thermal element 154 to the northernmost temperature sensor 152.

Accordingly, the temperature at each of the temperature sensors 152 is measured to determine the direction of greatest temperature increase, or to determine the temperature differential among sensors. The sensor measuring the highest temperature is in the downwind direction of the wind. In other embodiments, absolute changes in temperature for each sensor are measured as the heat source is cycled from the on state to the off state (or vice versa) and the sensor with the greatest change in absolute temperature is in the downwind direction of the wind. Accordingly, in various embodiments, the system is configured to measure only the difference in temperature between cycles, or the difference in temperature among sensors, and may therefore be insensitive to absolute temperature.

Thermal element 154 can include a resistive heating element such as, for example, a resistor, resistive wire or resistive heating element. Current can be supplied to thermal element 154 to increase its temperature above ambient temperature. To conserve power, algorithms can be employed to determine the amount of current needed to raise the temperature of thermal element 154 sufficiently above ambient temperature to allow operation of the thermal sensor.

The thermal sensors, for example, can comprise small negative temperature coefficient (NTC) thermistors mounted on 0.3-inch long pins. Thermal element 154 and temperature sensors 152 can, in some embodiments, be mounted such that they are at or near the center of the air channel provided by opening 110 such that they receive relatively unimpeded airflow. Additionally, in various embodiments, the sensors are preferably smaller in diameter than the separation distance between the sensors. Utilizing small sensors reduces interference with air flow around the sensors. Additionally, using smaller sensors typically yields a smaller thermal mass, allowing the temperature of the temperature sensors 152 to rise and fall more quickly in response to heat generated by thermal element 154. As seen in the example of FIG. 1, temperature sensors 152 and thermal element 154 are mounted toward the center of opening 110 to maximize the amount of shade from sunlight provided by upper part 100. Shading from the sun can be desired so that the operation of the sensors is not affected by movement of the sun, direct impact by the sun's rays, or the effects of changing cloud cover. For similar reasons, surfaces surrounding wind sensor 150 can be made from, covered with or painted with non-reflective materials.

As these examples serve to illustrate, with some embodiments, thermal wind sensor designs can be implemented to enable the determination of wind speed and direction using thermal means that allow for reduction in size of the weather station device and the elimination of moving parts as compared to conventional mechanical and acoustic approaches. This can also provide the benefit of eliminating binding that affects mechanical devices due to dust and contamination or due to freezing or ice accumulation.

In various embodiments, wind sensor 150 can include a module employing software or other algorithms to compute wind speed and direction. In some embodiments, a algorithm can be implemented to first determine the temperature sensor 152 experiencing the largest amount of temperature rise as compared to other sensors in the ring of thermal sensors 152. From this, the approximate wind direction can be determined. The algorithm can further be configured to calculate a more precise wind direction by using a weighted average of temperature changes among the thermal sensors 152. The algorithm uses the measure of actual heat rise for each temperature sensor 152 over the average rise in temperature among the set of temperature sensors 152. The method can be configured to also employ an algorithm to compute the average wind speed and wind direction by averaging the measurements over multiple measurement periods. In some embodiments, the algorithm can be configured to compute an average wind direction over multiple time periods only when the multiple direction readings are within 90° of one another. The system can further be configured to compute parameters for wind gusts by determining the highest wind speed recorded over a given period of time and the wind direction at the time the highest wind speed was recorded.

Below the wind sensing area in the example of FIG. 1, is an ambient sensing area used for sampling ambient air for purposes of determining for example humidity and temperature. The ambient sensors, however, are not limited to being positioned below the wind sensing area and can be placed in other locations about chamber 100 including above or at the same level as the wind sensor components. Preferably, the ambient sensors are not mounted in such a way so as to interfere with the flow of wind about the wind sensor components.

The weather station device can utilize high-accuracy, solid-state thermal sensors to measure ambient air temperature. In various embodiments, conventional off-the-shelf temperature sensors can be used for this purpose. In many embodiments, the weather sensing device can be configured to use a novel method to measure the amount of solar heating present at the weather sensing device, and to compensate for that solar heating to more accurately assess ambient air temperature. In accordance with one embodiment, the method relies on multiple temperature sensors. An external temperature sensor exposed to the air, is provided preferably in a shaded area. An internal temperature sensor (e.g., internal to the body of upper part 100) to measure the temperature of the shaded surface is also provided. The method determines the amount of solar heating that is affecting the ambient temperature sensor and subtracts this from the temperature measurement to arrive at a more accurate or better approximation of the temperature measurement. The amount of solar heating in one embodiment can be measured as the internal temperature sensor reading minus the external sensor reading. This provides an estimate of the amount of heat contributed to the device by solar effects. This temperature differential can be subtracted from the temperature measured by the ambient temperature sensor to arrive at a more accurate estimation of the ambient temperature.

From the analysis of temperature data, consistent behavior was noted to assess the proper correction factor, which is found to be very consistent for wind speeds greater than a knot. With the technology disclosed herein, true air temperature can be calculated by subtracting a fraction (e.g., as determined by device-specific calibration) of the difference between the external and internal readings from the external reading. The only deviation from the consistent correction factor occurs for air that is very still (less than 1 knot) for a prolonged amount of time. This is an uncommon condition in most real-world applications.

The weather station device can also utilize capacitive humidity sensors to measure ambient humidity. Capacitive humidity sensors are readily available as off-the-shelf products. In various embodiments, the device can be configured to use a novel method to measure the amount of solar heating and to compensate for errors introduced by solar heating in the humidity measurement. In various embodiments, the method utilized one external temperature sensor placed in a position to be exposed to the air, but in a shaded area of the device. The method also uses an internal temperature sensor that measures the temperature of the shading surface. The amount of solar heating may be assessed as the internal sensor reading minus the external sensor reading, multiplied by a correction coefficient and added to the humidity reading.

The use of multiple sensors across the weather station device, for example, multiple temperature, humidity and pressure sensors on upper surface element 118 and lower surface element 143 can be configured to give the system the capability to reliably and intelligently deduce or better estimate the true weather parameters from multiple sensor readings in a small form factor. For example, high intensity sun illumination would result in a heating differential between the upper mounting surface element 118 and the lesser heating of lower surface element 143. The difference in temperature for the temperature sensors on upper mounting surface element 118 and lesser heating of lower surface element 143 allows deducing the heat flow across the weather station device and calculating the true temperature reading without adding additional sun shading for the weather station device.

The use of multiple pressure sensors allows reducing random calibration variations for more accurate pressure readings and provides redundant pressure reporting in the event one or more of the sensors fails. Both interfaces of the upper mounting surface element 118 and lower surface element 143 could be sealed. Alternatively, upper mounting surface element 118 could be hermetically sealed to upper part 100, for example, and the lower mounting surface element 143 mounting can include gaps to prevent condensation and moisture accumulation in the inner volume of part 100. The electrical connections of components of the upper mounting surface element 118 and the lower mounting surface element 143 are preferably sealed from environment using potting materials, such as, for example, epoxy potting.

The weather observation unit can include additional capabilities in various embodiments to expand the range of missions and applications for the unit. These capabilities can be implemented inside or integrated physically with the portable weather station unit. In other embodiments, these capabilities can be supplied as external add-ons connected to the device by a cable, connector, or through a wireless link. The capabilities may include, for example, the detection of radiation or nuclear material with the inclusion of an ionizing radiation detector module. Chemical detection capabilities can be implemented by adding a chemical presence detection and identification unit. Biological agent presence detection could be implemented by using a specific biological agent detection and identification unit. In a preferred embodiment, nuclear, chemical, and biological agent presence detection may be done by sampling the environmental medium such as air or water through the detector unit for accumulation and analysis for improved sensitivity of detection.

The lower part 105 as well as upper part 100 can be powered by solar panels 127 mounted on the upper part 100. Lower part 105 may additionally or alternatively include a battery and capacitors mounted in the inner volume thereof. These power sources can be used to power either or both lower part 105 and upper part 100. Where batteries or capacitors are included with solar panels 127, solar panels 127 can be used to recharge the capacitors and batteries to allow operation during periods of little or no light. The electrical connection from lower part 105 to the upper part 100 could be done through the mounting means 112.

Lower part 105 can be designed such that it is a separable stand-alone power module in any of the power configurations noted above. This power module can be designed with universal mounting features on top, for example, to allow attachment of upper part 100 and create the weather station configuration defined in FIG. 1. Alternatively, other sensors or sensor systems, such as the extension module depicted in FIG. 3, can be mounted on top of lower part 105 and be powered by its power system. Such integration of the power module to other sensors is not limited to weather sensors, but can include other sensors such as chemical, radiological, biological, imaging, motion, etc. Such a configuration enables a universal power module capable of integrating with and powering any plurality of sensors. Alternatively, the power module can be wired to the full weather station, as depicted in FIG. 1, and provide additional backup power to the main power system of the weather station.

Although the batteries or capacitors can be placed in either or both the upper part 100 and lower part 105, placement in lower part 105 lowers the center of mass for the weather station device. Having a lower center of mass improves the deployability of the unit for air-drop deployments, such as those in which the weather station device is dropped from an airborne platform to a desired location. A lower center of mass for the weather station device would allow the system to stabilize its direction and orientation during the descent phase of air-drop deployment for proper orientation and placement in the ground.

A power switch 155 can be included to turn the weather station device on and off. Although power switch 155 is illustrated as being positioned on lower part 105, power switch 155 can be located elsewhere on the weather station device. Also, the weather station device may include a local connection port 160 and an extension port 165. Although illustrated as being located on lower part 105, such ports can be placed on either upper part 100 or lower part 105.

The local connection port 160 can be used for data transfer and to supply electric power to the weather station device from an external battery, solar cell or other power supply. This external power could be used to charge the weather data station device's batteries or to power the device during operation. Because the port can be used for data transfer, it can also be used to verify the device's performance after activation. Additionally, this port can be used to receive sensor data from the weather station device using a hardwired connection.

The extension port 165 can be used to connect additional modules such as, for example, sensor modules or other devices to the weather station device to augment its functionality. One example of such a module is an enhanced LIDAR system that can be used for visibility and cloud height measurement. Additional functionality can include, for example, modules to provide the capability to detect wind speed and wind direction above the weather station device using sound or light, such as sonic anemometer or laser anemometer. Another example is the use of a module to detect the presence of hazards such as radiological hazards, nuclear material hazards, chemical hazards or biologic hazards. In various embodiments, external modules connected through extension port 165 can include their own power sources such as, for example, batteries or solar panels, and can also be configured to exchange electric power with (from or to) the weather station device.

Using battery power to the exclusion of solar panels 127 frees up the use of the entire top surface of the device for placement of different sky-facing sensors—such as LIDAR, precipitation sensors, and photo sensors, and so on—without the added size and weight of additional mounting arms as in conventional solutions. Accordingly, various embodiments can be implemented considering trade-offs between unit size, real estate available for multiple sensors, and the long-term availability of power through the use of solar panels.

Existing weather sensors are much heavier than may be desired for remote deployability and are much too large to be easily carried. The typical configuration used in existing weather station consists of individual components mounted using separate arms suspending the individual components at some distance from one another. This is done so that the sensors do not interfere with one another and their various effects can be isolated. In contrast, with the current weather station system, an axial configuration (e.g., such as that shown in FIG. 1) can be utilized in various embodiments to provide different sensor mounted in a vertical configuration or otherwise vertically orient the component arrangement.

In the example illustrated in FIG. 1, the sensors are organized and arranged into specific groups mounted on upper and lower portions of the device so that the remote weather system can be provided as a single unit instead of multiple components connected through cables or mounted on arms and extensions. With an integrated package such as the example shown in FIG. 1, embodiments can be implemented to: eliminate multiple setup steps otherwise required to assemble components in a conventional system; eliminate large, bulky towers; reduce the overall system profile to reduce wind loading; reduce cost by eliminating multiple enclosures and interconnections; enable potential air-droppable capability; improve ruggedness and durability.

This configuration of sensors as shown in FIG. 1 allows for sky-facing sensors such as LIDAR, precipitation sensors, and photo sensors to be placed at the top of the device and to use all (if needed) available area on the top surface for sensors and photovoltaic cells. Below the top surface section is the open area used for wind sensing by either thermal, mechanical, sonic, or other wind sensing systems and which can be heated to avoid accumulation of ice or freezing rain. Below the Wind sensing area is an ambient sensing area that can be used to mount sensors for ambient air sampling such as humidity and temperature sensors. This overall arrangement allows sky-facing sensors, heated sensors, and ambient sensors to all exist as an integrated unit within a single compact device rather having such components separated on a sprawling device with multiple arms and extensions. The arrangement also allows for variations such as combining the wind sensing and ambient sensing areas as a single area if the wind sensor requires no heating or if the area is large enough such that when sensor heating does not impact the ambient sensors.

The weather sensing device can utilize this stacked, axial configuration with a combined area for wind and ambient sensing to meet stringent size and weight requirements. The device also utilizes most of the upper surface for solar cells to recharge batteries contained in the lower portion of the device; the remainder of the upper surface may be used for the satellite communications antenna, the lightning detection antenna, optical ambient light sensors, a moisture sensor, a precipitation force sensor, and a panoramic camera system. The air gap between the upper and lower portions of the device provides a shaded area for measurement of ambient temperature and humidity, and an air channel for measurement of wind speed and direction. Sensors for pressure, magnetic orientation, tilt, GPS, and a small microprocessor can be included internal to the device such as, for example, in the upper or lower portion of the device.

In various embodiments of the weather sensing device, the power system can be configured to utilize constant current charging from the solar panels to charge lithium-ion cells or other energy storage devices in parallel. A low-power linear regulator power supply can be included to maintain continuous operation of the microprocessor system even in the sleep mode, while separate switched mode supplies can be included and activated under microprocessor control. Supercapacitors in parallel with the solar cells can be included and used to deliver surge currents drawn from the switched-mode supplies that would otherwise exceed the current-delivering capability of the small battery pack.

In embodiments using supercapacitors, additional modules can be used to manage the supercapacitors. One module can include a charge dissipation circuit that automatically discharges the supercapacitors and turns off the device when the power switch is placed in the off position. Another module can be included and implemented to prevent high in-rush currents from occurring when the device is switched on and the batteries are connected to the supercapacitors. In one embodiment, the circuit can be implemented as a soft-start circuit that uses a high-power MOSFET (Metal Oxide Field Effect Transistor) driven by an RC (resistor-capacitor) network connected to the discharge load. This circuit can be implemented to limit current as the supercapacitors charge to the level of the batteries and for the connection to be of minimal electrical resistance when the device is fully on. This circuit can also be configured to reduce spark wear on the mechanical switch as well as the surge current stresses that would otherwise occur.

A number of additional features may also be included to protect the electronics of the system from environmental conditions for outdoor use, and, in some embodiments, particularly from rain and other forms of precipitation or condensation. Although sealed enclosures are typically used to achieve this type of protection, the weather station system can, in some embodiments, include one or more various features to achieve the same or a similar level of protection without the bulk of an enclosure. To protect the device without requiring excessive weight, the weather station device can be implemented to use un-enclosed printed circuit boards on which exposed sensors, and solar cell elements can be directly mounted. Antennas can also be directly mounted on an exposed print circuit board and epoxy encapsulation can be provided to shield the antennas from environmental exposure. The absence of gaskets and seals prevents moisture from becoming trapped within the enclosure and can also avoid problems associated with pressure variations such as may arise due to changes in elevation. Additionally, drainage holes can be included to prevent the build-up of moisture, which can be detrimental if the weather station device later encounters freezing conditions, which can cause water expansion due to the phase change.

In various embodiments, the device can include a completely self-contained power system. Power demands in a device with a small form factor are therefore ideally reduced or minimized. In many embodiments, to achieve reduced power consumption, the system is configured to power down all components. In further embodiments, all components except for the microprocessor are powered down, and the microprocessor is placed in a low-power sleep mode. The microprocessor can be configured to keep track of time in sleep mode and wake-up at predetermined intervals for scheduled measurements. At the time for scheduled measurements, the microprocessor awakens of sleep mode and powers on the sensors and other components of the device used for the scheduled measurement. In some embodiments, the microprocessor can be configured to power on only certain sensors that are used for particular measurements that are scheduled for a given time interval. In other embodiments, the microprocessor can be configured to power on the entire weather sensing device for measurements.

Accordingly, in some embodiments, the system can be configured to awaken at periodic intervals (e.g., every twenty minutes, every hour, every three hours, or other predefined intervals, regular or otherwise) to conduct scheduled measurements. In various embodiments, the intervals can be programmed via the communication interface (e.g., by messages received through an Iridium satellite transmission). In other embodiments, the system can be configured to wake-up at scheduled times to conduct measurements scheduled for those particular times. In some embodiments, the system can be programmed to awaken at given times, take particular measurements at the various awake times, and transmit the results to a base of operations (e.g., via satellite relay). In some embodiments, the data can be transmitted as it is being measured or at the end of each awake time, while in other embodiments, the data can be transmitted in batch form after a series of measurements are taken over a plurality of awake times.

Accordingly, in some embodiments, the system can be configured to wake multiple times (e.g., at regular intervals or as scheduled) leading up to a designated weather report. For example, in one embodiment, the system is configured to wake four times, at two-minute-and-thirty-second intervals during a ten-minute window immediately preceding a weather report. In some embodiments, for example, the timing is structured so that the weather messages are sent at roughly 55 min after the hour in hourly mode or every 15, 35, and 55 min after the hour in continuous mode. In three-hour mode, the unit can be configured to follow the hourly timing but only during hours 0, 3, 6, 9, 12, 15, 18, and 21. In other embodiments, other timing factors can be used.

Firmware in the device can be included to control the wake-up and sleep behavior as well as the operational modes: continuous, scheduled and periodic. When the weather station device is in sleep mode, a crystal oscillator or other timing source can be used to keep track of the sleep and wake times. For example, in some embodiments the device operates on a 32 kHz crystal oscillator to consume less than 100 uA of current. The microprocessor maintains state during sleep mode and is able to maintain time throughout sleep mode. In other embodiments, a low power receiver can remain powered on and the wake instructions sent from a remote device.

When the device is in active mode, the microprocessor in one example implementation operates on a 12 MHz oscillator so that sampling and computation can occur rapidly. When in this active mode, a sensor sampling state is executed every 10 mS during which a different action is performed each time. Since an interrupt is triggered every 10 mSec to handle timing during the active state, the firmware is designed so that all state executions take less than 10 mSec to execute. Computations that take extra time are broken into smaller subtasks. Static variables within the state handling routines maintain the intermediate calculation values between function calls so that long computations can be picked up wherever they are left off. Other clock rates and interrupt cycles can be used. The 12 MHz oscillator frequency and 10 mS trigger intervals are provided by way of example only.

Image compression is a well-known technique used in data communications. Compression helps to reduce the amount of redundant information in data, such as still images, in order to achieve efficient storage and transmission of the data over a communications link. In some embodiments, the weather station device compresses the still images captured by camera sensors on the device for easier transmission over the communication link. The camera sensor in the weather station device outputs image frames at a determined number of frames-per-second (FPS). In some embodiments, the sensor is capable of 30 FPS, but may be configured to output at a lower frame rate, for example 15 FPS. When the weather station device captures an image with a camera, image can be saved for compression and transmission.

A main control processor (e.g., a microcontroller in the weather station device) asserts the power-down control signals for each camera to cause all cameras to be transition to a disabled, powered-down state by default to save power when the cameras are not actively being used. When an image is to be captured from a camera, the microcontroller de-asserts the power-down control signal to the camera to enable/power-up the cameras. Cameras can all share a common bus for their output signals to reduce the number of components used and to reduce the number of traces needed for signaling, thereby simplifying the system design. Accordingly, in some embodiments, the cameras can be enabled one at a time to prevent bus contention.

Once a camera is powered up, the microcontroller can, in some embodiments, use a shared/common I2C communication bus to configure the camera's various settings (resolution, zoom, pixel output format, picture settings, etc.). When the camera has been fully configured and given a few seconds to adjust to the exposure and other picture conditions for the environment that it is sensing, the microcontroller sends a control signal to a CPLD, FPGA, or other programmable integrated circuit or module designed to capture and image and store the image data to external memory.

In some embodiments, the CPLD, FPGA, or other programmable integrated circuit or module interfaces with the camera sensor clock, vertical sync, horizontal sync, and data output signals. When an image capture occurs, the module detects the assertion (rising edge) of the vertical sync signal to identify the beginning of data output for a new image frame. At the same time, a horizontal sync signal is received that identifies the beginning (with its rising edge) and end (with its falling edge) of data output for a new row of pixels for the image frame. The module uses each clock cycle of the camera sensor's clock output to read in the pixel data for storing. The clocking in of pixel data continues for the expected number of data bytes for one row of the image frame at the configured resolution and pixel data output format. When the expected number of data bytes for one row has been clocked in, the module waits for the next horizontal sync signal to identify the beginning of the output of the next row of pixel data. This row pixel data is read by the module in the same way as before. This process repeats for each row of pixel data of the image frame, until all rows of pixel data for the configured image resolution have been read.

When the module reads pixel data of an image frame from a camera sensor, it immediately writes the pixel data to an external memory IC (e.g., SRAM), using sequential memory addresses to write pixels in the same order that they are read from the camera sensor.

When all pixel data bytes of an image frame have been read from the camera sensor and stored to memory, the module outputs a status signal to the microcontroller to indicate that an image frame has been captured to memory and is ready for reading/processing. Upon receipt of this status signal, the microcontroller initiates a clock/data/enable interface to read the pixel data out of the external memory IC, routed through the module. The microcontroller provides the clock and enable signals to the module since it is operating at a lower frequency than the module. The enable signal is asserted to trigger the module to enter a memory reading state. The enable signal remains asserted throughout the entire pixel data reading process. De-assertion of the enable signal causes the module to return to an idle state if it is in the middle of the memory reading state. The module also automatically returns to an idle state after all pixel data bytes have been read out of memory (determined by a count of the expected number of bytes based on image frame resolution and pixel output format).

The microcontroller asserts the data interface clock signal to the module to trigger the module to read data from the next SRAM address. The module immediately reads and outputs the pixel data byte to the microcontroller for the SRAM address. After a delay to guarantee that the new SRAM data is stable on the module to microcontroller interface, the microcontroller reads the pixel data byte into an internal FIFO buffer. The microcontroller then de-asserts and re-asserts the data interface's clock signal to the module to request the data for the next SRAM address for reading and buffering. This process repeats until all pixel data bytes have been read from the SRAM.

During the process of reading pixel data from the SRAM, routed through the module, and output to the microcontroller, the pixel data is accessed from the SRAM addresses in blocks of eight horizontal pixel data sets by eight vertical pixel data sets. A pixel data set includes all of the pixel data bytes that represent one image frame pixel. These blocks of eight-by-eight pixel sets are read in rows from left to right and top to bottom of the image frame, in order to support the JPEG compression that is performed by the microcontroller.

During the process of reading pixel data from the SRAM, since the microcontroller is controlling the read process with the assertion and de-assertion of the data interface's clock signal, the microcontroller can pause the reading of pixel data in order to perform the JPEG compression on the eight-by-eight pixel sets block and transmit the result out through a different interface (e.g. I2C or UART) to free up the FIFO buffer before reading in the next set of pixel data for JPEG compression of the next pixel data block.

Image compression, e.g., via the JPEG standard, can be implemented in the microcontroller (from the Microchip dsPIC33F family), taking advantage of its built-in computational functions for various steps of the JPEG compression algorithm. Currently, there is one fixed set of quantization tables for luminance and chrominance to achieve the desired level of compression to balance the sufficient image detail with minimal image data size. However, multiple tables can be stored in memory and selected by the user via external commands to change the effective compression levels. In addition, other imaging standards may be used based on requirements of the system.

This basic architecture of a CPLD/FPGA (or other module) to receive and store data from a sensor that outputs at a high frequency for future processing can be applied for any number of sensors. In some embodiments, the architecture can be used to record the output data of an analog-to-digital converter rated in the megasamples-per-second (MSPS) range and allowing a slower processor to analyze and process the samples later. This allows for greater flexibility in the type of processor used in the device and adding more flexibility in meeting stringent size and weight requirements.

In some embodiments, the weather station uses the Iridium short burst data modem (SBD) satellite communications network for data communications. Commanding a weather station, however, does not have to be limited to the Iridium SBD network. The Iridium SBD communications can be replaced or even augmented by any of a variety of other communications interfaces to allow for other commanding and data reporting options. Such options include, for example, UART, ZigBee wireless, IEEE 802.11 (Wi-Fi) wireless, other proprietary or custom standards or protocols, or even custom infrared or laser-based optical data transmission solutions. For ease of illustration only, the transmission of compressed still images will be described in terms of the Iridium SBD network. After reading this example, one of ordinary skill in the art will understand how this can be implemented using other communication protocols and devices.

In embodiments using the Iridium system, the Iridium SBD (short burst data) service is limited to data burst transmissions of up to a few kilobytes at a time. The Iridium 9602 modem, for example, is limited to transmissions of 340 bytes, which is not sufficient for transmitting a complete image of a reasonable resolution and detail. In some embodiments, the camera sensor output resolution can be chosen to be 320×240 pixels and use JPEG compression performed by the imaging microcontroller. These characteristics can significantly reduce an image to a data size that can be broken up and transmitted via several Iridium SBD bursts over a time that fits within the normal operating mode of the weather station device (hourly sensor readings and transmissions). In some embodiments, data from other weather systems external to the system can be fed in to the communication sub-system and treated as if the sensor readings were taken by the transmitting device itself.

Image data packets transmitted over the Iridium SBD contain a header that identifies each packet as image data. The header of each packet contains an incrementing sequence number to ensure that image data can be recombined in the correct order and to mark the total number of packets transmitted in the last packet. The header also contains a status byte to indicate whether the packet is the last data packet of an image. The header of the first packet contains a timestamp that corresponds to the timestamp of the weather sensor readings taken just prior to the image capture.

The image data portions of each image data packet include the JPEG compressed image data streamed from the imaging microcontroller. Image data is requested from the imaging microcontroller by the processor (a different microcontroller) that is assembling and transmitting the Iridium SBD packets, so only the amount of image data needed to fill the current packet is requested. The image data fills the remainder of each 340-byte Iridium SBD packet. In the last packet, if image data does not completely fill to 340 bytes, benign JPEG data fill bytes of hexadecimal 0xFF are used. These fill bytes do not affect the reassembly and display of a completed JPEG image.

The Iridium SBD packets are received via e-mail attachments by a remote computer. Each packet is received as a file attachment in an e-mail message, one e-mail message and attachment per transmitted Iridium SBD packet. Once the attachments are downloaded, the JPEG image can be reassembled into a file that is viewable on a computer by appending the image data portions of each packet, in the correct sequence, to a predefined JPEG file header containing the proper attributes. The standard JPEG end of image marker bytes of 0xFFD9 is then appended to the end of the image data bytes to complete the file.

This method of transmitting data for a complete image can be applied to sending any kind of large data format over any other interface and transmission protocol with a limited transmission packet size. It can also be used as a method to limit the bandwidth and effective transmission rate of one particular set of data, in order to make room for other data sets to share bandwidth over the interface for time sensitive transmission events.

Control of the weather station device is also capable using the satellite communications link. Commands are sent to the weather station device via the satellite communications link, such as the Iridium SBD network in certain embodiments. The remote end user creates an e-mail message targeted at the unique IMEI (International Mobile Equipment Identity) number of the Iridium 9602 modem on the weather station device. The user attaches a text file containing a single command or a list of commands to be processed and executed by the weather station device. The contents of this text file are queued for the weather station device to download via the Iridium SBD network. The next time the weather station device transmits data (any data, weather or image) it will download and read the message queues from the Iridium SBD network and any valid commands are processed at the completion of the original data transmission (after all weather or image data has been sent), to not interrupt the original process.

If multiple instances of the same command type are received during a single data transmission state (transmission of one group of weather packets or one group of image packets), depending on the command type, either the latest/most recent command received overrides the previously received command of that type (e.g. operating mode) or the latest/most recent command can be appended to the previously received command of that type (e.g. image request from certain cameras).

Various functions of the weather station system may be controlled by sending commands remotely over the satellite link. Commands may be sent to change the operating mode of the weather station device between continuous, hourly, every three hours, or some other operating mode employed in the design. By changing the operating mode, it is possible to change the frequency with which the weather sensing components collect weather data remotely as well as the frequency of transmission of that data, both of which are controlled by the operating mode. Commands may also be sent to request images to be captured and transmitted from the weather station device, independent on the operating mode selected. When such commands are sent, the weather station device may be manually forced to collect and transmit data without waiting for the next scheduled iteration of data collection. In some embodiments, this command may also reset the timing of the operating mode. For example, if a command is sent to tell the weather station device to collect data from weather sensors in between the programmed sampling interval, the weather station device will sample the data and the sampling interval will reset at that time. In other embodiments, the weather station device will not reset the sampling interval. In this case, the weather station device will sample the data as requested and then again at the scheduled interval time. Commands may also be sent to request an update of the GPS location of the weather station device. Requesting GPS information can be used to ensure that the GPS sensor is functioning properly by comparing the known location with the transmitted result. In addition, the GPS data can be used to ensure that the device has not been compromised by checking its known location against the received GPS data.

The commanding of a weather station device does not have to be limited to the Iridium SBD network. The Iridium SBD communications can be replaced or even augmented by another communications interface in the design to allow for other commanding and data reporting options. Such options include UART (already implemented in the PIWOS), ZigBee wireless, IEEE 802.11 (Wi-Fi) wireless, or even custom infrared or laser-based optical data transmission solutions.

Figure 2:
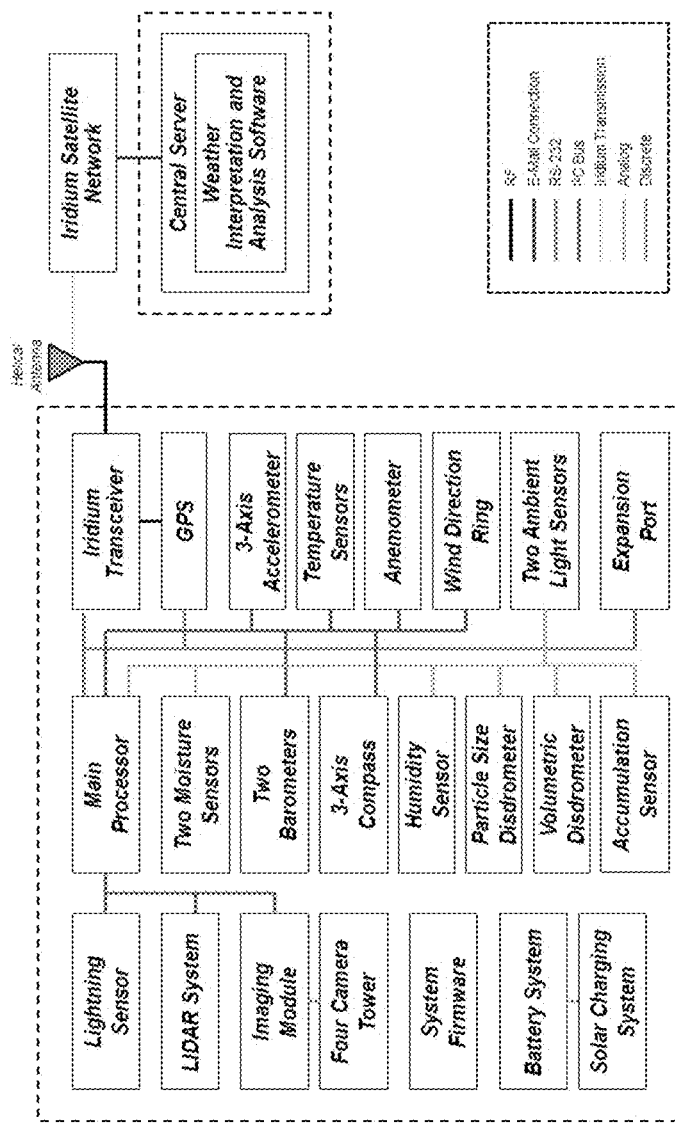
FIG. 2 is a functional block diagram illustrating an example weather station device in accordance with one embodiment of the technology described herein.

FIG. 2 is a functional block diagram illustrating an example weather station device in accordance with one embodiment of the technology described herein. The use of a three (3) axis accelerometer and three (3) axis compass provides a means for correcting the offset of weather-station-device orientation during placement and operation in remote location. The accelerometer also serves as a powerful tool for identifying attempts at tampering with the weather station device or changes of the orientation due to the environment or other factors. The use of the compass allows for the addition of magnetic orientation so that the photographic direction of the camera images from the cameras of the imaging module can be determined, and therefore the direction for incoming weather conditions determined. The collection of sensor data from multiple weather station devices at the central server can be configured to provide an efficient, sustainable, reliable, and redundant way of remote weather monitoring for the needs of multiple users.

Required weather parameters may be recorded using modules such as a lightning detector, ambient light sensors, cameras, LIDAR, multiple moisture sensors, multiple temperature sensors, pressure and humidity sensors, and disdrometer sensors. The battery system, in combination with the capacitor bank and solar panels, can be used to provide power to the system. System firmware, in combination with the main processor, collect the readings from the sensors, adds the required processing, corrections and encryption, if needed, to recorded data and then transmit the resulting data to the central server through the communications interface, such as the Iridium satellite network.

Figure 3:
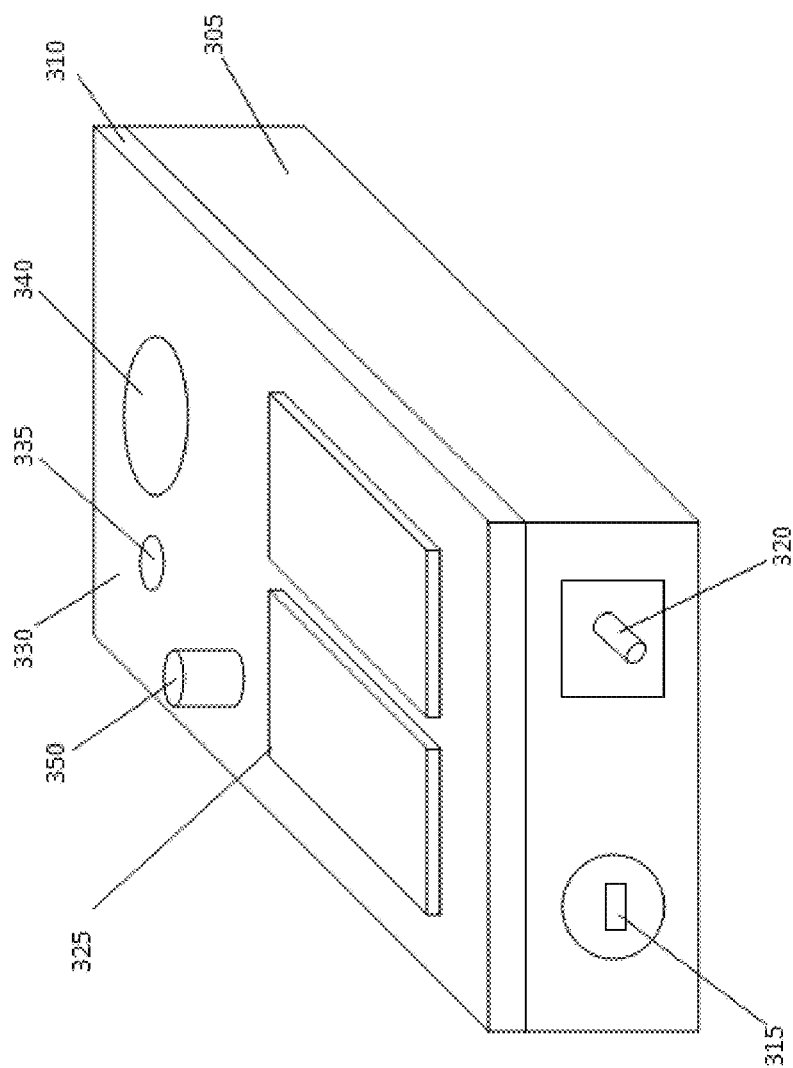
FIG. 3 is a diagram illustrating an example embodiment of an extension module for the weather station device in accordance with one embodiment of the technology described herein.

FIG. 3 is a diagram illustrating an example embodiment of an extension module for the weather station device in accordance with one embodiment of the technology described herein. The module includes a body 305 and a cover 310. The module may further include a connection port 315 that allows connecting the extension module to weather station device. The module may also have an electric switch 320 to turn the module on and off. The cover 310 may also include solar panels 325 or other power sources for electric power generation or supply. The section 330 of the cover 310 may configured to tilt to allow water or precipitation to run off of the cover or to orient the solar panels 325 toward the equatorial latitudes for better sun exposure. The cover section 330 may have optical windows 335 and 340 for laser output and laser return collection correspondingly. These optical windows can be used to protect the laser range finder inside the extension module. The advanced module can also include an access port 350. This port can be used to take samples of air or precipitation inside the module for contamination analysis. The contamination analysis can be, for example, for chemical, biological, and radiation contamination.

As noted above, in some embodiments, new micro weather sensing devices can be included to detect atmospheric characteristics such as, for example, atmospheric visibility, wind speed, and wind direction.

Figure 4:
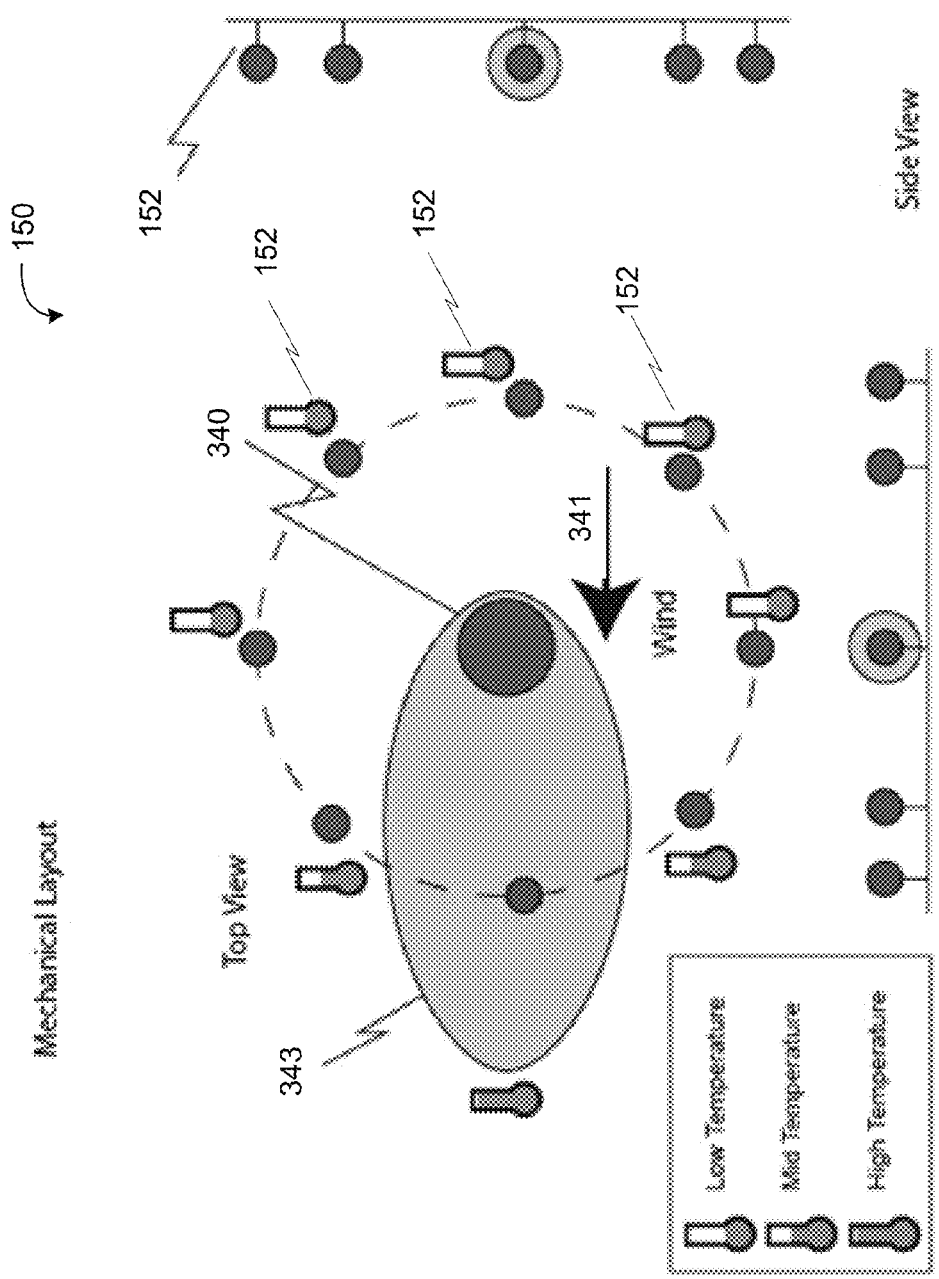
FIG. 4 is a diagram illustrating an example mechanical layout for exemplary thermal sensors in accordance with one embodiment of the technology disclosed herein.

As introduced above, another sensor that can be included is a new thermal sensor design capable of measuring wind speed and wind direction using no moving parts. Embodiments can be implemented that have no moving parts and that are smaller than conventional wind sensors. FIG. 4 is a diagram illustrating an example mechanical layout for exemplary thermal sensors in accordance with one embodiment of the technology disclosed herein.

Referring now to FIG. 4, in this example sensor 150 includes a plurality of thermal sensors 152 mounted on a printed circuit board. In various embodiments, these thermal sensors 152 are mounted so that the temperature sensing mechanism of thermal sensors 152 (e.g., thermocouple, thermistor, etc.) are placed at a predetermined spacing above the surface of the print circuit board. Preferably, the temperature sensing mechanisms of thermal sensors 152 are positioned so as to be located within the channel formed between the upper part and the lower part of the weather sensing device. In this manner, these temperature sensors can be positioned to sense the temperature of air moving through this channel. In various embodiments, these thermal sensors 152 are passive thermal sensors. Although 8 thermal sensors 152 are shown as being arranged in a circular ring about a central element 340 (with central element 340 being at approximately the center of the ring), other quantities of thermal sensors 152 can be used, and they can be disposed in alternative arrangements or geometries.

In this example, central element 340 is provided and includes a thermal sensor and a thermal generator or heater (not separately illustrated). In operation, the thermal generator of central element 340 is powered to generate heat. In various embodiments, a controlled amount of power can be provided to the central thermal generator to heat the central thermal generator above ambient temperature. The amount of power can be determined based on the ambient temperature. As wind blows through the channel between the upper and lower parts of the weather station (e.g., channel 110 of the example in FIG. 1), this airflow causes heat to be transferred from the central thermal generator to one or more of the thermal sensors 152. Particularly, the airflow, or wind, causes the heat from the central thermal generator to be transferred to the one or more thermal sensors 152 that are downwind from the central thermal generator.

An example of this is illustrated at FIG. 4. In this example, the wind is blowing in the direction from right to left across the page as indicated by arrow 341. This causes heat produced by the central thermal generator to travel in the direction of arrow 341 toward the ring of thermal sensors 152. This is illustrated by the elliptical shaded area 343. As can be seen in this example, this higher temperature air flows toward and around the leftmost thermal sensor 152 (i.e., the one at the "9 o'clock" position on the ring). As a result, leftmost thermal sensor 152 reads a higher temperature than do the other thermal sensors 152. From this, it can be determined which direction the wind is blowing relative to the weather station device itself. If the orientation of the weather station device as deployed (e.g., as mounted in the ground) is known, the actual wind direction can be determined.

The faster the wind flows over this central element, the less the temperature rise it will experience due to more heating being lost to the moving air in what can be referred to as a heat bloom. Accordingly, wind speed can be determined by measuring the ambient temperature (e.g., from a temperature sensor removed from the thermal array) measuring the temperature at the thermal generator (e.g., via a temperature sensor of central element 340) and measure the temperature increase that the affected thermal sensor 152.

In some embodiments a micro-visibility sensor can be included and implementations of it can be configured to: allow for measurement of visibility in an extremely compact device with limited power; use common, individually focused photodiodes with integrated spectral filtering but can also be used with more sophisticated optical elements; and use common, individually focused light (e.g., 850 nm LED (light-emitting diode)) but can also be used with more sophisticated optical elements.

Figure 5:
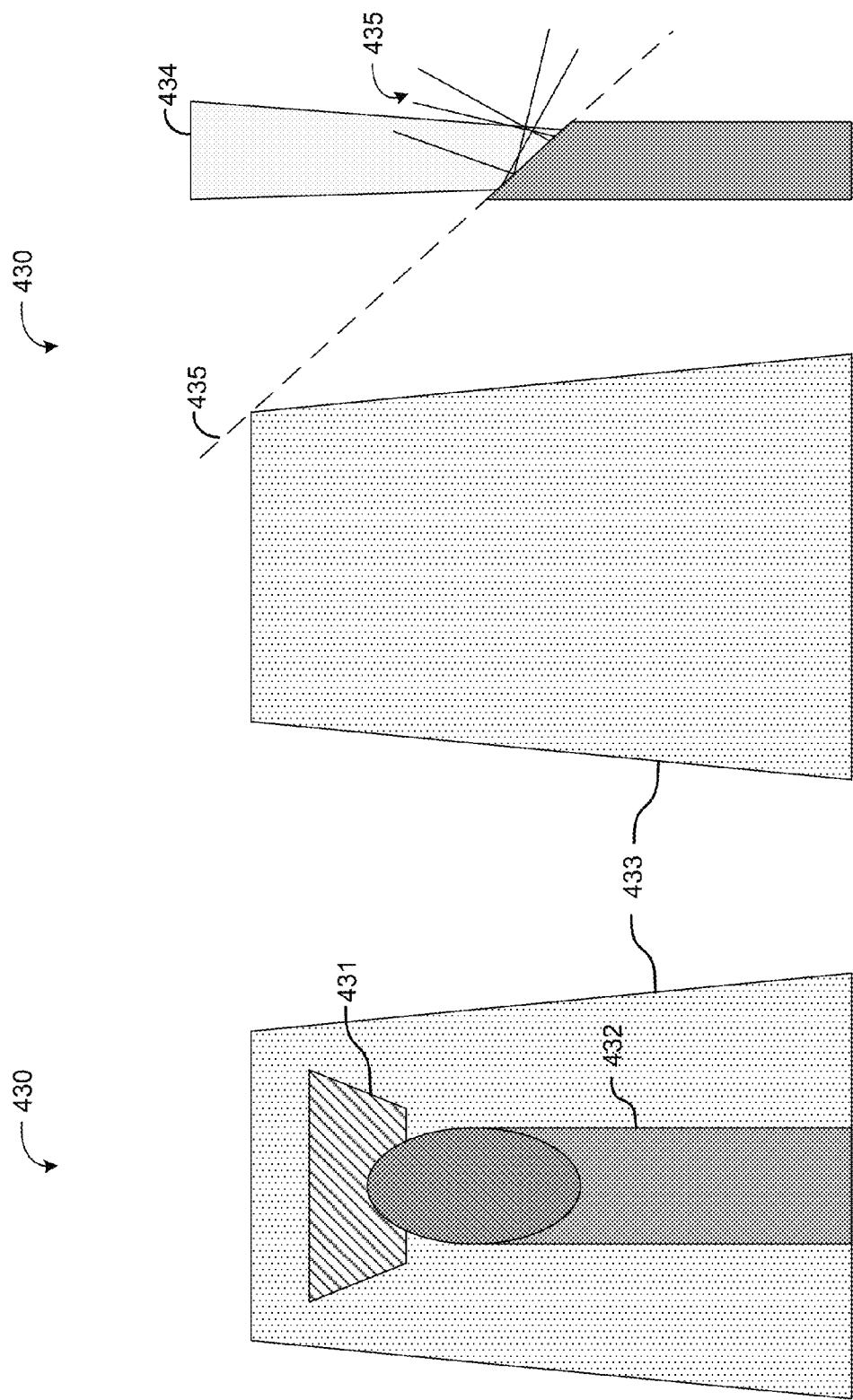
FIG. 5 is a diagram illustrating an example of an opto-mechanical arrangement in accordance with one embodiment of the technology described herein.

FIG. 5 is a diagram illustrating an example of an opto-mechanical arrangement in accordance with one embodiment of the technology described herein. In this example, the arrangement of this new sensor 430 includes a transmitter tower including a light source (e.g., one LED internal to the confining element 432) and a receiver tower 433 containing a photoreceptor 431 (e.g., an array of photodiodes). The light source is surrounded by a light director or confining element 432. In this example, confining element 432 is a tube (e.g., substantially cylindrical in shape), but other configurations can be chosen. The top of the tube is formed or cut at an angle so that the optical receiver array 431 is below the shadow line 435 from the transmitted beam 434. This arrangement prevents not only direct light from the transmitter from entering the receiver but also prevents reflections from within the transmitter tube from entering the receiver. The transmitter tube can also be internally coated with a non-reflective material to further avoid reflections from the transmitter from reaching the receiver. Therefore, the only light from the transmitter that can enter the receiver is from reflections of the light above the shadow line, in particular from atmospheric scattering. The reason for this is that there is no straight-line path from any point inside the hollow transmitter tube, 432 to any point on the optical receiver array, 431 including any secondary point sources caused by optical edge interference. Therefore, all secondary reflections, 436 from inside the transmitter tube occur only above the shadow line, 435. Because of the soft edge and low-coherence light source, illumination below the shadow line by secondary Fraunhofer diffraction is also reduced or avoided. Therefore, the only signal from the transmitter that is received by the photo-detectors is the light reflected from the atmosphere.

Electronically, the sensor operates by driving the LED with a square wave at a specific frequency of 32.768 kHz, but those skilled in the art will note that the approach can also be applied to other waveforms and to higher or lower frequencies. During operation, the photodiode array detects light that is scattered by the atmosphere into the array. To detect this small amount of light (as low as one-millionth of the transmitted power), the photodiode signal is first AC-coupled and amplified to a sufficient level to allow detection due to scattering.

Measurement of the scattered light occurs by separately averaging the received light level when the LED is on and when it is off. The difference between these two levels is then amplified again and digitized to provide a clear measure of the amount of scattered light. Accordingly, a 50% duty cycle square wave is preferred, but other waveforms and duty cycles can be used.

As this example illustrates, devices for visibility measurement may be based on return optical signals, which can be very weak, especially in the case of high atmospheric signal attenuation. Therefore, reducing Intra-System Optical Noise (ISON) may be important for the high sensitivity typically desired for such devices.

Figure 6:
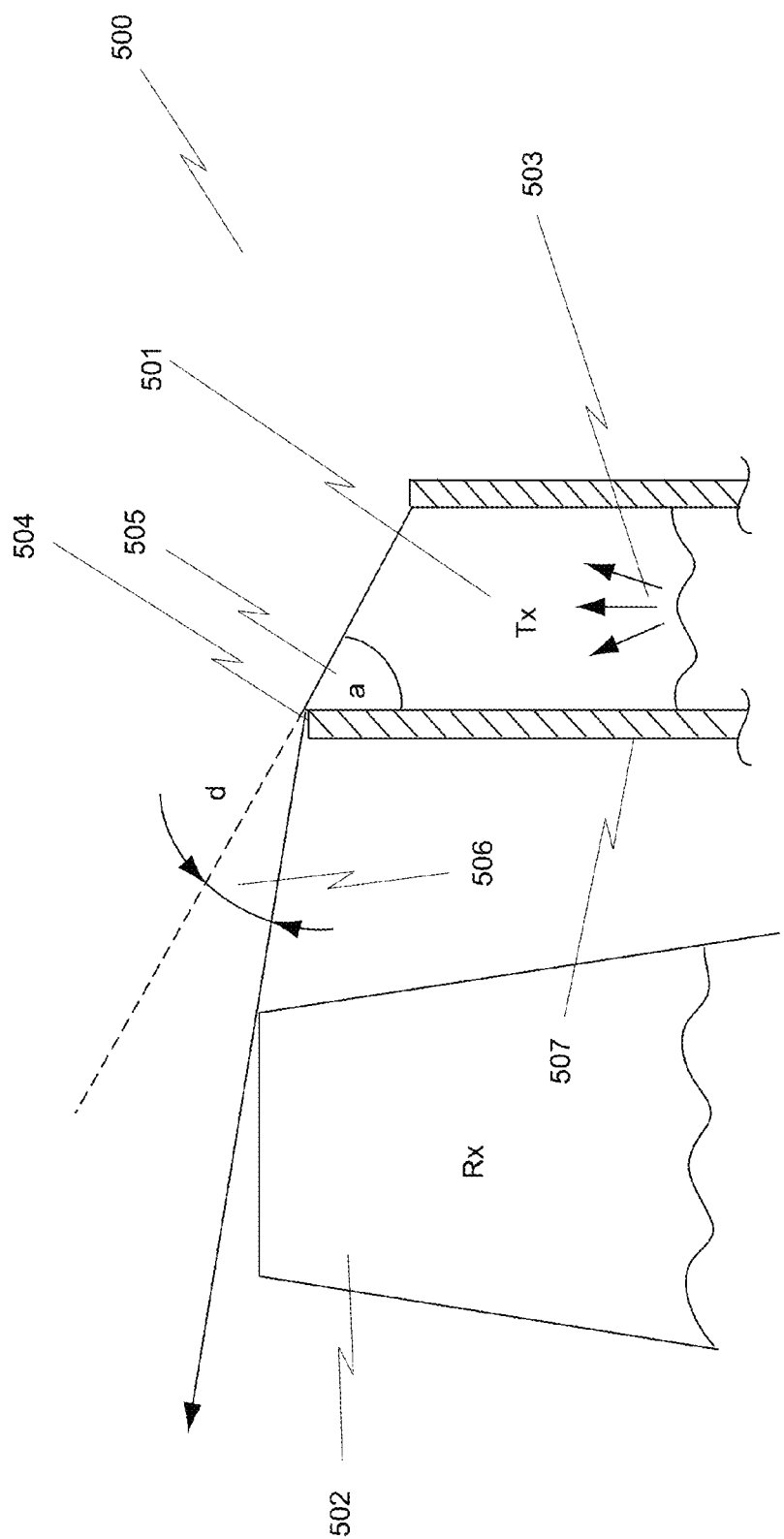
FIG. 6 is a diagram illustrating a close-up view of a portion of a visibility measurement system such as that shown above.

In accordance with embodiments of the technology disclosed herein, and as discussed immediately above, a hollow optical transmitter tube, Tx, may be cut to shield the optical receiver, Rx, (e.g., photoreceptor 431 described above in FIG. 5) from intra-source optical noise (ISON), such as that from the light source of the visibility measurement system itself. The typical optical source in various embodiments is an LED, and the typical receiver Rx may be photodiode. FIG. 6 is a diagram illustrating a close-up view of a portion of a visibility measurement system such as that shown above in FIG. 5. As can be seen from FIG. 6, the cut angle, α, is smaller than α=90°. O In the example of FIG. 6, the optical Tx/Rx-sub-system including optical tube 507, which can be implemented using the same optical tube 432 as illustrated in FIG. 4. Optical tube 507 includes a light source such as, for example, an LED or other light source (not shown in FIG. 6). As described above, an optical receiver 502 (e.g., photodetector array 431 in FIG. 5) is used to gather light scattered by moisture in the air. FIG. 6 also illustrates exemplary characteristic optical rays 503 as well as a Ray diffracted from edge 504 of tube 507.

The cutoff angle, α, denoted as 505, is smaller than α=90°. The auxiliary angle, δ, denoted as 506, can be used for further analysis. This diffraction angle, 506, can be very small as shown in FIG. 5, but it is shown large in FIG. 6 to illustrate the theory of operation. The diffraction boundary, 507, is critical for diffraction phenomenon. As this example further illustrates, light from the light source does not have a direct path to the receiver 502. Accordingly, receiver 502 is shielded from the light source thereby reducing ISON.

Figure 7:
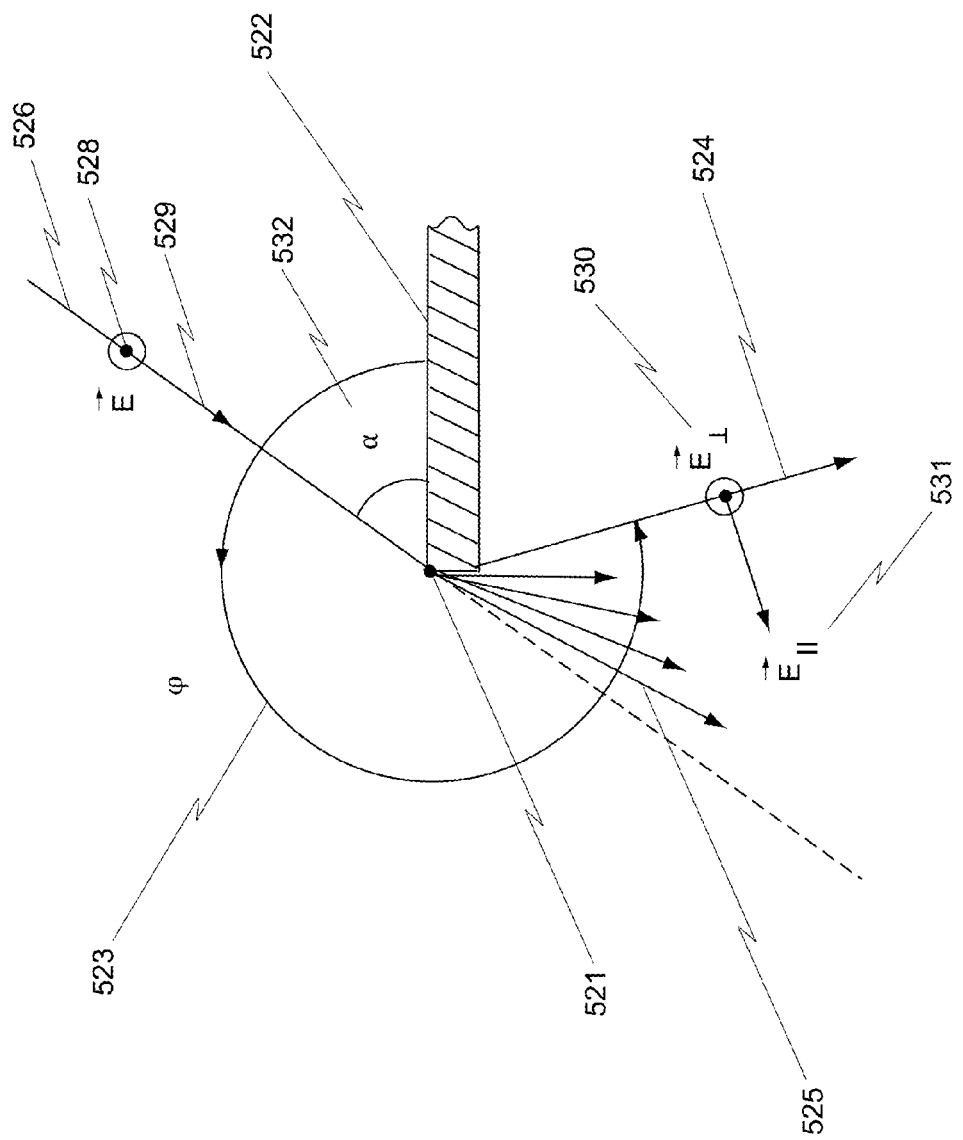
FIG. 7 is a diagram illustrating an example of a diffraction problem in accordance with various embodiments.

FIG. 7 is a diagram illustrating an example of a diffraction problem in accordance with various embodiments. The illustrated diffraction problem is illustrated using a diffraction edge 521 (e.g., analogous to edge 504 of FIG. 6). A diffraction (local) half-plane 522 (e.g., analogous to diffraction boundary 507 (i.e. the edge of the tube) in FIG. 6) is shown with an exaggerated thickness for illustration purposes. However, Sommerfeld's canonical diffraction theory is provided for an infinitely thin half-plane.

Angle, φ, denoted as 523, depicts a diffraction ray 524 including other diffraction rays 525 resulting from incident optical ray 526. With a growing angle, φ, diffraction rays 525 become weaker and weaker, as symbolically shown by the arrows' length. The incident ray, or rather electromagnetic ray with electrical (polarization) vector, $\vec{E}$, 528 is perpendicular to the direction of propagation 529 and can be arbitrarily-polarized 528. However, the diffraction ray 524 may be considered as a superposition of two elementary polarizations: TE (transversal-electric, or $\vec{E}_\perp$), and TM (transversal-magnetic, or $\vec{E}_\parallel$), denoted as 530, and 531, respectively. The electrical vector complex amplitude, U, (Sommerfeld's canonical diffraction solution) for a perfectly conducting diffraction half-plane, (r is the distance from edge 521):

$$U = \frac{1+i}{4\sqrt{\pi kr}} e^{ikr} \left( \frac{1}{\cos\left(\frac{\varphi - \alpha}{2}\right)} \mp \frac{1}{\cos\left(\frac{\varphi + \alpha}{2}\right)} \right) \quad (1)$$

where k is wavenumber (k=2π/λ, where λ-optical wavelength), i=√−1, and e is natural logarithmic base, while φ-angle is 523, and α-angle, is 532, in FIG. 7. The upper minus (−) is for TE-polarization, and lower plus (+) is for TM-polarization. As this diagram illustrates, the sign (−) shows that for diffraction ray 524 tangential for half-plane, U=0, as expected, because, in such a case, the electrical vector tangential component, $E_t$, should be equal to zero:

$$E_t = 0 \quad (2)$$

However, this condition is only satisfied for a perfectly-conducting half-plane. In various embodiments, the half-plane maybe a dielectric (e.g., glass, or plastic). Thus, the polarization-sensitive terms can be omitted, and Eq. (1) reduced to:

$$U = \frac{1+i}{4\sqrt{4kr}} e^{ikr} \frac{1}{\cos\left(\frac{\varphi - \alpha}{2}\right)} \quad (3)$$

which describes the cylindrical wave with propagation waveform, in the form:

$$\frac{e^{ikr}}{\sqrt{r}} \quad (4)$$

while the wave intensity will be proportional to $|U|^2$, where |U| is module of the complex amplitude, U.

Figure 8:
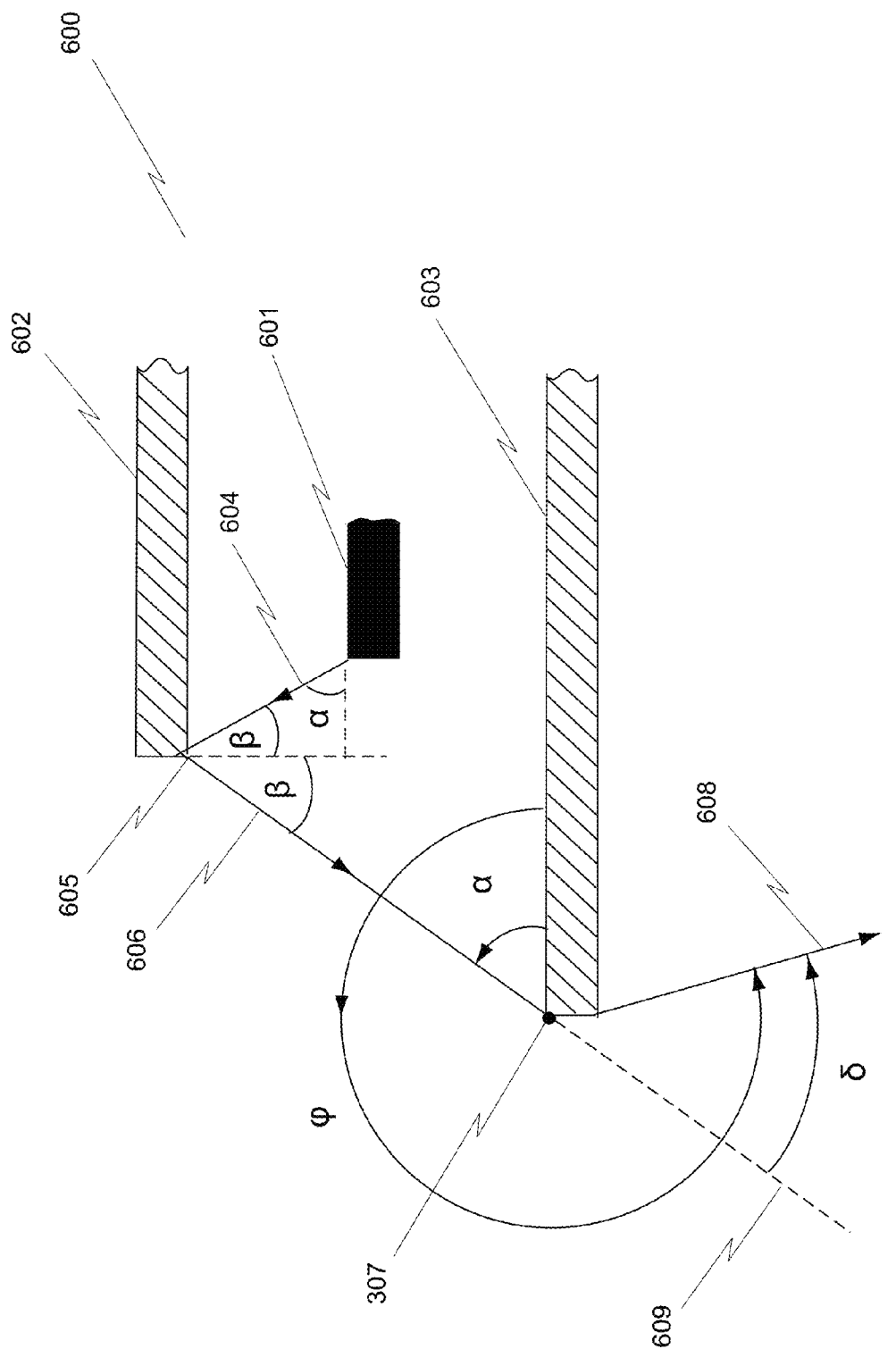
FIG. 8 is a diagram illustrating an example of an expanded version of FIG. 7, including a source geometry, to illustrate an example of the diffraction problem

FIG. 8 is a diagram illustrating an example of an expanded version of FIG. 7, including a source geometry, to illustrate an example of the diffraction problem. This example includes an optical source 601 and hollow tube walls 602, 603. An incident Ray 604 represents source intensity, $I^{(s)}$, at angle α, which hits the edge 605 at angle, β, where β=90°−α. Ray 606 is reflected at surface 605 representing Fresnel reflection. This ray 606 is incident at edge 607, creating diffracted ray 608, which is diffracted at diffraction angle, δ, which denotes diffraction at δ-angle from shadow boundary 609. At locations farther from shadow boundary 609 the diffraction beam becomes weaker. In order to see this quantitatively, the following angular relation is noted:

$$\varphi = \alpha + \pi + \delta \quad (5)$$

thus: φ−α=π+δ, and the diffraction beam intensity, $|U|^2$, becomes, $$|U|^2 = \frac{1}{8\pi kr} \frac{1}{\sin^2 \frac{\delta}{2}} \quad (6)$$

From this relationship, it can be seen that $|U|^2$ decreases with increasing angle, δ. For exemplary angle, $\delta_0$:

$$|U_0|^2 = \frac{1}{8\pi kr} \frac{1}{\sin^2 \frac{\delta_0}{2}} \quad (7)$$

assuming $\delta_0 = 3°$, it can be further assumed that $\delta \geq \delta_0$. In this case, the relative intensity ratio, is $$\eta = \left| \frac{U}{U_0} \right|^2 = \frac{\sin^2 \frac{\delta_0}{2}}{\sin^2 \frac{\delta}{2}}; \delta \geq \delta_0 \quad (8)$$

This relation is tabulated in Table 1. For example, for δ=30°, and $\delta_0 = 3°$, we obtain: η=0.01.

TABLE 1

η-RATIO vs. δ-ANGLE, for $δ_0 = 3°$

| δ | 3° | 5° | 10° | 20° | 30° | 40° | 50° | 60° |
|---|---|---|---|---|---|---|---|---|
| η | 1 | 0.35 | 0.09 | 0.023 | 0.01 | 0.00 | 0.004 | 0.003 |

Figure 9:
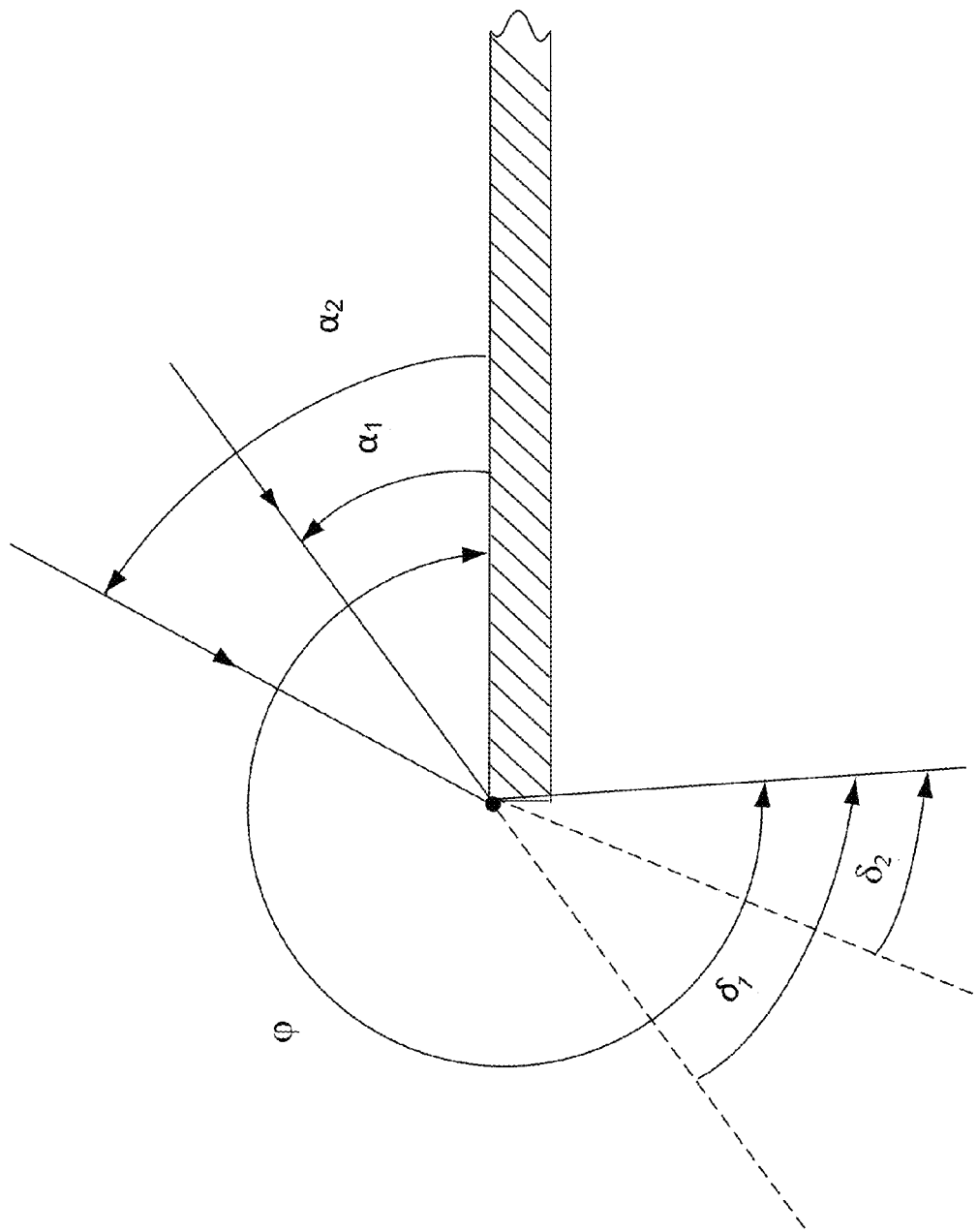
FIG. 9 is a diagram illustrating an example of this relation between the inclination angle, $\alpha$, and diffraction angle, $\delta$.

According to Eq. (3), for φ=constant, we obtain $$\Delta\delta = -\Delta\phi \quad (9)$$

i.e., increasing of φ-value causes decreasing of δ-value, and vice versa. FIG. 9 is a diagram illustrating an example of this relation between the inclination angle, α, and diffraction angle, δ.

According to FIG. 9, it can be seen that for constant φ values:

$$\left|\frac{U_1}{U_2}\right|^2 = \frac{\sin^2\frac{\delta_2}{2}}{\sin^2\frac{\delta_1}{2}} \quad (10)$$

i.e., for larger α-values, the δ-value is smaller, which results in larger $|U|^2$ values. Thus, a more inclined the 'cut' at the end of the tube (smaller a-value) results in a smaller $|U|^2$-value.

Figure 10:
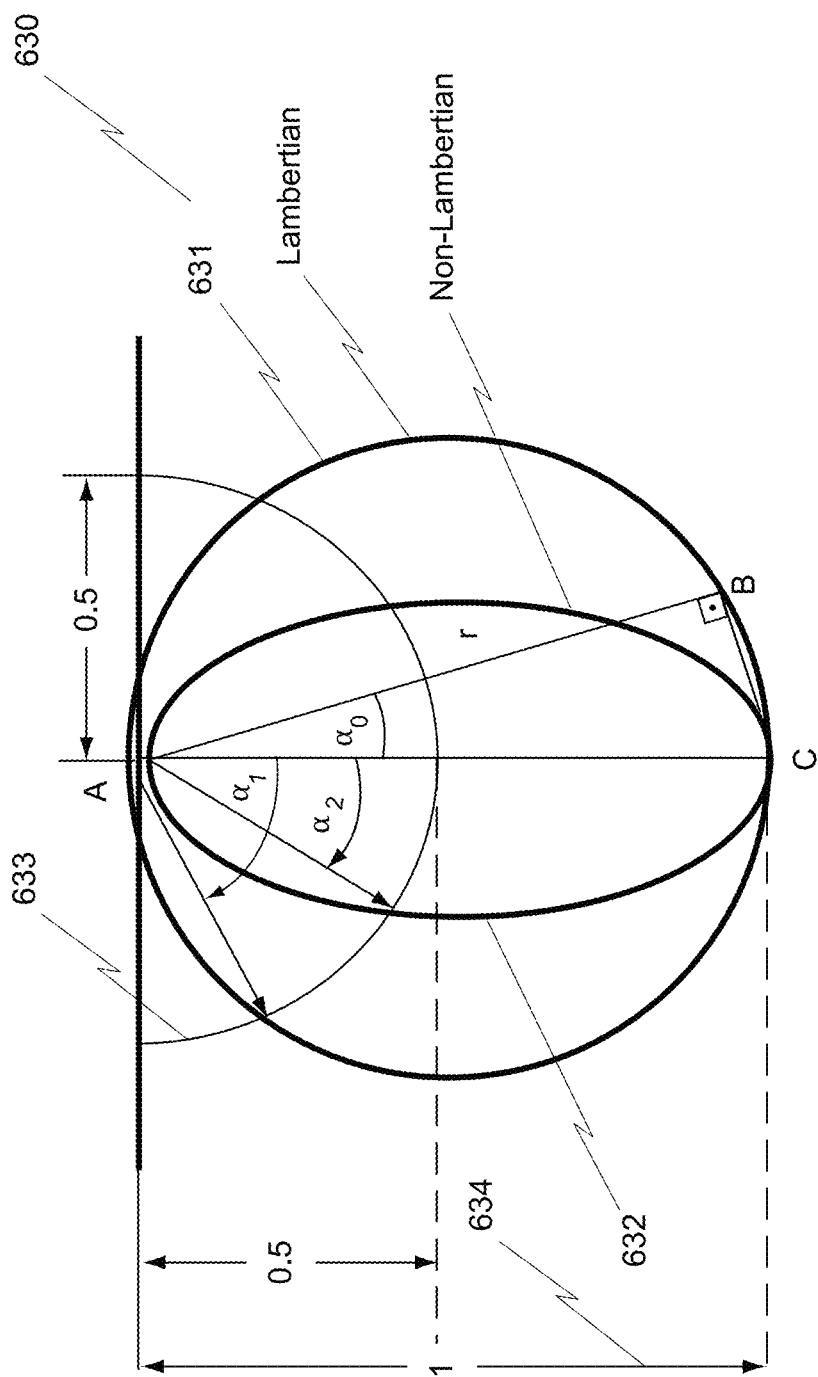
FIG. 10 is a diagram illustrating a Generalized Lambertian Source Model in polar coordinates $r=r(\alpha)$.

In order to address the global diffraction problem, it is useful to also consider the source angular spectrum and Fresnel reflection from the tube walls. FIG. 10 is a diagram illustrating an example of a generalized Lambertian source model in cross-section for the 2D case.

Referring again to FIG. 8, the source intensity spectrum, is $$I^{(s)}(\alpha) = I^0 \cos^n\alpha \quad (11)$$

where the Generalized Lambertian Source model has been assumed, as shown in polar coordinates in FIG. 10, where n=1 for a Lambertian source and n>1 for a non-Lambertian source.

In FIG. 10, a Generalized Lambertian Source Model in polar coordinates r=r (α) is presented. This example is shown for scenarios including a Lambertian source (n=1), and a non-Lambertian source (n>1). For a Lambertian source, there is a right angle triangle ABC, where:

$$r = 1 \cos\alpha_0 = \cos\alpha_0 \quad (12)$$

which becomes Eq. (11) for n=1. Half-Max-Half-Angle (HMHA) values $\alpha_1$ and $\alpha_2$ are obtained for the Lambertian and non-Lambertian case, respectively.

In FIG. 10, a generalized Lambertian source model 630 includes a Lambertian case 631, a non-Lambertian case 632, and a half-max case 633, in which the maximum intensity value has been normalized by one (as denoted by 634).

For the Lambertian case, the half-max angle value, $\alpha_1$, may be obtained by crossing sphere 631 with hemisphere 633. For the non-Lambertian case, $\alpha_2$ may be obtained by crossing rotational ellipsoid 632 with hemisphere 633. FIG. 10 presents the 2D cross-section of the 3D case. According to Eq. (11), n-value can be found from the following equation:

$$0.5 = \cos^n\alpha_{1/2} \quad (13)$$

or, $$n = \frac{\log(0.5)}{\log\cos\alpha_{1/2}} \quad (14)$$

For example, for $\alpha_{1/2}=60°$, n=1 (Lambertian case), while for $\alpha_{1/2}=30°$, n=4.8 (non-Lambertian). This results in $\alpha_1=60°$, and $\alpha_2<60°$, as in FIG. 10.

According to Eq. (11), the source intensity, $I^{(s)}(\alpha)$ is a monotonically decreasing α-function. Also, according to FIG. 8, the Fresnel reflection intensity coefficient, R, is a monotonically increasing function of β. For example, for β=0°, R≈8%; and for β=90°, R=100%=1. Inversely, the R-value is a monotonically decreasing function of α. For α=90°, R~8%, and for α=0°, R~1. However, the diffraction intensity, $|U|^2$, is a monotonically increasing function of α. Therefore, there are two contradictory tendencies, summarized in the form:

$$I(\alpha) = |U(\alpha)|^2 I^{(s)}(\alpha) R(\alpha) \quad (15)$$

In order to minimize the I(α)-value representing the ISON factor, it is useful to reduce α-value to some value <90°. However, then, both $I^{(\alpha)}(\alpha)$ and R(α) would increase. Therefore, this leaves the challenge of determining how to minimize ISON factor, the solution to which is not obvious.

Figure 11:
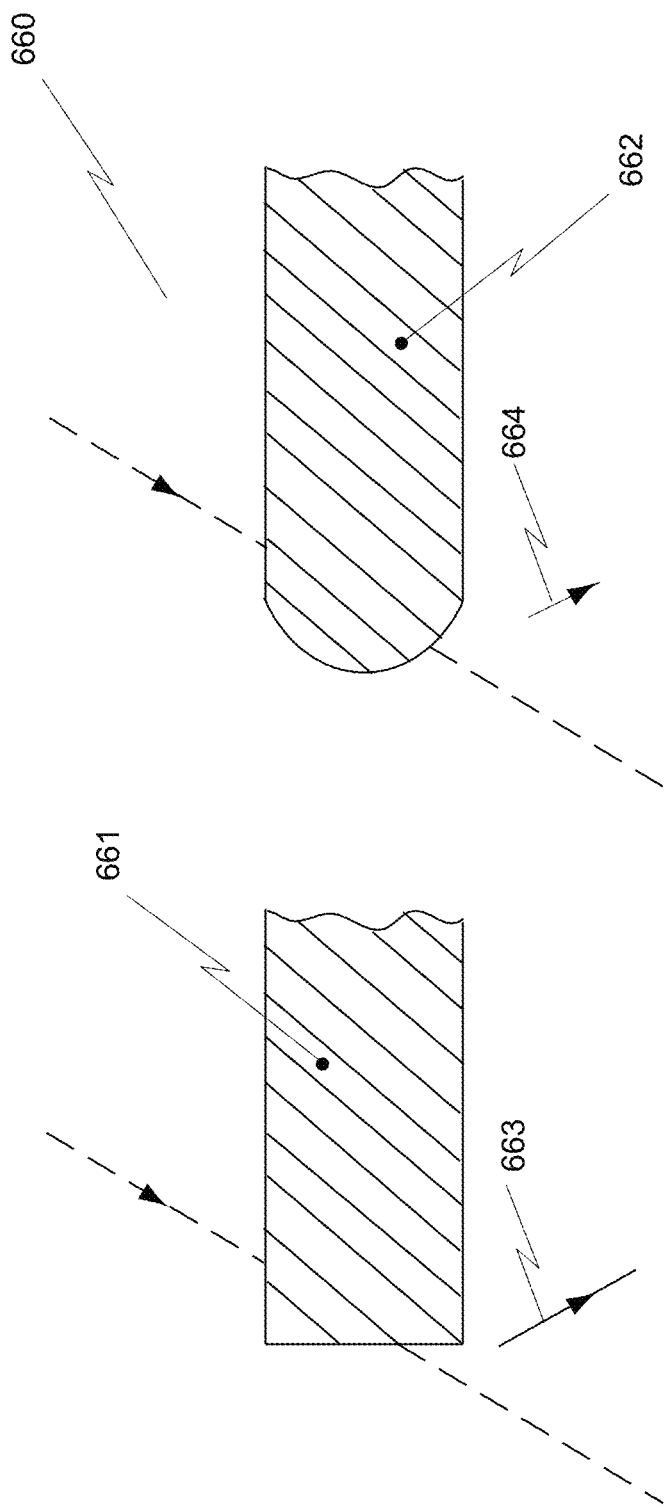
FIG. 11 is a diagram illustrating an example of diffraction edge profiling in accordance with various embodiments of the technology disclosed herein.

Furthermore, it may be desirable to minimize diffraction effects by smoothing the tube edge profile. FIG. 11 is a diagram illustrating an example of diffraction edge profiling in accordance with various embodiments of the technology disclosed herein. In the example illustrated in FIG. 11, the diffraction edge profiling 660 illustrates the hollow tube wall without profiling 661 and the hollow tube wall with profiling 662. In the first case, a large diffraction beam results as symbolized by relatively large ray arrow 663. In contrast, in the second case, a smaller diffraction beam results as symbolized by smaller ray arrow 664.

As noted above, in important goal for the system is to minimize ISON. According to Eq. (15), three factors should be minimized by mitigating the contradiction tendency between the 1st factor and the other two factors, leading to satisfying the following global condition:

$$I(\alpha) < I_T(\alpha) \quad (16)$$

where $I_T(\alpha)$ is some threshold value in [W/m²], say: 1 pW/(50 μm)²=4·10⁻⁴ W/m², for example.

All 3 factors can be found numerically or experimentally and calculated for a specific α. Situations may be common in which the $|U|^2$-factor will be very small, but factors $I^{(s)}(\alpha)$ or R(α), or both, are still very large. Because the Fresnel R(α)-factor is derivative of the source factor, $I^{(s)}(\alpha)$, only the latter can be manipulated. This can be accomplished by either changing the geometry, or by changing a type of source (by increasing n-power factor).

It is noted that typically all three factors are spectrally dependent, either on wavelength, λ; frequency, f; or angular frequency, ω. Any of these parameters may be chosen because for small variations:

$$\frac{\Delta\lambda}{\lambda} = \frac{\Delta f}{f} = \frac{\Delta\omega}{\omega} \ll 1 \quad (17)$$

For example, according to Eq. (6), the diffraction beam intensity, is $$|U(\delta, r; \lambda)|^2 = \frac{\lambda}{16\pi^2 r} \frac{1}{\sin^2 \frac{\delta}{2}} \quad (18)$$

However, the remaining two factors are weakly spectrally-dependent, while the diffraction factor, according to Eq. (18), is proportional to wavelength, $\lambda$. Thus, only the diffraction factor is strongly spectrally-dependent.

However, diffraction $\lambda$-dependence is a simple proportionality. Therefore, by integration, instead of Eq. (18), the following relation can be obtained:

$$\int_{\lambda_1}^{\lambda_2} |U(\delta, r; \lambda)|^2 d\lambda = |U(\delta, r; \bar{\lambda})|^2 \Delta\lambda \quad (19)$$

where:

$$\bar{\lambda} = \frac{\lambda_1 + \lambda_2}{2}, \text{ and } \Delta\lambda = \lambda_2 - \lambda_1.$$

Therefore, the primary relation (17) is preserved while having adding extra bandwidth factor, $\Delta\lambda$, while it is assumed that the source spectrum is within $(\lambda_1, \lambda_2)$-range.

The approximate formula for a diffraction beam has the following form:

$$I(\delta, \alpha, r) = K \frac{\bar{\lambda}\Delta\lambda}{16\pi^2 r} \frac{1}{\sin^2 \frac{\delta}{2}} I^{(s)}(\alpha) R(\alpha) \quad (20)$$

where the double angle $(\delta,\alpha)$ emphasizes the fact that the narrow incident beam (defined by its angular distribution, $I^{(s)}(\alpha)$ and its intensity Fresnel reflection, $R(\alpha)$) is spread into a set of diffraction "rays", as shown by 525 in FIG. 7. Thus, only the diffraction factor seems to have double angle dependence. However, by introducing the diffraction angle, $\delta$, this double dependence is reduced into a single angle dependence, on $\delta$, as in Eq. (20). The proportionality constant, K, is introduced for calibration purposes. Thus Eq. (20) presents factorized dependence in the form:

$$I(\delta,\alpha,r) = K|U(\delta,r)|^2 I^{(s)}(\alpha) R(\alpha) \quad (21)$$

where r-distance from diffraction edge.

It is very difficult, if possible at all, to analytically derive the optical detection factor. There are many reasons for this, including the semiconductor process of photonic detection, complex incidence angle dependence, and so on. Therefore, various embodiments utilize a calibration constant, K. Typically, for high-sensitive CCD photo detectors, the final optical intensity of the beam, I, will be about:

$$I \sim \frac{1 \text{ pW}}{(10 \text{ } \mu m)^2} = \frac{10^{-12} \text{ W}}{10^{-10} \text{ m}^2} = 0.01 \text{ W/m}^2 \quad (22)$$

After I-value measurement (at fixed distance, r), we can approximately predict I-intensity behavior for various source/tube configurations. This is because the 1$^{st}$ diffraction factor is known while two remaining source and Fresnel factors can be obtained from general optical propagation considerations. Thus, by knowing the K-factor, I-value distribution for various source/tube configurations can be predicted in order to minimize I-value, thus satisfying condition (16).

More detailed consideration shows that the calibration constant, K, is, in fact, a calibration parameter with two control variables: $\delta$, and r. Thus, this parameter may be referred to herein as a Dual-Control-Variable Calibration Parameter, in the form:

$$K = K(\delta, r) \quad (23)$$

This parameter is without subscript, which is in contrast to $I^{(s)}(\alpha)$ and $R(\alpha)$ which can include a subscript. This is, because, the latter functions can be different for various types of sources for or different average wavelengths, $\bar{\lambda}$. In contrast, Eq. (23) depends only on the receiver geometry (unless the receiver type is changed).

Figure 12:
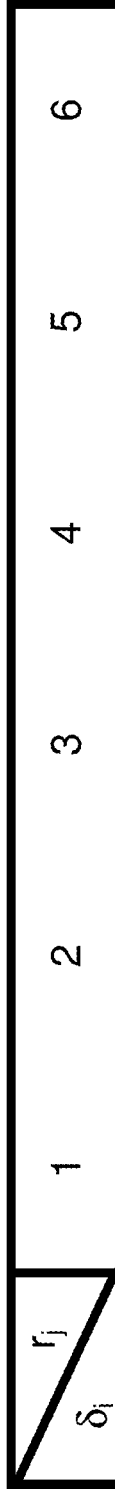
FIG. 12 is a diagram illustrating an Exemplary Look-Up Table for Dual-Control-Variable Calibration Parameter, $K(\delta_i, r_j) = K_{ij}$.

FIG. 12 is a diagram illustrating an Exemplary Look-Up Table for Dual-Control-Variable Calibration Parameter, $K(\delta_i, r_j) = K_{ij}$. In FIG. 12, exemplary mapping table is shown, as $$K_{ij} = K(\delta_i, r_j) \quad (24)$$

This relation has been obtained after quantization, or digitization, for specific average wavelength, $\bar{\lambda}$.

In the example of FIG. 12, exemplary look-up table for dual-control-variable calibration parameter, $K_{ij}$, includes two indices i, j. These indices may be numbered by integers: 1, 2, 3, 4, . . . The index, i, can be used to denote discrete values of the diffraction angle, $\delta$, in the form: $\delta_i$. The index, j, can be used to denote discrete values of distance radius, r, in the form: $r_j$. This calibration parameter can be used to characterize photo detector behavior as a function of diffraction geometry. In general, a monotonically-decreasing dependence on $r_i$ and $\delta_j$ can be expected as shown in FIG. 12. The question marks show the values that were not measured experimentally. The $r_j$ are some normalized values that depend on methodology.

Figure 13:
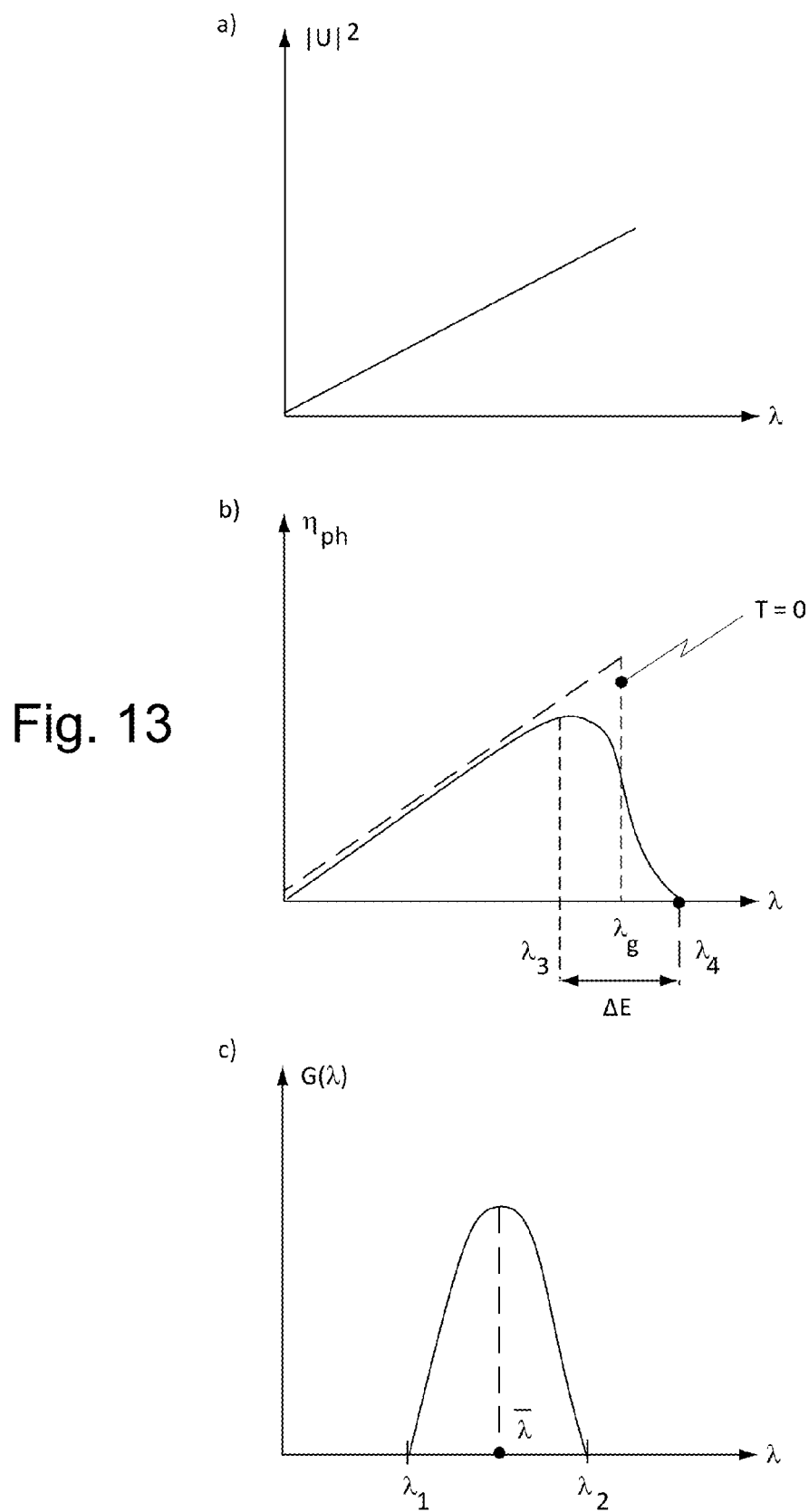
FIG. 13A is a diagram illustrating diffraction efficiency.
FIG. 13B is a diagram illustrating photodiode quantum efficiency.
FIG. 13C is a diagram illustrating light source power density.

One important yet nonobvious point is that knowing the K-value for specific $\lambda$, and $\Delta\lambda$-bandwidths, I-values for different light sources can be predicted. FIG. 13 is a diagram illustrating a comparison of diffraction efficiency (FIG. 13A(a)), photodiode quantum efficiency (FIG. 13B(b)), and light source power density (FIG. 13C(c)). A further remarkable coincidence is that photodiode quantum efficiency, $\eta_{ph}$, is also proportional to wavelength, $\lambda$, for entirely different reasons. This is shown in FIG. 13, where comparison of diffraction efficiency (FIG. 13A(a)), photodiode quantum efficiency (FIG. 13B(b)), and light source wavelength power density (FIG. 13C(c)), is shown. It may be assumed that the light source (LED, for example) linewidth, $\Delta\lambda$, is within the $(\lambda_1, \lambda_2)$-range, according to Eq. (19). Assuming that, also, $\lambda_2 < \lambda_3$, which is not needed, in general, the source relation similar to that in Eq. (19) exists, namely: $G(\bar{\lambda})\Delta\lambda$.

FIG. 13B (b) pairs further explanation. For absolute zero (T=0 in K°) temperature, the curve has a sharp triangular form. However, for T>0 (again, T in K°), the curve is smoothing within range $(\lambda_3, \lambda_4)$, which is defined by the $\Delta E$-parameter. It is remarkable that two fundamental quantum physics relations defining $\lambda_g$ and $\Delta E$ contain so many (3) fundamental physical constants, in the form:

$$\lambda_g = \frac{hc}{E_g}, \Delta E = kT \qquad (25ab)$$

where $E_g$-energy of semiconductor gap (few electron volts, eV) and $\Delta E$-energy of thermal fluctuations, while h, c, k—are three (3) fundamental constants, namely, Planck's constant (h), the speed of light in vacuum (c), and Boltzmann's constant (k). In particular for T~300° K (room temperature), $\Delta E$~0.02 eV.

In various embodiments, the Approximate Prediction Procedure (AP2) may begin with selecting other light sources that may be useful for prediction. Such a source may be characterized by manufacturer power angular dependence, $I^{(s)}(\alpha)$, which is given. Then, the Fresnel formula, $R(\alpha)$, is used, which (presumably) has already been tabulated. An $\alpha = \alpha_0$-value is selected for a given incidence ray, $\alpha$, following source and tube geometry as in FIG. 8. For these $\alpha_0$-values, $G(\alpha_0)$, and $R(\lambda_0)$-values may be obtained. Then, the $|U|^2$ value is given according to Eqs. (6), (18), or (20), according to the following formula:

$$I_0(\delta_0, \alpha_0, r_0) = K(\delta_0, r_0) \frac{\bar{\lambda}\Delta\lambda}{16\pi r} \frac{1}{\sin^2\frac{\delta_0}{2}} I^{(s)}(\alpha_0) R(\alpha_0) \qquad (26)$$

It can be seen that Eq. (26) is identical to Eq. (20), or Eq. (21), except general values, ($\delta$, $\alpha$, r), have been replaced by specific ($\delta_0$, $\alpha_0$, $r_0$)-values, according to the following reduction operation:

$$(\delta,\alpha,r) \Rightarrow (\delta_0,\alpha_0,r_0) \qquad (27)$$

Figure 14:
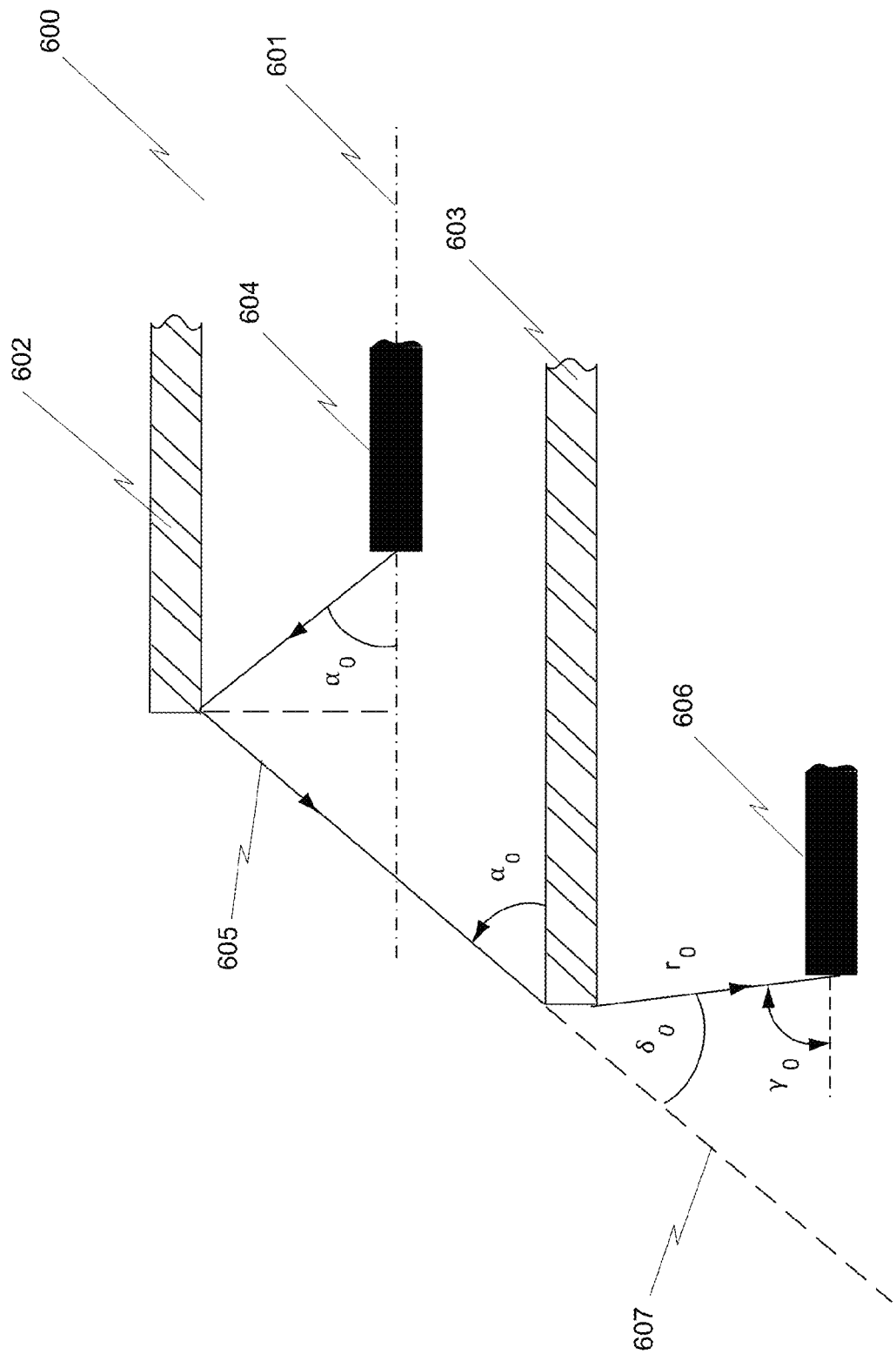
FIG. 14 presents a 2D cross-section of a 3D geometry with tube axial symmetry 681 in accordance with various embodiments of the technology disclosed herein.

An example of this situation is illustrated in FIG. 14, for the specific example: source, tube, and photodetector geometries. Particularly, FIG. 14 illustrates an example 2D Geometry for Approximate Prediction of the $I_0$-value.

This geometry leads to the Approximate Prediction Procedure (AP2). FIG. 14 presents a 2D cross-section of a 3D geometry with tube axial symmetry 681. The tube wall cross-sections 682, 683 can be made using glass, plastic or other tube materials (the glass is preferably hardened, however). The specific light source geometry 684 defines a spherical angle, $\alpha_0$, which also has axial symmetry. Therefore, incidence ray 685 is also defined with an inclination angle, $\alpha_0$.

Because the photodetector geometry 686 is also defined, the diffraction angle, $\alpha_0$, and cylindrical distance, $r_0$, are also given. This includes an incidence angle, $\gamma_0$. According to FIG. 14, the following trigonometric relation exists:

$$\alpha_0 + 180° + \delta_0 + \gamma_0 = 360° \qquad (28)$$

thus, $$\gamma_0 = 180° - \alpha_0 - \delta_0 \qquad (29)$$

Therefore, the photodetector incidence angle, $\gamma_0$, may be determined by incidence angle, $\alpha_0$, and diffraction angle, $\delta_0$. This is because the shadow boundary 687 is also defined. The intensity, $I_0$, at photodetector surface is related to power, $P_0$, by the relation $P_0 = I_0 \cdot A$, where A is the photodetector area. This is because the intensity is normal projection of Poynting vector, according to fundamental rules of radiometry.

Applying AP2-specific indexing, Eq. (26) may be written in the form:

$$I_1(\alpha_1,\delta_1,r_1) = K(\delta_1,r_1)|U|^2(\delta_1,r_1)I_1^{(s)}(\alpha_1)R(\alpha_1) \qquad (30a)$$

$$I_2(\alpha_2,\delta_2,r_2) = K(\delta_2,r_2)|U|^2(\delta_2,r_2)I_2^{(s)}(\alpha_2)R(\alpha_2) \qquad (30b)$$

These are basic AP2 formulas that may be used for approximate prediction. The subscripts (1) and (2) denote different types of a light sources. For example, in Eqs. (30ab), they are applied for two sources: 1 and 2. These intensity subscripts: "1", and "2" are only on the left side of Eqs. (30ab), and for denoting $I^{(s)}$ values; i.e., for both intensity values in W/m².

The remaining factors do not have intensity subscripts and they are dimensionless. This is because they are universal for all types of light sources with the same $\bar{\lambda}$-value. Therefore, measuring a K-factor for a given source, e.g., 1-source, also provides valid K-values for other sources, e.g., 2-source. The other not-indexed factors, namely, $|U|^2$ and R, are also universal, and obtained analytically, namely the $|U|^2$-diffraction factor, by Sommerfeld, and R-Fresnel factor, by Fresnel. Thus, knowing formula indexed by "1", for example, allows to predict other formula, indexed by "2", for example.

An Approximate Prediction Procedure Example (AP2) is now described. In the first step, a universal diffraction factor is provided. This can be accomplished using the classic Sommerfeld diffraction formula (26) or other analytic available formulas useful for the AP2 problem. The universal diffraction factor, $|U|^2$, may be provided as a function of distance, $r_1$, and diffraction angle, $\delta_1$. In one embodiment, the diffraction formula can be used in the form of a look up table.

In a second step, a universal Fresnel factor is provided. For example, the universal Fresnel factor, R, can be provided as a function of incidence angle, $\alpha_1$, in a similar manner as accomplished in the first step.

In a third step an averaged wavelength is selected. So far, both universal factors $|U|^2$ and R, are valid for any averaged wavelength, $\bar{\lambda}$. However, in this step a $\bar{\lambda}$-value is selected. This determines the class of light sources with the same $\bar{\lambda}$-value. In the case of the next $\bar{\lambda}$-value, the procedure may be repeated for this next value. This selected $\bar{\lambda}$-value is preferably chosen using constraints explained in the description of FIG. 13. This $\bar{\lambda}$-value has been denoted in FIG. 13(c).

In a fourth step, a look up table for K is developed. This can be accomplished, for example, as illustrated in FIG. 12. These factor K-values will hold for entire class of light sources with the same averaged wavelength $\bar{\lambda}$-value.

In a fifth step, an AP2 formula is applied. Various embodiments apply a universal AP2 formula with an arbitrary k-index, where k=1, 2, . . . , N, in a form that is a generalization of Eq. (30):

$$I_k(\alpha_k,\delta_k,r_k) = K(\delta_k,r_k)|U|^2(\delta_k,r_k)I_k^{(s)}(\alpha_k)R(\alpha_k) \qquad (31)$$

where N is number of light sources of interest, belonging to the same class, defined by specific $\bar{\lambda}$-value.

Because K-values are valid for whole $\bar{\lambda}$-class of light sources (i.e., light sources with the same $\bar{\lambda}$-value), and $|U|^2$, R-factors are universal for all $\bar{\lambda}$-classes, only angular source characteristics $I_k^{(s)}(\alpha_k)$, for a given light source need to be known.

In a sixth step, the angular source characteristics are determined. These can be determined from manufacturer data. From this data the operation can apply angular source characteristics, $I_k^{(s)}(\alpha_k)$, for k-source. Using the edge-cut tube geometry, as in FIG. 14, for example, the operation can determine incidence angle, $\alpha_k$, denoted as, $\alpha_0$, in FIG. 14. From this, the $R(\bar{\lambda})$-value is also given.

In a seventh step, diffraction beam coordinates are determined. For example, this can be accomplished using the geometry of FIG. 14. This step determines diffraction beam coordinates: $r_k$, $\delta_k$, denoted as $r_0$, $\delta_0$, as shown in FIG. 14. The operation may also use the K-look-up table, to find $K(\delta_k, r_k)$-value from the look-up table, using the format of FIG. 12.

In an eighth step, the final intensity value is determined. Because all factors, on the right side of Eq. (31), are given, the $I_k$-intensity value can be calculated, thus predicting this value for any light source of interest with a given $\bar{\lambda}$-class where the photodetector area, A, is known, the system can also predict the power of photodetector, $P_k$, in Watts:

$$P_k = I_k A \qquad (32)$$

It can be seen that the area, A, is not indexed, because it is not defined for only the $\bar{\lambda}$-class, but, for all sources available. The $P_k$-value is intra-system optical noise power, describing the ISON factor.

The example eight-step AP2 procedure described above can be used to predict intra-system optical noise power, $P_k$, as defined by Eq. (32), and Eq. (31). This is based on the assumption that angular source characteristics $I_k^{(s)}$ do not depend strongly on wavelength, and therefore, it is defined by averaged wavelength, $\bar{\lambda}$. Otherwise, the AP2 process should be repeated for a spectrum of wavelengths, $\lambda$, and averaged over a source power density, $G^{(s)}(\lambda)$. However, the basic principle of this procedure does not change. Also, it should be noted that the intra-system optical noise power is optical, and not electrical noise power, the latter one being well-known as Noise-Equivalent-Power, (NEP).

In the case of electrical noise power, (NEP), however, the non-linear rule, which is not commonly known, should be observed. However, this is a result of the basic photodetection law. In this sense, it is, in general, also valid here. The general photodetection law is such that electrical current of a photodetector is proportional to the optical power signal. On the other hand, Signal-to-Noise-Ratio (SNR) is usually defined as a ratio of signal and noise of electrical power rather than the ratio of optical power. Therefore, in order to obtain (SNR)=n, it can be important to have (optical) signal power only $\sqrt{n}$-times larger than (NEP)-value. For example, in order to obtain (SNR)=10=10 dB, it is ideal to have optical signal power, only $\sqrt{10}$-times larger ($\sqrt{10}$=3.16).

By applying a procedure such as the one described above for AP2 in general, and a basic AP2 formula (see; Eq. (31)) in particular, a set of $I_k$-values, for k=1, 2, 3, . . . representing various hypothetical light sources can be obtained. Thus, the optimization path leading to the ISON minimization can be predicted, including a variety of practical factors, such as, for example:

a) Type of photodetector and its geometry
  b) Particular diffraction case
  c) Specific Fresnel reflection effects
  d) Various types of light sources as summarized in Table 2, below.

The ISON values are represented by $I_k$-values. The practical factors: 1, 2, 3, 4, 5, 6, as summarized in Table 2, can be varied, leading to a diversification of ISON-values (represented by $I_k$-values, as in Eq. (31), leading in turn to a broad variety of possible scenarios that can be exercised for ISON optimization purposes.

TABLE 2

Summary of Practical Factors for ISON Minimization *)

| No. | Factor Description | Critical Parameter | Symbol |
|---|---|---|---|
| 1 | Type of Photodetector | Calibration Parameter | K |
| 2 | Geometry of Photodetector | Diffraction Coordinates | $r_k, \delta_k$ |
| 3 | Cutoff Geometry | Incidence Angle | $\alpha_k$ |
| 4 | Fresnel Reflection | Fresnel Intensity Reflection Coefficient | R |
| 5 | Particular Diffraction Case | Complex Amplitude Module Square | $|U|^2$ |
| 6 | Light Source Intensity Distribution | Source Intensity | $I^{(s)}$ |

*) For specific averaged wavelength $\bar{\lambda}$-value.

In various embodiments of the weather system devices disclosed herein, the precipitation sensing and measurement systems may be included. In some embodiments, such systems can comprise three primary subsystems. These can include a precipitation characterizer, a precipitation quantifier, and a precipitation classifier. The precipitation characterizer in some embodiments includes a subsystem configured to determine a precipitation type. The precipitation quantifier may in some embodiments include a subsystem that primarily measures precipitation amounts. The precipitation classifier may, in some embodiments, include a subsystem that makes a final determination of a type of detected precipitation. Each of these subsystems are now described.

Figure 15:
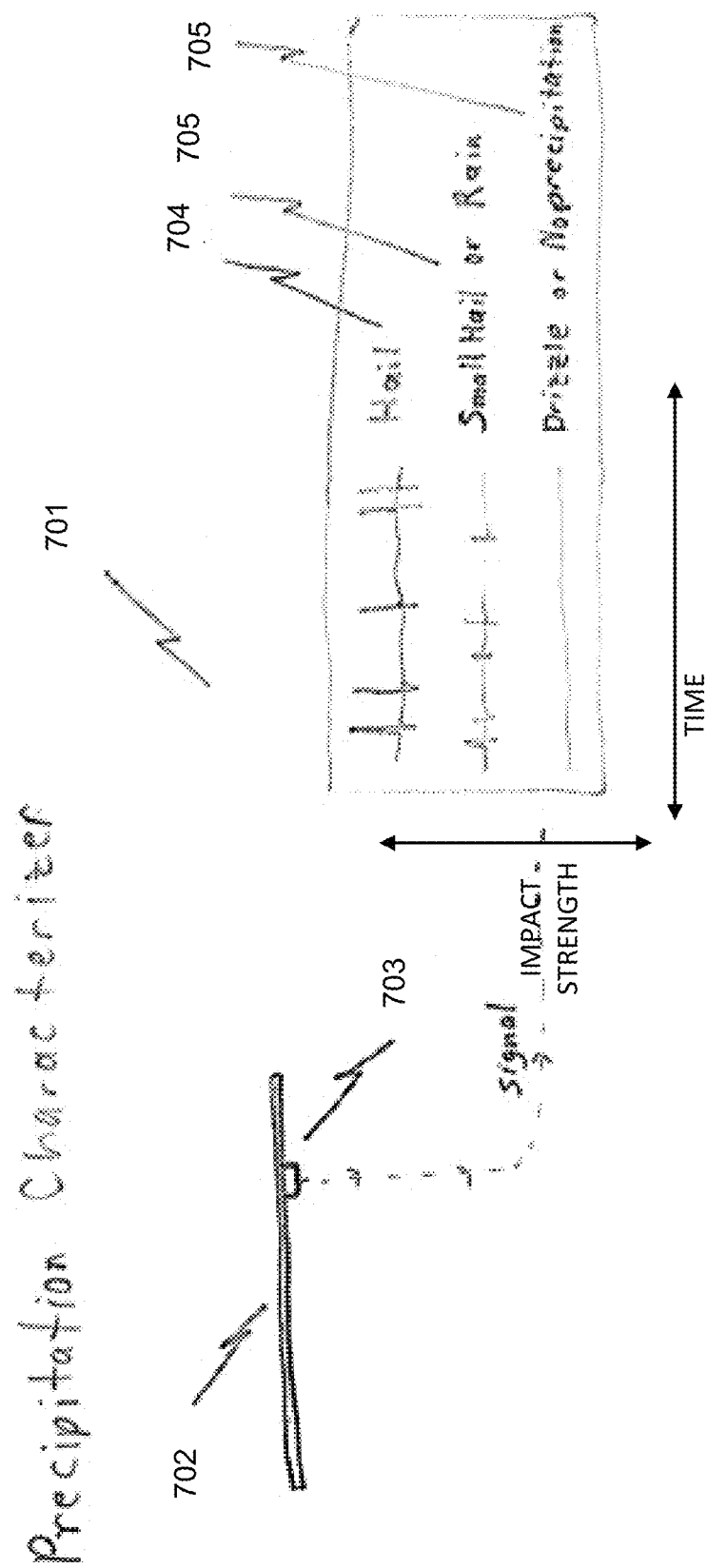
FIG. 15 is a diagram illustrating an example precipitation characterizer subsystem in accordance with various embodiments of the technology disclosed herein.

FIG. 15 is a diagram illustrating an example precipitation characterizer subsystem. The precipitation characterizer subsystem 701 in this example includes a precipitation receiver 702, which in the illustrated embodiment is a flat plate upon which precipitation falls, and an accelerometer 703 that detects the impact of falling precipitation on that plate by the detection of shock waves travelling through the plate and manifesting as accelerations or micro-accelerations at the accelerometer. By monitoring and evaluating the signal from the accelerometer, the difference between hail 704, small hail or rain 705, or drizzle 706 can be largely distinguished according to the classification of peak impact 707 resulting from the impact of each droplet or hailstone. (The precipitation classifier, which is described in detail below is the subsystem that evaluates the signal and makes the final determination.)

Although the precipitation receiver is depicted here as a simple flat plate, this surface can be of any shape, but preferably a shape that will not allow water to pool on the top surface, which would otherwise mute the impacts of successive precipitation. Another embodiment of the disclosed technology utilizes a mechanical case of the system itself as the precipitation receiver without requiring the addition of a separate plate. An example of this uses the plastic or metal (or other material) enclosure of a weather sensor as a precipitation sensor by the addition of a simple accelerometer.

Although the arrangement of such a simple system as a means of determining may seem obvious, this is not so without the use of hindsight. Arrival at this solution occurred out of an evolution of ideas that first began with the use of an electromagnetic voice coil (e.g., a conventional acoustic speaker) to detect impacts on the speaker cone directly. This method was later refined to use a Piezo element that detected impacts on the Piezo element directly. It was only after extensive experimentation that the discovery was made that impacts on the board to which the Piezo element was mounted produced a muted, yet measurable signal. This, after further work, led to the discovery that the Piezo element acted as an accelerometer in this mode of operation, thereby enabling this solution.

Although a precipitation amount (as typically noted in inches per hour) can be measured by an extension of the technique used to measure precipitation type, this method is not highly accurate. The wide variation in impact strength of different droplet sizes a makes the counting of impacts inaccurate for the assessment of volume, and heavy mist or drizzle is not detected by this means. To accurately assess the precipitation amount, a means of assessing true volume in various embodiments utilizes a different subsystem with a completely different structure and methodology.

Figure 16:
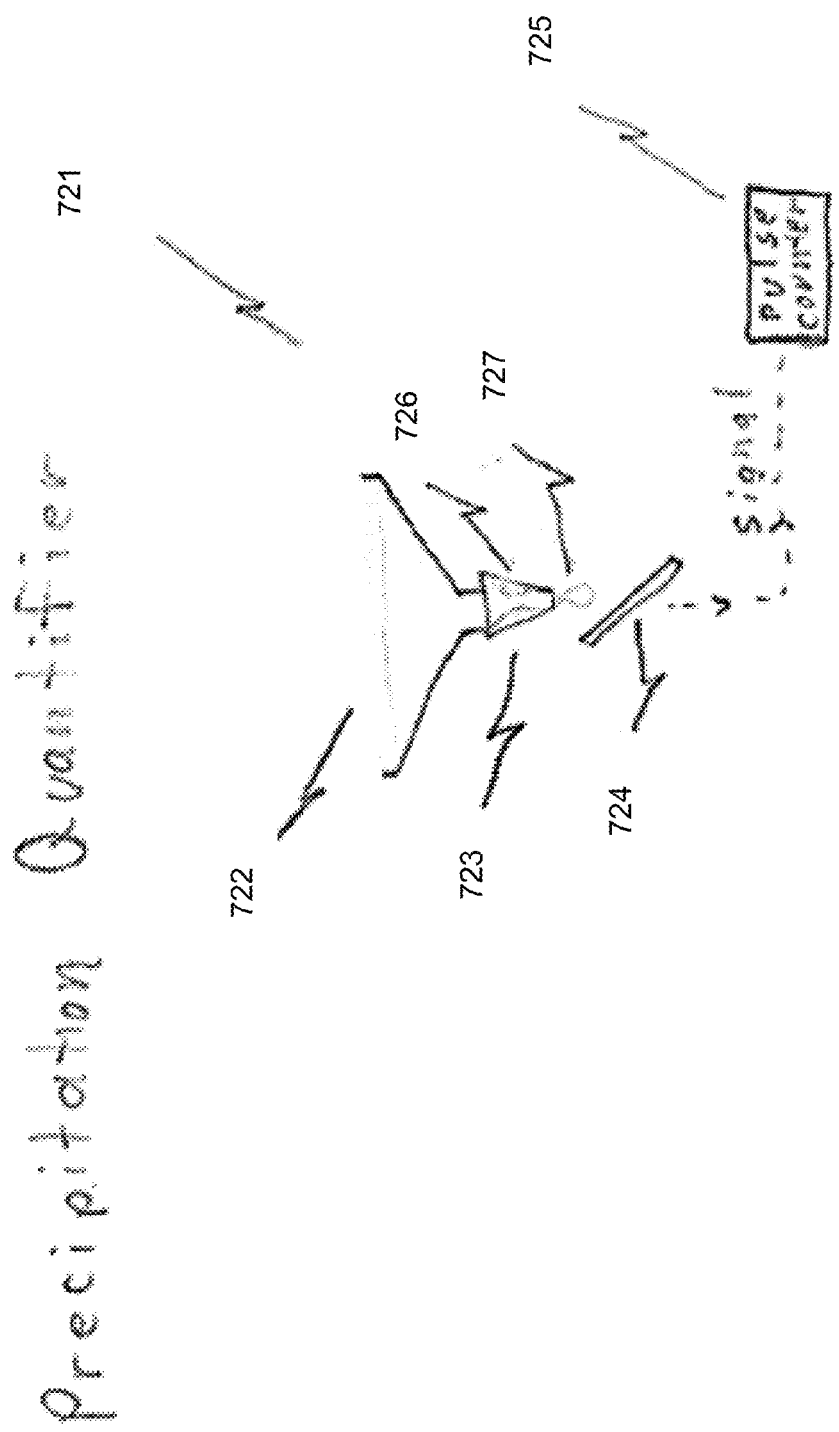
FIG. 16 is a diagram illustrating an example precipitation quantifier subsystem in accordance with one embodiment of the technology disclosed herein.

FIG. 16 is a diagram illustrating an example precipitation quantifier subsystem in accordance with one embodiment of the technology disclosed herein. Referring now to FIG. 16, in this example, the precipitation quantifier subsystem 721 includes a funnel 722, a drop of former 723, a droplet detector 724 and a droplet counter 725. In this example apparatus, funnel 722 accumulates moisture from a number of different forms of precipitation including, for example, drizzle, rain, snow, etc. over the collection area of the funnel 722. The collected precipitation is directed to the droplet former 723. Droplet former 723 in this example utilizes a bi-conical shape 726 that draws water in from the funnel 722 while forming droplets at its output 727. Preferably, is configured such that the droplets are of a uniform physical size that drop onto the detector below.

In this example, the droplet detector includes two electrodes spaced apart from one another (e.g., 0.2 inches apart) that are disposed on a hydrophobic substrate. Because of the hydrophobic nature of the substrate, droplets landing on the detector are in effect repelled by the substrate and cause to move quickly across the electrodes. Because precipitation droplets have a much higher conductivity (typically ranging from 200 Ω·cm to 200,000 Ω·cm) compared to air, the conductivity between the electronics increases (e.g. spikes) when a droplet passes across the electrodes. This increase or spike can be detected by applying voltage to the electrodes and measuring the electric current through the droplet. An electronic pulse counter 725 can be used to count the drops from the drop former, and inaccurate measure of the true volume can be assessed across a number of different types of precipitation.

In various embodiments, the accuracy of the sensor may be governed by the degree to which the droplet former creates consistently-sized droplets, since the technology for accurate counting (e.g. a pulse counter) is well understood.

Figure 17:
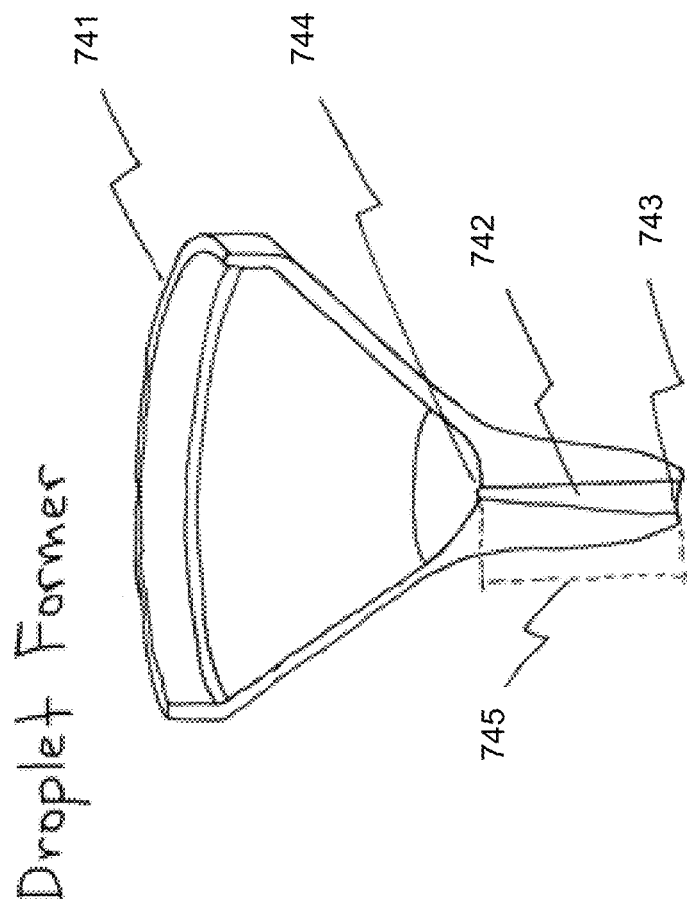
FIG. 17 is a diagram illustrating a droplet former quantifier in accordance with one embodiment of the technology disclosed herein.

FIG. 17 is a diagram illustrating a droplet former quantifier in accordance with one embodiment of the technology disclosed herein. As can be seen from this example, droplet former 741 includes an internal taper 742, which is configured with a geometry so as to allow a specific amount of mass to pass through it until it overcomes the surface tension that a droplet encounters at the outlet orifice 743. The internal taper may be defined by an optimized ratio of the inlet 744 to the outlet orifice diameters as well as its overall length 745. If the internal taper 742 is too restrictive, then the droplets may take a considerable amount of time to form. On the other hand, if the internal taper 742 is too large, then the droplets either combine to form a single stream, or have no uniformity as they exit the outlet orifice.

With regard to detection of the drops, those versed in the art will also note that water droplets can be detected by means other than conducting electrodes. For example, the presence of droplets can be detected by capacitive, mechanical, and optical means.

It is noted that the use of a funnel as a means of concentrating precipitation for the purposes of measurement is a conventional technique. However, conventional techniques have not used a funnel-shaped apparatus for gathering moisture for converting to a homogenized (all of equal size) droplet stream and exploiting the fact that counting of equal-sized droplet yields a measure of total volume or volumetric rate.

The two above-describe subsystems are nearly sufficient for the measurement of precipitation type and amount. However, as introduced above, the precipitation characterizer cannot fully distinguish all types of precipitation. Specifically, embodiments of the characterizer cannot detect drizzle or snow, and cannot distinguish the impacts of small hail from heavy rain.

Accordingly, a precipitation classifier can be included to perform such classification. The precipitation classifier is the third subsystem of the sensors set, and includes logic that combines inputs from both the precipitation classifier and the precipitation quantifier into a final determination of precipitation type. Table 3, below, shows an example of a logical truth table that the classifier can implements to determine the final precipitation type.

TABLE 3

Logical Truth Table for Classifier

| Impact Level | Moisture Measured | Temperature | Type |
|---|---|---|---|
| High | No | n/a | Hail |
| Medium | No | n/a | Small Hail |
| Low/High/Medium | Yes | n/a | Rain |
| None | Yes | Above Freezing | Drizzle |
| None | Yes | Below Freezing | Snow |

Any combination that doesn't map to one of the input values is labeled "unknown precipitation" until the classifier is able to map the precipitation to one of the known types. Types which remain "unknown" can be assumed to be one of several more rare types including ice grains, snow grains, blowing sand, or volcanic ash.

Instrumentation in various forms, including instrumentation as described above can be delivered via a number of different mechanisms, including delivery and installation by personnel. In some applications or deployments, it may be desirable to deliver the instrumentation via air deployment. For example, it may be desirable to deliver the instrumentation by deploying it from an airborne platform such as a fixed- or rotor-winged aircraft. Accordingly, delivery mechanisms can be provided that can house the instrumentation and be dropped, released or otherwise deployed from an aircraft to carry the instrumentation to the ground with or without power.

In various embodiments, the deployment can be configured with an aerodynamic shape (e.g., somewhat similar to that of a dart) to facilitate flight from the airborne platform to the ground (or other deployment location). The mechanism can include a weighted tip (or a forward-end weight bias), an elongated body section, and a set of stabilizing fins at the aft end. This shape facilitates a vertical orientation during free-fall flight from the airborne platform to the deployment site. With sufficient weight at the fore-end, or tip, a vertical or near-vertical fall trajectory can be achieved even in high winds and at high initial deployment velocities. The weight at the fore-end can even assist causing penetration of the tip into the soil or other deployment surface.

Accordingly, the weight can be chosen based on anticipated weather conditions at the drop location and soil hardness or density at the deployment site.

Figure 18:
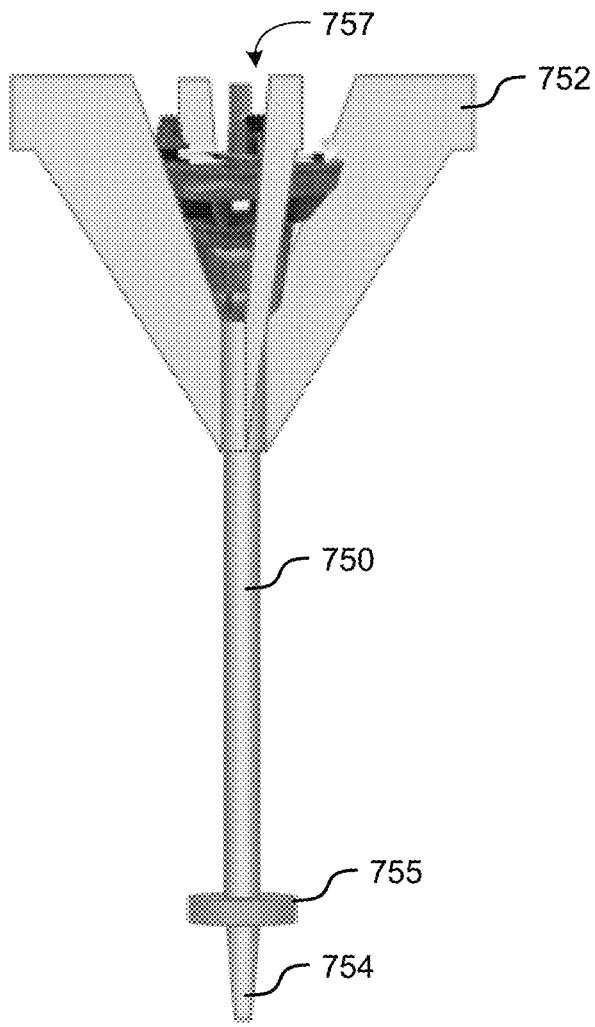
FIG. 18 is a diagram illustrating a side view of a deployment assembly in accordance with one embodiment of the technology described herein.

FIG. 18 is a diagram illustrating a side view of a deployment assembly in accordance with one embodiment of the technology described herein. The example illustrated in FIG. 18 also illustrates the deployed equipment carried by the assembly. Referring now to FIG. 18, the example assembly includes a mast 750, a fin assembly 752, a stopper 755, and an anchor spike 754. Also illustrated in the example of FIG. 18 is an example payload 757, which, in this example, is a portable weather station. Payload 757 can be any of a number of different payloads, including portable weather stations as described in this document. Although not illustrated, a connection mechanism or other connector can be included to allow the payload to be mounted to the deployment assembly. For example, a threaded mount can be provided to allow the payload to be screwed onto the deployment assembly. Likewise, a snap fit assembly, bayonet mount, friction fit assembly or other like connector can be provided to engage the payload (i.e., to engage a complementary connector or fitting of the payload).

In the illustrated example, fin assembly 752 comprises four fins arranged circumferentially about the body of the assembly, although other quantities of fins can be provided. One purpose of the fins is to provide stability during flight to allow the assembly to maintain its orientation and intended flight path. This can be used to help prevent the assembly from tumbling during return to the ground. Fins can accomplish this by moving the center of pressure of the assembly aft of the center of gravity. A weighted tip also helps to accomplish this objective by moving the center of gravity forward. A different number of fins can be used as appropriate for the given application or environment. For example, 2, 3, 4, 5, 6 or more fins can be used as appropriate, although fewer than three fins is preferably avoided. Three to four fins are adequate for most applications. Likewise, fin area, fin shape (i.e., planform), thickness, and so on, can vary from that shown.

Although not illustrated, the fins can also include fairings at the joint between the fin and the body. The fairings can be used to help reduce interference drag if desired. However, it is noted, that fairings can also affect (e.g., potentially increase) the terminal velocity as well. Also not illustrated are features that may be included such as radial tapers on the leading and trailing edges, which can be used to reduce drag and provide a more efficient shape; and airfoils, which can further reduce drag. As noted above, however, reduction of drag should be considered as a factor in determining the desired terminal velocity of the assembly. It may not be desirable to have too high a terminal velocity, as a higher terminal velocity tends to create a greater shock to the equipment on impact.

In the illustrated example, the body of the assembly is formed by mast 750. In this example, mast 750 is a single piece, cylindrical in shape, and has a relatively uniform diameter from the fore to the aft end. In other embodiments, the body can be of other shapes, geometries and sizes, and can be made from multiple pieces and have a tapered or otherwise varying diameter along its length. As described in more detail below, the body can comprise a multi-segment mast or rod that can serve functions such as cushioning the shock of landing, and extending the height of the assembly upon landing. Additional shock absorbency or cushioning can be provided at the point at which the instrumentation 757 is mounted to the assembly.

Anchor tip or spike 754 can be tapered as illustrated to allow easier penetration into the soil or other deployment surface. Stopper 755 can be included to help the penetration of the assembly into the deployment surface at a predetermined depth. Either or both of anchor spike 754 and stopper 755 can be weighted to bias the weight of the unit toward the nose. Likewise, body section 750 can be weighted toward the nose. Weighting toward the nose of the assembly assists in orienting the assembly in a nose-forward position (e.g., nose-down) during its return to Earth.

As noted above, the terminal velocity is affected by factors such as the total mass of the assembly and its drag coefficient. The terminal velocity, $V_t$ can be determined mathematically as follows:

$$V_t = \sqrt{\frac{2mg}{\rho A C_d}} \tag{33}$$

where m is the mass of the assembly, g is the acceleration due to gravity, p Is the density of the fluid (e.g. the air) through which the assembly is traveling in its return to Earth, A is the projected area of the assembly and $C_d$ is the drag coefficient of the assembly.

Figure 61:
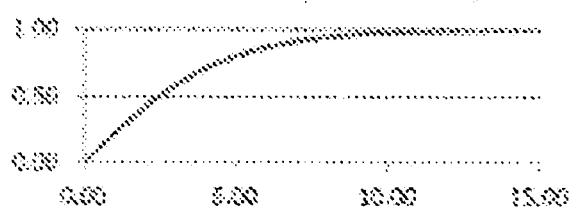
FIG. 61 illustrates an example of design parameters for an assembly having a terminal velocity of 100 mph.

FIG. 61 provides example design parameters for example assembly having a terminal velocity of 100 mph, in this example, the unit has a total mass of 3,150 grams, and a drag coefficient of 0.75.

As noted above, aerodynamic analysis of this design estimates a terminal velocity of roughly 100 mph. Based on the time it takes for the assembly to reach its terminal velocity, it is estimated for this design that a speed of 35 mph (sufficient to fully penetrate most soils) will be reached after only a 40 ft drop. However, those of ordinary skill in the art reading this disclosure and its teachings will see that the design parameters can be easily changed to achieve a desirable terminal velocity or impact shock, or other related objective, for the deployment assembly. In addition to providing verticality and relative insusceptibility to winds, this approach utilizes the downward force of the fall to anchor the system into the ground. Even if small rocks or other surface irregularities are encountered, the assembly can be configured such that its moment of inertia is large enough to overcome any forces that would bias it from vertical. In addition, because the terminal velocity is limited at 100 mph (or other velocity as designed), the system can be dropped from any height. A cushioning mechanism in the riser pole (described below) spreads the deceleration due to impact over time, thereby limiting the shock force that the equipment experiences.

Because the tip of the falling assembly is expected to hit the ground with sufficient force to penetrate into the earth for anchoring, it is desirable to reduce the level of G-shock encountered by the equipment being deployed. To reduce that shock load, the mast above the spike may be designed to both re-coil (e.g., be compressed) and then expand upon impact. This mechanism can be configured to not only reduce the total shock level but also to increase the overall height of the deployed equipment without requiring the pole to be at its full deployed length when dropped from the aircraft. Accordingly, any of a number of design mechanisms can be included with the assembly to accomplish these objectives. For example, mast 750 can be spring-loaded (e.g. at its junction with, or somewhere above anchor tip 754) to absorb the shock of impact. As another example, mast 750 can be segmented to provide shock absorbency and the ability to telescope to a fully deployed height. In various embodiments, a segmented mast 750 can be implemented as two or more interlocking coaxial tubular members that can be configured to be compressed for storage in flight, and to telescope to an expanded height upon impact with the ground.

Figure 19:
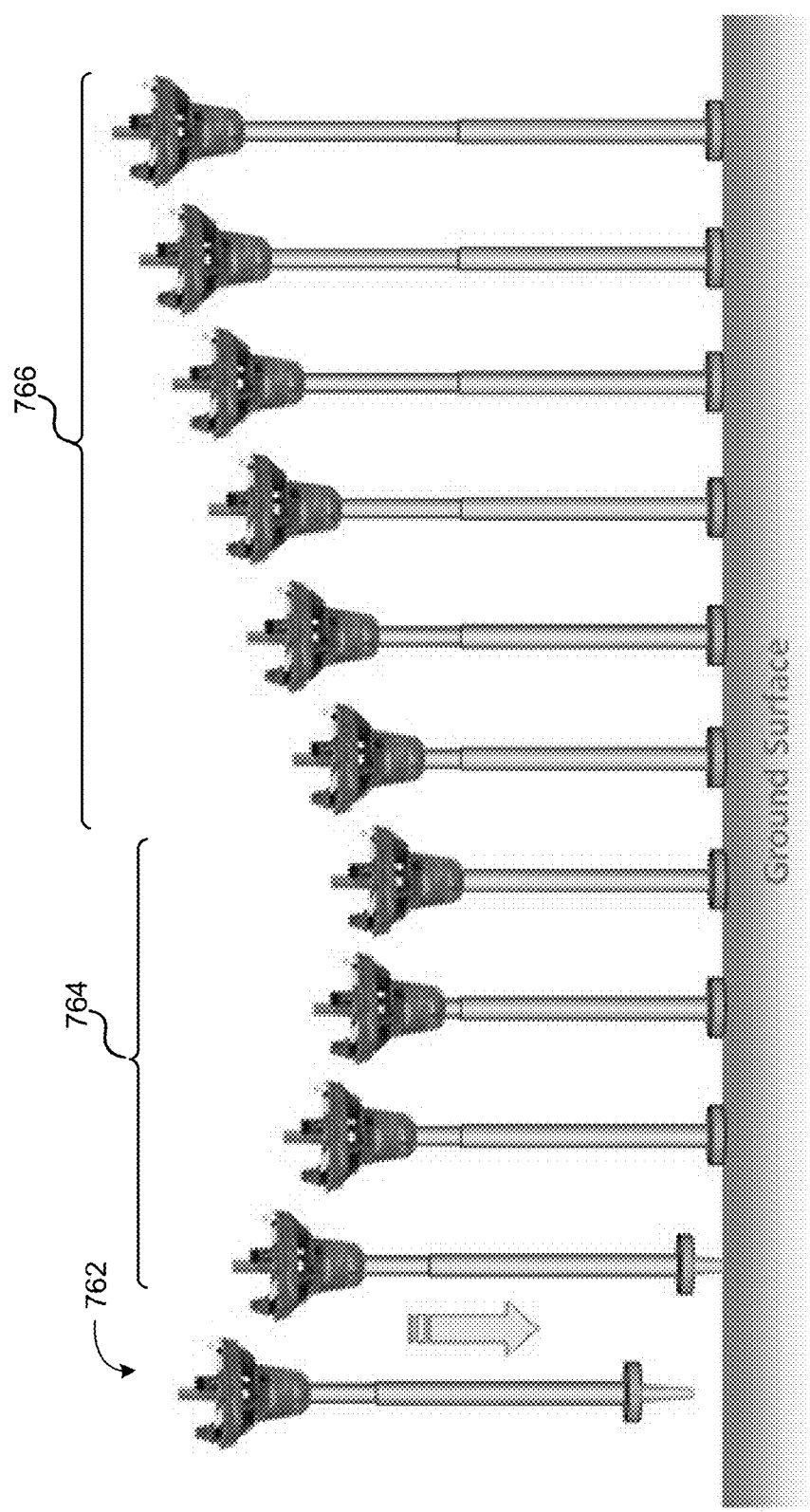
FIG. 19 is a diagram illustrating an example of a multi-segment riser pole before, during, and after impact in accordance with one embodiment of the technology disclosed herein.

FIG. 19 is a diagram illustrating an example of a multi-segment riser pole before, during, and after impact in accordance with one embodiment of the technology disclosed herein. In this example, two segments are shown, however, after reading this description, one of ordinary skill will appreciate that more than two segments can be used depending on the final height desired. For clarity of description and to better facilitate understanding by the reader, the assembly is depicted without fins. As seen in FIG. 19, the length of the riser pole can be configured to reduce in length in the moments after impact to absorb the G-shock that the equipment experiences and then to gradually lengthen to full length after impact to fully elevate the equipment to the desired height.

As this example illustrates, at 762, moments before impact, the assembly is at a reduced height selected for the unit's return-to-ground flight. The upper segment of the mast is partially, but not necessarily completely pushed into the lower segment. In the next four images 764, during and immediately after impact with the ground surface, it can be seen that the mast compresses to absorb the shock of impact with the ground surface. In various embodiments, the upper (inner) mast segment is spring-loaded to absorb the shock of impact. Upon impact, the upper mast segment is translated by the force of gravity to move further into the lower (outer) mast segment thereby increasing the stopping distance of the instrumentation, and cushioning or absorbing the shock on the instrumentation mounted at or near the top of the mast.

In the next six images 766, the mast telescopes to desired height. In various embodiments, the telescoping operation can be triggered by the impact with the ground surface. For example, a spring-loaded locking or catch mechanism can be used to hold the mast in its in-flight position (762) during its fall to the earth. Depending on the design, the shock upon impact can cause the catch mechanism to release, allowing the spring force applied to the upper mast segment to cause the upper mast segment to expand as shown at 766. As another example, a locking or catch mechanism can be provided that is released when the lower end of the inner segment reaches a certain point within the outer segment.

As will be appreciated by one of ordinary skill in the art reading this description, the number and length of the segments can be chosen to achieve the desired in-flight and deployed lengths. For example, in one embodiment, when the assembly is released from an aircraft, it is roughly 2 ft in length to make it more manageable prior to deployment. Although it initially shrinks to absorb impact, it eventually lengthens to 3 ft after it is fully anchored. This ideal combination can be readily achieved by the use of mechanical springs, pneumatic cushioning, or other shock absorbency techniques to absorb and dissipate impact energy, a simple spring that pushes the pole to expand at final deployment, and a quick-release latch that keeps the pole in a shortened state prior to drop. Those versed in the art can see that this mechanism can be scaled up or down to larger and smaller sizes.

Although the stabilizing fins are desirable to facilitate or ensure vertical deployment of the equipment, they can be withdrawn from the area around the equipment in order to avoid or minimize interference with operation of the equipment. In various embodiments, a mechanism can be provided that not only achieves the displacement of these fins, but also utilizes the fins for added stability of anchoring. In further embodiments, the fins can be designed such that they can even stabilize the assembly on a solid or impenetrable surface such as, for example, rock, frozen ground, a building rooftop, and so on. The fins can also provide additional stability on extremely soft surfaces such as granular sand, peat, mud, and so on.

In various embodiments, the mechanism for causing displacement of the fins from an in-flight position to a deployed position can be configured to work by allowing the shock-force of impact to carry the fins down to the ground upon impact and to pivot the fins down to the point that they meet the ground. Furthermore, in various embodiments, a mechanical ratcheting mechanism can be used to lock each fin in place once the fins reach the downward, deployed position.

Figure 20:
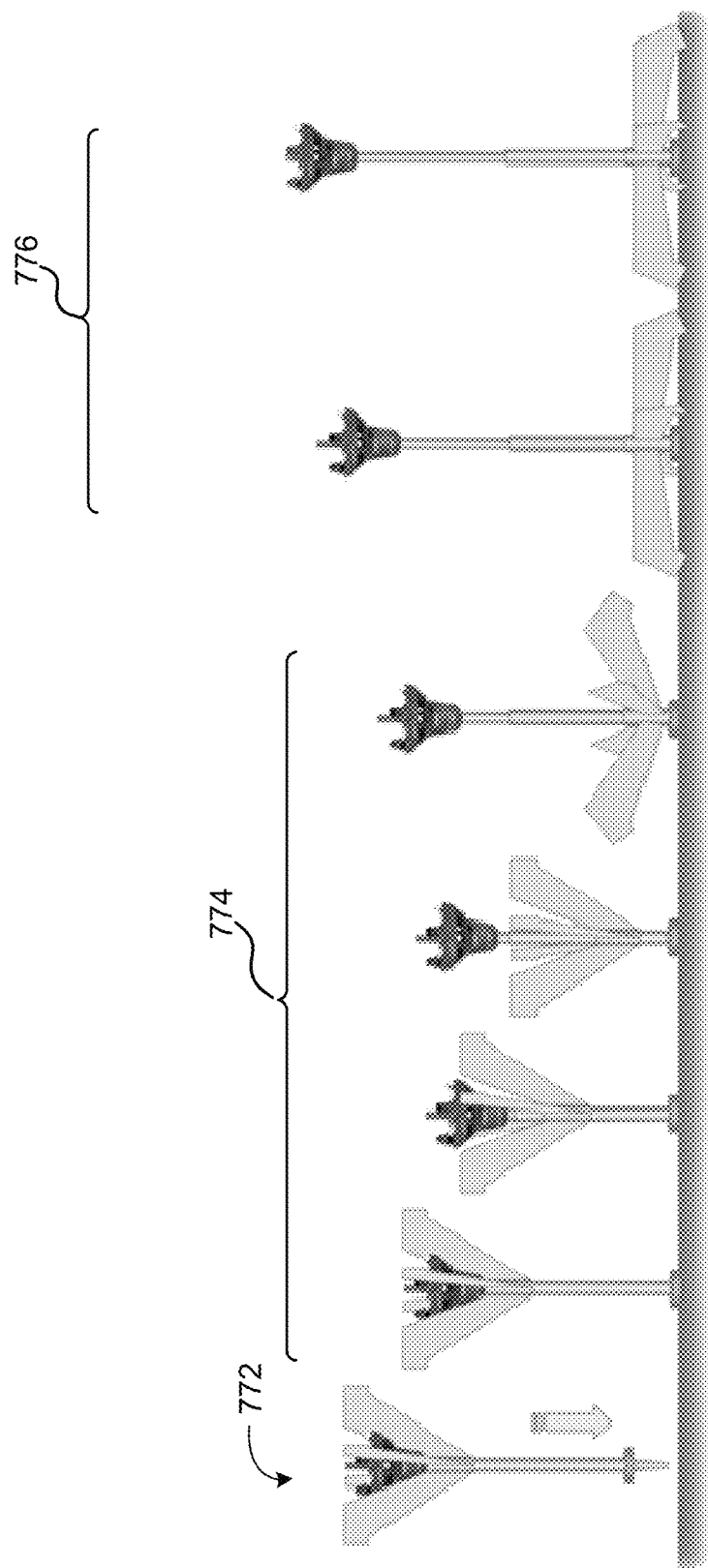
FIG. 20 is a diagram illustrating an example of this displacement and ratcheting in accordance with one embodiment of the systems and methods described herein.

FIG. 20 is a diagram illustrating an example of this displacement and ratcheting in accordance with one embodiment of the systems and methods described herein. Referring now to FIG. 20, image 772 depicts the assembly moments before impact. As seen by this example illustration, the fins are in their in-flight position toward the aft end of the assembly to provide a center of pressure aft of the center of gravity, thereby making a more stable flight.

As discussed above, a mechanism can be provided (e.g. a spring-locking or other mechanism) that locks the fins into their in-flight position during flight, but releases upon the shock of the impact. Immediately after impact, as shown by images 774, after the catch mechanism is released, the momentum of the fins and the force of gravity cause the fins to move along the body in a downward direction toward the deployment surface. The continued momentum of the outer ends (tips) of the fins causes them to continue to move in a downward direction once the body upon which the inner end of the fins is mounted ceases its downward movement. At 776, the fins are fully deployed, providing a more stable base to the unit. As also shown at 776, the mast is forced by its spring mechanism to rise to its final deployed height.

As also seen in this illustration, the fins can be mounted on a sliding ferrule or other tubular or ring-like member configured to be able to slide from the aft end to the tip for deployment. A catch or spring-loaded mechanism can be provided to maintain the fins at the aft end during flight and to allow the fins to fall to the deployed position as a result of the shock of impact. A catch mechanism can also be provided at the tip end to lock the fins in place upon deployment. As FIG. 20 illustrates, a pivot mechanism can also be provided at the ferrule or ring to allow the fins to pivot from their upright in-flight position to the deployed position contacting the ground. For example, a pin, hinge or other like mechanism can be provided about which the fins may pivot.

Rubber or rubberlike feet can be provided at the tips of the fins to provide a more stable base for deployment. The contribution of rubberlike feet to the drag of the assembly should be considered for designs that include such a feature. In the embodiment illustrated in images 776 of FIG. 20, the fins are shown to include a pointed protrusion at the tips of the fins, which can be used to penetrate the deployment surface and provide increased ability.

Figure 21:
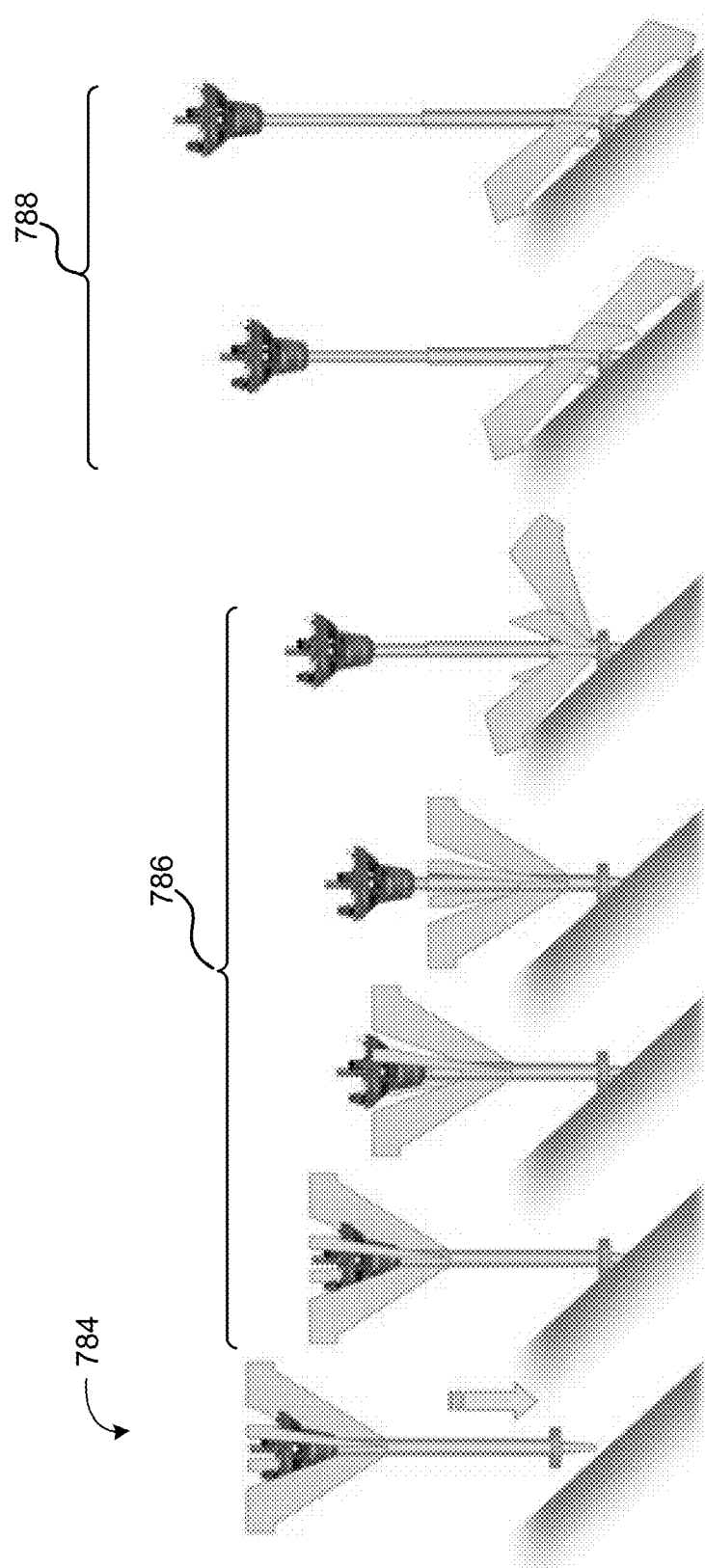
FIG. 21 is a diagram illustrating an example of deployment on the slope using ratcheting fins in accordance with various embodiments of the technology disclosed herein.

Although ideal for conditions with flat and penetrable ground, in various embodiments the mechanism can also be configured for deployment on steep slopes. FIG. 21 is a diagram illustrating an example of deployment on the slope using ratcheting fins. As can be seen by the embodiment of FIG. 21, the fins can be configured to ratchet beyond 90° from the mast to allow stable footing on a sloped or irregular surface. Additionally, each fin can be positioned independently of the others to allow stable footing on such sloped or irregular surfaces. As seen at image 784, in this example, the assembly includes the same in-flight configuration for the fins. At 786, the fins are released and travel downward along the mast until each fin reaches the deployment surface. As seen in these images, once each fin reaches its grounded position, its movement ceases. A stepped ratchet mechanism can be used to lock the fins in place at their downward-most position. Continuing to images 7808, it is seen in this example that the remaining two fins continued until they contact the deployment surface, ceasing their downward motion and locking into place by the ratcheting mechanism. As this illustrates, the mast can remain in a vertical or near vertical position and the fins can be deployed to conform to the contour of the ground or other deployment surface to provide stability.

In cases where the penetrating ground spike hits a rock or other impenetrable surface and is unable to penetrate, or where it hits a muddy or sandy surface with poor stability, the fins provide a backup that enables the platform to remain stable and vertical. Using the combination of both a penetrating ground spike and a lateral base formed by the fins gives the assembly stability and effectiveness on a wide variety of terrain.

It is noted that the ground spike can be configured to provide anchoring in penetrable surfaces such as soil, sod, gravel, clay, firm mud, firm sand, and combinations of these. Although not illustrated, the ground spike can include a relatively sharp tip to allow penetration and a shoulder (like a broadhead arrow rotated in 360°) to provide a more firm hold into the ground.

Also, as the above illustrates, the fins can be configured to provide a stable platform on impenetrable surfaces (rock) and provide additional stability on soft and extremely soft surfaces including sugar sand and soft mud. Both the spike and fins can be configured to be capable of working just as effectively on uneven terrain and on slopes of 45° or more without affecting their performance.

Figure 22:
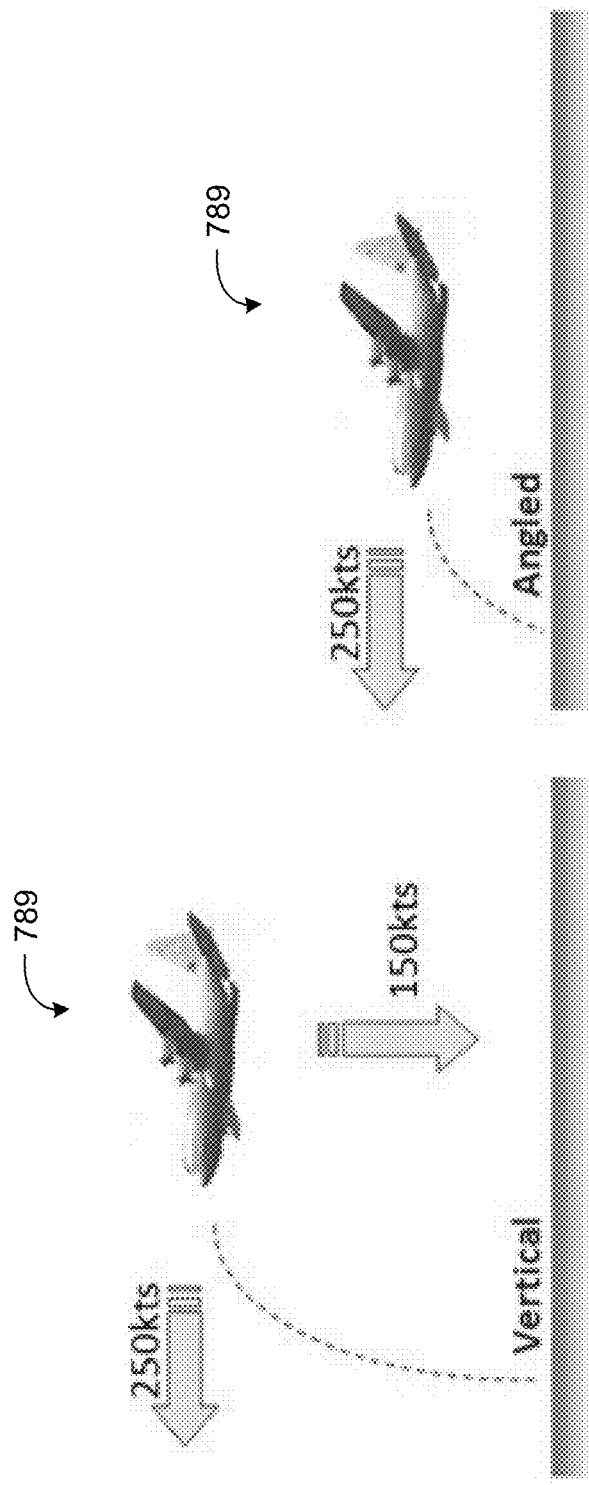
FIG. 22 illustrates an example of horizontal travel as a result of speed of the deployment aircraft.

The combination of the re-coiling pole and ratcheting fins as described above can, in most embodiments, be configured to provide air emplacement from low-speed rotorcraft or from high-speed fixed wing aircraft flying at high altitudes. However, when dropped from a low altitude at a high speed, enough horizontal speed from the drop is carried through on the flight to the ground, which can lead to a non-vertical impact angle. FIG. 22 illustrates an example of horizontal travel as a result of speed of the deployment aircraft 789.

To address these deployment scenarios where equipment must be dropped from a low altitude and a high speed simultaneously, the assembly can be configured to include a "flash parachute" or other like mechanism that can be attached to the air-drop fin system prior to release. The parachute in such embodiments can be referred to as a "flash" parachute because it is designed to be open for a short period of time (e.g., only 2-3 or 3-5 seconds, or other time interval as appropriate) to stop the lateral motion of the system. After deployment, the parachute is configured to be released to drift away while the assembly and its equipment drops vertically to the ground. Using a parachute that remains deployed longer than this short period of time could cause the assembly to be carried off course due to wind conditions in the area and could slow the descent to such a rate that penetration of the anchor spike is hindered. In other words, in various embodiments, the parachute is not used to deliver the equipment to the ground or to limit the downward fall speed—it is used to arrest its horizontal movement.

Figure 23:
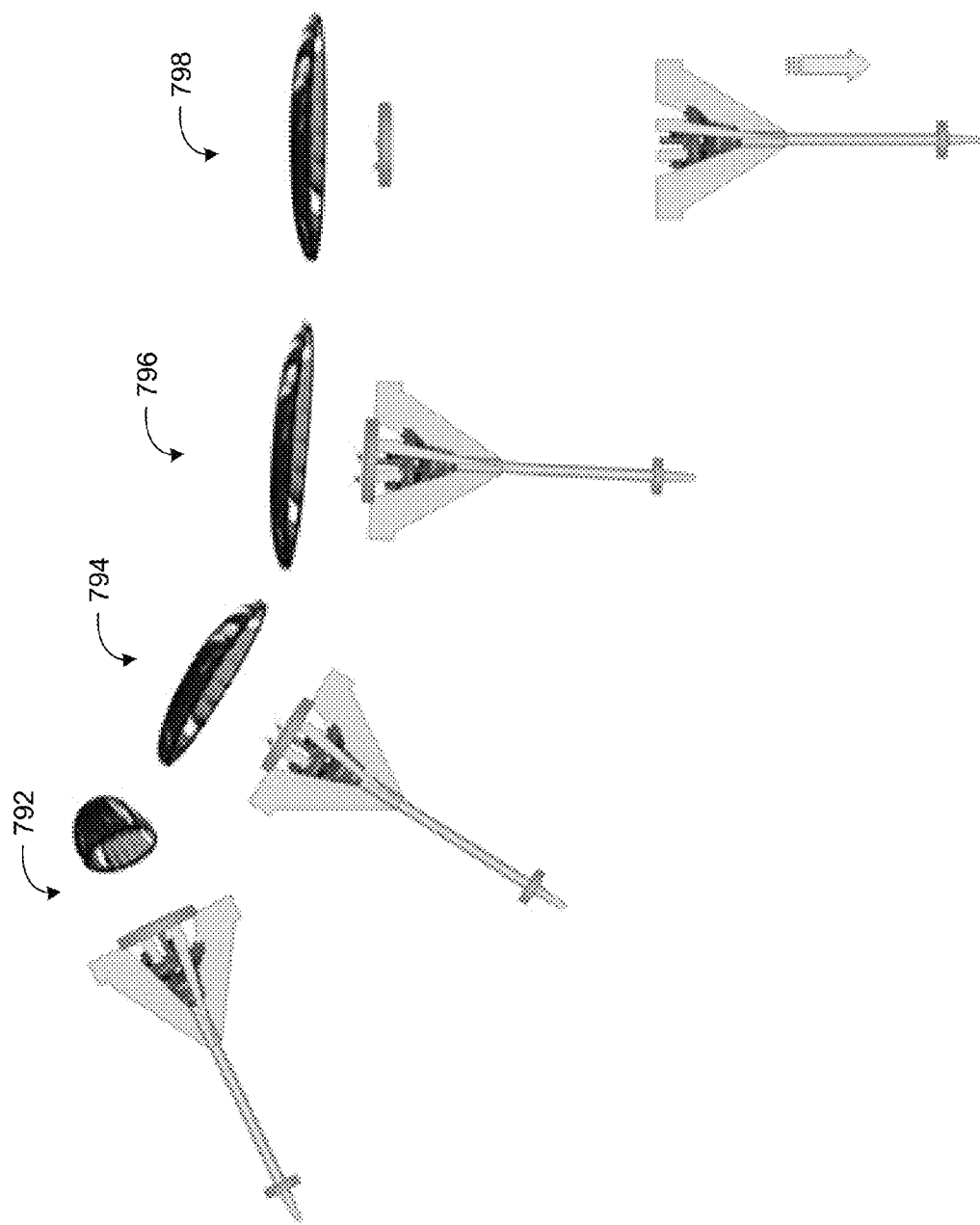
FIG. 23 is a diagram illustrating the operational release of a flash parachute in accordance with one embodiment of the technology described herein.

FIG. 23 is a diagram illustrating the operational release of a flash parachute in accordance with one embodiment of the technology described herein. As seen in this example, upon initial release from the aircraft (image 792), the assembly begins to fall but will continue to travel at or near the airspeed of the delivery aircraft, but is slowed by the atmosphere. The flash shoot begins to deploy, slowing the unit's horizontal airspeed. At images 794 and 796, it can be seen that the parachute opens further as it resists the flow of air, further slowing the horizontal airspeed. As also shown at images 794 and 796, the weight bias toward the tip of the assembly continues to cause the assembly to move to a vertical orientation. Accordingly, to avoid having the parachute unduly impact the vertical airspeed of the assembly, the parachute is released from the assembly as shown in image 798. Accordingly, the timed-release mechanism holds the parachute in place to arrest horizontal movement and releases to allow the unit to fall to the ground and preferably reach its terminal velocity. In some embodiments, the timed-release mechanism can be implemented using a timer that triggers the release mechanism after a certain amount of time has elapsed from release from the aircraft. In other embodiments, motion or acceleration sensors can be used to trigger the release of the parachute from the assembly at the moment the sensors detect that sufficient horizontal movement has been arrested. In yet another embodiment, the parachute release mechanism can be configured to release the parachute once sufficient pull is provided by the parachute. For example, force sensors can be used to detect the amount of pull and trigger the release mechanism. As another example, the parachute release mechanism can be a friction coupling that releases with sufficient force from the parachute packs on the coupling.

In various embodiments, the weather station system/device can include other advanced capabilities such as weather event predictive analysis and information protection tools, the latter ones related to so-called Information Assurance (IA). Such tools and technology can also be used at a central weather station or at any other location or facility used to perform predictive analysis. It is not known, nor would it be obvious to use these capabilities as applied or tuned to weather station specificity or to weather event prediction. Accordingly, a detailed discussion follows. Also, in various embodiments, these capabilities are achieved by including software engines and algorithms, or other like modules, allowing them to address the SWaP2 constraints, where P2 refers to both the power supply and processing power.

One aspect of non-obviousness in the weather event predictive analysis context arises in microclimate weather prediction, which requires prediction of so-called Weather Anomalous Events, or WAEVENTS, based on a heuristic software engine and so-called cybersensing, based on Bayesian inference.

One non-obvious aspect of information protection tools that can be included in embodiments herein is in IA-key management and wireless/RF transmission, including through harsh weather communication channels. In some embodiments, the IA-keys include encryption keys and injection keys, as described below. This is, because, the allowance of even a single uncorrected error can inhibit the ability to use the keys as intended, while a high assurance of error correction by error-correcting-codes can be bandwidth overhead (OVH) cost prohibitive. Therefore, in some embodiments, specific solutions to this challenge are incorporated.

In some embodiments, the detection and identification (ID) of Weather Anomalous Events, or WAEVENTS, detrimental to weather predictive analysis, especially in microclimate conditions, relies on detecting and identifying Digital Topologic Singularities (DTS) as part of Digital Singular Mapping (DSM). This can be the case for both linear and non-linear DTS, the latter including catastrophes as defined by mathematical theory of catastrophes. While the theory of catastrophes is known, their heuristic detection and identification is unobvious and unknown in prior art, and may be incorporated in various embodiments of the technology disclosed herein. Various embodiments related to weather predictive analysis and information protection tools, may be software-based and may thus, avoid the use of hardware constraints of the weather station system/device, especially in cases in which the RF networking and satellite communication are useful, or even required.

Various embodiments of the systems and methods described herein can be configured to provide an optimum or more ideal solution for SWaP (Size, Weight and Power) constraints. Additionally, embodiments can be implemented to provide a systemic solution to command-and-control (C2) issues, including high bandwidth communication issues and satellite communication issues. In further embodiments, modules can be implemented (e.g., using a software engine) for: detection, identification and recognition of weather anomalous events. The system can also be configured to provide novel weather sensing schemes, including optical visibility measurement.

Various embodiments can be configured to provide a module for weather anomalous event detection, identification, and recognition. The Weather Anomalous Event System (WAES), may be based on binary cybersensing, including a double-alarm digital decision generation (DDG) scheme. It may be based on a cybersensor fusion making decision: determining whether a weather event is anomalous (alarm), or not (no alarm); and Bayesian Figure of Merit (FoM) (e.g., a Positive Predictive Value (PPV), similar to that as used previously extensively in medicine, in general, and in λ-ray Mammography in particular).

Embodiments can also be configured to apply a Bayesian Inference, in a novel way, by applying the Bayesian statistics for weather anomalous events, which can be referred to herein as WAEVENTS. An exemplary way in which WAEVENT may be configured as a target to be detected by the WAES is due to a cybersensor set: $C_1, C_2, C_3, \ldots C_n$, where n is the total number of cybersensors. These sensors may be connected with two buses: a sensor bus, or C-bus; and, a microprocessor (µP)-bus, or P-bus. The cybersensors are fed by the computer cloud or database, upgraded from PC-interface. The output WAEVENT, or red alarm, is outputted to PC, while yellow alarms are stored in µP for further consideration.

Figure 24:
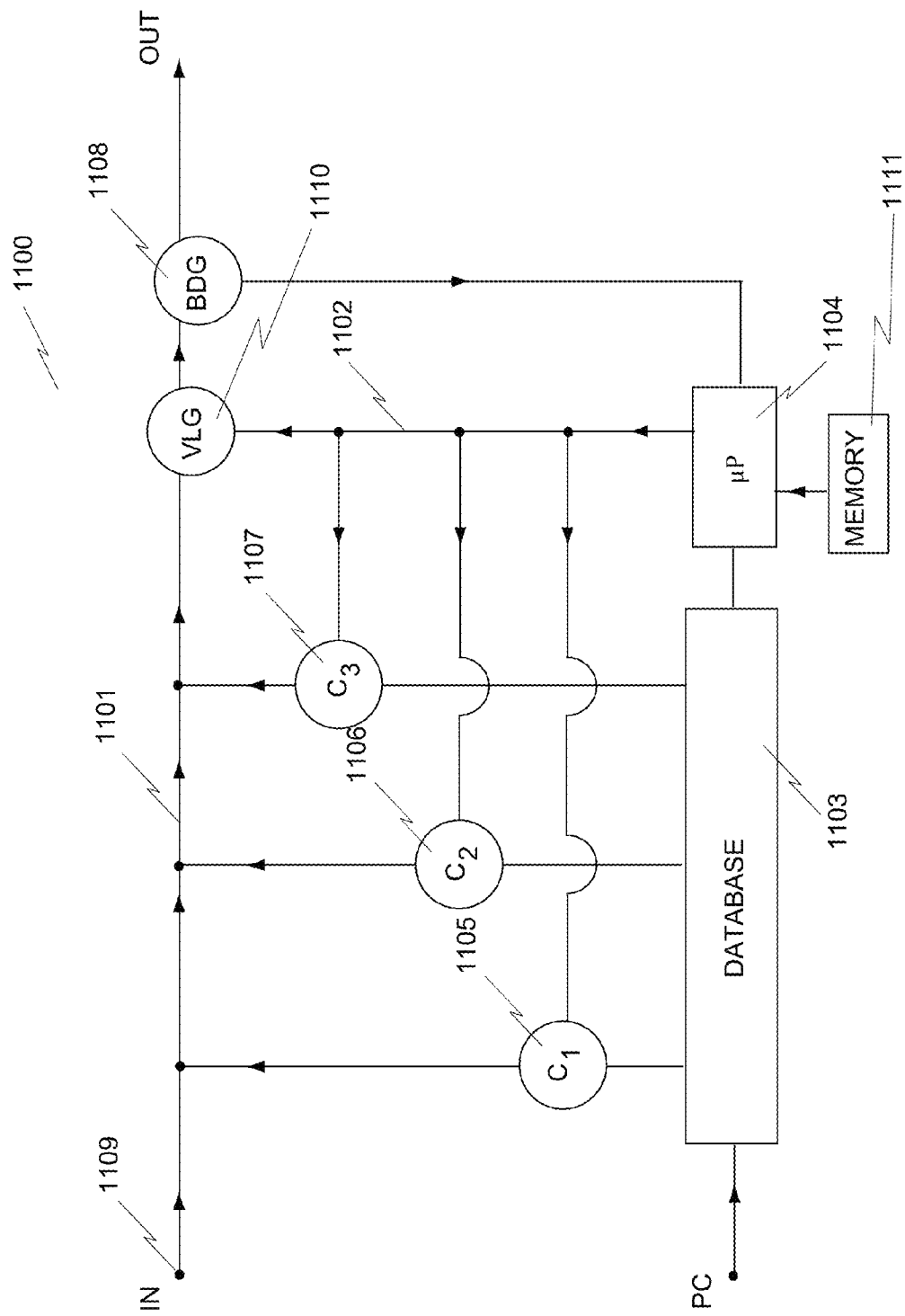
FIG. 24 is a diagram illustrating an example Truthing-based Anomalous Event Software Engine (TAESE) that can be used to implement a WAES in accordance with one embodiment of the technology described herein.

FIG. 24 is a diagram illustrating an example Truthing-based Anomalous Event Software Engine (TAESE) that can be used to implement a WAES in accordance with one embodiment of the technology described herein. In the example illustrated in FIG. 24, the WAES schematic 1100 is shown as including two data buses 1101 and 1102, as well as database 1103, microprocessor (µP) 1104, cybersensors 1105, 1106 and 1107, and Binary Decision Generator 1108 as basic WAES sub-systems or components. Weather data 1109 is used as input to the WAES system 1100. In various embodiments, this can be a formatted weather event, or Structured Weather Event (SWE). In various embodiments, the weather event is input to the system as a statistical quant or sample 1109 and is investigated by the cybersensors in the system (e.g., 1105, 1106, 1107 in the illustrated example). In various embodiments, a greater or lesser quantity of cyber sensors can be utilized. The cyber sensors can be used to produce an anomaly ranking. The anomaly ranking can be summarized at Voting Logic Gate (VLG) 1110 to produce a yellow alarm or no-alarm. Also memory (such as flash memory, for example) 1111 can be added.

In various embodiments, the received weather data 1109 may be pre-structured, or formatted in the form of a statistical quant of information. This may be referred to herein as a Weather Information Statistical Quant (WISQ). The WISQ may include metadata such as, for example, geospatial coordinates: (x, y, z), temporal coordinate, t, as well as weather data parameters, such as, for example:

Temperature
Atmospheric pressure
Wind speed and direction
Rain volume
Relative humidity
Insolation (solar radiation)
Camera cloud high
Visibility
Others Cyber sensors 1105, 1106, 1107 can be used to verify the weather data parameters to determine whether or not to produce a weather anomalous event (WAEVENT). Therefore, in various embodiments, the weather event space is binary, producing either a WAEVENT (or signal, S); or noise, N (no-WAEVENT). Based on sensor readouts made available to voting gate logic (VLG) 1110, the binary decision generator (BDG) 1108 produces either an alarm, S'; or no-alarm, N'. In various embodiments, the basic paradigm of Bayesian Inference may be based on two absolute event probabilities: p(S), p(N) which may be exclusive events. Therefore, the sum of these two exclusive events results in certainty: p(S)+p(N)=1. In terms of a sensor response, the BDG causality relation results in two exclusive readout probabilities: p(S')+p(N')=1.

Also, there may be four (4) direct conditional probabilities: p(S'|S), p(N'|N), p(S'|N), p(N'|S). These are, respectively: probability of detection, probability of rejection, probability of false positives and probability of false negatives. Those conditional probabilities satisfy two conservation relations: p(S'|S)+p(N'|S)=1, and p(S'|N)+p(N'|N)=1. Based on Bayes Theorem, embodiments can be configured to also introduce four (4) inverse (Bayesian) conditional probabilities: p(S|S'), p(N|N'), p(S|N'), and p(N|S'). The probability, p(S|S'), is referred to as Positive Predictive Value (PPV). By using the Bayesian Truthing Theorem (BTT), it can be determined that: (PPV)=p(S|S') is equal to the ratio of true alarms, $a_1$, to total number of alarms, a, which is the basic Key Performance Parameter (KPP) of so-called Bayesian Truthing, introduced by analogy to RADAR truthing in 1960s. Accordingly, Bayesian Truthing (BT) may be used in various embodiments to introduce absolute measurable quantities in the analysis, rather than relying solely on relative parameters such as statistical probabilities. This, in various embodiments, can result in simplifying the WAEVENT structure to be more useful for experimental measurement and experimental verification. However, there is equivalence between Bayesian statistical formulas and truthing formulas.

For example, the probability of false positives (PFP), is $$(PFP) = p(S' \mid N) = \lim_{n \to \infty}\left(\frac{a_2}{n}\right) \quad (34)$$

where $\alpha_2$ is the number of false alarms, n is the number of no-targets, and asymptotic limit (n→∞) provides the equivalence between Bayesian Statistics and Bayesian Truthing, the latter one based (for binary case) on a number of parameters. In various embodiments, there may be nine (9) parameters: m, s, n, a, $a_1$, $a_2$, b, $b_1$, $b_2$, which are the number of: statistical quants, targets, no-targets, alarms, true alarms, false alarms, no-alarms, true no-alarms and false no-alarms, respectively. In order to have statistics valid, various embodiments make the m-value a large number (e.g., assume: $m \geq 10^9$). The challenge with anomalous events, such as WAEVENTS, is such, that, as anomalous events, the targets are rare (e.g., anomalous weather, by definition, is a rare event in comparison with normal weather); i.e., s-number is small quantity:

$$s \ll m \quad (35)$$

However, for targets as rare events, the PPV-value is usually small. This is because, in good approximation, the PPV value is:

$$(PPV) = \frac{1}{1 + \frac{p(S' \mid N)}{p(S)}} = \frac{1}{1 + \frac{(PFP)}{p(S)}} \quad (36)$$

In order to illustrate this case, assume the probability of false positives, PFP=$10^{-6}$, which is a rather low number, and calculate positive predictive value (PPV) as a function of target population, p(S). An example of this is shown in Table 5.

TABLE 5

| (PPV) vs. p(S), for (PEP) = $10^{-6}$ | | | | | | | |
|---|---|---|---|---|---|---|---|
| p(S) | $10^{-8}$ | $10^{-7}$ | $10^{-6}$ | $10^{-5}$ | $10^{-4}$ | $10^{-3}$ | $10^{-2}$ |
| (PPV) | 0.0099 | 0.09 | 0.5 | 0.91 | 0.99 | 0.999 | 0.9999 |

According to Table 5, for a very low target population such as s=10 (then, p(S)=$10^{-8}$, for m=$10^9$), the result is a very low PPV-value of 0.0099. Only for s≥1000 (p(S)=$10^{-6}$), the PPV-values are large. The threshold is:

$$p(S) = (PFP) \Rightarrow (PPV) = 0.5 \quad (37)$$

i.e., when (PPV)-value is 50%.

Therefore, there is a fundamental problem with recognizing anomalous events, such as WAEVENTS, which embodiments of the systems and methods disclosed herein are configured to solve in an unique way. In various embodiments, the solution is implemented using a multi-step process (in a similar way as in λ-ray mammography in the case of breast cancer diagnosis) by applying a sequence of sensors with very low target misses, i.e., for p(N'|S)=(PFN) ≪1, when false negatives are very low (or, probability of false negatives, PFN, is very low).

In order to solve this rare target problem, embodiments can be configured to apply a WAEVENT Sensor Fusion (WSF), (discussed in detail below). The WSF is based on Bayesian Truthing rather than on Bayesian statistics. Therefore, a number of conservation relations may be applied for in the nine truthing parameters mentioned above. For example, this can be in the form of:

$$m = s + n \quad (38)$$

$$m = a + b \quad (39)$$

$$a = a_1 + a_2 \quad (40)$$

$$b = b_1 + b_2 \quad (41)$$

$$s = a_1 + b_2 \quad (42)$$

$$n = b_1 + a_2 \quad (43)$$

Among these six (6) equations, only five (5) of them are independent. Therefore, among nine (9) truthing parameters, four (4) of them are free.

For the sake of clarity, consider a 2-step process, or WAEVENT Sensor Fusion (WSF) with two cybersensors, or, simply, two sensors: SENSOR 1 and SENSOR 2. Theoretically, the single ideal sensor is possible with zero false positives (PFP=0) and zero false negatives (PFN=0). In practice, however, using a medical analogy, a more practical approach that can be implemented with various embodiments is to apply the set of sequential sensors, all of them with very low false negatives (target misses), yet, with monotonically decreasing false positives. The number of sensors cascaded is preferably two, or larger than two for cases in which there is a problem with (PPV)-value increasing. Here, for simplicity, we consider only two (2) sensors in cascade. For purposes of providing an understanding, this discussion describes the WSF quantitative analysis as an example.

For SENSOR 1, consider Input (Free) Parameters: m=$10^9$, s=10, $b_2$=1, (PPV)=$10^{-3}$. From Eq. (42), we obtain: $a_1$=s−$b_2$=10−1=9. Since: (PPV)=$a_1$/a, then α=9·$10^3$=9000. Also, from Eq. (40): $a_2$=a−$a_1$=9000−9=8991; and, from Eq. (39): b=m−a=$10^9$−9000=999991000. However, according to Eq. (41) we have: $b_1$=b−$b_2$=999990999, and from Eq. (43), we obtain: n=$b_1$+$a_2$=9999999990. For checking, we verify that indeed we have: n+s=999999990+10=$10^9$=m, according to Eq. (38).

The output parameters of SENSOR 1 may become the input parameters of SENSOR 2. Therefore, for SENSOR 2, we have Input Parameters: m=9000, s=10, $b_2$=1, (PPV)=0.99. Due to the $1^{st}$ sensor, this $2^{nd}$ sensor can afford very low both false positives (high PPV) and false negatives (low $b_2$-value). Because of small s and $b_2$ values, there is some uncertainty with keeping all values as integer numbers. For example, it is unclear whether the s-number should be 10, or 9 (because of $b_2$=1, in the $1^{st}$ sensor case). Also, we should observe that due to cascade values, the number of alarms from the previous sensor (α=9000) becomes the number of statistical samples (quants), in the case of the $2^{nd}$ sensor:

$$m^{(2)} = a^{(1)} \quad (44)$$

where the upper index is for sensor numbering.

Using the same approach as in the case of the $1^{st}$ sensor, we obtain: $a_1$=s−$b_2$=9, and: a=9/0.99=9.09≅10, where we approximate to higher integer. Also, $a_2$=a−$a_1$=10−9=1, and: b=m−a=9000−10=8990. Then, $b_1$=b−$b_2$=8990−1=8989, and: n=8989+1=8990. For checking: n+s=8990+10=9000=m.

The results of both sensors in this example are summarized in Table 6. We apply diagonal line: "/", as "or", due to the difficulties associated with integer approximation. This is because the number of statistical quants should always be an integer number rather than a fractional number.

TABLE 6

Example Values of 9 Truthing Parameters for Two Sensors' Cascade,
Including: (2a)-SENSOR 1, (2b)-SENSOR 2

2a. SENSOR 1

| m | s | $b_2$ | n | b | $b_1$ | $a_1$ | a | $a_2$ |
|---|---|---|---|---|---|---|---|---|
| $10^9$ | 10 | 1 | 999999990 | 999991000 | 999990999 | 9 | 9000 | 8991 |

2b. SENSOR 2

| m | s | $b_2$ | n | b | $b_1$ | $a_1$ | a | $a_2$ |
|---|---|---|---|---|---|---|---|---|
| 9000 | 10/9[*)] | 1 | 8990 | 8990 | 8989 | 9/10[*)] | 10 | 1/0[*)] |

[*)]Due to integer accuracy. In any case, both $b_2$ and $a_2$ values are very low ($b_2 = a_2 = 1$); leading to the perfect performance.

Figure 25:
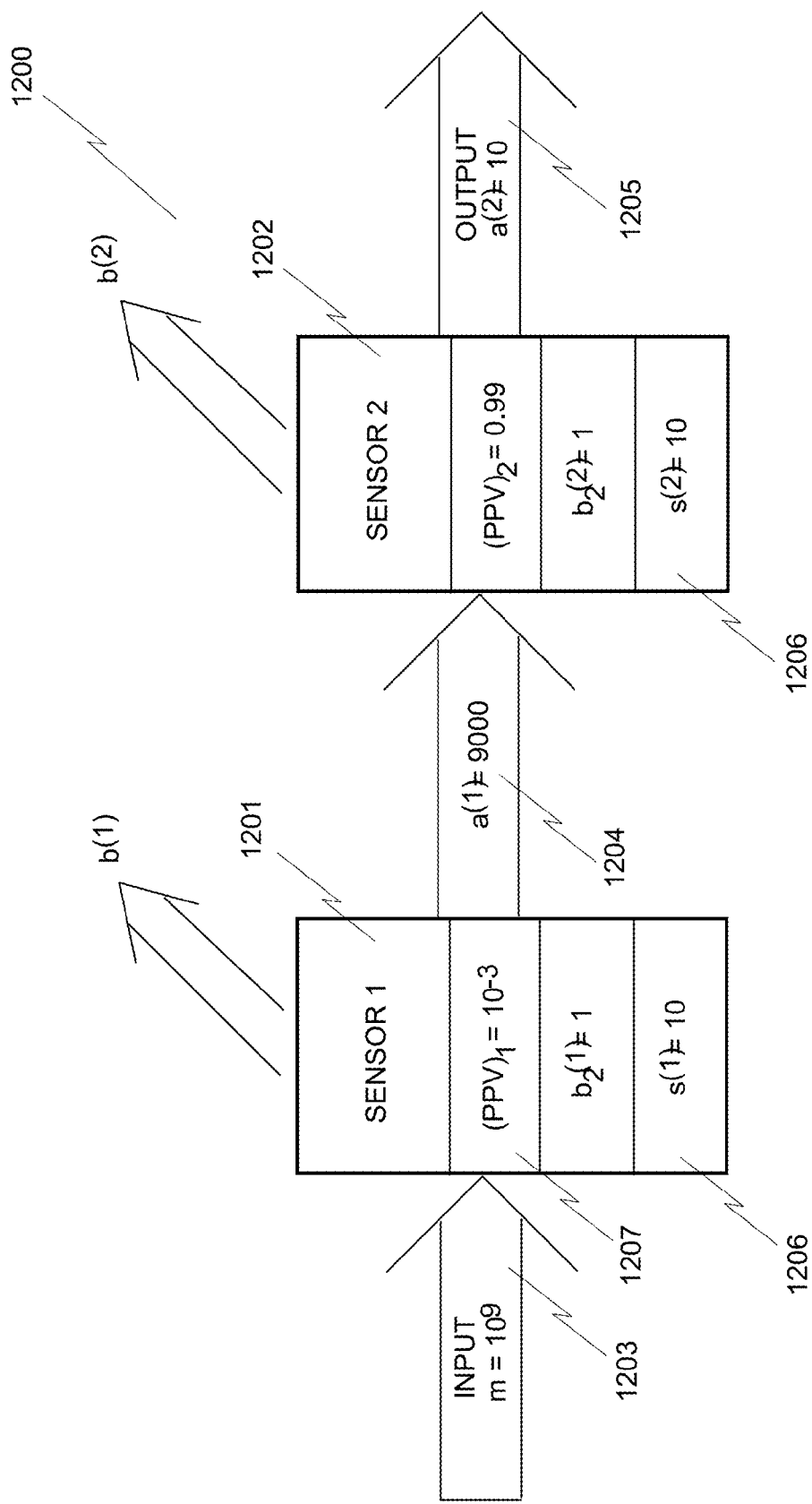
FIG. 25 is a diagram illustrating an example of WAEVENT Sensor Fusion (WSF) for two cascaded sensors in accordance with one embodiment of the systems and methods described herein.

FIG. 25 is a diagram illustrating an example of WAEVENT Sensor Fusion (WSF) 1200 for two cascaded sensors in accordance with one embodiment of the systems and methods described herein. In the example illustrated in FIG. 25, the cascade sensor function includes SENSOR 1 1201, and SENSOR 2 1202. Pre-structured input data 1203 are received and provided to cyber sensor 1201, resulting in intermediate output data 1204. Intermediate output data 1204 can be in the form of yellow alarms $a^{(1)}$, which are shown with an example number of 9000, according to Table 6. These yellow alarms become the inputs to SENSOR 2; thus, satisfying Eq. (44). This results in the final output (in this example a red alarm) 1205. This example illustrates that the first sensor 1201 has very low false negatives, but rather high false positives. Indeed, its (PPV)-value, $(PPV)_1=10^{-3}$ (i.e. high false positives), while its $b_2^{(1)}=1$ (i.e., low false negatives). The reason for that is with a low target population 1206 ($s^{(1)}=s^{(2)}=10$), it is difficult, if possible at all, to produce both low false positives and low false negative for the $1^{st}$ sensor. Indeed, for $(PPV)_1=10^{-3}$, 1207, and s=10, a high number of false alarms, $a_2=8991$, results.

Figure 26:
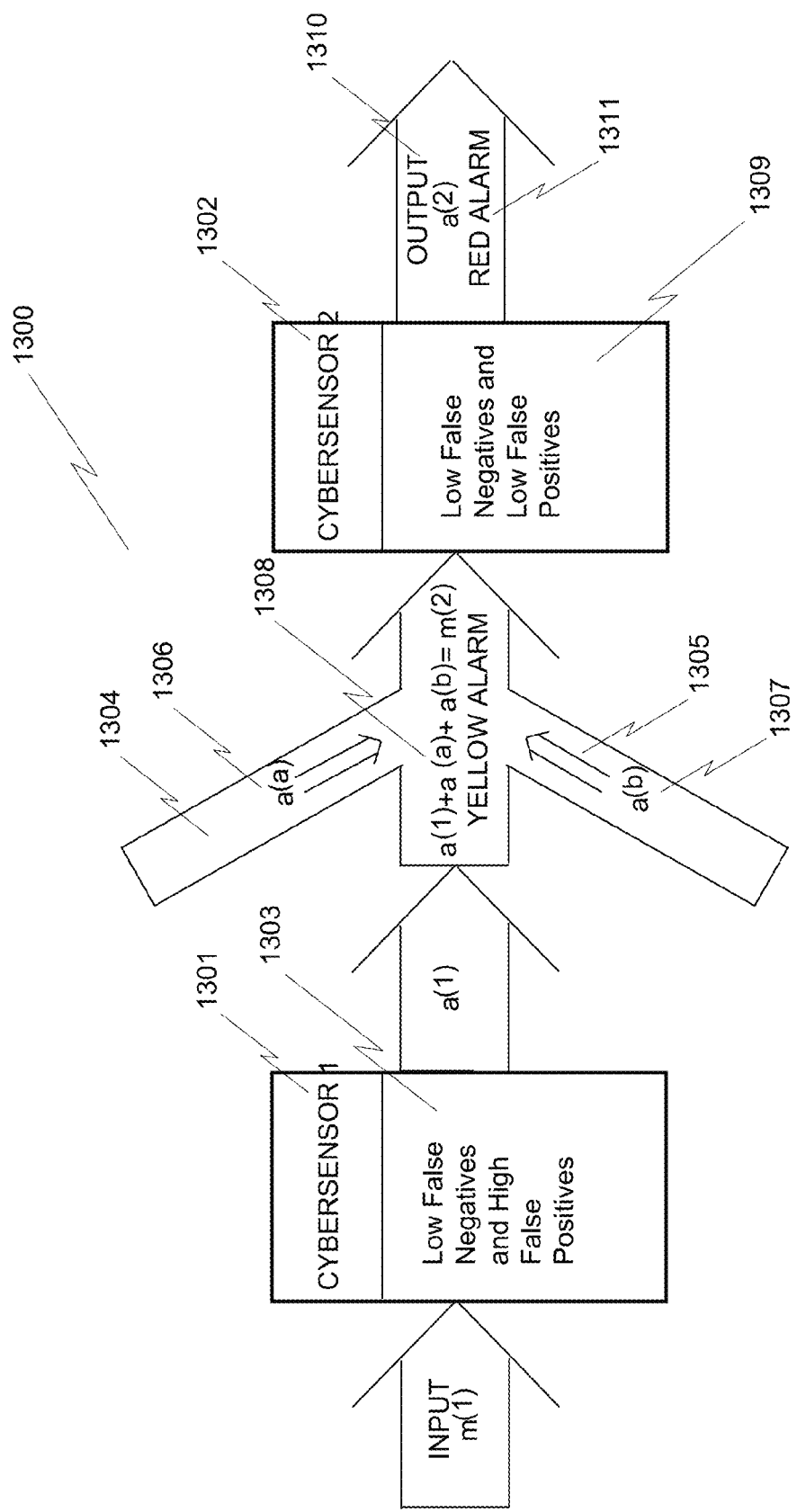
FIG. 26 is a diagram illustrating an example of a WAEVENT Sensor Fusion (WSF) Software Engine using two (2) cybersensors in cascade in accordance with one embodiment of the systems and methods described herein.

FIG. 26 is a diagram illustrating an example of a WAEVENT Sensor Fusion (WSF) Software Engine using two (2) cybersensors in cascade. In the example illustrated in FIG. 26, WAEVENT Sensor Fusion Software Engine 1300 is illustrated with two cyber sensors 1301, 1302 in cascade. However, in contrast to the example illustrated in FIG. 25, the example of FIG. 26 also considers outputs from other "first-type" sensors. The "first-type" sensors may be $1^{st}$ sensors in cascade, with low false negatives, yet high false positives 1303—i.e., sensors with a large number of false alarms. Additional first-type sensors, shown in this example as a-sensor 1304 and b-sensor 1305, are also contributing to the input of the second-type sensor 1302. Strictly speaking, in embodiments using a number of sensors greater than two (2), the first-type sensor may be referred to as an introductory sensor, and the second-type sensor may be referred to as a final sensor. This is, because, in addition to these two sensors, there may be a number of intermediate sensors. For example for a total number of four (4) sensors, the number of intermediate sensors is two (2).

In the example shown in FIG. 26, sensors 1304, 1305 need not be considered intermediate sensors in the sense discussed above. Therefore, in the example of FIG. 26, there are no intermediate sensors. Contributions from other introductory sensors 1304, 1305 may come from the soft decision concept of the WAES, assuming that some yellow alarms produced by these sensors may have been left for further consideration. In such a case, the input sample space for sensor 1302, $m^{(2)}$, may be the sum of yellow alarms $a^{(a)}$ 1306 and $a^{(b)}$ 1307 as shown by summation formula 1308.

The second sensor 1302 as the final sensor in this example has both low false negatives and low false positives 1309. In other words, the number of output alarms 1310 producing a red alarm 1311 includes only a low number of false alarms, thus realizing the ultimate goal of a high PPV for the WSF software engine.

Figure 27:
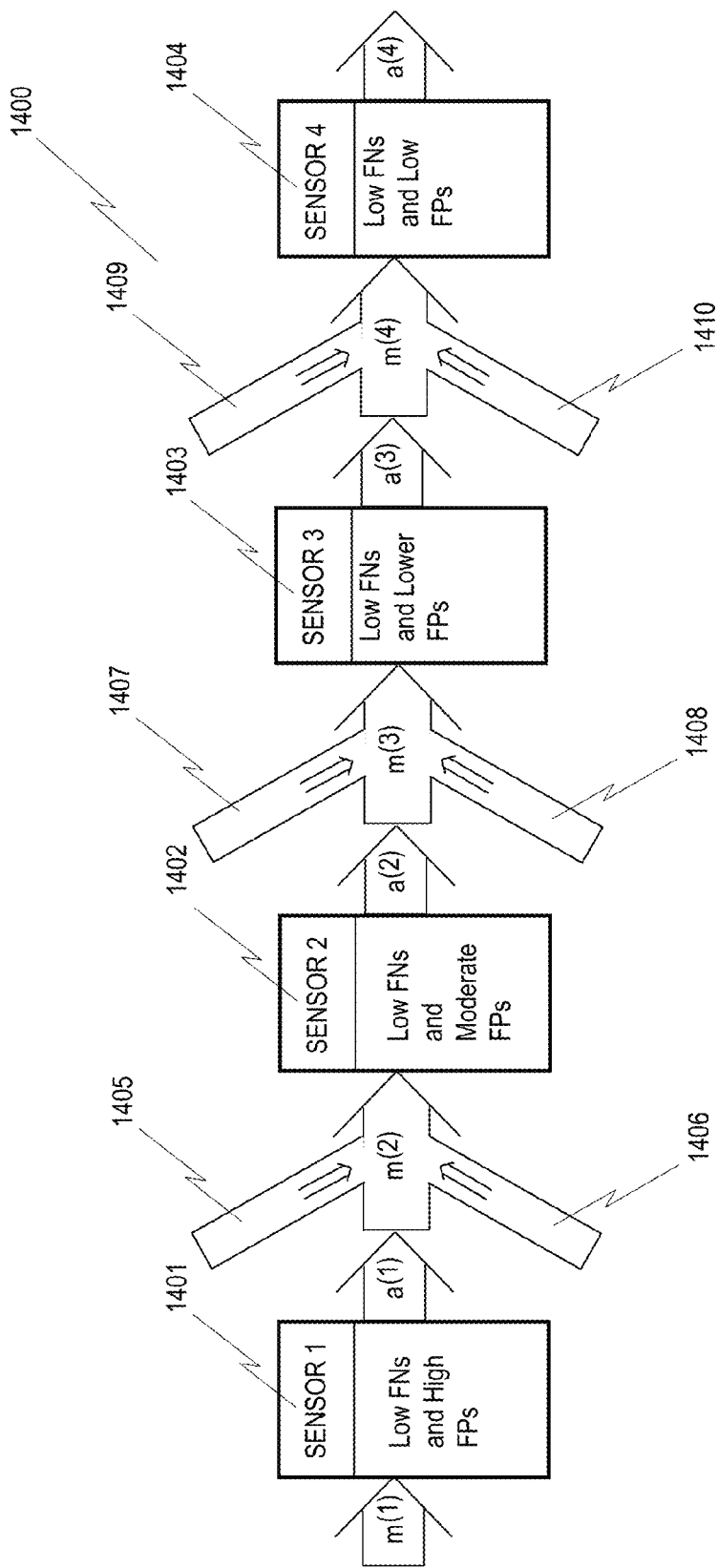
FIG. 27 is a diagram illustrating an example of a WAEVENT Sensor Fusion (WSF) engine for 4 cascaded cyber sensors in accordance with one embodiment of the systems and methods described herein.

FIG. 27 is a diagram illustrating an example of a WAEVENT Sensor Fusion (WSF) engine 1400 for four cascaded cyber sensors. This WAEVENT Sensor Fusion (WSF) includes 4 cyber sensors 1401, 1402, 1403 and 1404. Among these sensors, sensor 1401 can be referred to as the introductory sensor and sensor 1404 may be referred to as the final sensor. Using this terminology convention, sensors 1402 and 1403 are the intermediate sensors. These four sensors have input sampling spaces, $m^{(1)}$, $m^{(2)}$, $m^{(3)}$, and $m^{(4)}$, respectively. These four sensors have output alarms: $a^{(1)}$, $a^{(2)}$, $a^{(3)}$, and $a^{(4)}$, respectively, with $a^{(4)}$ being a red alarm. In all these elements of cascade, the input space can be larger than number of output alarms, in the form:

$$m^{(i+1)} \geq a^{(i)} \qquad (45)$$

for i=1, 2, 3, as in FIG. 27, used as an example. The wings 1405, 1406, 1407, 1408, 1409, 1410, and possibly others, come from an extra yellow alarm contribution due to the soft decision structure of the system, resulting in an output figure with both low false alarms, and false no-alarms.

Because formal structurization of weather data is either very difficult, or even impossible, embodiments of the systems and methods disclosed herein utilize the pre-structurization of the weather data. In particular, embodiments utilize Weather Anomalous Event (WAEVENT) pre-structurization. For example, embodiments may be configured to create the Weather Data Event Format, including its temporal and geospatial coordinates, in either 3D time-space (x, y; t), or in 4D time-space (x, y, z; t), where z is the altitude of the Region of Interest (RoI), while (x, y)—are terrain coordinates, and t-time is a coordinate. Then, all Parameters of Interest (PoIs), such as temperature, humidity, wind directions, etc., (denoted by PoI1, PoI2, PoI3, etc.) may be introduced. A Weather Anomalous Event Ranking, or WAER, may be provided to one or more of the totality of PoIs. Voting logic and a Digital Decision Support Engine (DDSE) may be used to produce a digital decision, which can be a soft decision or a hard decision, in the form of a dual-alarm structure, including yellow and red alarms. With such embodiments, the system can be configured to categorize Catastrophic Anomalous Events, or other Weather Anomalous Events, as summarized in FIG. 27.

Figure 28:
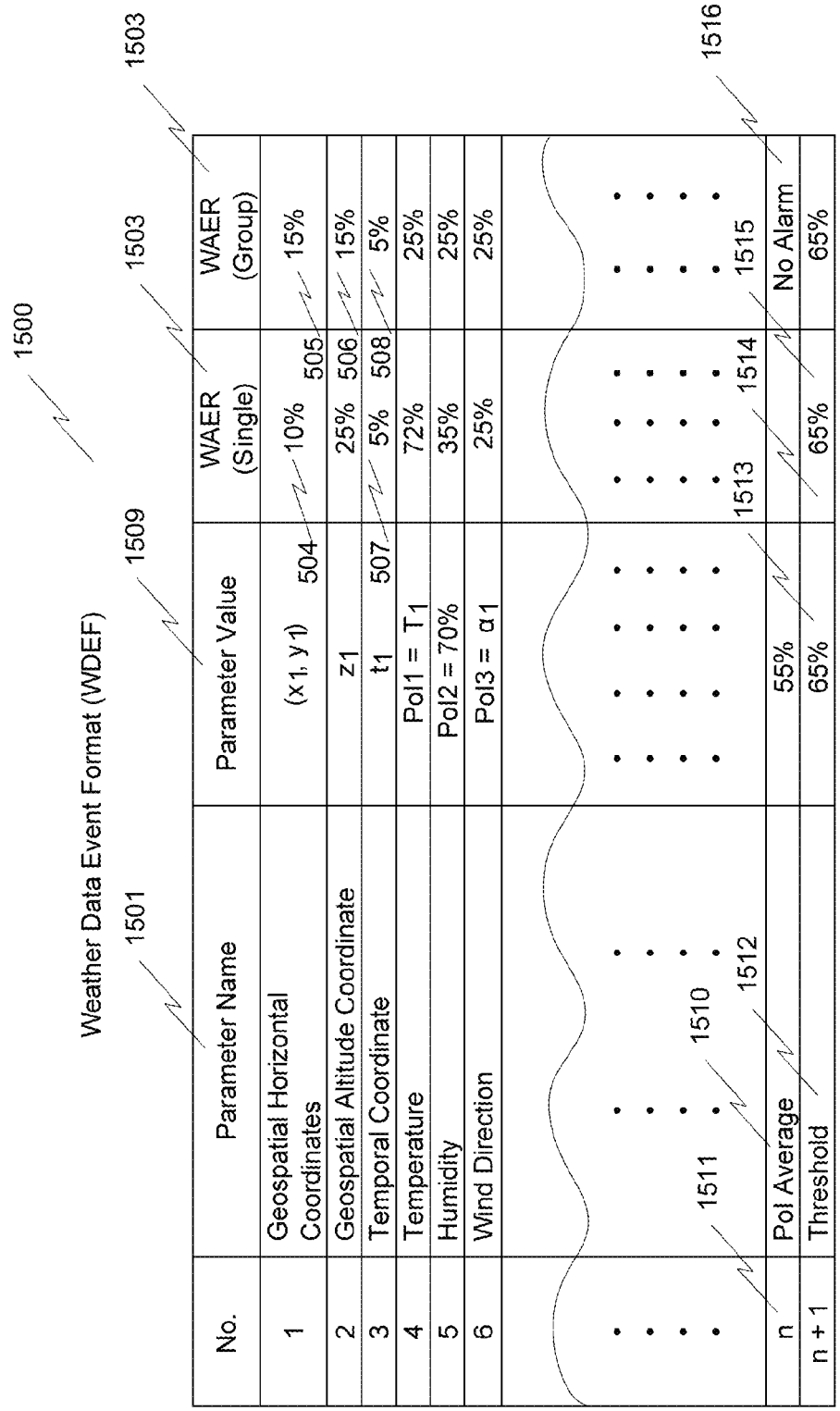
FIG. 28 is a diagram illustrating an example of a Weather Data Event Format (WDEF) in accordance with various embodiments of the systems and methods disclosed herein.

FIG. 28 is a diagram illustrating an example of a Weather Data Event Format (WDEF) 1500 in accordance with various embodiments of the systems and methods disclosed herein. In this example, WDEF 1500 includes PoI name 5101 PoI value 1509 Weather Anomalous Event Ranking (WAER) for single event 1502 and the WAER for group of PoIs 1503 and PoI average 1510. The WAER-value is provided as a percentage, as for exemplary WAERs; 1504, 1505, 1506, 1507, and 1508. For example, in this particular example, the anomaly for geospatial coordinates $(x_1, y_1)$ is only 10%, denoted by 1504, while the anomaly for the group of parameters (#1 an #2) 1505 is 15%, and the same value, 15%, for #2, as denoted by 1506. Similarly, this example shows a single WAER 1507 and the same value, 5%, for 1508. The number of parameters, n, is denoted by 1511, and the WAER ranking threshold 1512 is 65%. This also shows the same value for 1513, 1514, and 1515; thus, there is no alarm 1516. However, if the value of 1513 is 72%, for example, these would be an "alarm" for 1516.

The number of samples, m, is preferably be sufficiently large to satisfy the Bayesian Statistics. For each sample, or statistical quant, the WDEF document such as that illustrated in FIG. 28 can be used as an element of pre-structurization.

Weather C2 Sensor (WC2S) in various embodiments provide a systemic solution to weather sensing, and can also be configured to include Command and Control (C2) capability for the Weather Station. The 1st element of the WC2S, is a software engine, which, in various embodiments, is a software engine such as that introduced above. This document now describes two additional aspects of the WC2S. These relate to satellite communication and Information Assurance (IA).

Satellite communication and related bandwidth control are important factors for weather C2 sensing. This is because the limited bandwidth, B, can be transmitted through satellite channels, for example. Of course, due to signal compression, the original (raw) bandwidth, $B_0$, is larger than the bandwidth, B, typically transmitted. However, for the quantitative purposes, there may be a significant bandwidth load due to overhead (OVH), $B_{OVH}$, which is some fraction, E, of the transmission bandwidth, B:

$$B_{OVH} = \in B \tag{46}$$

where: $\in$-coefficient is the sum of various overhead components:

$$\in = \in_{Crypto} + \in_{FEC} + \in_{Net} \tag{47}$$

where $\in_{Crypto}$, $\in_{FEC}$ and $\in_{Net}$ are due to: crypto (IA), forward error correction, and network load, respectively. On the other hand, from the link budget point of view, the RF bandwidth, B, is inversely proportional to distance square, in the form:

$$B = \frac{CONSTANT}{R^2} = \frac{C}{R^2} \tag{48}$$

where C is constant and R-distance between Transmitter (Tx) and Receiver (Rx).

The overall bandwidth equation, is $$B = \frac{C}{R^2} = \frac{B_0}{(CR)} + OVH = \frac{B_0}{(CR)} + \varepsilon B \tag{49}$$

where (CR) is compression ratio. Usually, this equation may be applied to the highest bandwidth data; i.e., video data, while audio and textual data, or rather numerical data (in the case of weather C2 sensor), are less bandwidth-intensive. Using Eq. (49), we can write, $$B(1 - \varepsilon) = \frac{B_0}{(CR)} \tag{50}$$

or, using all components of Eq. (49), we obtain, $$B = \frac{B_0}{(CR)(1-\varepsilon)} = \frac{C}{R^2} \tag{51}$$

Example 1

Assuming R=50 km, $\in$=50%, and (CR)=100:1, what is the raw bandwidth, $B_0$? In order to find the solution to this problem, the value of the constant, C, should be known. Typically, for various applications it can be assumed that:

$$C = 100 \text{ Mbps} \cdot 1 \text{ km}^2 \tag{52}$$

i.e., the RF bandwidth for R=1 km, including a typical network load and other loads, is about 100 Mbps. Then, this leads to:

$$B_0 = \tag{53}$$

$$\frac{C(CR)(1-\varepsilon)}{R^2} = \frac{100 \text{ Mbps} \cdot 1 \text{ km}^2 (100)(0.5)}{(50 \text{ km})^2} = \frac{(100)(50)}{(50)^2} \text{Mbps} =$$

$$\frac{5000}{2500} = 2 \text{ Mbps}$$

Example 2

Using data from EXAMPLE 1, a display resolution, or pixel number, PN=740×480 ((VGA) standard), and the RGB (red-green-blue) mode of 24 bpp (bits per pixel), find the maximum video frame rate, FR.

The original, uncompressed video bandwidth, $B_0$, is $$B_0 = (PN)(BPP)(FR) \tag{54}$$

Assuming $B_0$=2 Mbps, the maximum frame rate, is $$(FR) = \frac{B_0}{(PN)(BPP)} = \frac{2 \text{ Mbps}}{(355,000)(24)} = 0.23 \text{ fps} \tag{55}$$

i.e., about one video frame per 5 sec. This is quite satisfactory for typical meteorological camera measurements, such as cloud height, for example.

Example 3

Assume a crypto load of 10%, an error correction load of 5%, and a network bandwidth load of 50%. Further assume: (CR)=100:1, C=100 Mbps·1 km², pixel resolution: 740×480, RGB-mode, (FR)=0.2. In this scenario, what is the maximum distance, R?

The overhead coefficient, is: $\in$=10%+5%+50%=0.65, and the raw bandwidth, $B_0$, is $$B_0 = (355,000)(24)(0.2) = 1.704 \cdot 10^6 \text{ bps} \tag{56}$$

and, the RF bandwidth, B, is $$B = \frac{B_0}{(CR)(1-\varepsilon)} = \frac{1.704 \cdot 10^6}{(100)(1-0.65)} = 4.87 \cdot 10^4 = 48.7 \text{ Kbps} \tag{57}$$

Using Eq. (51), we obtain, $$R = \sqrt{\frac{C}{B}} = \sqrt{\frac{100 \text{ Mbps} \cdot 1 \text{ km}^2}{48.7 \text{ Kbps}}} = 45 \text{ km} \tag{58}$$

Which is a relatively short distance for satellite communication.

Example 4

Assuming C=100 Mbps·1 km², R=100 km, (CR)=100:1, and $\in$=0.5, what is the maximum raw video bandwidth, $B_0$?

By applying Eq. (51), we have:

$$B = \frac{C}{R^2} = \frac{100 \text{ Mbps} \cdot 1 \text{ km}^2}{10^4 \text{ km}^2} = 10 \text{ Kbps} \tag{59}$$

also, we have:

$$B_0 = B(CR)(1-\epsilon) = (10 \text{ Kbps})(100)(0.5) = 500 \text{ Kbps} \tag{60}$$

Example 5

Assuming $B_0 = 500$ Kbps, black-white 8 bpp, and (FR) =0.2, what is the maximum pixel resolution, PN-value?

$$(PN) = \frac{B_0}{(FR)(BPP)} = \frac{500 \text{ Kbps}}{(0.2)(8)} = 312.5 \cdot 10^3 \text{ pixels} \tag{61}$$

Using the same ratio: 740:480=1.54, we obtain the shorter side of 450 pixels, and longer side of 693 pixels; i.e., almost VGA format for gray color; i.e., VGA gray screen can be applicable for satellite communication, assuming R=100 km.

Information Assurance (IA) typically increases the bandwidth requirements. That is, where more information assurance (IA) that is desired, more bandwidth is typically required to provide such assurance. Depending on the type of communication medium (data/numerical, audio, video), there may be different relationships between the available bandwidth, $B_A$, and the original or raw bandwidth, $B_0$.

In the case of a data/numerical medium, lossless compression may be applied with the network provision that, after Forward Error Correction (FEC), the resulting (BER), or Bit-Error-Rate, is almost zero. In the case of audio and video, however, the bandwidth cost may in all practicality prohibit such an ideal situation. This is why in various embodiments of systems and methods may apply a lossy compression, in order to reduce the $B_A$-level significantly below the $B_0$-level. This may be especially true in the case of video compression where the relationship between compression ratio (CR) and the overhead (OVH) components is critical. For the purpose of discussing the IA Bandwidth Cost, consider three (3) OVH-components: $\epsilon_{FEC}$ (error correction), $\epsilon_{NET}$ (network), and $\epsilon_{CRYPTO}$ (cyber cost), the latter one addressing the IA in a narrow sense.

In order to analyze quantitatively the IA Bandwidth Cost, Eq. (50) may be rewritten in the form:

$$B_A = \frac{B_0}{(CR)(1-\epsilon)} \tag{62}$$

where B is the original (raw) bandwidth, $B_A$ is the available bandwidth, (CR) is the compression ratio, and E is the overall OVH coefficient, which is the sum of the above three OVH coefficients (FEC, crypto, network), according to Eq. (47). For further estimation purposes, it may be observed that:

$$(CR) \geq 1 \tag{63a}$$

$$0 \leq \epsilon \leq 1 \tag{63b}$$

Then, for low (CR)-values, the following relationship should hold:

$$B_A > B_0, \text{ for low CR-values} \tag{64}$$

However, for the video/audio case, circumstances are usually such that:

$$B_A < B_0 \tag{65}$$

Accordingly, they can be derived from Eq. (47) that:

$$\epsilon = \epsilon_{FEC} + a; \; a = \epsilon_{CRYPTO} + \epsilon_{NET} \tag{66}$$

and, Eq. (62) becomes, $$B_A = \frac{B_0}{(CR)(1-a-\epsilon_{FEC})} = \frac{B_0}{(CR)(A-\epsilon_{FEC})} \tag{67}$$

where $$A = 1-a \tag{68}$$

For parameterization purposes, both $B_A$ and $B_0$ can be set as constant values:

$$B_A = \text{constant}, B_0 = \text{constant} \tag{69ab}$$

While $B_A$ is generally a constant due to communication channel limitations (e.g., in the case of satellite communication), the $B_0$ value does not need to be constant. However, for practical purposes it can be assumed that also Eq. (69b) holds. By putting Cartesian coordinates: x, y, in the form:

$$x = (CR), y = \epsilon_{FEC} \tag{70ab}$$

Eq. (67) becomes $$B_A = \frac{B_0}{x(A-y)} \tag{71}$$

or, $$x(A-y) = \frac{B_0}{B_A}; \tag{72}$$

or, $$A - y = \frac{1}{x} \frac{B_0}{B_A} \tag{73}$$

Which is equivalent to:

$$A = y + \frac{1}{x} \frac{B_0}{B_A} \tag{74}$$

or, $$1 = \frac{y}{A} + \frac{1}{x}\left(\frac{B_0}{AB_A}\right) \tag{75}$$

or, $$1 = \frac{y}{A} + \frac{D}{x}; D = \frac{B_0}{AB_A} \tag{76}$$

This equation can be parameterized using the well-known trigonometrical identity: $\sin^2 \phi + \cos^2 \phi = 1$, in the form:

$$\sin^2 \phi = \frac{\varepsilon_{FEC}}{A} = \frac{y}{A} \Rightarrow \sin\phi = \sqrt{\frac{y}{A}} \quad (77)$$

or, $$\phi = \arcsin\left(\sqrt{\frac{y}{A}}\right) \quad (78)$$

where $\phi$-parameter, in radians; thus, $$\cos^2 \phi = \frac{D}{(CR)} = \frac{D}{x} \Rightarrow \cos\phi = \sqrt{\frac{D}{x}} \quad (79)$$

According to Eq. (78), $\phi$-grows with increases in y, where: $x=(CR)$ and $y=\varepsilon_{FEC}$. Also, from Eq. (76), the y-value can be maximized, when the x-value is also maximized, and vice versa. According to Eq. (30):

$$x \geq 1 \quad (80a)$$

$$0 \leq y \leq 1 \quad (80b)$$

Therefore, starting with $x=1$; then, $y=y_{MIN}$, and $\phi=\phi_{MIN}$. Then, for $x \rightarrow \infty$, $y \rightarrow A$, and $\phi \rightarrow \pi/2$. The latter conclusion follows since, for infinitely large CR values, the raw bandwidth, $B_0$, is reduced to zero; thus, all available bandwidth, $B_A$, can be used for the OVH. Thus: $y=\varepsilon_{FEC}=A=1-a$; and therefore, $\varepsilon=(1-a)+a=1$, as it should be.

Both limited cases: $x=1$, and $x=\infty$, are, of course, extreme, and never met in practice. Thus, the optimum performance is somewhere between $\phi=\phi_{MIN}$ and $\phi=\pi/2$, for $\phi=\phi_0$, where:

$$\phi_{MIN} < \phi_0 < \pi/2 \quad (81)$$

Figure 29:
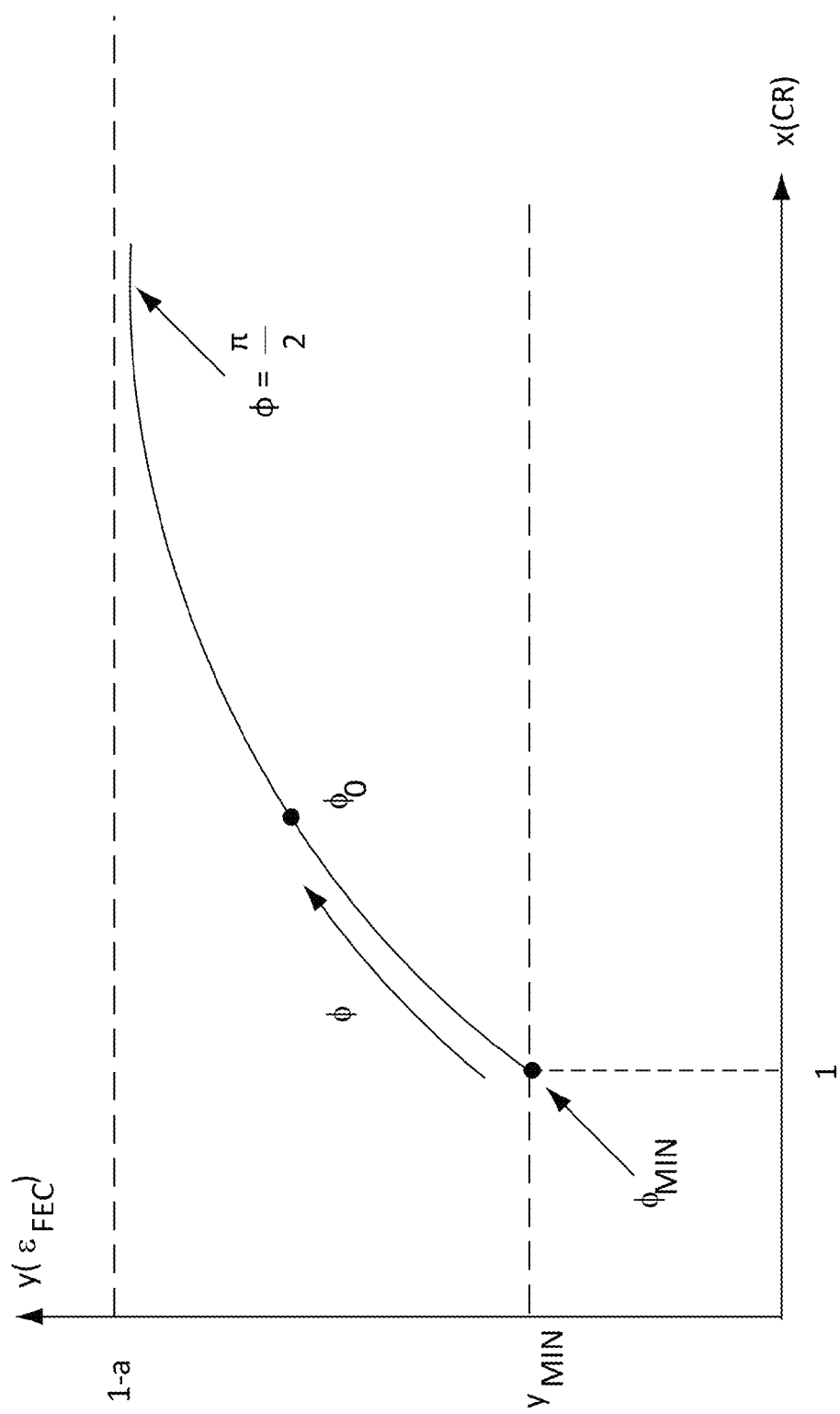
FIG. 29 is a diagram illustrating this relationship. Particularly, FIG. 29 provides an illustration of optimum performance for $\phi = \phi_0$ for $y(x)$-dependence, where $x = (CR)$ and $y = \in_{FEC}$.

FIG. 29 is a diagram illustrating this relationship. Particularly, FIG. 29 provides an illustration of optimum performance for $\phi=\phi_0$ for y(x)-dependence, where $x=(CR)$ and $y=\varepsilon_{FEC}$. The parameter, which characterizes the system performance, may be referred to as the Peak-Signal-to-Noise-Ratio (PSNR), denoted as U, in the form:

$$U=(PSNR) \quad (82)$$

The PSNR may be defined as bit-by-bit average difference between the original (un-compressed) and compressed image, in decibels. (For no-difference (PSNR)=∞; for good image quality, (PSNR)≥30 dB). In the view of the above comments, U is a function of the $\phi$-parameter, with a maximum somewhere between $\phi_{MIN}$ and $\pi/2$, in the form:

$$U=f(\phi) \quad (83)$$

Figure 30:
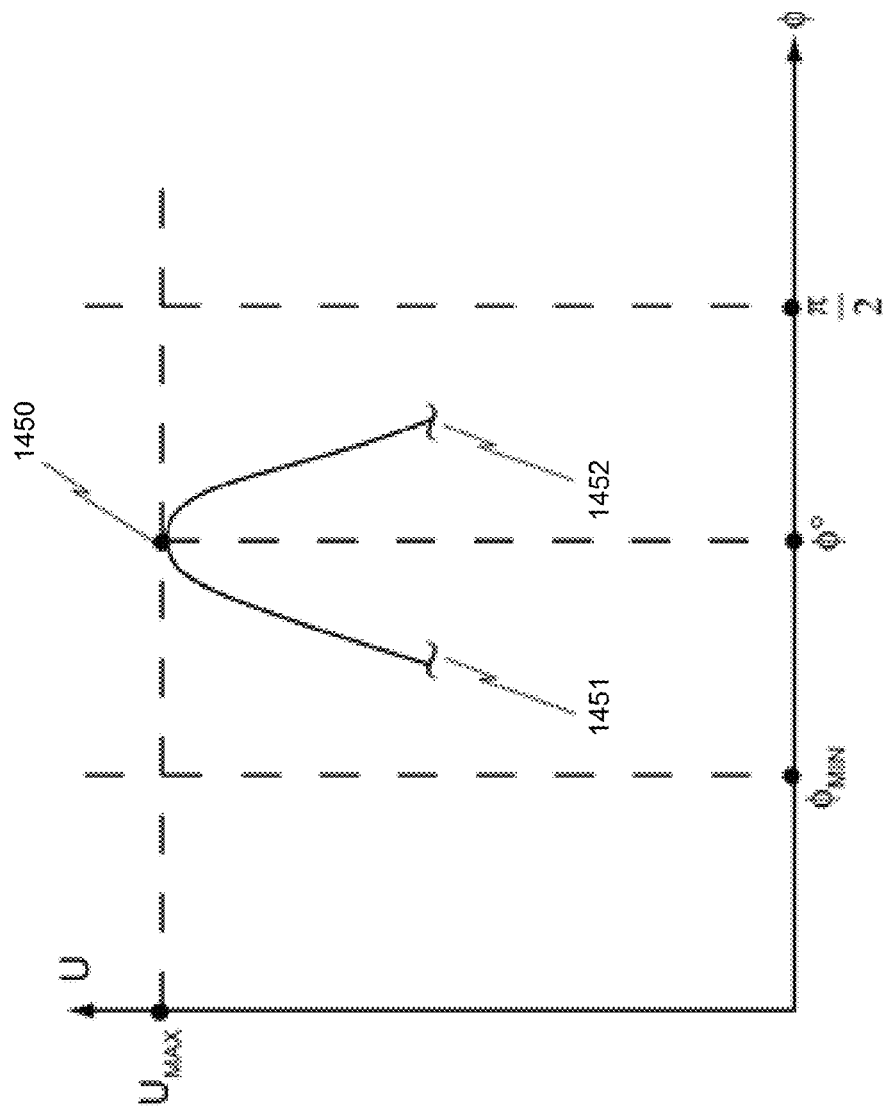
FIG. 30 is a diagram illustrating the relationship presented by Eq. (51).

FIG. 30 is a diagram illustrating the relationship presented by Eq. (83). Particularly, FIG. 30 illustrates the behavior of the U-Function as a function of $\phi$-parameter, with maximum out $\phi=\phi_0$, where U=(PSNR). In this figure, U=(PSNR), and the U function has maximum 1450 at $\phi=\phi_0$. This function is cut at 1451 and 1452, because their behavior outside maximum must generally be determined by specific experiment, and the cases well outside the maximum vicinity are non-practical cases.

In typical embodiments, the system is configured such that input data (e.g. such as video data) are firstly compressed; then, encrypted; then error corrected; then, networked. This data transmission (Tx) transfer sequence is shown in FIG. 31, which includes examples of characteristic parameters representing each step. A similar sequence, but in the inverse, may occur for the data receiving (Rx) transfer sequence. An example of this is illustrated in FIG. 31B in which the characteristic operations are defined rather than representative parameters. In FIG. 31C, the Tx data sequence, equivalent to Rx data sequence, as in FIG. 31B is shown.

Figure 31A:
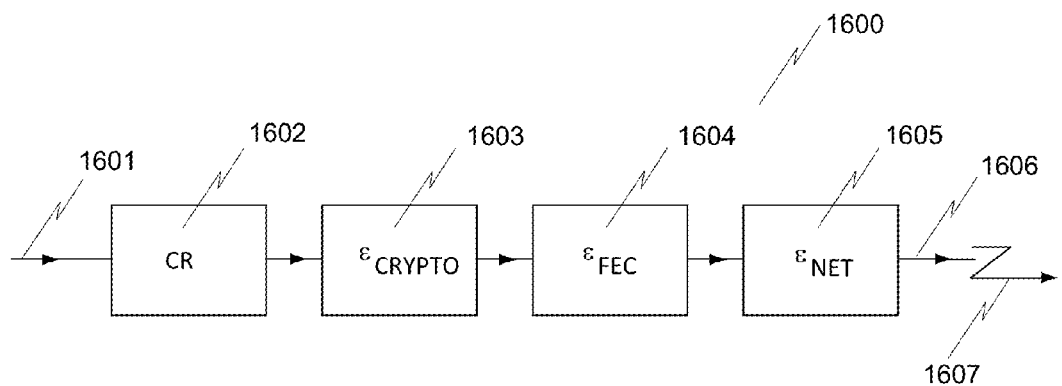
FIG. 31A is a diagram illustrating a data transmission (Tx) transfer sequence, which includes examples of characteristic parameters representing each step. A similar sequence, but in the inverse, may occur for the data receiving (Rx) transfer sequence.
Figure 31B:
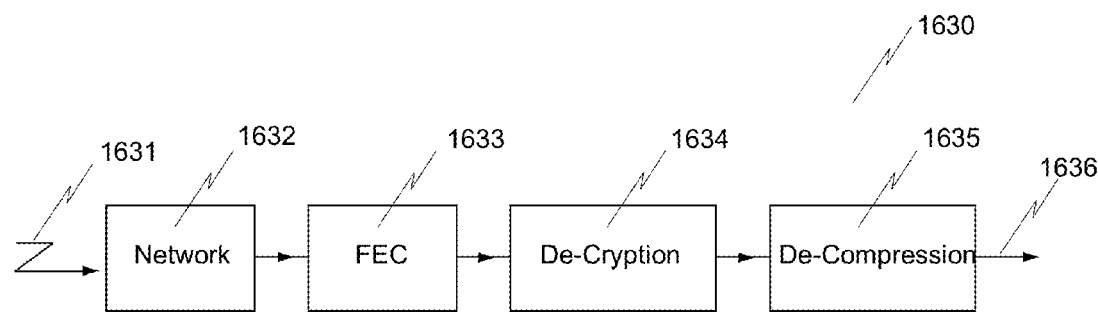
FIG. 31B is a diagram illustrating the data receiving (Rx) transfer sequence, in which the characteristic operations are defined rather than representative parameters.
Figure 31C:
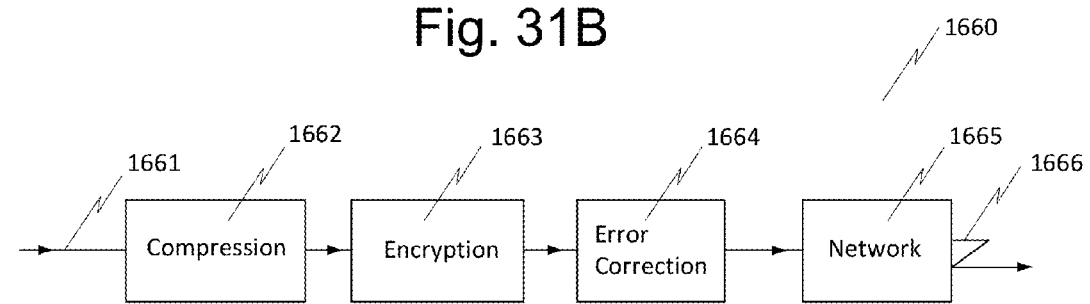
FIG. 31C is a diagram illustrating the data Tx transfer sequence, equivalent to the data Rx transfer sequence of FIG. 31B.

In the example illustrated in FIG. 31A, the Tx Video Data Transfer Sequence 1600 is shown. In this example transfer sequence 1600 input data 1601 is received for transmission. At operation 1602, data compression is applied by a data compression module 1602 to achieve a desired compression ratio CR. Data is then encrypted by a data encryption module 1603 to provide a measure of data security. This is represented by $\varepsilon_{CRYPTO}$-coefficient. A forward error correction (FEC) module 1604 can be included to perform a Forward-Error-Correction (FEC) operation, represented by $\varepsilon_{FEC}$-coefficient. The resulting data can be configured for networking a block 1605 and output as output data 1606. The data can be modulated onto an RF carrier for transmission as an RF-transmitted wavefront 1607.

In the example of FIG. 31B, the Receiving (Rx) Video Data Transfer Sequence 1630 receives video data 1631. Where the data was modulated onto an RF carrier, it can be demodulated before providing it to the network receive operation 1632. A forward error correction module 1633 can be included to perform error correction on the received data based on the forward error correction operation supplied by the transmitter. The data can be decrypted using decryption module 1634, and decompressed using decompression module 1635. The resultant received data 1636 can e output for use by the system.

In the example of FIG. 31C, the sequence of FIG. 31A is shown as being repeated, except, in this example only the characteristic operations have been shown, in direct equivalence to FIG. 31B. This example Tx Video Data Transfer Sequence including Characteristic Operations 1660 includes Tx-input data 1661 received by the system. The sequence further includes data compression module 1662, data encryption module 1663, error correction module 1664, and networking operation 1665. The resulting data is modulated and transmitted as a Tx-wavefront 1666.

In various embodiments, these modules and operations can be implemented as they are commonly implemented in various medications systems for communications of data, video, and other content. This description illustrates, however, that each operation has its bandwidth cost, which should be estimated in order to analyze any type of C2 (Command-Control), especially those that operate with all three types of media: data/numerical information, audio, and video.

For all these types of data, FIG. 31, which comprises FIGS. 31A, 31B and 31C applies, except there are typically going to be quantitative differences in value ranges of parameters: CR, $\varepsilon_{CRYPTO}$, $\varepsilon_{FEC}$, and $\varepsilon_{NET}$, which may be referred to herein as control variables. All these control variables may include intra-system variables in such a sense that they represent system responses to factors such as environmental, terrain, and latitude changes.

In order to complete the control variable set, it may be useful to consider the Bit-Error Ratio (BER)$_0$, which is an external control variable in the sense that it comes from the external environment. However, after the error correction, this external $(BER)_0$-value may be transformed to an internal $(BER)_1$-value, in the form (other operations such as Frequency Hopping can also be included):

$$(BER)_0 \rightarrow (BER)_1; (BER)_1 < (BER)_0 \tag{84}$$

The (BER)-figure is usually defined as a so-called ensemble average figure; i.e., averaged over a statistical ensemble of specific ensemble realizations. However, in practice, systems and methods may be configured to operate with ensemble realizations. Also, it may be noted that there may be two basic types of data stream errors: bit-by-bit errors, or $b_3$-errors; and burst-errors, or $b_1$-errors, the latter of which are typically more severe than the former. Usually, the $b_1$-errors are mitigated (not fully eliminated, however) by reshuffling of bits before sending, which, of course, does cost additional latency.

In the context of control variables, the (PSNR)-figure may also be introduced as a state variable. Both control variables and state variables create so-called phase space variables, the nomenclature used in the mathematical theory of catastrophes which will be applied here as an embodiment of the invention, as an unobvious generalization of Singular Mapping (SM) concept.

The Singular Mapping (SM) approach may be configured to extract and identify topological singularities, both linear and non-linear, coming from SM-visualization, or SMV. The SMV may be applied as a general concept, which can be applied Singular Mapping (SM) to C2-communication parameters: ∈-parameters, CR, and (PSNR), but also to any other parameters describing a situation in a weather station, for example. Then, the control variables are weather variables such as: temperature, relative humidity, air pressure, etc.; while the single state variable or several state variables represent some resulting parameters such as ranking number of anomalous event, for example.

The SMV can be configured to create discrete topological singularities (DTS), which can be either linear or non-linear ones. The linear DTS may include maxima, minima, inflection points, etc.; while the non-linear DTS may be referred to as catastrophes, which are sudden drops, or jumps of state variable value. The $3^{rd}$ category of DTS may include threshold DTS, which characterize off-the-expectation (OTE) incidents, or anomalous events, which are rather rare targets. Thus, the OTEs include non-linear DTS, or N/DTS, and threshold DTS, the latter of which may be characterized by some exceeding-threshold values. These may be referred to herein as T/DTS—for brevity.

This rather comprehensive description of Discrete Topological Mapping (DTS) is provided to help explain the rather difficult DTS-concept by using the C2-communication example, discussed below. This example has two goals: first, to explain the WAES as C2-sensor; and second, to explain the general concept of Discrete Topological Mapping.

Figure 32:
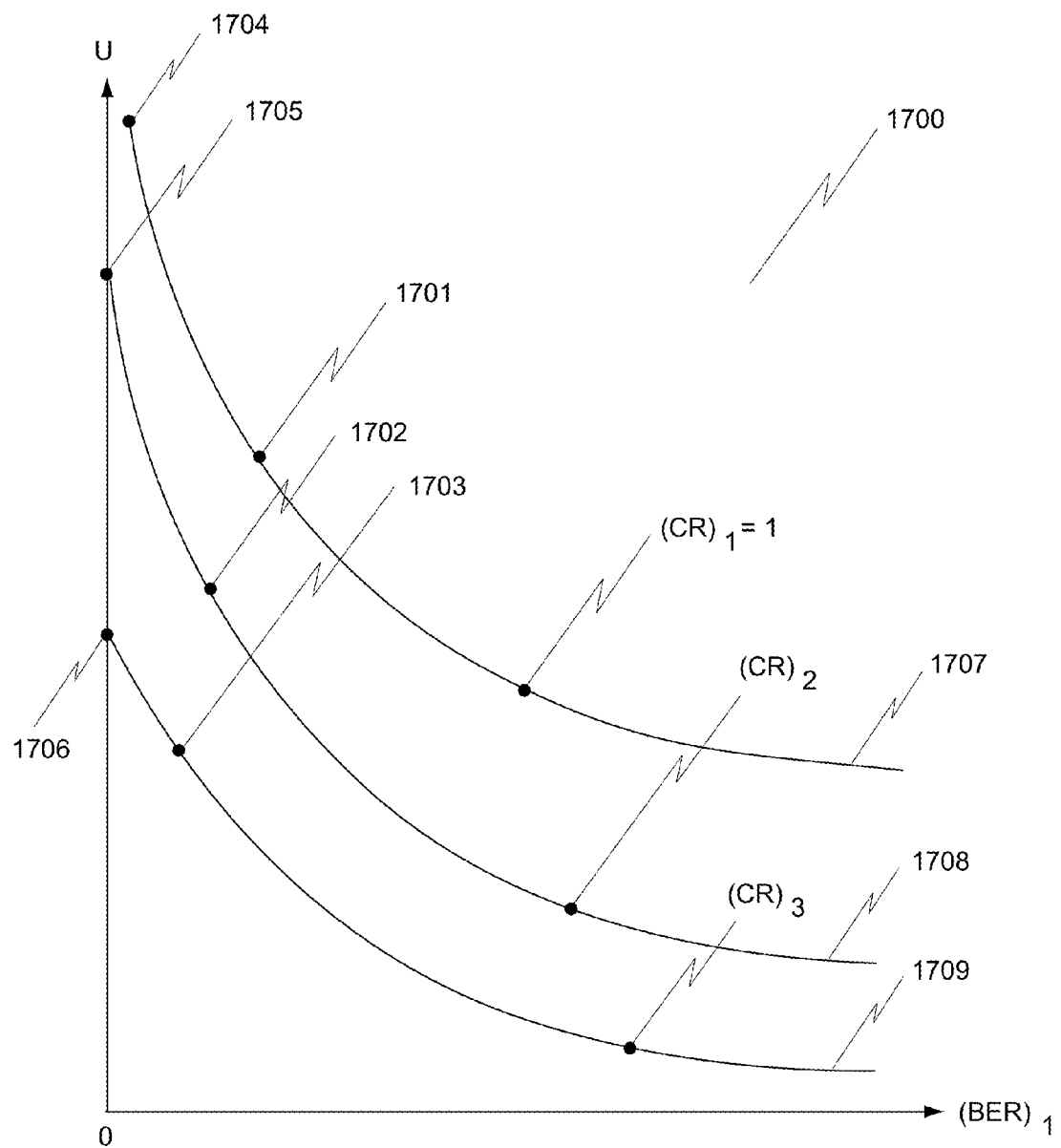
FIG. 32 is a diagram illustrating an example of (PSNR)-dependence as a function of internal $(BER)_1$-control variable, defined by Eq. (84) in accordance with one embodiment of the systems and methods described herein.

FIG. 32 is a diagram illustrating an example of (PSNR)-dependence as a function of internal $(BER)_1$-control variable, defined by Eq. (84). Higher $(BER)_1$-value results in a lower (PSNR)-value, or U-value. In the extreme case when $(CR)=1$, and $(BER)_1=0$, the result it that $U=\infty$. However, for $(CR)>1$, and $(BER)_1=0$, $U=\infty$, typically only in situations in which the (CR) operation is lossless. However, for video/audio data, the (CR) operation is typically lossy. In this case, $U<\infty$, even for $(BER)_1=0$. This means that for scenarios with lossy compression, the reconstructed image according to FIG. 31B will be, in general, different from original video image.

As noted, FIG. 32 illustrates an example of U-Dependence (i.e., PSNR-dependence) as a Function of $(BER)_1$, for various (CR)-values. In this example, curves 1700 are presented including three typical (CR)-values: 1701, 1702, and 1703, where:

$$(CR)_3 > (CR)_2 > (CR)_1 \tag{85}$$

where $(CR)_1=1$. Therefore, for $(BER)_1=0$ (no errors, after correction), we obtain, $$U=(PSNR)=\infty, \text{ for } (CR)=1 \tag{86}$$

characterized in FIG. 32 by point 1704. Eq. (86) can also be satisfied for $(CR)>1$, if the compression is lossless. In FIG. 32, however, the $(CR)_2$ and $(CR)_3$ values are for lossy compression. Therefore, $U<\infty$, for points 1705 and 1706.

It can also be observed that all three curves 1701, 1702, 1703, are monotonically decreasing, as shown by decreasing tendency of curve tails 1707, 1708, 1709. This monotonic feature generally holds unless some hidden parameters exist, especially for $b_1$-errors, which also should be classified as anomalous events.

Figure 33:
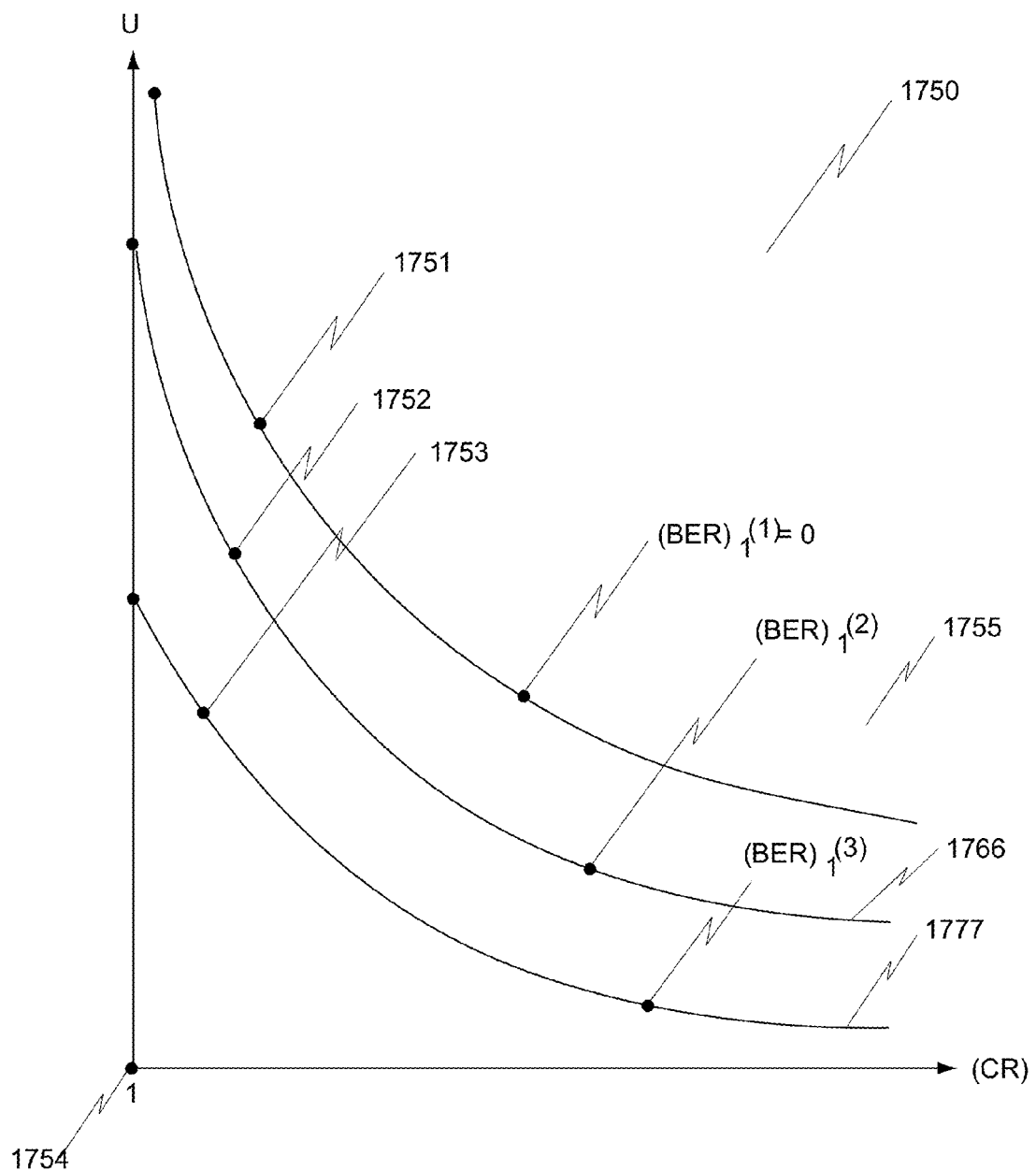
FIG. 33 is a diagram illustrating an example of U-dependence as a Function of (CR) for various $(BER)_1$-values in accordance with one embodiment of the systems and methods described herein.

FIG. 33 is a diagram illustrating an example of U-dependence as a Function of (CR) for various $(BER)_1$-values. The example chart 1750 includes three curves 1751, 1752, and 1753, for various $(BER)_1$-parameters: $(BER)_1^{(1)}$, $(BER)_1^{(2)}$, and $(BER)_1^{(3)}$, respectively. Since, $(BER)_1^{(1)}=0$, $U=\infty$ for $(CR)=1$, (illustrated by reference character 1754). The curves are also monotonic 1755, 1756, 1757. However, the monotonicity does not need to be satisfied, and the (CR)-value can be lower than unity. This more general case is discussed in detail below.

In order to emphasize the non-linear singular sets, this document refers to digital mapping more precisely as Digital Singular Mapping (DSM).

In order to provide a more general case, or the DTM-generalization, the Cartesian variables (other coordinate variables can also be used) can be placed in the form:

$$x=(CR), y=(BER)_1, z=U=(PSNR) \tag{87abc}$$

where control variables: (CR), and $(BER)_1$, are denoted by "horizontal" (x, y)-coordinates, while state U variable is denoted by vertical z-coordinate.

In the context of the theory of catastrophes', the single-state variable case may be categorized as a co-rank-1 catastrophe, while multiple state-variable cases may be categorized as co-rank 2, 3, etc. catastrophes, respectively. For clarity of discussion, this section of the document focuses on co-rank 1 catastrophes.

Figure 34:
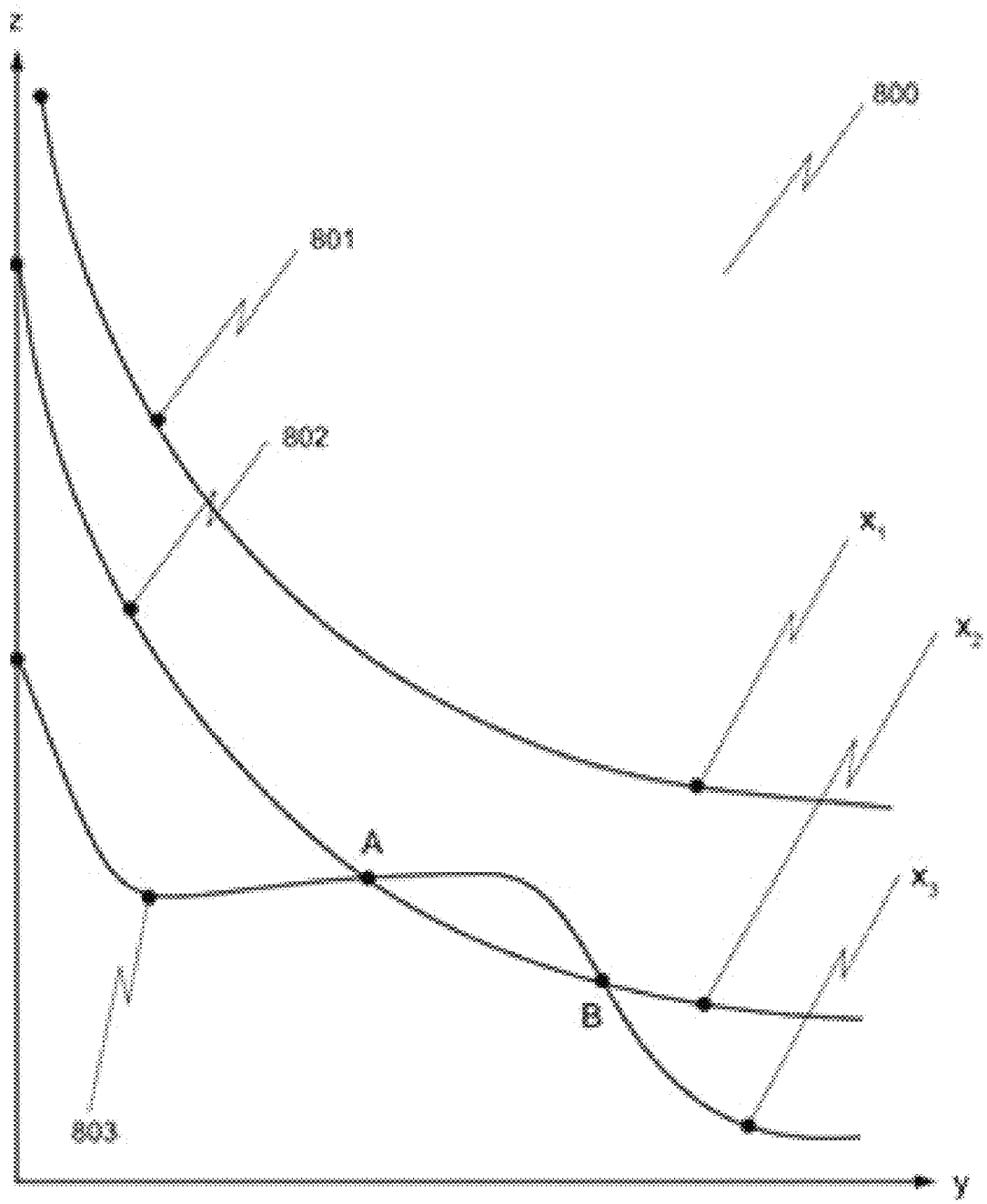
FIG. 34 is a diagram illustrating an example of z Function dependence as a Function of y, with the x variable as a parameter, in which the ex-variable as values $x_1$, $x_2$, $x_3$.

Firstly, it may be observed that although typically the function set is such that such functions such as functions 1707, 1708, 1709 do not cross (e.g., as in FIGS. 32 and 33); this is not always the case. In fact, such functions can cross each other, as shown in the example of FIG. 34. FIG. 34 is a diagram illustrating an example of z Function dependence as a Function of y, with the x variable as a parameter, in which the ex-variable as values $x_1$, $x_2$, $x_3$. The function set 1800 with three member functions 1801, 1802, and 1803 is presented. The example of FIG. 34 also illustrates function 1803 as a non-monotonous function 1803, which is crossing function 1802 at two points: A and B. FIG. 34 is a generalized version of FIGS. 32 and 33. This generalization is provided to illustrate the general principle the z-function may be considered in the form:

$$z=z(y;x_n) \tag{88}$$

In which z is state variable and y is control variable, with $x_n$ as a parameter. The x, y variables can also be reshuffled in the form:

$$z = z(x; y_n) \quad (89)$$

where $y_n$ is a parameter. In general, the z-function of two variables, x, y, can be written in the form:

$$z = z(x,y) \quad (90)$$

As noted above, this general form may always alternatively be presented in the form of either Eq. (88), or in the complementary form of Eq. (89). The only material difference between Eq. (90) and Eqs. (88) and (89), is that in Eq. (88), two variables (z, y) are continuous and the $x_n$ variable is discrete ("n" is integer), while in Eq. (89), two other variables (z, x), are continuous and the $y_n$ variable is discrete. In contrast, in Eq. (90), all three variables x, y, z are continuous. It can be determined that the function set in the example of FIG. 34 is sampling a version of the 2D-function (90), which is continuous in all three variables.

Eq. (90) may further be generalized into the following convoluted form:

$$F(x,y,z) = 0 \quad (91)$$

Similarly, Eqs. (88) and (89), can be generalized into the convoluted forms:

$$F(y,z;x_n) = 0; \quad F(x,z;y_n) = 0 \quad (92ab)$$

in which Eq. (92a) is the convoluted form of Eq. (88), and Eq. (92b) is the convoluted form of Eq. (89).

It should be noted that not all functions (91) are capable of being presented in an un-convoluted form (90). For example, the following function can be presented only with sign uncertainty:

$$x^2 + y^2 = z^2 \Rightarrow z = \pm \sqrt{x^2 + y^2} \quad (93)$$

In the context of the theory of catastrophes this can be in important distinction because function (90) does not contain catastrophes, while function (91) sometimes includes catastrophes.

Examples of co-rank-1 catastrophes as anomalous events are described in: T. Jannson, et al., "Catastrophic Extraction of Anomalous Events," SPIE Proc. Vol. 8359-19, 2012, which may be useful to the reader as a reference for background purposes. For the purpose of the exemplary DSM operations, this document discusses the 3D space (x, y, z) which can be easily visualized. However, as would be known to one of ordinary skill in the art the procedure is valid for the 4D-space and higher spaces, as well as for co-rank-2, co-rank-3, and higher co-rank catastrophes. However, heuristication of the Digital Singular Mapping (DSM) procedure, is believed to present a novel and non-obvious approach. Heuristication of the DSM procedure includes performance of the procedure automatically, such as by computer or other processing system.

For ease of discussion and to facilitate understanding, consider only 3-D space (x, y, z), in which z is the state variable, and x, y are control variables. In 3D space, Eq. (91) describes a 2D surface in 3D (which is sometimes referred to herein in shorthand as a 2-surface). Similarly, in 2D space a 1D surface, or curve, can be referred to herein as a 1-surface. However, in n-dimensional space, only (n−1) continuum can be referred to as a "surface."

In order to obtain the simplest so-called fold catastrophe, it may only be necessary to slightly deform FIG. 33 into the form as in FIG. 34.

Figure 35:
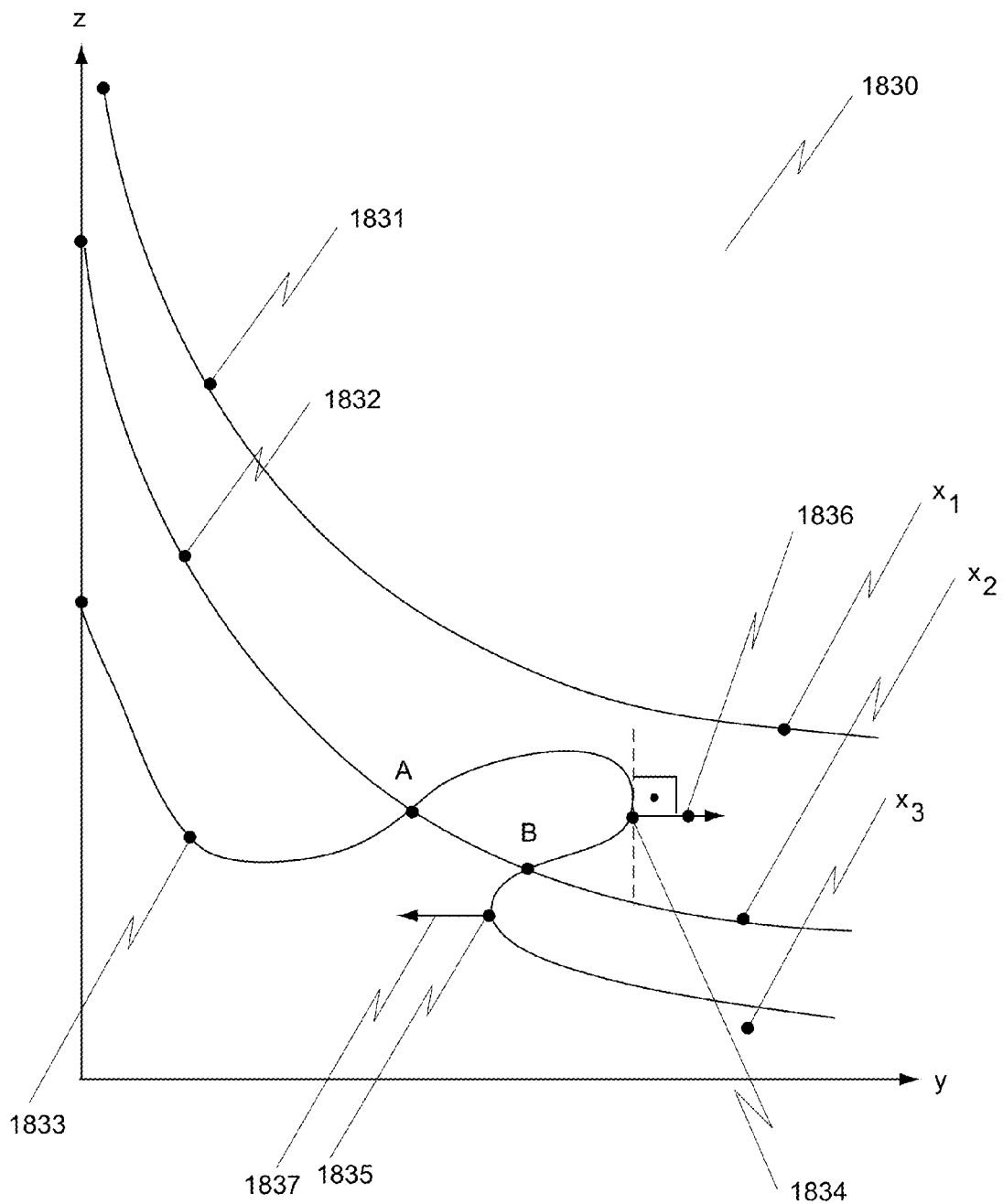
FIG. 35 is a diagram illustrating an example of a z Function as a Function of y, with the variable x as a parameter in accordance with one embodiment of the systems and methods described herein.

FIG. 35 is a diagram illustrating an example of a z Function as a Function of y, with the variable x as a parameter. In this example, the curves 1830 include function set 1831, 1832 and 1833. As seen in this example, function 1833 crosses function 1832 at the points designated as A and B. However, in contrast to the example of FIG. 34, function 1833 is more "folded" then is function 1803 in FIG. 34. Indeed, in the example of FIG. 35, function 1833 is folded to a level such that a new topological quality occurs. Particularly, the normal to function 1833 at point 1834 is perpendicular to a line (illustrated by the broken line) parallel to the z-axis. In this example, the normal is represented by arrow 1836 and perpendicularity is shown by the right-angle symbol.

A similar perpendicularity feature does occur at point 1835, as illustrated and defined by the normal, shown as arrow 1837. Accordingly, in FIG. 35, two fold catastrophes do occur at points 1834 and 1835.

Prior to this disclosure, there may have existed difficulty with realizing that functions 1832 and 1833 can cross. This may be because it can be difficult to provide inductive thinking in generalizing 2D-views into a 3-D perspective. This can be seen in FIGS. 36, 37 and 38 which illustrate, in steps, a generalization from 2D to 3D, or, more, generally, from (n−1)-space to n-space.

Figure 36:
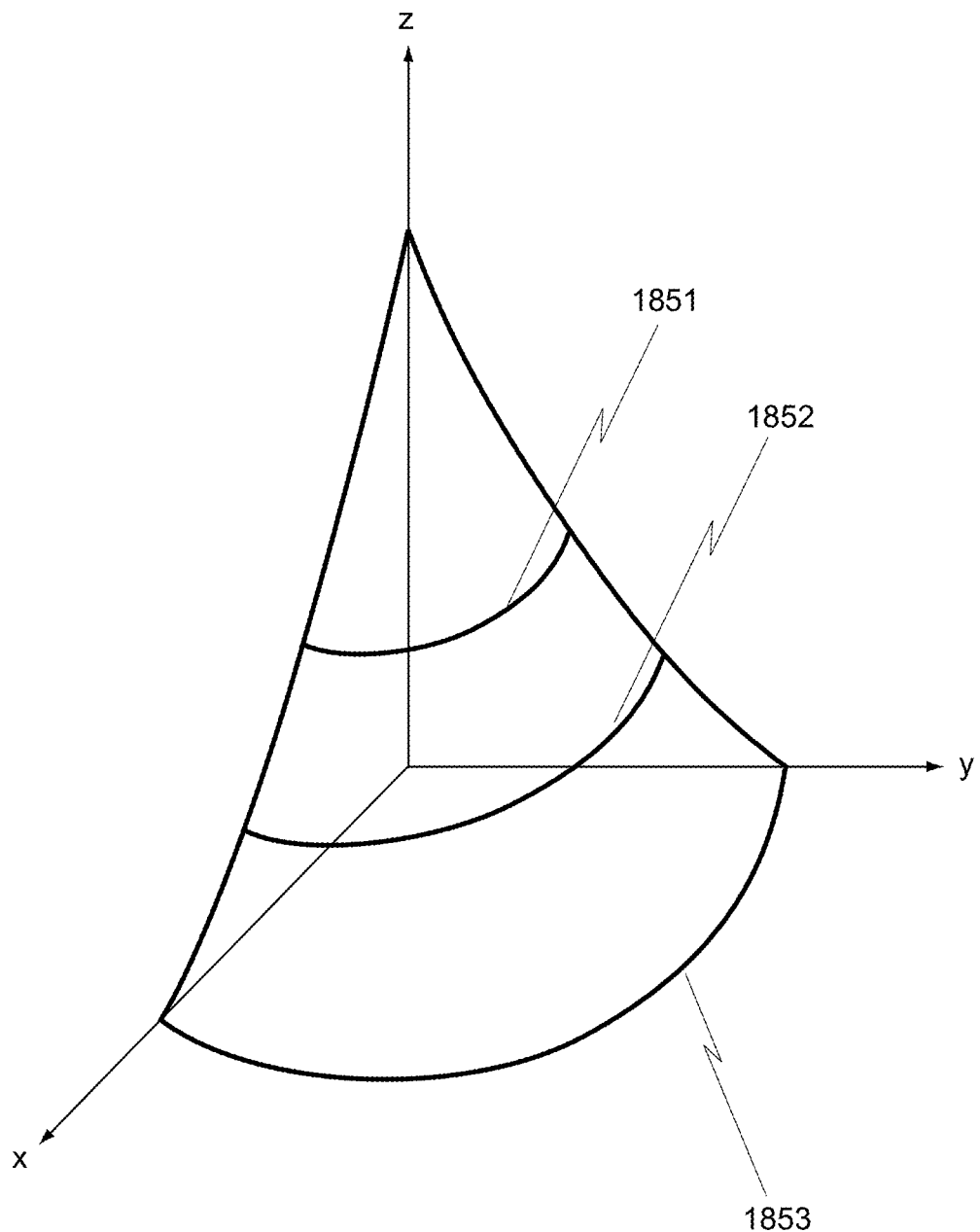
FIG. 36 is a diagram illustrating an exemplary z surface in (x, y, z) space, including contour lines in accordance with one embodiment of the systems and methods described herein.
Figure 37:
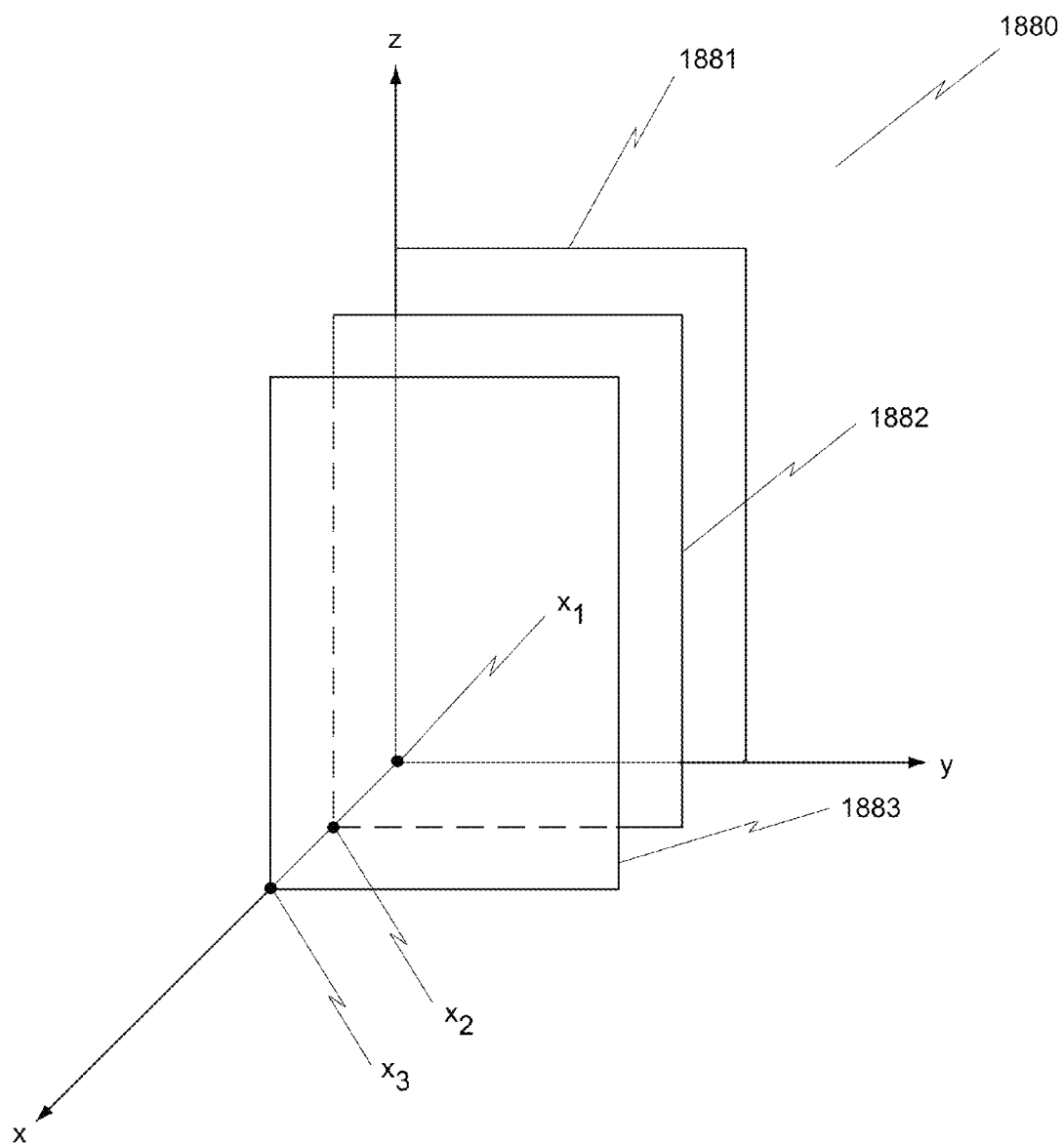
FIG. 37 is a diagram illustrating an example of planes perpendicular to the x axis in accordance with one embodiment of the systems and methods described herein.
Figure 38:
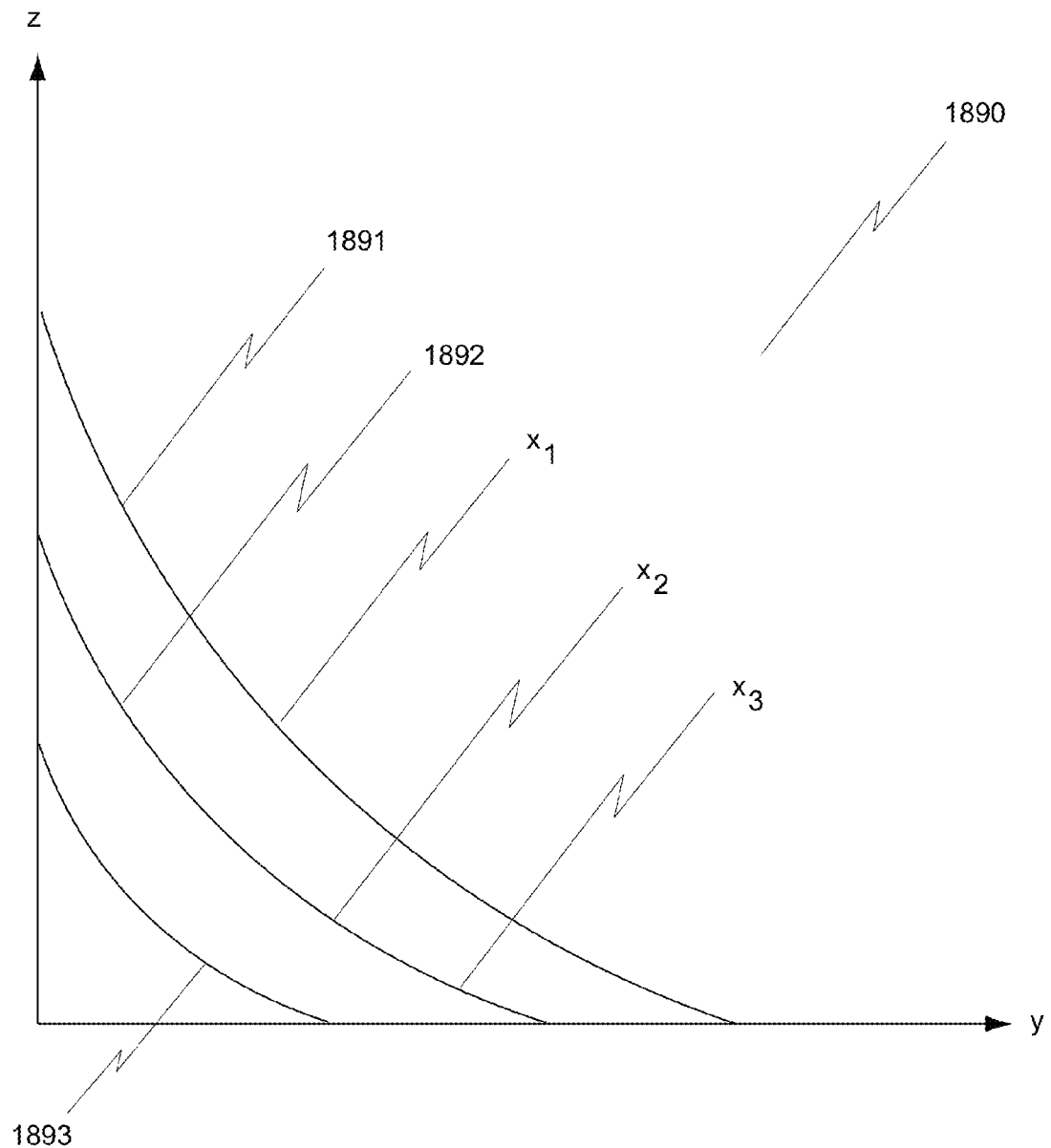
FIG. 38 is a diagram illustrating an example of x cross-sections of an exemplary z surface in accordance with one embodiment of the systems and methods described herein.

FIG. 36 is a diagram illustrating an exemplary z surface in (x, y, z) space, including contour lines. FIG. 37 is a diagram illustrating an example of planes perpendicular to the x axis. FIG. 38 is a diagram illustrating an example of x cross-sections of an exemplary z surface.

In the example of FIG. 36, exemplary z surface in (x, y, z) space is illustrated with contour lines 1851, 1852 and 1853. These contour lines illustrate cross-sections of a z surface in planes normal to the z-axis in the form:

$$z = \text{constant} \quad (94)$$

However, in FIG. 37, the surface cross-sections 1881, 1882, 1883 are normal (perpendicular) to x-axis, in the form:

$$x = \text{constant} \quad (95)$$

As these examples illustrate, the cross-sections of the z surface described by Eq. (95) are perpendicular to the z axis, while the cross-sections of the same z surface, described by Eq. (96), are perpendicular to the x axis; i.e., the cross-sections are perpendicular to each other. However, z cross-sections, defined by Eq. (95) can be considered as having a special status because they are normal to the state variable, while x cross-sections and y cross-sections are only perpendicular to the control variables. Nevertheless, any of those cross-sections, if sufficiently dense, are sufficient to reconstruct z surface, such as in FIG. 36. In particular, such cross sections as 1880 or as represented by planes 1811, 1882, and 1883, if they are sufficiently dense to be sufficient to reconstruct, the z surface. How dense they should be may be defined by the Sampling Theorem.

Accordingly, it can be concluded that a kind of deductive thinking for going from a z surface to its contours 1851, 1852, 1853, or to x cross-sections 1891, 1892 and 1893, is relatively straightforward. In contrast, inductive thinking for going from x-cross-sections 1891, 1892 and 1893, into the z surface can create issues if turned into some anomalous case, as in FIG. 35, or even as in FIG. 34. This is, because, in transformation from FIG. 38 into FIG. 36, it appears as if an extra dimension is added, namely the x variable; while in fact, what occurred was a transformation of a discrete variable, $x_n$, (which may also be referred to as a parameter) into a continuous variable, x.

After this explanation, it is appropriate to introduce a process for handling the fold catastrophe in an automatic way (i.e., fully heuristically), defining its location on the convoluted z surface:

$$F(x,y,z)=0; \text{ z-state variable} \qquad (96)$$

satisfying the following equation for its z-dependent partial 1st differential:

$$\frac{\partial F}{\partial z} = 0 \qquad (97)$$

According to Eq. (98), in the fold catastrophe location (x, y, z) and on z surface (Eq. (97)), the normal to this surface has zero z-component; i.e., indeed it is perpendicular to the z axis, as in points 1834 and 1835 in FIG. 35. This is, because, the normal vector to the z surface in Cartesian coordinates: (x, y, z) is proportional to a gradient to this surface, in the form:

$$\vec{n} = A \text{ grad } F = \left(\frac{\partial F}{\partial x}, \frac{\partial F}{\partial y}, \frac{\partial F}{\partial z}\right) \qquad (98)$$

where $\vec{n}$ represents a normal vector to the F surface, and is a proportionality constant. Therefore, indeed, Eq. (98) is equivalent to the following formula:

$$n_z = 0 \qquad (99)$$

With this foundation in mind, the Digital Singular Mapping (DSM) automatic procedure is now described according to various embodiments. For the sake of clarity, this procedure is given for a 3D-space, with Cartesian variables (x, y, z), for z-state variable and (x, y)-control variables. However, this procedure is straightforward for all co-rank-1 catastrophes as: fold, cusp, swallowtail, butterfly, wigwam and higher, as well as for co-rank-2 catastrophes: elliptic umbilic, hyperbolic umbilic, and parabolic umbilic, as well as for higher co-rank catastrophes, and other than Cartesian coordinates, based on prior art mathematics of the Theory of Catastrophes.

A Digital Singular Mapping (DSM) procedure may be implemented heuristically. "Heuristicity" as used herein refers, in some embodiments, to the process feature eliminated from non-heuristic elements, which assumes some involvement of intelligence or consciousness as explained by Erwin Schrödinger in his famous book: *What is Life?: With Mind and Matter and Autobiographical Sketches*, Cambridge Univ. Press, 1945. This is because in various embodiments, the DSM Procedure can be implemented as an automatic (or, autonomous) process that could be handled by the computer system.

In the theory of catastrophes, the phase space may be constituted by state variables and control variables. This approach may be continued in various embodiments, but it should be noted that the DSM contains more general Digital Topologic Singularities (DTS), which include both linear and non-linear DTS. The linear DTS can include such singular curves and points as: maxima, minima, inflection points, and other singular areas of standard function analysis. In contrast, the non-linear DTS can include various types of mathematical catastrophes including those with a single state variable (co-rank 1), two state variables (co-rank 2), etc. The number of control variables can be arbitrary.

Figure 39:
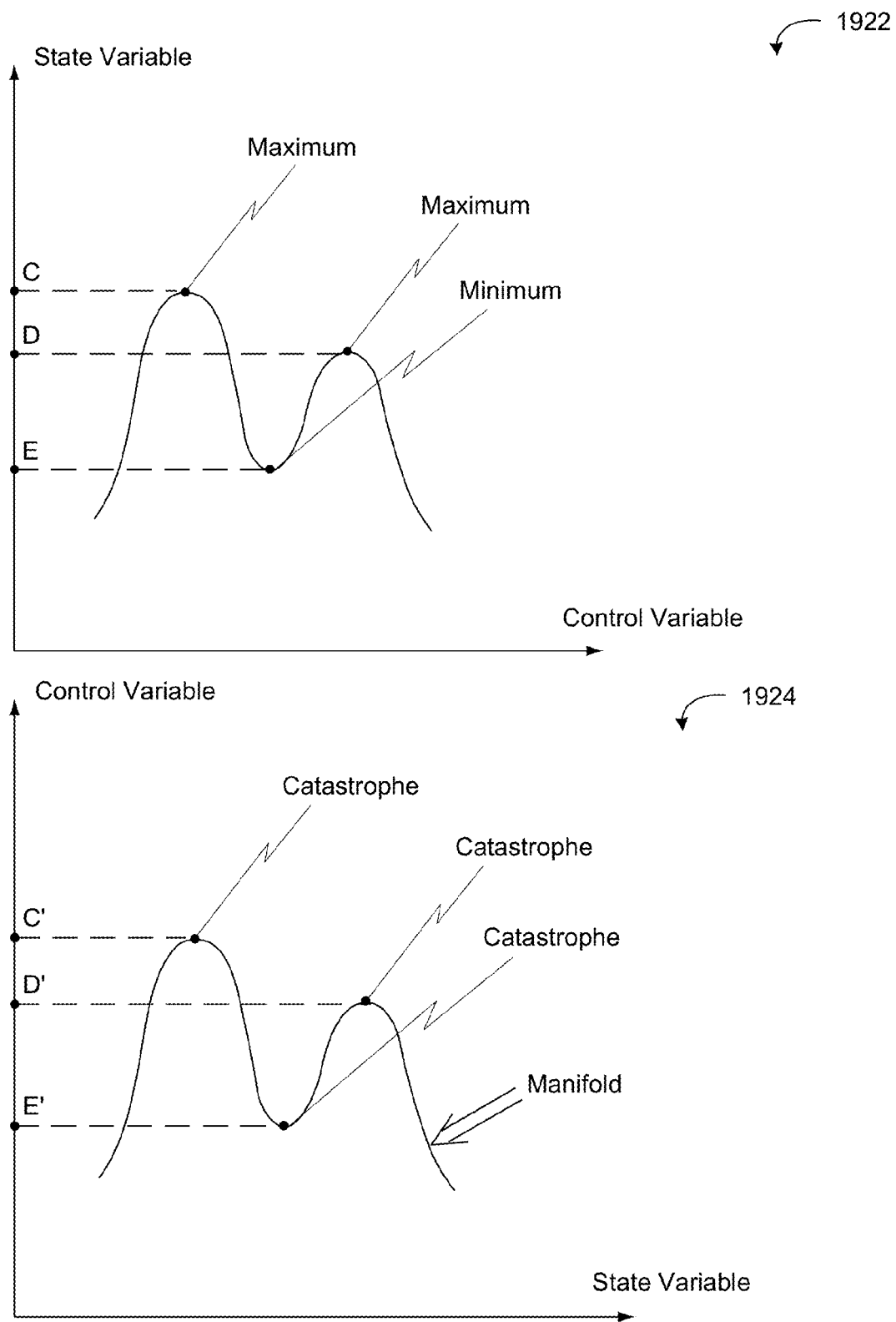
FIG. 39 is a diagram illustrating an exemplary relation between state and control variables due to causation principle.

By applying a causality principle, state variables may be separated from control variables in such a way that the control variables are input or cause variables, while state variables are output, effect, or result variables. However, by treating this problem heuristically, it may be impossible to separate them in a unique way. FIG. 39 is a diagram illustrating an exemplary relation between state and control variables due to causation principle. FIG. 39 includes an example for linear digital topological singularities (catastrophes) 1922 and an example for non-linear digital topological singularities (catastrophes) 1924.

As this example illustrates, the curves for both cases are identical. Nevertheless, the state and control variables have been replaced. In particular for singularities and 1922, the points C, D, E, determine linear DTS locations of maxima (C, D) and minima (E). On the other hand, for singularities 1924, the identically located points C', D', E', determine non-linear DTS fold catastrophe locations in 2D phase space, for simplicity. Accordingly, as this example illustrates, a simple reshuffling of state and control variables changes the DTS meaning in a material way.

Therefore, in the case of the example DSM procedure discussed below, the $1^{st}$ step is partially non-heuristic, while the next steps are rather heuristic in a sense of the Schrödinger definition of consciousness. These heuristic distinctions can be used in various embodiments to provide an automated computer system process, which in some cases can be a fully automated process that does not require human intervention. Such a feature can be useful for a C2 weather station operating in the field to allow it to autonomously distinct between anomalous and normal meteorological events.

For clarity of discussion, this document describes this process in terms of Cartesian coordinate systems, defining nD-space, where n is the number of dimensions. For n=3 we obtain 3D-space. For any nD-space, or shortly n-space, embodiments can be implemented using (n-m) sub-spaces, where m is a number of excess variables that can be treated as parameters. This is shown in FIG. 40, which is a diagram illustrating an example of subspaces and parameters.

Figure 40:
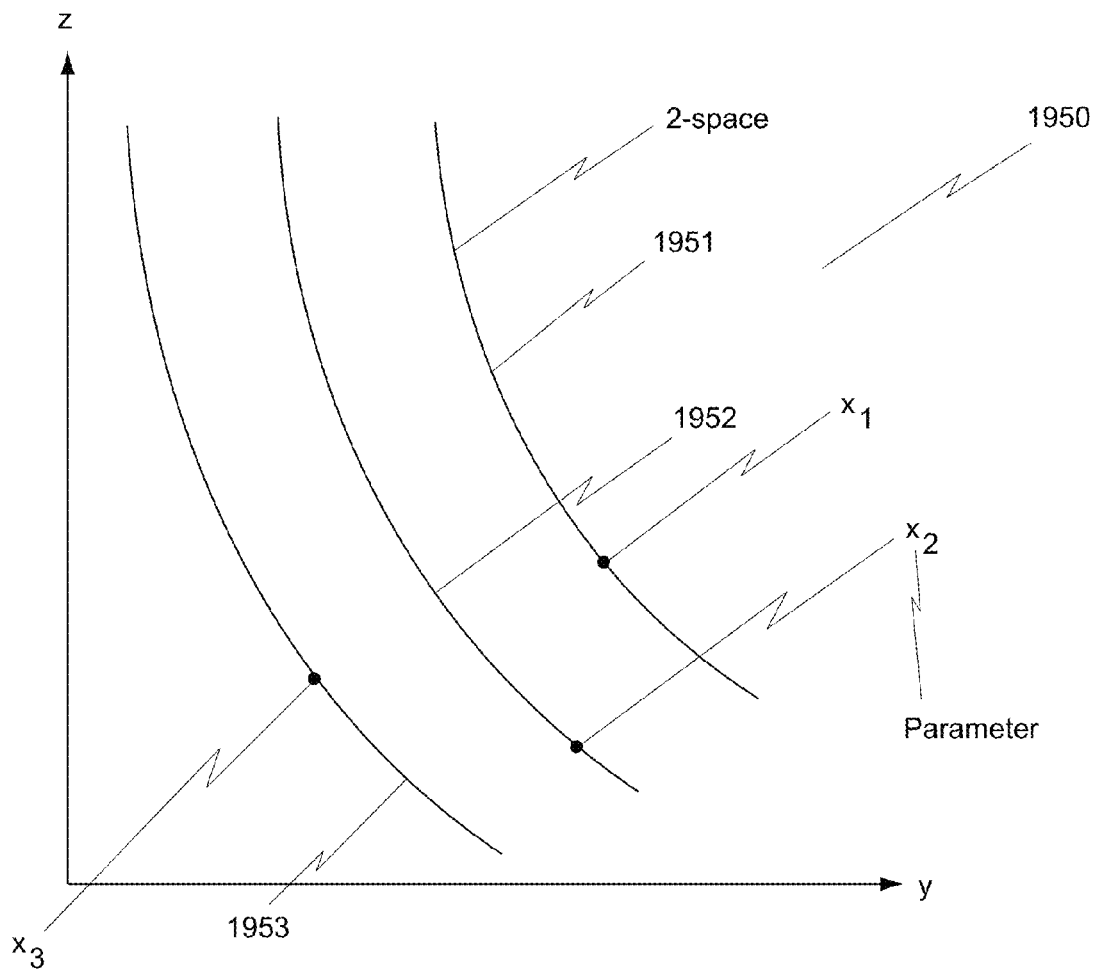
FIG. 40 is a diagram illustrating an example of a reflection between subspaces and parameters.

In the example shown in FIG. 40, 3D-space (x, y, z) has been discretized in such a sense that the x-dimension is treated as a parameter. The discretized 2-surface 1950 is presented in the form of discrete set, of 1-surfaces 1951, 1952 and 1953, which are cross-sections of the 2-surface, with the $3^{rd}$ x variable treated as a constant. (These constants $x_1$, $x_2$, $x_3$ may be referred to herein parameters.) This paradigm can be generalized in such a sense that the number of discrete dimensions (parameters) can be larger than one, as well as a number of dimensions can be larger than two. For example, we can consider a 2-surface with z parameters in the form:

$$F(x,y,z;u,v)=0 \qquad (100)$$

This 2-surface (x, y, z), with two parameters (u, v) is a cross-section of a 4-surface F(x, y, z, u, v)=0. In particular, the 1-surface in FIG. 40 can be presented in the form (where the semicolon separates continuous variables from discrete parameters):

$$F(y,z;x)=0 \qquad (101)$$

which is a cross-section of the 2-surface F(x, y, z)=0. The essential variables can be defined as such variables that contain catastrophes. They should contain at least one state variable. Such essential variables define a sub-surface, or cross-section, that contains a catastrophe, or catastrophes.

The understanding of relations between topologic surfaces, cross-sections and projections is important for heuristic development of the DSM. In order to provide such simple (heuristic) development, it is convenient to apply Cartesian systems of coordinates such as (x, y, z) in 3D space, or (x, y, z, u, v) in 5D space, for example. Therefore, generalized, or curvilinear coordinates need not be provided unless specifically required.

In 3D space, a 2-surface satisfies the following convoluted relation:

$$F(x,y,z)=0 \qquad (102)$$

In non-convoluted form, however, Eq. (103) simplifies into the form:

$$z=z(x,y) \qquad (103)$$

where z is a state variable, and (x, y) are control variables. Comparing Eq. (104) with Eq. (98) it can be seen that in such a case (x, y, z) variables are not essential variables. This is because, by presenting Eq. (104) in convoluted form (103), yields:

$$F(x,y,z)=z-(x,y)=0 \qquad (104)$$

Thus, $$\frac{\partial F}{\partial z} = 1 \neq 0 \qquad (105)$$

Thus, indeed, there are no catastrophes in this case. In fact, Eq. (104) presents familiar geophysical contour mapping, which, usually does not include catastrophes. This specific example is crucial to understand the meaning of essential coordinates. It will be discussed as EXAMPLE 6 in the next section.

Figure 41:
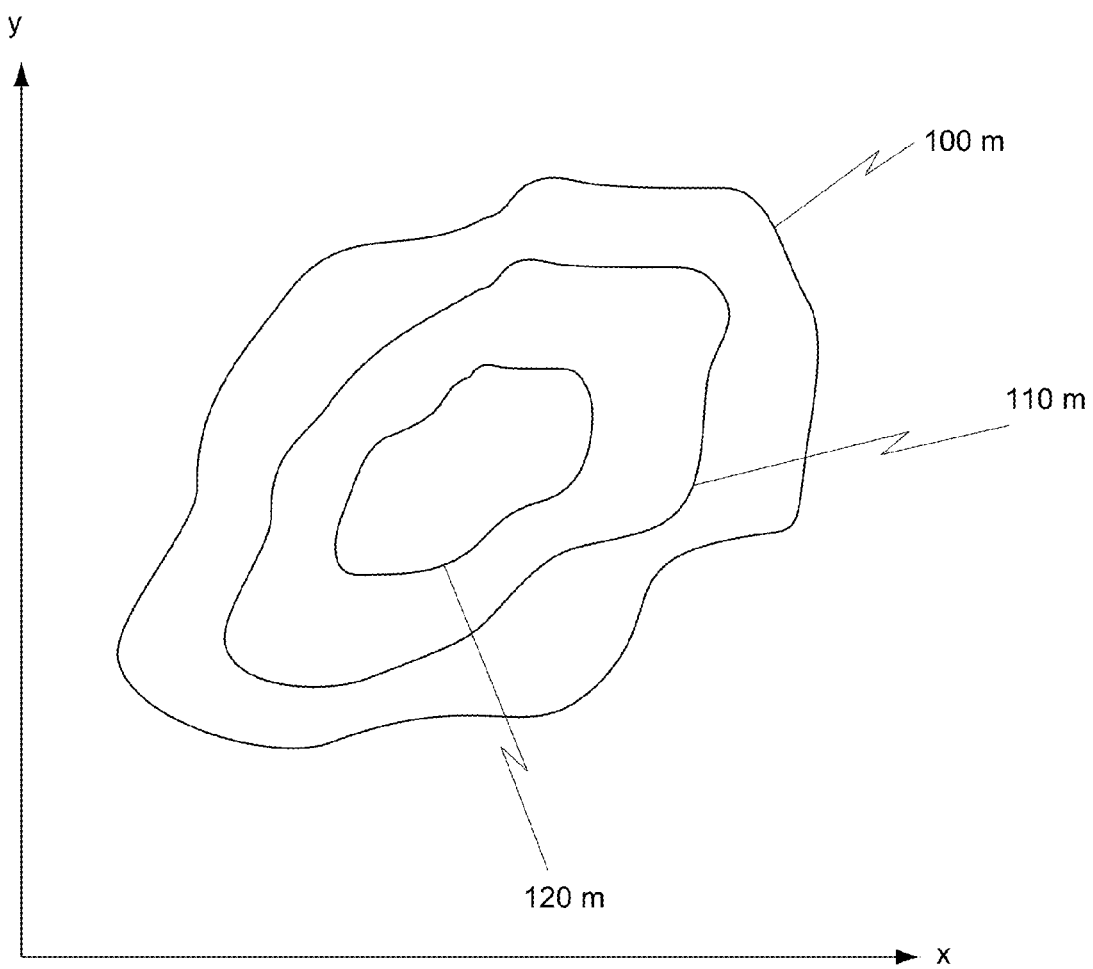
FIG. 41 is a diagram illustrating a familiar contour mapping with contour lines at z: 100 m, 110 m, 120 m—elevations.
Figure 42:
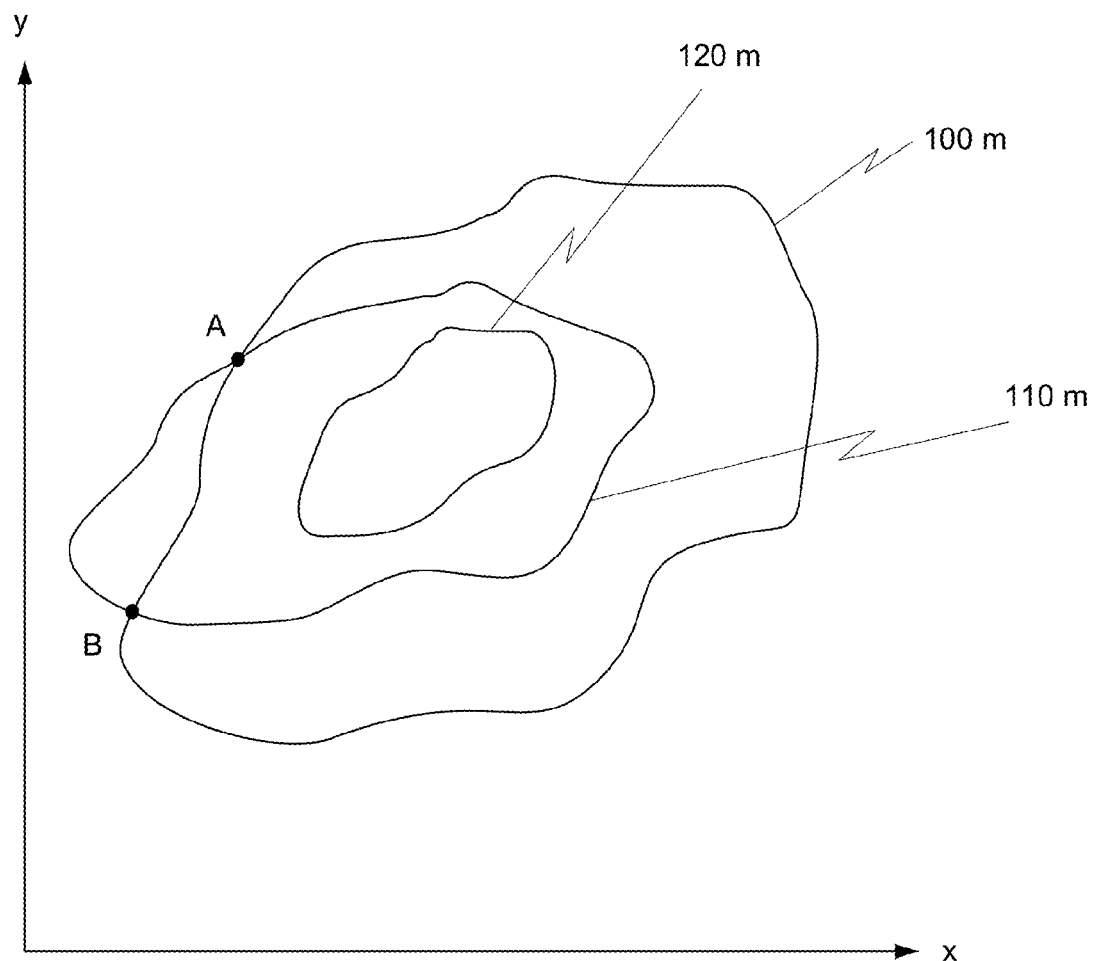
FIG. 42 is a diagram illustrating an example of non-linear contour mapping in accordance with various embodiments of the technology disclosed herein.

According to Eq. (103), surface cuts or, cross-sections, can be made in three (3) possible ways; i.e., as x-cross-sections, y-cross-sections, and z-cross-sections. In the case when z coordinate is a state variable, while (x, y) are control variables; then, z cross-sections are also called contour lines. These contour lines may be in the form:

$$F(x,y;z_n)=0 \qquad (106)$$

where $z_1, z_2, \ldots, z_n$ are locations of z-coordinate. When, these locations are uniformly distributed, then there are familiar mapping contours, as shown in FIG. 41. FIG. 41 is a diagram illustrating a familiar contour mapping with contour lines at z: 100 m, 110 m, 120 m—elevations. FIG. 42 is a diagram illustrating an example of non-linear contour mapping.

While the contour mapping as in FIG. 41 is rather familiar, the non-linear contour mapping as in FIG. 42 is not familiar. This is because the contour lines of FIG. 42 cross each other, leading to some possible catastrophe locations. In non-linear contour mapping as in FIG. 42, the contour lines at z=100 m and z=110 m do cross each other at points A and B. The example of x-cross-sections is shown in FIG. 37. In general, the cross-sections such as x, y, z cross-sections can lead to full surface reconstructions, assuming that the distance between cross-sections, Δz, tends to zero value:

$$\{lim F(x,y,x_i)=0\}=\{F(x,y,z)=0\}$$

$$\Delta z \to 0 \quad i=1,2,3$$

$$n \to \infty \qquad (107)$$

i.e., the continuum of surface cross-sections leads to continuous surface, for number of cross sections, n, tending to infinity.

Surfaces vs. Projections.

Combining Eq. (103) with Eq. (98), leads to two (2) surface equations that may be satisfied, simultaneously, in the form:

$$F(x,y,z)=0 \qquad (108a)$$

$$\frac{\partial F}{\partial z} = G(x, y, z) = 0 \qquad (108b)$$

The $1^{st}$ surface Eq. (109a) can be used to determine the possible manifold surface, while the $2^{nd}$ surface equation (109b) can be used to determine the geometrical locii of fold catastrophes. In order to obtain their projections, the z variable may be eliminated from Eq. (109), resulting in a z projection referred to as a bifurcation set, in the form:

$$K(x,y)=0 \qquad (109)$$

DSM and Manifolds.

Figure 43:
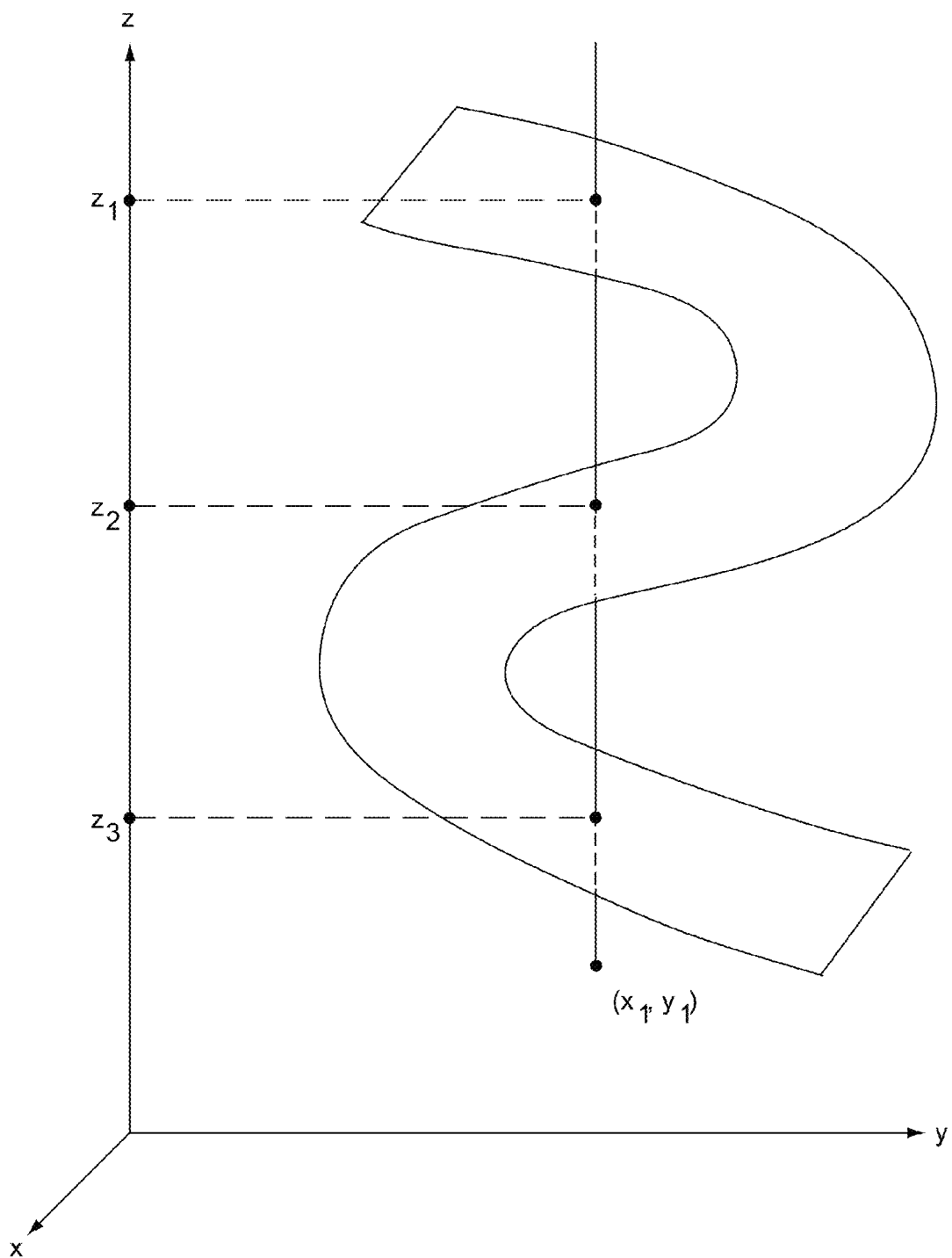
FIG. 43 is a diagram illustrating an example of a z manifold in (x, y, z) space in accordance with various embodiments of the technology disclosed herein.

FIG. 43 is a diagram illustrating an example of a z manifold in (x, y, z) space. In FIG. 43, the z-manifold is shown in (x, y, z) space, with a z state variable and (x, y) control variables. As this example illustrates, a vertical, straight line, satisfying equation: $x=x_1$, $y=y_1$, crosses the z-manifold in three points, with z-coordinates $z_1, z_2, z_3$. If the number of crossing points is larger than one, this may be referred to as a manifold; otherwise it can be deemed that there is no manifold.

The DSM procedure according to various embodiments may be carried out in process steps that may be "heuristicized" as much as possible or practical. Table 7 is a table illustrating example steps for the DSM procedure in accordance with one embodiment of the systems and methods disclosed herein.

In the first step (step number 1), the process identifies state and control variables. For simplicity of description, consider 3D-space, (x, y, z), with z state variable and (x, y) control variables. The input data, obtained either from experiment or by estimation, may be in the form of a set of points: $(x_i, y_i, z_i)$; i=1, 2, 3, . . . , n; where n is the number of points. By applying standard sampling procedures, the sampling points $(x_i, y_i, z_i)$, are usually formatted in the form of curves, with the $3^{rd}$ coordinate (x, or, y) as a parameter. Only control variables can be parameters. Thus, such sampling curves as in FIG. 40, for example can be obtained.

In the second process operation (step number 2), the process provides $x_i$-parameters, for example, denser and denser (using rules of standard sampling theorems), until, a continuum DSM surface is obtained. See, Eq. (76), for example. In the third process operation (step number 3) the process identifies whether this continuum surface is a z manifold. For these purposes, the process can be configured to apply a bundle of vertical lines, as in FIG. 43, and find, whether their cross-sections with a given surface produce multi-value solutions. If the answer is yes, then it means that a given surface is a manifold. On the other hand, if the answer is no, a given surface is not a manifold. Equivalently, in the $1^{st}$ case the (x, y, z) variables may be deemed to be essential; otherwise, they are not essential. This is, because, the presence of the manifold means at least the existence of fold catastrophe/catastrophes.

In the fourth process operation (step number 4) the process identifies a location of any fold* catastrophes that exist (i.e., non-linear DTS, in the manifold case). Otherwise, the process identifies possible locations or regions of linear DTS. In hybrid situations, it is possible that both linear and non-linear DTS exist. In the fifth process operation (step number 5), the process provides DTS synthesis by finding bifurcation sets, or (x, y)-projections of fold catastrophes, in the case of non-linear DTS. Otherwise, the process locates linear singular sets, only. In the sixth process operation (step number 6) methodology summarizes the results in a proper format, which can be defined, for example, by Pre-Structuring. In the seventh process operation (step number 7) system provides the necessary generalizations, including providing more dimensions, etc.

TABLE 7

Example Summary of Digital Singular Mapping (DSM)

| Step Number | Step Name |
|---|---|
| 1 | Identify state and control variables |
| 2 | Develop DSM continuous surface: F(x, y, z) = 0 |
| 3 | Identify if the DSM surface is manifold. Find essential variables. |
| 4 | Identify location of fold[2] catastrophes and linear Digital Topologic Singularities (DTS) |
| 5 | Provide DTS synthesis |
| 6 | Summarize the results in pre-structuring format |
| 7 | Provide necessary generalizations[**] |

[2]And this procedure can be generalized to higher order catastrophes such as cusp and others
[**]Mostly, apply larger number of dimensions, if needed.

Three examples of fold catastrophes presented in heuristic way are presented including geophysical, meteorological, and physical ones.

Example 6. Geophysical Contour Mapping

Figure 44:
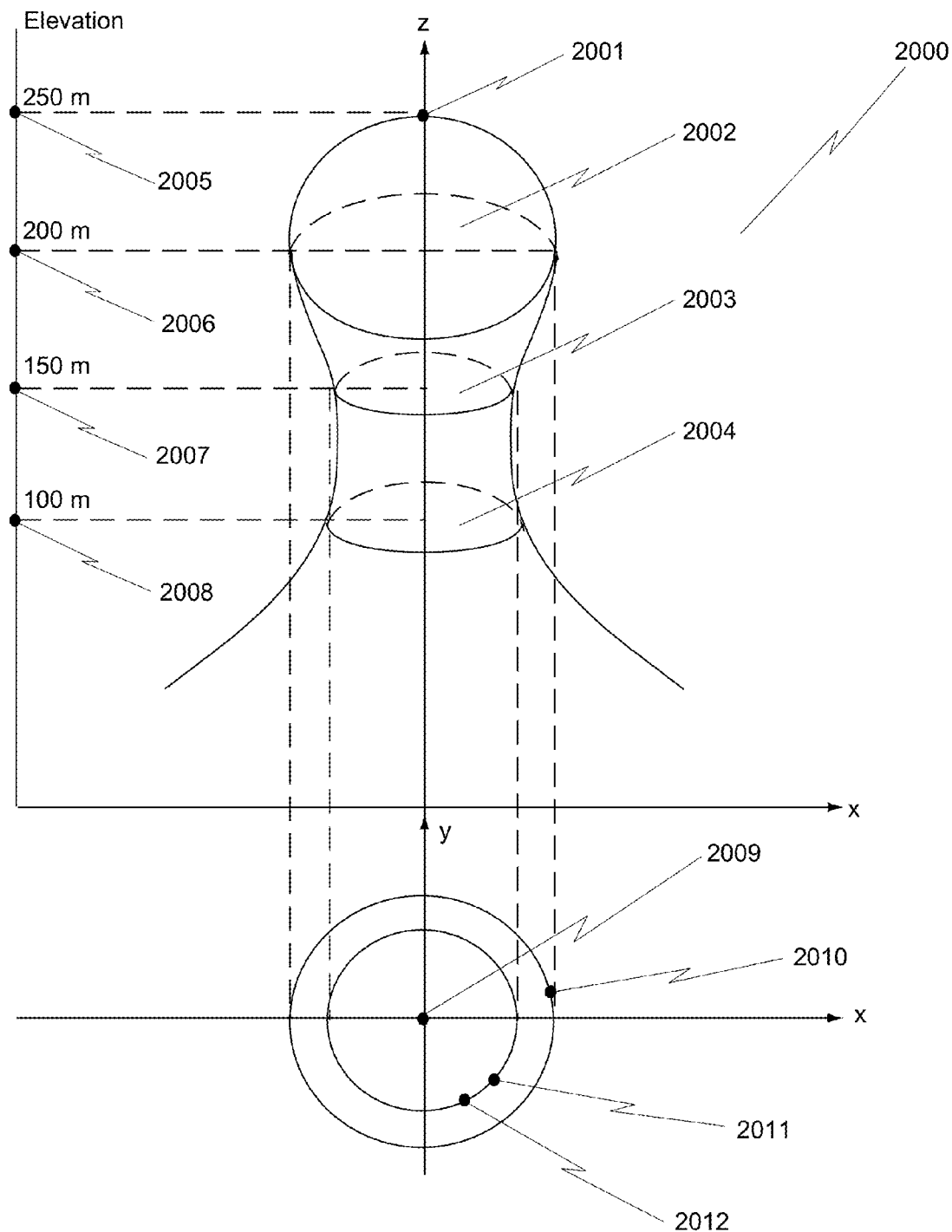
FIG. 44 is a diagram illustrating an example of non-linear contour lines in accordance with various embodiments of the technology disclosed herein.

In the case of well-known geophysical contour mapping, the contour lines are z-cross-sections, where z is the elevation coordinate, and (x, y) are the geophysical coordinates. In this case, the DTS step 1, as in Table 7, is automatically provided with a z coordinate as a state variable and (x, y) as control variables. The familiar contour mapping lines are z-cross-sections. In FIG. 41, exemplary linear contour lines are presented; while in FIG. 42, the exemplary non-linear contour lines are presented. By comparing FIG. 41 with FIG. 42, it can be seen that, rarely, we see such contour lines as in FIG. 42, except, perhaps, when the detailed mapping of mountain caves, or coves is provided. This is, because, typically, the geophysical mapping does satisfy the unconvoluted 2-surface Eq. (104) condition, which does not result in fold, or higher co-rank-1 catastrophes (such as: cusp, swallowtail, butterfly, wigwam, etc.). In the case of such unusual rocky mountains, such as the "finger" mountains in Arizona, for example, some unusual shapes can be found including those as shown in FIG. 44, which resembles a human body, for example. FIG. 44 is a diagram illustrating an example of non-linear contour lines.

In the example illustrated in FIG. 44, Non-Linear Contour Lines are illustrated such as those that can be described by using Eq. (107) in convoluted form. Accordingly, these do not lead to Eq. (105). Therefore, at least, fold catastrophes can exist, in such a case.

In fact, in the example of FIG. 44, the convoluted 2-surface 2000, characterized by the following convoluted 2-surface equation, is presented in the form:

$$F(x,y,z)=0 \Leftrightarrow \text{CONVOLUTED 2-SURFACE} \quad (110)$$

with four (4) exemplary z-cross-sections 2001, 2002, 2003, and 2004, representing four (4) elevations: z=250 m, 2005; z=200 m, 2006; z=150 m, 2007, and z=100 m, 2008, respectively. Their projections are 2009, 2010, 2011, and 2012, respectively. As this example illustrates, these projections do cross each other in such a sense that projections 2011 and 2012 coincide. This is, because, contours 2003 and 2004, at different elevations 2007 and 2008, are identical as a peculiar specific non-linear case. Of course, these contour lines do not need to be axially symmetrical as in the example illustrated in FIG. 44.

Example 7. Meteorological Fold Catastrophe

Consider a peculiar phenomenon of creating a rain in a desert by putting fire on a cactus forest. This unusual anomalous effect does occur when relative humidity in the air is very high (e.g., so high that there is no rain because there are not sufficient condensation centers in the air). By creating the fire, however, a smog results, producing the required condensation centers; thus, resulting in unexpected rain, which is a kind of non-linear DTS, or mathematical catastrophe. The term "mathematical" catastrophe, may be used herein to refer to the effect of sudden drop or jump of state variable. While, the drop is considered as normal (regular) catastrophe, the jump is usually not considered as normal catastrophe, in a familiar sense.

In order to "heuristicize" this phenomenon, the rain rate, R, may be introduced as state variable, and temperature, T; time, t; and (x, y), may be used as control variables. Accordingly, embodiments can be implemented having a 5D space: (T, t, x, y, R), and 4-surface, which is so-called an equilibrium surface in the theory of catastrophes, in the form:

$$F(T,t,x,y,R)=0 \quad (111)$$

To visualize this so-called hyper-surface (i.e., higher than 2-surface in 3D), embodiments can be implemented to "discretize" two state variables as parameters $(x_n, y_n)$, resulting in an equilibrium 2-surface:

$$F(T,t,R;x_n,y_n)=0 \quad (112)$$

Such a surface has, indeed, a "catastrophic" jump of an R-variable for a given (T, t)-values.

In the context of this example, the "paramaterizing" process may be considered, in a way, as indicative of the presence (existence) of other additional variables (e.g., by presenting them as parameters). For example, in Eq. (113), two other (spatial) coordinates $(x_n, y_n)$ are indicated. However, there may be some other hidden variables that are essential but omitted in the process. In some embodiments, the process may fail to indicate such variables in equations such as Eq. (113), which can result in some non-linear DTS mapping missed.

Figure 45:
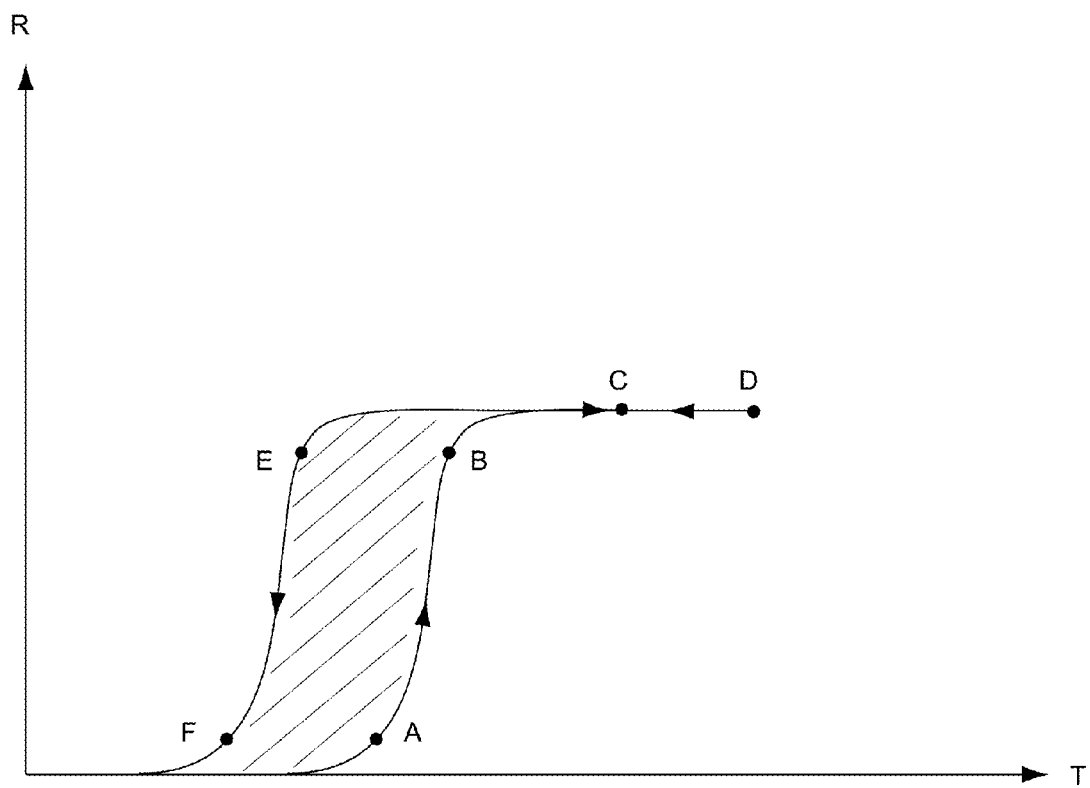
FIG. 45 is a diagram illustrating an example of hysteresis in the case of the desert rain phenomenon in accordance with various embodiments of the technology disclosed herein.

Consider again the fire phenomenon as discussed in Example 7, by analyzing two essential variables R and T. FIG. 45 is a diagram illustrating an example of hysteresis in the case of the desert rain phenomenon discussed above with reference to example 7. With reference to FIG. 45, in this example, the evolution path, ABC, is applicable only in the case of arrows as indicated in FIG. 45. Otherwise, when the evolution path goes from right to left (e.g. as in DEF), this path is different from the previous one. The graphical difference between paths ABC and DEF is denoted by the crosshatched area under the curve. If there were no difference between the two paths, the crosshatched area would be zero. Therefore, the hysteresis is proportional to the crosshatched area.

Figure 46:
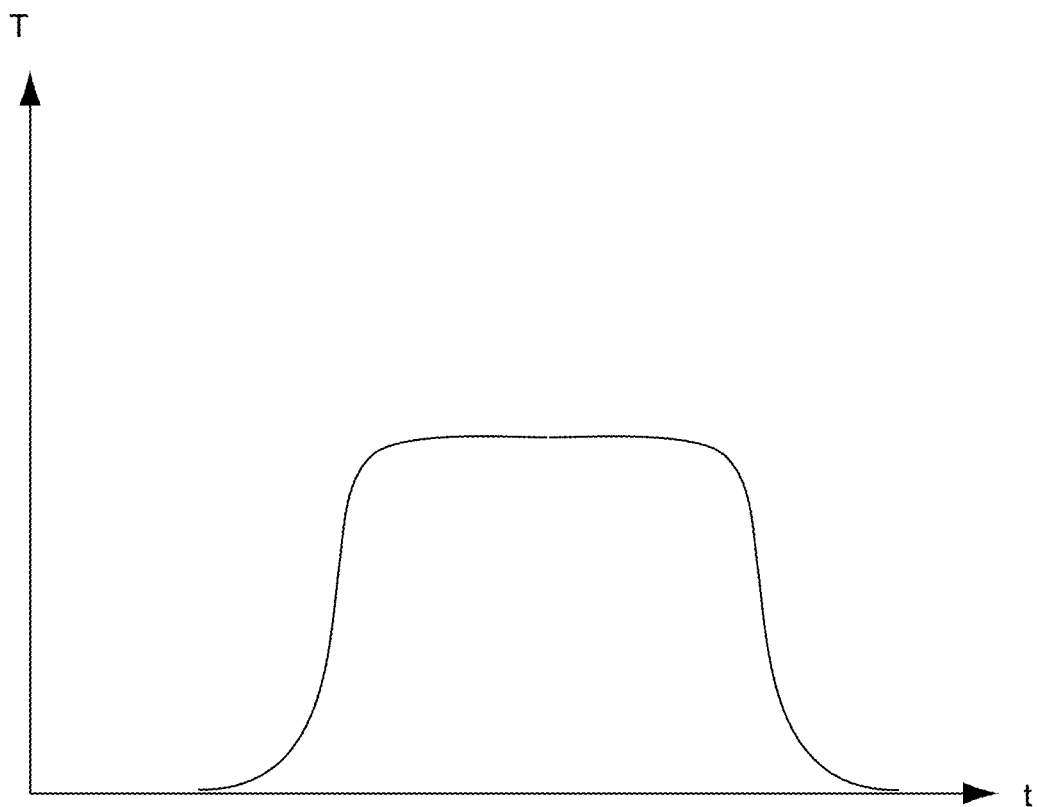
FIG. 46 is a diagram illustrating an example of a typical relation (44) for normal dispersion in accordance with various embodiments of the technology disclosed herein.

The example of FIG. 45 includes two fold catastrophes: a jump catastrophe AB; and a drop catastrophe EF. This example illustrates that time variable, t, is not shown even as a parameter. Therefore, the t variable is a hidden variable in this case. In fact, air temperature, T, is direct function of t, as shown in the example of FIG. 46, which plots example of temperature versus time dependence. This also illustrates that FIG. 46 does not contain non-linear singularities, only linear ones (a maximum).

Figure 47:
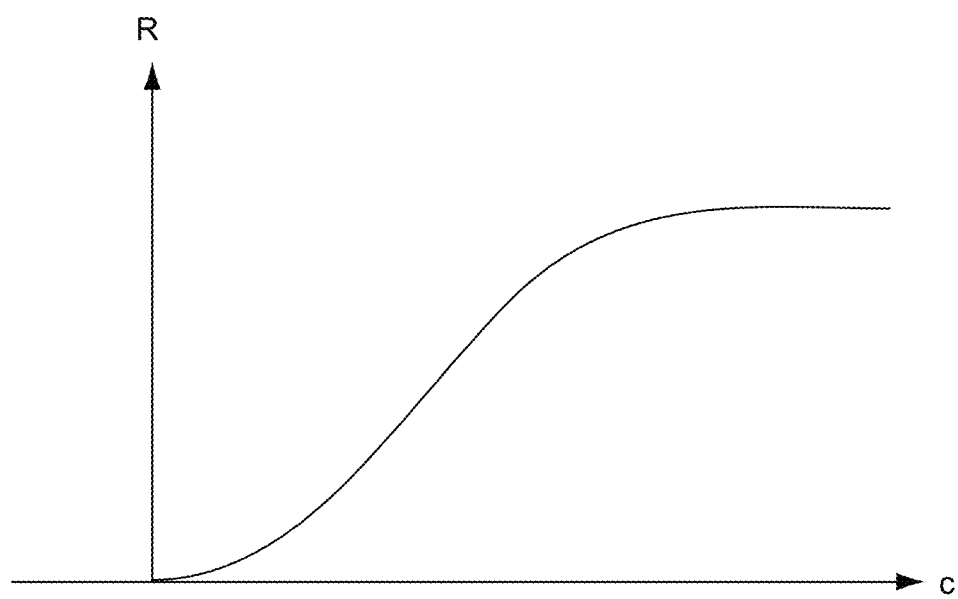
FIG. 47 is a diagram illustrating an example of Linear R(c)-dependence in accordance with various embodiments of the technology disclosed herein.

FIG. 45 demonstrates a kind of heuristication effect. This is because, as shown in FIG. 45, two fold catastrophes can be found automatically, by measuring the R(T) dependence (i.e., these non-linear singularities were found without Schrödinger's consciousness). In fact, the catastrophic phenomenon in FIG. 45 is a result of choosing non-primary coordinate, T, while using the primary coordinate such as condensation center (aerosol) concentration, c, as in FIG. 47 (which illustrates a Linear R(c)-dependence), would not show any non-linear singularity. It is noted that the definition of an essential variable (as variable involved in the catastrophic effect) is heuristic rather than non-heuristic, which can be considered as deficiency. However, in the context of automatic extraction of singularities (both linear and non-linear singularities), this can be an advantage because it allows the process in various embodiments to maximize the identification (ID) sensitivity of catastrophe detection.

Example 9

This example considers a well-known example. However, the heuristicity analysis in accordance with various embodiments is new, leading to a better understanding of the relation between heuristic and non-heuristic examples of the catastrophe ID.

Consider the standard linear oscillator equation for the ID case, where x is the oscillation coordinate; $\dot{x}=dx/dt$, is its first time-differential; and, $\ddot{x}=dx^2/dt^2$, is its second time-differential, with added non-linear force term, $F_x(x)$, in the form:

$$\ddot{x}+\omega_0^2 x+k\dot{x}=F \cos \gamma t + F_x(x) \quad (113)$$

where $\omega_0$ is linear resonance angular frequency, k is viscosity coefficient (in frequency units), F is amplitude of stimulating force, y is stimulating force frequency, and $F_X(x)$ has the form:

$$F_x(x)=-ax^3 \quad (114)$$

This $3^{rd}$-order non-linearity may lead to both the $3^{rd}$ harmonic and to the contribution to the linear term, the latter of which may be essential for the catastrophes, due to the following solution of Eq. (114), in the form:

$$A = \frac{F}{\sqrt{\left(\omega_0^2 - \gamma^2 + \frac{3aA^2}{4}\right)^2 + \gamma^2 k^2}} \quad (115)$$

where A is resulting amplitude of oscillations in the form:

$$x=A \cos(\gamma t - \phi) \quad (116)$$

where φ is the phase. We see that for a=0, Eq. (116) becomes the standard solution of the linear oscillator. In the vicinity of the resonance ($\gamma \cong \omega_0$), the stimulating angular frequency, γ, can be presented in the form:

$$\gamma=\omega_0(1+\in); \in \ll 1 \quad (117)$$

By substituting Eq. (118) into Eq. (115), and assuming $k \ll \omega_0$, the following equilibrium surface equation ($z=A^2$) is obtained:

$$F(\varepsilon, a, z) = z\left(\frac{3az}{4} - 2\varepsilon\right)^2 + k^2 z - F^2 = 0 \quad (118)$$

The square of amplitude, z, is the state variable, while (c, a) are control variables. By differentiating function, F, twice in respect to z, the locations of the fold and cusp catastrophes can be obtained. In particular, the location of two cusp catastrophes, is given by $$(a,\in)=\pm(32k^3\sqrt{3}/27F^2, k\sqrt{3}/2) \quad (119)$$

Figure 48:
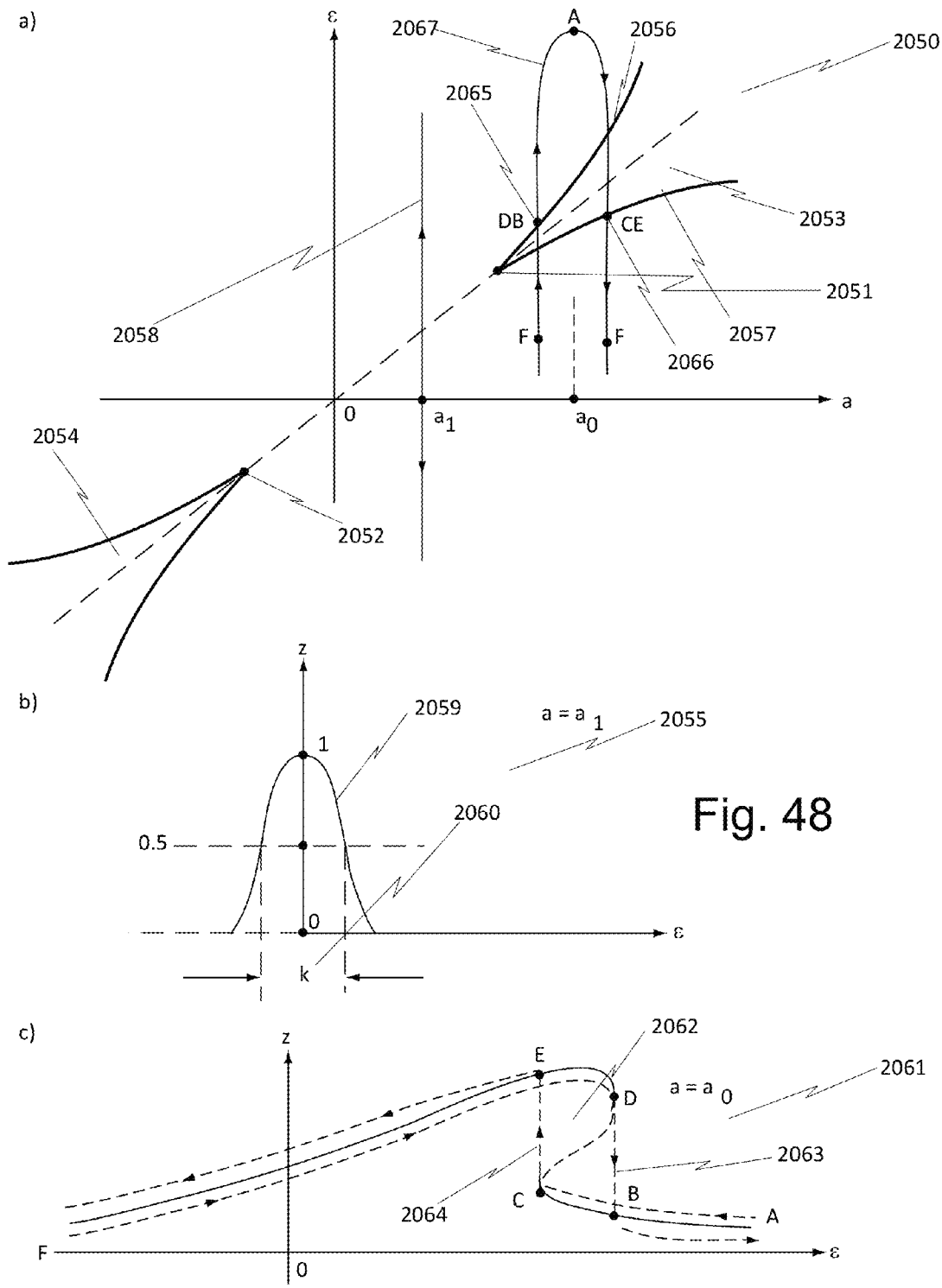
FIGS. 48A-C illustrate examples of non-linear oscillator catastrophes in accordance with various embodiments of the technology disclosed herein.

FIGS. 48A-C illustrate examples of non-linear oscillator catastrophes. FIG. 48A is an example of a bifurcation set for non-linear oscillator catastrophes. FIG. 48B is an example of linear singularities for a non-linear oscillator for $a=a_1$. FIG. 48C is an example of non-linear singularities for a non-linear oscillator for $a=a_0$.

In FIG. 48A, bifurcation set 2050 for non-linear oscillators is presented including cusp catastrophes 2051 and 2052 and fold catastrophes. Each cusp catastrophe in various embodiments can be configured to generate two branches of fold catastrophes for the so-called hard oscillator 2053 when a>0 and soft oscillator 2054 when a<0. The hard non-linear oscillator 2053 is discussed in detail.

In FIG. 48B, the linear singularities for non-linear oscillator 2055 are discussed outside of the bifurcation region, which is inside two fold catastrophes branches 2056 and 2057, for $a=a_1$ following evaluation path 2058 in FIG. 48A. In FIG. 48B the resonance curve 2059 is in the form:

$$z=z(\in) \quad (120)$$

which is shown, in a normalized form. As this example illustrates, the resonance width 2060 may be equal to k, which is in agreement with standard linear oscillator theory. According to Eq. (120), the location of cusp catastrophe for hard case, is $$\varepsilon = \varepsilon_2 = \frac{k\sqrt{3}}{2} = 0.87k > 0.5k \quad (121)$$

i.e., it is outside the resonance curve width, as in FIG. 48B. Of course, the resonance is located at $\in=0$, as shown by the curve 2059. Therefore, FIG. 48B shows the linear singularity (a maximum).

In contrast in FIG. 48C, the non-linear singularities (catastrophes) 2061 are shown including a characteristic hysteresis effect 2062. This is because the evolution path, FEDBA, does not coincide with the evolution path, ABCEF, in the other direction. As described above, this creates the hysteresis effect (in FIG. 48C) the resonance at $\in=0$ has been omitted for sake of simplicity). The hysteresis also creates bi-stability (i.e. a situation where the system is bifurcating between two states: upper (FED) and lower (CBA)). For DB-catastrophe 2063, a drop is indicated, while for CE-catastrophe 2064, a jump is indicated. Because FIGS. 48B and C present z-cross-sections, the catastrophes 2063 and 2064 can be reduced to points 2065 and 2066 respectively in FIG. 48A. The full evolution path ABCEFEDBA is also shown in FIG. 48A as 2067. This illustrates that the region of catastrophes or bifurcations 2053 is symmetrical to region 2054 for a soft oscillator.

Therefore, both hard and soft oscillators behave symmetrically in respect to catastrophes.

Heuristicity Analysis.

Comparisons of Examples 7 and 8 provide heuristicity comparisons. This is, because, EXAMPLE 7 is for an extremely heuristic case, while EXAMPLE 8 is extremely non-heuristic. Indeed, in the case of EXAMPLE 8, it is important to know oscillator theory very well in order to find catastrophes, while in the case of EXAMPLE 7, is somewhat easier to select measurement variables. It can be seen that this difference is drastic only for non-linear singularities, while for linear singularities, the process, in general, can be very heuristic, assuming a causality principle. In contrast, in the case of non-linear singularities we have a full spectrum of estimations, some of them very heuristic, other very non-heuristic. In this context, we see that non-heuristic solutions are rather narrow in a sense of application, while heuristic ones are generally broader. However, referring to EXAMPLE 8, the solution is not so narrow because the resonance phenomenon is rather broad, with applications in mechanics, electronics, acoustics, biophysics, etc.

Table 8 provides a summary comparison between example linear and non-linear singularities. Smooth, regular continuous functions and manifolds, lead to discrete singularities, the prototype of anomalous events.

TABLE 8

Summary Comparison of Linear and Non-Linear Singularities

| No. | Feature | Linear | Non-Linear |
|---|---|---|---|
| 1 | Typical Examples | Maximum, Minimum, Inflection Points *) | Catastrophes (Jumps) |
| 2 | Topological Type | Continuum | Continuum |
| 3 | Analythic Geometry can be Applied **) | Yes | Yes |
| 4 | Heuristicity | High | Lower |
| 5 | Causality Principle | Yes | Yes |
| 6 | Phase-Space is Valid | Yes | Yes |
| 7 | State/Control Variables ***) | Yes | Yes |
| 8 | Discretization of Continuity ****) | Yes | Yes |
| 9 | ID of Anomalous Events | Yes | Yes |
| 10 | Regression can be Applied | Yes | Yes |
| 11 | Sampling Theorem can be Applied | Yes | Yes |

*) And higher inflection points (higher differentials than of the 2" order).
**) This feature is a consequence of continuum topology.
***) Feature (7) is equivalent to (6).
****) The essential point.

Various embodiments of the technology disclosed herein include a C2 Weather Sensor System (C2WS2), which is the particular case of the C2 Sensor System. The C2WS2 contains Command-Control (C2) system structure applicable to Weather Station. In the Weather Station case, the anomalous event is a Weather Anomalous Event, or, shortly, WAEVENT based on the Software Engine, or, more specifically, on Truthing-based Anomalous Event Software Engine (TAESE), as described in FIG. 24. The WAEVENT Pre-Structuring, as discussed above, can be important to define the sampling space used for Bayesian Truthing of the TAESE, including Weather Data Event Format (WDEF) as a sample, shown in FIG. 28.

The optimum selection and identification (ID) of a WAEVENT can take advantage of the WAEVENT Sensor Fusion (WSF) software engine, an example of which is discussed above in reference to FIGS. 26 and 27. The selection and identification of WAEVENTS can be done either in the digital domain (e.g., as in FIG. 24) or in the topologic (analog) domain, leading to a yellow/red, dual-alarm Autonomous Decision Generation Process (ADGP). Any of the decision paths, whether digital, or topologic (analog), can result in a yellow alarm, while two yellow alarms from both paths and at the same time create the red alarm, within the dual-alarm structure, introduced for Information Quality (IQ) purposes.

Four (4) or more information structures may be included in various embodiments. These include the well-known Information Assurance (IA), Information Security (IS), Information Hardening (IH), and Information Quality (10).

The Bayesian Inference, based on the PPV figure of Merit (FoM), is introduced only for Performance Metrics purposes rather than for decision process purposes. This is an important distinction because the latter option suffers from the autonomous system's low actionability. As used herein PPV can be taken to refer to the Positive Predictive Value.

The cost of bandwidth is also an important factor as discussed above. This is because both RF-power and processing power are approximately proportional to bandwidth, within SWaP2-constraints (in which "P2" refers to both RF and processing powers).

While IA may be thought of in various applications as a familiar cipher term relating to the encryption and decryption process, within $\in_{CRYPTO}$-coefficient, and Information Quality (IQ) has been discussed above, the IS and IH require further explanation. In particular, the IS is related to the protection of a location of source information, while the IH may be considered a more general term introduced by analogy to device (hardware) hardening against harsh environmental conditions. This is, because, even in the case of ideal crypto system, the lossy (video) compression and environmental noise introduces additional errors, as discussed above.

Figure 49:
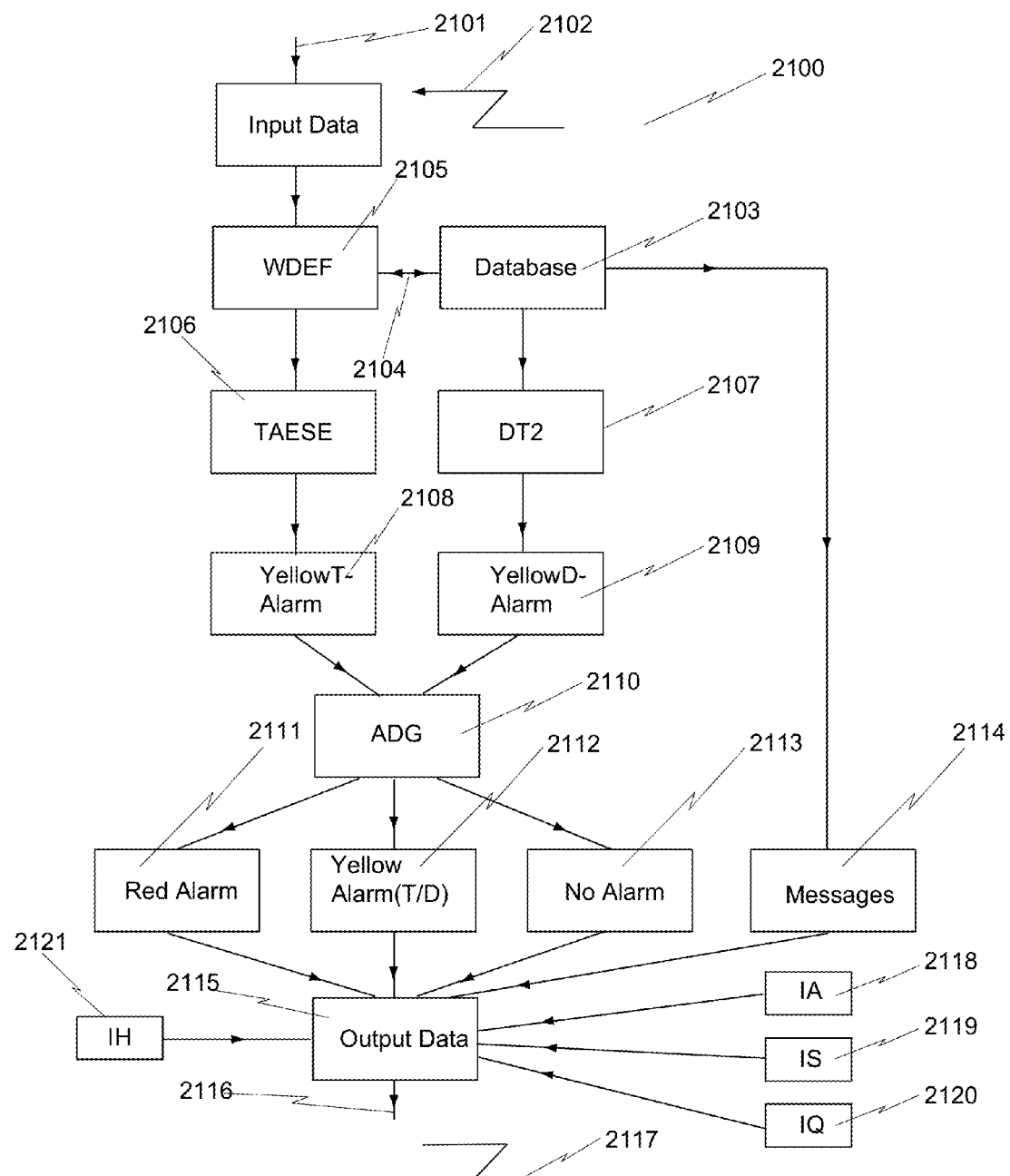
FIG. 49 is a diagram illustrating an example of a CON-OPS 2100 for a weather station such as a C2 Weather Sensor System (C2WS2) in accordance with one embodiment of the technology described herein.

FIG. 49 is a diagram illustrating an example of a CON-OPS 2100 for a weather station such as a C2 Weather Sensor System (C2WS2) in accordance with one embodiment of the technology described herein.

This exemplary systemic Weather Station with C2 capability has three (3) sources of weather data: (1) weather data from its own sensors 2101, (2) weather data from other weather stations, and (3) weather data from the Command Control Center (CCC) 2102. In one embodiment, weather data such as weather data 2102 can be received through one or more wireless (RF) communication channels, and its own database 2103. The double arrow 2104 is provided to illustrate the fact that in various embodiments the database 2103 can support various summaries. Examples of these summaries can include: tables, look-up tables, and other lists, which can work for both TAESE (Truthing-based Anomalous Event Software Engine) 2106 and DT2 (Data Topologic Transfer) 2107 (the $1^{st}$ one working in the digital domain), while the $2^{nd}$ one may be working in the analog domain. The phrase "analog domain" can be used to refer to digital experimental and estimation data that are transferred into a topologic continuous domain, including linear and non-linear DTS (Digital Topologic Singularities). The example DTS structure shown in FIG. 49 shows an example in which digital data is transferred to an analog (topological) domain, and, by heuristic, or semi-heuristic processes is transferred to a digital DTS. In various embodiments, a linear DTS may include: maxima, minima, inflection points, higher inflection points (for higher order differentials), and above-threshold points, while non-linear DTS may include various types of catastrophes.

The TAESE 2106 can be configured to generate a yellow alarm or rather a T-alarm (or no alarm) 2108; while the DT2 2107 can also generate a yellow alarm or rather a D-alarm 2109 (or no alarm). Both yellow alarms may be synthesized within an Autonomous Decision Generation (ADG) subsystem 2110. If two yellow alarms are produced for the same sample, the ADG may be configured to produce a red alarm. If only one yellow alarm is produced by either of 2108 or 2109, the T/D yellow alarm may be produced 2112. If neither yellow alarm is produced no alarm is generated, thus defining the soft-decision process. In parallel, the database 2103 can be configured to produce messages 2114 as a kind of relay with, for example, minimum data micro-processing (µP) or only micro-controlling (µC). These alarm outputs 2111, 2112, 2113 and messages 2114 may be transmitted to output data interface 2115, which can further re-transmit these messages to devices such as, for example, a PC cartridge or other device 2116 whether via a wired link or wirelessly 2117.

Figure 50:
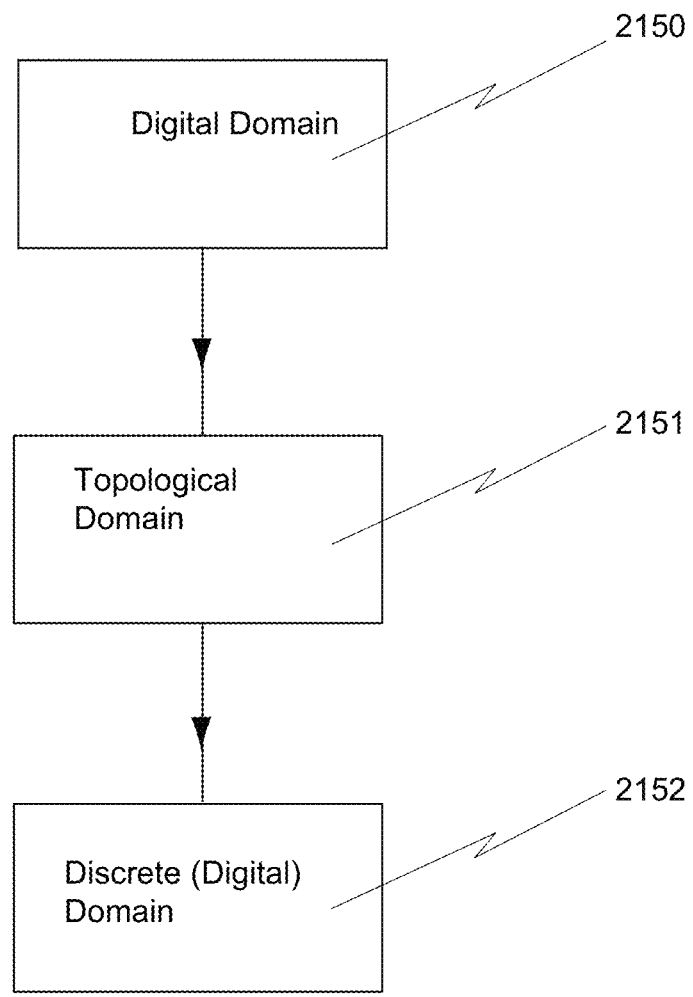
FIG. 50 is a diagram illustrating a cross-domain DT2 structure in accordance with various embodiments of the technology disclosed herein.

FIG. 50 is a diagram illustrating a cross-domain DT2 structure in accordance with various embodiments of the technology disclosed herein. In the example shown in FIG. 50, an example of the detailed cross-domain DT2 structure 2109 is presented. This example includes Including digital (input) measurement and estimation data 2150, topological (analog) domain 2151, and, again, digital domain, 2152. As described above, this "cross-domain" operation is useful to obtain discrete events 2152 from continuous 2151 which was synthesized from digital input data 2150.

Referring again to FIG. 49, the output data 2115 may be constrained by Information Assurance (IA) 2118, Information Security (IS) 2119, Information Quality (IQ) 2120 and Information Hardening (IH) 2121 as explained briefly above in accordance with the example embodiments. These are also discussed in greater detail below.

Further embodiments relating to specific solutions for Information Constraints IA, IS, IQ, and IH are now described.

Information Assurance.

The Information Assurance (IA) may be related to data cipher operations such as, for example, data encryption and decryption (i.e., transformation of data from plain text or clear text to cipher text and vice versa). The cipher key in various embodiments can include two parts or two half-keys: encryption keys and decryption keys. The cipher key can be a symmetrical key or an asymmetrical key. In the case of asymmetrical keys, the encryption half-key is usually a public key while the decryption half-key is usually a secret key. Therefore, if the public key is transmitted to a transmitter party, this party can only encrypt the data and it is not able to decrypt encrypted data.

Dealing with situations involving a cross-domain of red and black data they present challenge. However, various embodiments of the disclosed technology are not concerned with the crypto key but are instead concerned with the other half-key. In various embodiments, the other key can be a key used to enable communications. Accordingly, by way of nomenclature, this key can be referred to from time to time as a "turn-on-engine" key or a TOE key for short. Conventional keys for turning on or turning off a process are typically mechanical or electronic keys. In contrast, in various embodiments the TOE key may be implemented, for example, as an RF key. The "turn-on-engine," or TOE-operation, can be analogous to that function for car key. In other words, without a "turn-on-engine" key applied to a weather station, the weather station will not operate because it cannot be turned on. Likewise, after the TOE-key is removed, the weather station will in various embodiments stopped communicating.

While various of these features may be known, embodiments of the disclosed technology include an additional feature of the TOE-key. For example, in some embodiments the TOE-key is an RF-key. More specifically, the TOE-key may be implemented in various embodiments to be wirelessly connected with the key owner in such a way that he/she keeps in his/her pocket the additional sub-key, which is RF-connectable with the TOE-key. This can be implemented, for example, as an RF proximity connection with a maximum connection distance (e.g., up to 50 m i.e., for >50 m—this connection is broken). Therefore, even if RF proximity TOE-key is lost or stolen, it cannot be used to turn-on the weather station (all functions can be locked or just communications, for example) unless the thief is nearby.

Figure 51:
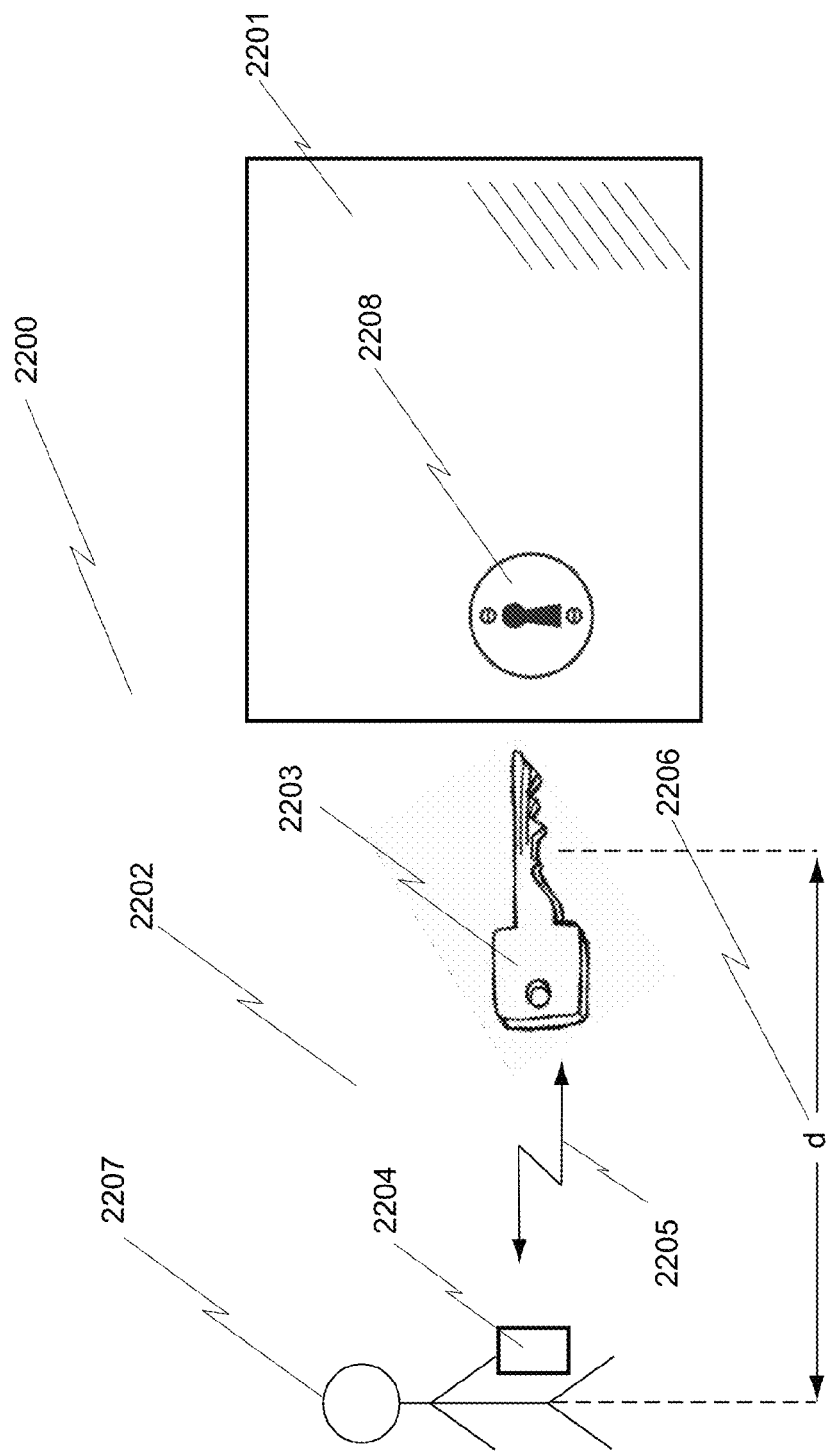
FIG. 51 is a diagram illustrating an example of an RF TOE key implemented as an RF proximity key in accordance with one embodiment of the technology disclosed herein.

FIG. 51 is a diagram illustrating an example of an RF TOE key implemented as an RF proximity key in accordance with one embodiment of the technology disclosed herein. As illustrated in the example of FIG. 51, the RF TOE key 2202 comprises 2 parts 2203, 2204. These two parts 2203, 2204 can be communicatively coupled via wireless connection 2205. In various embodiments, wireless connection 2205 can be implemented as an RF connection, however alternative wireless connections can be implemented. In various embodiments, the communication between parts 2203 and 2204 can be two-way communication to allow information to flow between the two parts 2203, 2204 in both directions.

As noted above, in various embodiments, the wireless connection 2205 can be distance limited to provide a measure of security by requiring the 2 keys to be within a certain distance of one another for operation. Accordingly, in the example illustrated in FIG. 51, the wireless connection 2205 is only operable when the 2 parts are within the maximum connection distance, d, 2206. In some embodiments there can be user specific requirements for the use of key 2203. However, in other embodiments, key 2203 can be used by anybody, but the holder 2207 of subkey 2204 (e.g. in his or her pocket, or in his or her possession) must remain within the predetermined distance, d, 2206 such that:

$$d \leq d_0 \tag{122}$$

where $d_0$ is some threshold distance, defined by the specification of the wireless electronics. In various embodiments, the maximum distance, d, is in the range of d~20-50 m, however other distances can be used.

Accordingly, in order to operate the weather station 2201, the key owner or holder 2207 must either put key 2203 into its key slot 2208 him or herself, or must be within the maximum distance when another person put key 2203 into its key slot 2208. Although illustrated and described as a conventionally shaped key with a corresponding key slot, other shapes sizes and configurations of keys can be used for key 2203. Key 2203 can be implemented in any of a number of forms of mechanical, electronic, or electromechanical keys they can be used to "unlock" weather station 2201.

Because in such embodiments one person can be designated as the keeper of key 2203, and another different person can be designated as keeper of the subkey 2204, this further increases the security of the connection (i.e., IA) and information security (IS). Where the condition as set forth in equation (123) is broken, weather station 2201 cannot be turned on for operation. In some embodiments, the key arrangement requires that the keeper of key 2204 be in proximity to key 2203 at all times during operation or operation of the weather station 2201 is shut down. This can result in a high security operation for the weather station 2201, assuming that the battery system of subkey 2204 is sufficiently hardened.

In addition to the information security and information assurance aspects provided by security solution described above with reference to FIG. 51, additional or alternative Information Security (IS) solutions can be considered as protection of the location of the RF source related to Weather Station. This is because weather stations operating (especially those operating in remote locations) may be or designed to communicate through satellite channels that can be spotted. Accordingly, for purposes of information security, it may be preferable to not disclose the location of some critical person or unit.

Figure 52:
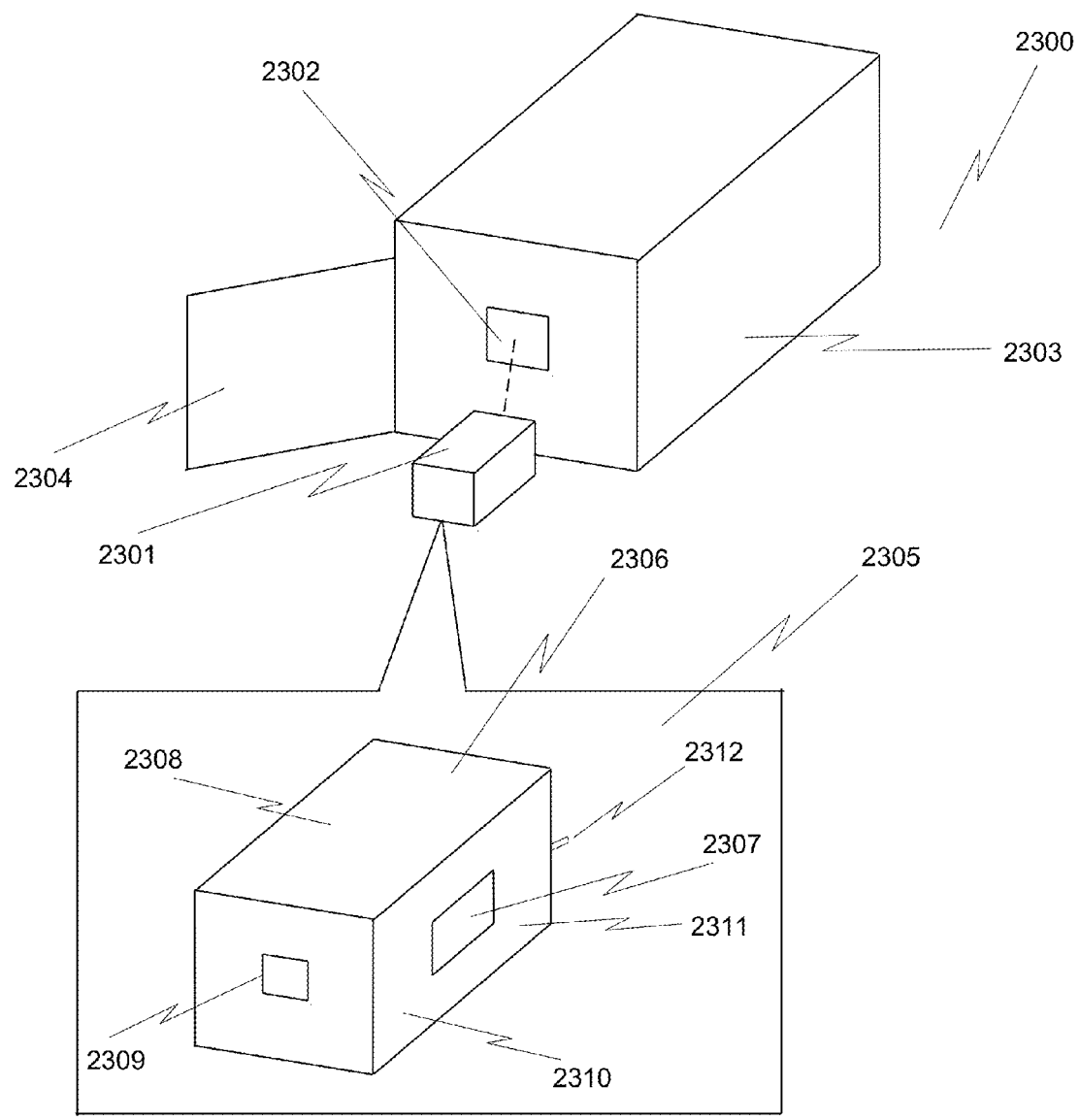
FIG. 52 is a diagram illustrating an example of a weather station cartridge in accordance with one embodiment of the technology disclosed herein.

Therefore, some embodiments use a cartridge type solution 2300. FIG. 52 is a diagram illustrating an example of a weather station cartridge in accordance with one embodiment of the technology disclosed herein. Referring now to FIG. 52, in this example a weather station cartridge 2301 is designed to be inserted into a cavity 2302 (which may be of complementary shape or geometry to cartridge 2301). As this example illustrates, a cartridge door 2304 can be used to close off cavity 2302. In some embodiments, cartridge door 2304 can be configured with appropriate seals to provide weather sealing for cavity 2302 (and for cartridge 2301).

FIG. 52 also provides an illustration of an expanded view of an example cartridge 2306 (e.g. weather station cartridge (WSC) 2301). As this example illustrates, cartridge 2306 can include a housing 2308, memory 2307 (e.g., flash memory) and a GPS Beacon 2309, and vibration protection or dampening substance 2310.

The weather station cartridge 2301 can be implemented in such a way as to provide a plurality of functions, examples of which may include: extraction of high-bandwidth (such as video) data without troublesome cabling, including an adequate power source 2311 (e.g., battery power), data ground and power pins 2312 (+5 V, for example) and adequate electronics and mechanics; concealing a location of the cartridge since it can be brought to a location that does not use vulnerable RF-communication; high-quality transport of sensitive data (to avoid vulnerable RF-communications); etc.

Aspects of the technology in various embodiments relating to Information Quality (IQ) is addressed throughout this document. Various embodiments enhancer and prove information quality through the use of, for example, Bayesian Truthing (BT) and the sampling space with anomalous events as rare targets, or signals (5). These anomalous events are referred to herein as WAEVENTS in the case of the Weather Station. The WAEVENTS may be detected, selected and identified (ID) using a Cross Domain DT2 structure, an example of which is described with reference to in FIG. 49. WAEVENTS may also be detected, sometimes in parallel, using the TAESE (Truthing-based Anomalous Event Software Engine), which in some embodiments relies on an Autonomous Decision Generation (ADG) sub-system 2110. Particularly, various embodiments can utilize the ADG 2110 as a digital assistant to facilitate operation of the weather station in modes beyond that of merely a Data Transfer System (DTS). In various embodiments, the WAES (Weather Anomalous Event System) can be implemented using the C2WS2 structure, an example of which is illustrated in FIG. 49, and may further include the TAESE (Truthing-based Anomalous Event Software Engine), an example of which is described in detail with reference to FIG. 24.

Protection of information in various embodiments may be referred to herein as Information Hardening (IH). Such reference is used from time to time by analogy to device hardening, which typically refers to some level of protection against adverse or hostile environment (including TEMPEST countermeasures). In particular, the IH generally refers to hardening of information against a harsh environment that could otherwise lead to increasing Bit-Error-Rate (BER). Embodiments of an IH solution are discussed above as relating to minimization of bandwidth cost. In particular, increasing bit error rates dictates $\in_{FEC}$-increasing, as in Eq. (67), in the form:

$$B_A = \frac{B_0}{x(A-y)}; A = 1 - a; a = \varepsilon_{CRPYTO} = \varepsilon_{NET} \quad (123)$$

where: x=(CR) and y=$\in_{FEC}$, as well as:

$$\phi = \arcsin\left(\sqrt{\frac{y}{A}}\right) \quad (124)$$

where $\phi$ is a parameter as explained above with reference to FIG. 29.

According to Eq. (126), it can be seen that for $B_A$, $B_0$=constant, the following conservation relation exists:

$$x(A-y)=\text{CONSTANT}=I_0 \quad (125)$$

(where $I_0$ is an invariant).

This means that if the y variable increases; then, also the x variable increases. Thus, from Eq. (77), also $\phi$-parameter increases, according to the following causation relation:

$$(\text{BER})\uparrow \Rightarrow y\uparrow \Rightarrow x\uparrow \Rightarrow \phi\uparrow \quad (126)$$

Therefore, if the system has already been optimized using the (PSNR)-criterion, as in FIG. 29; then, with $\phi$ increasing as in Eq. (127), the system moves into: $\phi > \phi_0$, in the form:

$$(\phi=\phi_0) \Rightarrow (\phi>\phi_0) \quad (127)$$

The optimum solution for various applications may be to reduce the value $B_0$ (keeping $B_A$=constant), thus, reducing x, y values (and the value of $\phi$) and thus, in turn, returning to the maximum (PSNR) value (or, to the vicinity of this value):

$$(\text{PSNR})=U(\phi_0)=\text{MAXIMUM} \quad (128)$$

Figure 53:
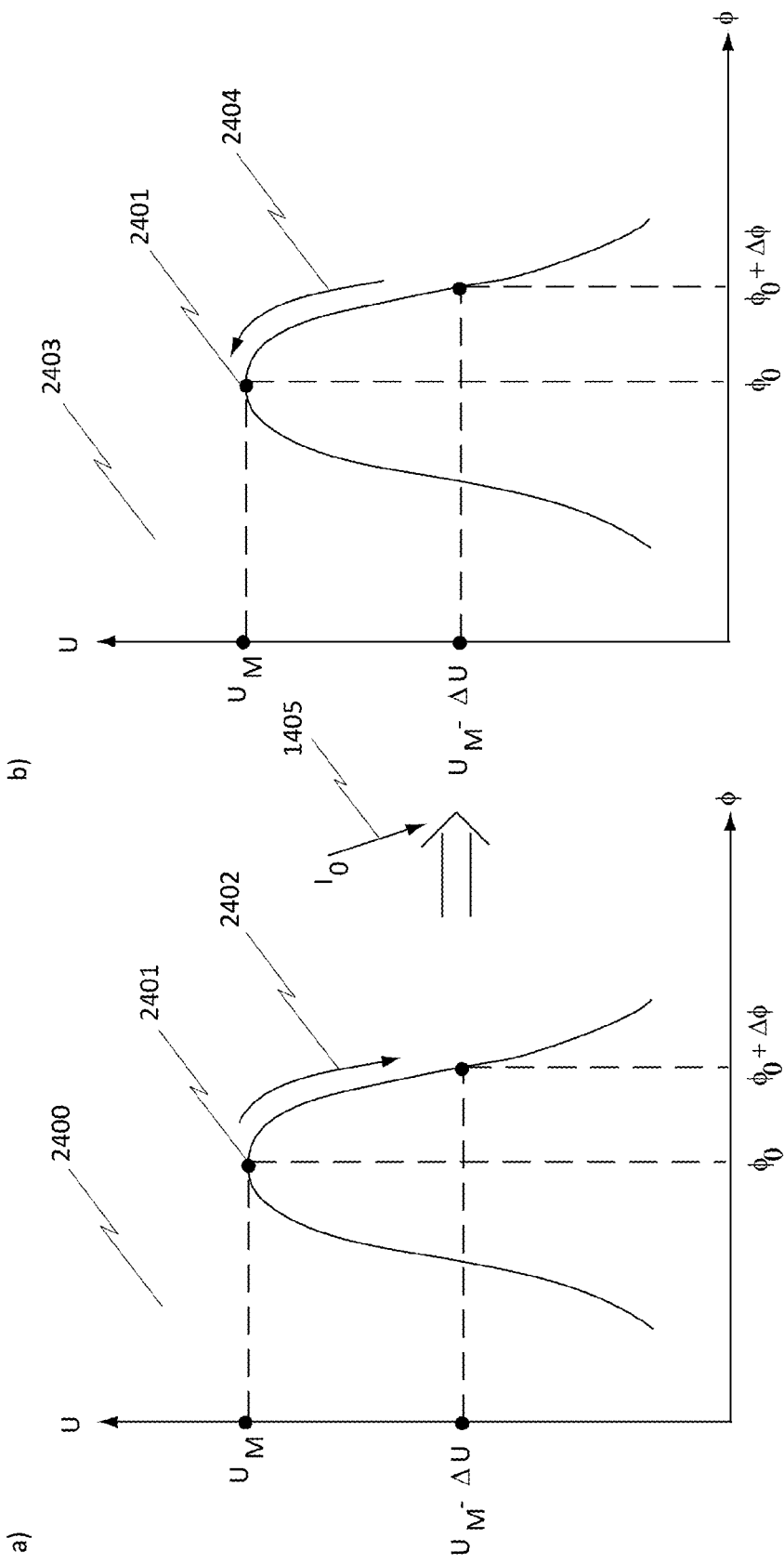
FIG. 53A is a diagram illustrating an example of a return-to-maximum procedure, including a decreasing U-value.
FIG. 53B is a diagram illustrating an example of a return-to-maximum procedure, including an increasing U value.

Therefore, the information hardening (IA), maybe closely related to minimizing the bandwidth cost, as shown in FIG. 53. Particularly, FIG. 53 is a diagram illustrating an example of a return-to-maximum procedure, including: (FIG. 53A) Decreasing U-value; (FIG. 53B) Increasing U-value.

In the example illustrated in FIG. 53, the procedure of "Return-to-Maximum", or RTM-procedure, is shown, including a decreasing U-value FIG. 53A) and an increasing U-value FIG. 53B), where U=(PSNR). In FIG. 53A, a decreasing $\Delta U$ as a result of increasing (BER) is shown at 2400. This leads to losing a maximum $U_M$ value 2401 due to an increasing $\phi$ parameter 2402. In order to increase the U value again as in FIG. 53B 2403, the system can be configured to return the $\phi$ value back to $\phi=\phi_0$ has seen at 2404. However, this is impossible unless $I_0$ value 2405 is reduced, which can only be done by reducing $B_0$ value according to Eq. (124).

An innovation associated with this is in the fact, that, due to the above procedure, the system can determine a level of reduction needed in the bandwidth $B_O$ value in order to return into the previous (PSNR)-value.

The reduction of the $B_O$ value in the case of video signal transmission can be accomplished by adjusting one or more of the following factors alone or in combination:

1) Display format (resolution)
2) Pixel dynamic range, in bpp
3) Frame Rate
4) Reducing color into black-white (grey)

In a similar manner, embodiments can be implemented to provide the (PSNR) maximization procedure when $B_O$=constant, but $B_A$ is not constant. However, the latter case is less practical than the previous one.

The designation C2WS2 (C2 Weather Sensor System) as used herein in various embodiments refers to a Weather Sensor System with Command-Control (C2) capability. In particular, such a system should preferably be compliant with Command-Control-Center (CCC), including in the IA-sense. For example, in the case of highly sensitive information, the CCC can send a public encryption key in order to receive weather information data encrypted by an asymmetric cipher key. In general, the C2WS2 can be configured to receive data from its own meteorological sensors: $S_1, S_2, \ldots, S_n$, and from other Weather Station sensors through the CCC, mostly by satellite communication channel, or by other wired or preferably wireless communication links. In various embodiments, these data may be parallelized through Wireless (or wired) Sensor Star Communication Interface (WSSCI). Then, the weather event messages may be pre-structured as in FIG. 28, for example, within Weather Data Event Format (WDEF). When the Weather Anomalous Event Ranking (WAER) exceeds some threshold value, then such event may be classified as yellow alarm, due to the TAESE (Truthing-based Anomalous Event Software Engine). In parallel, the weather data may be summarized through the DT2 (Data Topologic Transfer), as in FIG. 49.

Figure 54:
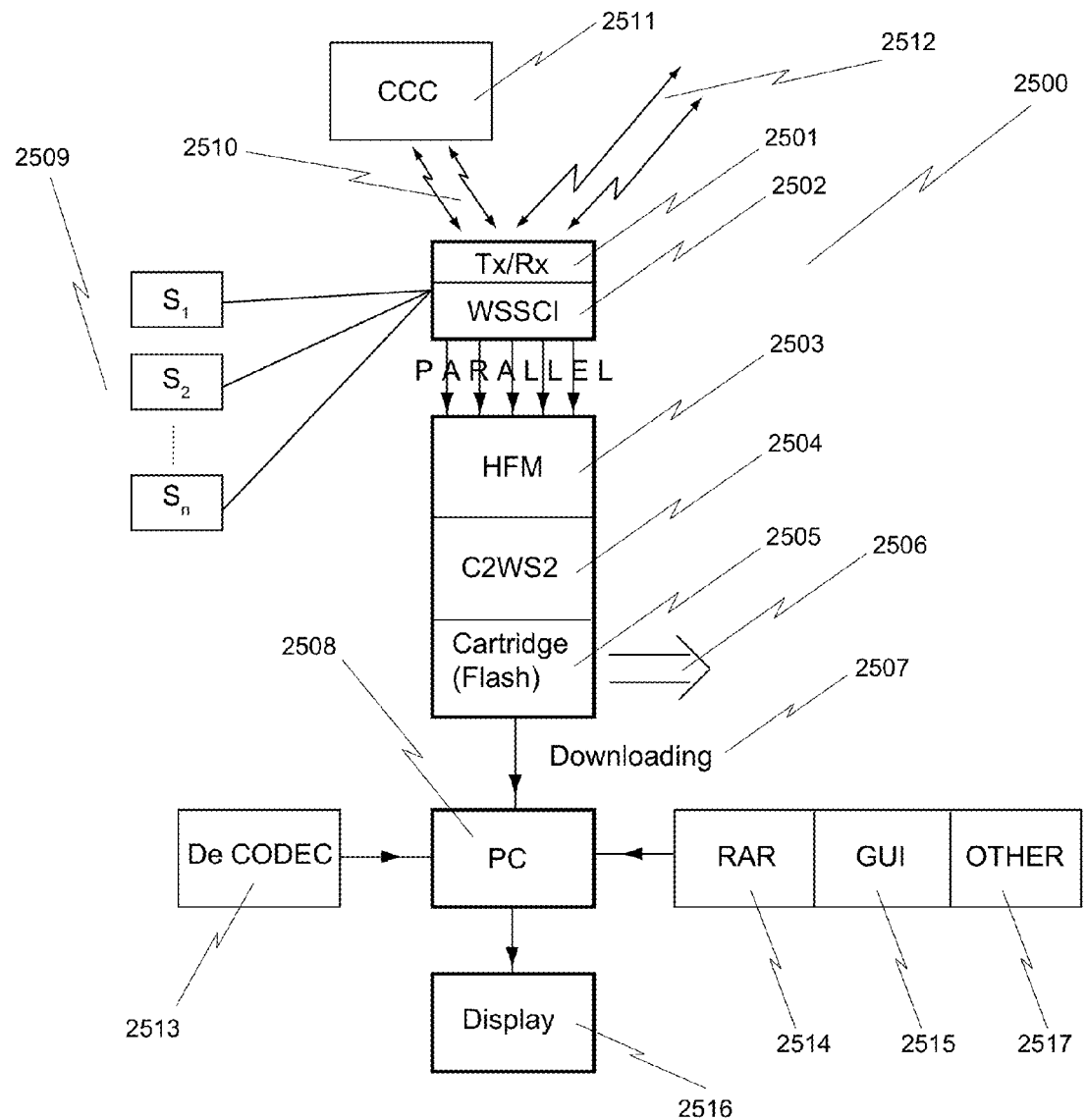
FIG. 54 is a block diagram illustrating an example system including a transmit/receive physical layer and a wireless (or wired) Sensor Star Communication Interface, which may be configured to perform compression and decompression as well as OVH-operations such as, for example: IA, FEC (Forward Error Correction), cipher, and others, within Data Transfer System (DTS).

FIG. 54 is a block diagram illustrating an example system 2500 including a transmit/receive physical layer 2501 and a wireless (or wired) Sensor Star Communication Interface 2502, which may be configured to perform compression and decompression as well as OVH-operations such as, for example: IA, FEC (Forward Error Correction), cipher, and others, within Data Transfer System (DTS).

The example system illustrated in FIG. 54 also includes advanced operations and components, including Hardened Flash Memory (HFM) 2503, a C2WS2 (C2 Weather Sensor System) 2504, and cartridge 2505. Optionally, the information can be transferred by cartridge 2505, by physical means 2506, or downloaded 2507 to a PC (Personal Computer) 2508 or other work station or computing device. In parallel, the weather information data can be received by the weather system's own sensors $S_1, S_2, \ldots, S_n$ 2509, and communicated wirelessly 2510 from or to the CCC 2511. Also, the information can be wirelessly transmitted/received through satellite communication channel, or other wireless channel from/into other sources 2512.

In parallel, the PC 2508 is connected with extra DeCO-DEC 2513, RAR (Random Access Retrieval) 2514, a Graphical User Interface (GUI) 2515, display 2516 and other sub-systems 2517.

The transmission of encryption keys and injection keys through an RF interface can be a challenge due to errors that can arise with wireless communications. In many circumstances, any error (even single error) in communication of that data representing those keys, sometimes referred to as Information Assurance (IA) keys, can render an encryption or decryption system inoperable. This damage often cannot be corrected in sufficient time relative to the time criticality of the security operation. A relevant-for-the-encryption operation (REO) time may be defined in such a way that, during the REO time, breaking an encryption key would compromise the IA of the system; i.e., if during the REO-time, $t_R$, the encryption key (or, injection key) is broken, then, the IA of the overall system is compromised, leading to the following relation:

$$t \geq t_R \Rightarrow IA \text{ is not compromised} \quad (129a)$$

$$t < t_R \Rightarrow IA \text{ is compromised} \quad (129b)$$

Eqs. (130a) and (130b) define the REO-time, $t_R$.

For the purpose of various embodiments, the encryption key can be defined as comprising two half-keys: an encryption half-key, EK, and a decryption half-key, DK.

For asymmetric keys, based on factorization of two large prime numbers (or, primes), PN1 and PN2; the EK, represented by PN1 is public, while the DK is secret. With asymmetric keys, a receiver (Rx) of cipher text (i.e., encrypted text, in contrast to non-encrypted plain text) can be configured to send the public EK/PN1 to the transmitter (Tx). Then, the transmitter applies this public half-key to encrypt the text and sends to Rx. In this moment, the transmitter is not able to decrypt its own cyber text. After sending the cyber text by Tx into the Rx, the Rx decrypts this cyber text into plain text using the secret DK, representing both primes PN1 and PN2.

For symmetric keys, on the other hand, both half-keys, the EK and the DK are maintained as secret. In any case (i.e., for both symmetric and asymmetric keys), the transmission of encryption key through RF channel is a challenge, related to Eq. (130) conditioning.

As noted above, injection keys may be analogized to a "start-engine" key for an automobile. In various embodiments, injection keys can be mechanical, electronic, or a combination of the 2. Therefore, the injection key, IK, is referred to herein in some embodiments as the "turn-on-key" of the encryption system.

Embodiments of the technology are related to IA-secure transmission of both encryption and injection keys through an RF (wireless) channel, which is typically much more prone to errors than cable channels, or wired channels. Embodiments may also be applicable to optical wireless (so-called Free-Space-Optics (FSO)) channels, acoustic channels, and other wireless channels.

An RF channel accordance with various embodiments of the technology disclosed herein is now described. Consider an example binary data stream such as: 1, 0, 0, 1, 1, 1, 0, 1, . . . , which should be highly robust, or quasi-robust (QR). Of course, any binary data stream can be protected by error-correcting codes; such as, for example, Forward-Error-Correcting (FEC) codes. However, those codes are not perfect, because they are limited to cases in which the number of errors, m, for a number of bits, n, is a relatively small number (e.g., typically m≤2, while the case of m>2 is not protected). This is typically not a problem for most wired channels when the probability of error per bit, q, is very small. However, this property may be coming problem when the communication channel is wireless, whether RF, optical, acoustic, or, otherwise. This is because, in such cases, the error probability, q, may not always be sufficiently small because it depends on weather and other factors that can affect the communication link.

In general, due to the statistical nature of bit errors, the problem does exist, especially for wireless communication channels. This is, because, applying the FEC codes for large m-numbers would be costly in terms of bandwidth. In other words, the bandwidth overhead (OVH) cost of protecting the data stream would be too high. Embodiments of the technology disclosed herein can be implemented to address this situation.

For injection keys, a time delay IA problem may also exist. This can be validating case in which, in addition to parallelity, the simultaneousness of the IA keys is issue. This is due to not only weather conditions, but also because network OVH control introduces uncontrollable time delays that can be both statistical and deterministic.

Weather factors such as, for example, air turbulence, can introduce multi-path errors and other statistical error problems, even without obstacles. In particular, air turbulence introduces dielectric constant, e, fluctuations, which in turn caused the refractive index, n, of the communication channel to fluctuate. One reason for this is that, for non-magnetic media ($\mu \cong \mu_o$), the refractive index, n, is $n=\sqrt{\in}$, where $\in$-relative dielectric constant. Higher temperature gradients, $\Delta T$ (T in Kelvin), higher winds, etc., create higher air turbulence, which in turn can cause higher refractive index, $\Delta n$, fluctuations. High temperature gradients can exist, for example, in the vicinity of the so-called marine layer, for example. Typically, the higher the air transparency, the higher the air turbulence. In addition, high RF-signal attenuation, due to: fog, mist, etc., may also create statistical binary errors, (as well as other unwanted effects). This description sets forth some of the multitude of causes of statistical errors within RF communication channel.

For the purpose of this technology this document also discusses the non-obvious statistical relation between probability of error, or errors, $W_n(m)$, probability of error per bit, q, and bit-error-rate (BER).

Bit-Error-Rate (BER).

BER testers measure BER values in the following way, based on a definition of absolute (i.e., not conditional) probability, p', in the form:

$$p' = \left\{ \lim_{n \to \infty} \left( \frac{\text{Number of Errors}}{\text{Total Number of Bits Per Data Stream}} \right) \right\} \quad (130)$$

Ensemble Average

The limit shows the number of bits tending to infinity, ∞. For smaller n-numbers, this relation fluctuates, and then it tends, asymptotically, to define the limit defined by Eq. (131), assuming that the statistical ensemble is stationary and ergodic, which is the typical case of an RF-channel if air turbulence is also a stationary random process. Otherwise, the more complex case of non-stationary processes must be considered as discussed, for example, in the book by M. Born, E. Wolf: *Principles of Optics*, Cambridge Univ. Press, 7$^{th}$ Edition, 1999; Section 10.2, A Complex Representation of Real Polychromatic Fields.

It is noted that the nature of experimentation is that experimentation is unable to provide a priori information fully from only experimental data. In fact, only a combination of experimental and theoretical data allows us to obtain a priori information (in contrast to a posteriori information which can be obtained from experiment, only). However, only a priori information enables a predictive analysis, which is also the subject of this technology. This is the fundamental epistemologic problem, discussed by Kant, Mckay, Brillouin, and others, which is relevant for the disclosed technology. A further complication is the relation between the theory and experiment as well as a connection of this relation to entropy, as discussed, for example, by L. Brillouin in: *Science and Information Theory*, Academic Press, 1956.

Various embodiments of the technology disclosed herein can be configured to formulate practical conditions for obtaining a quasi-robust (QR) RF communication channel that allows the systems to send IA-secure encryption and injection keys. In particular, Eq. (131), defining what is referred to herein as a "smoothed periodogram," generalized to binary processes, shows that, for stationary and ergodic statistical processes:

$$\lim_{n \to \infty} p' = q = (\text{BER}) \quad (131)$$

where q is the probability of error per bit. Then, the probability of no-error per bit is: p=1−q. Thus, the following conservation relation can be obtained:

$$p+q=1 \quad (132)$$

In the view of the above discussion, the probability of m-number of errors within a binary data stream of n-number of bits, $W_n(m)$, is not equal to q probability:

$$W_n(1) \neq q \quad (133)$$

which is a non-obvious relation.

It can be shown that, under the above statistical assumption, the NEP (Number of Errors Probability) equal to:

$$(\text{NEP}) = W_n(m) \quad (134)$$

Leads to the Poisson Statistical Distribution for small m-numbers, and large n-numbers, where $W_n(m)$ is the probability of m-number of errors and n is the number of bits per given data stream. It should be noted that the difference between Eq. (131) and Eq. (135), which is not obvious, leads to the nonobvious relation (134). This is because Eq. (131) is defined by asymptotic limit:

$$n \to \infty \quad (135)$$

while Eq. (135) holds for finite n-numbers.

The number-of-errors probability, NEP (not to be confused with noise-equivalent-power for optical signals), is defined by binomial statistical distribution (Pascal, Newton, Bernoulli), in the following form:

$$W_n(m) = q^m p^{n-m} \binom{n}{m} \quad (136)$$

where $$\binom{n}{m} = \frac{n!}{(n-m)!m!} \quad (137)$$

and n! is a factorial, defined as: n!=n(n−1)(n−2) ... (1), with 1!=1, and 0!=1, and the NEP-probability, $W_n(m)$, satisfies the following conservation relation:

$$\sum_{m=0}^{n} W_n(m) = 1 \quad (138)$$

Eq. (139) shows that Eq. (137) is, indeed, valid for a finite n-number, and, shows that the number of errors, NEP, holds for any m-number between m=0 (no errors) and n. Thus, it is a certainty. Also, the following binomial relations hold for the statistical mean, $\overline{m}$, and standard deviation (or, dispersion), $\sigma$:

$$\overline{m}=nq; \ \sigma^2=npq; \quad (139ab)$$

It should be noted that, for RF-channel: $q \ll 1$. In contrast, the mean value, $\overline{m}$, does not need to be small. However, for a quasi-robust (QR) RF-channel, the $\overline{m}$ value should be much smaller than 1:

$$\overline{m} \ll 1 \quad (140)$$

Also, although for $q \ll 1$, $p \cong 1$:

$$q \ll 1 \Rightarrow p \cong 1 \quad (141)$$

the $p^n$-value can be still small.

Thus, for $q \ll 1$, Eqs. (140ab) become, $$\overline{m}=nq; \ \sigma=\sqrt{\overline{m}}; \text{ for } q \ll 1 \quad (142ab)$$

For small q-numbers and large n-numbers:

$$q \ll 1; \ n \gg 1 \quad (143ab)$$

This is the case of the IA-keys, because, for typical RF-channel, q and n can be given as $$q=(10^{-6}-10^{-4}); \text{ and, } n=(100-1000) \quad (144ab)$$

This is, because, for n=256-key-length, header OVH, encryption OVH, and FEC-OVH, and further network OVH are added.

However, for the general RF-channel, the following NEP-formulas exist for small m-numbers:

$$W_n(0)=q^0 p^n(_0{^n})=p^n \quad (145a)$$

$$W_n(1) q n p^{n-1} \quad (145b)$$

$$W_n(2) = q^2 p^{n-2} \frac{n(n-1)}{2} \quad (145c)$$

$$W_n(3) = q^3 p^{n-3} \frac{n(n-1)(n-2)}{6} \quad (145d)$$

and, we can continue these exact binomial formulas until m=n.

For OR-channel, however, we have: $\overline{m} \ll 1$; thus, the approximate formulas, valid for $\overline{m} \ll 1$, and small m-numbers, are $$W_n(0)=p^n \quad (146a)$$

$$W_n(1) \cong \overline{m} p^n \quad (146b)$$

$$W_n(2) \cong \overline{m}^2 p^n \left(\frac{1}{2}\right) \quad (146c)$$

$$W_n(3) \cong \overline{m}^3 p^n \left(\frac{1}{6}\right) \quad (146d)$$

$$W_n(m) = W_n(0) \left(\frac{(\overline{m})^m}{m!}\right) \quad (146e)$$

where, Eq. (147e) is valid only for:

$$m \ll n \quad (147)$$

According to condition (148) (valid only for small m-numbers relative to the n-value) Eq. (147a) can be applied in the form:

$$W_n(m) = (1-q)^n \frac{(\overline{m})^m}{m!} = e^{n \ln(1-q)} \frac{(\overline{m})^m}{m!} \quad (148)$$

where ln ( . . . ) is natural logarithm, and e is natural logarithm base. However, for $q \ll 1$, we obtain the following linear Taylor series' term:

$$\ln(1-q) \cong -q \quad (149)$$

thus, Eq. (149) becomes:

$$W_n(m) = e^{-\overline{m}} \left(\frac{(\overline{m})^m}{m!}\right) \quad (150)$$

which is the Poisson distribution, used in the theory of radioactivity, for example. However, the classic Poisson statistics are obtained as a limit to infinity ($n \to \infty$) for $q \ll 1$ of binomial distribution, in the form:

$$\lim_{n \to \infty} W_n(m) = e^{-\overline{m}} \frac{(\overline{m})^m}{m!} \quad (151)$$

which looks identical to Eq. (151), but it is derived in a different way, as shown, for example, in: H. Margenau and G. M. Murphy, *The Mathematics of Physics and Chemistry*, Robert E. Krieger Publishing Company, 1976. In contrast, Eq. (151) is obtained, independently, assuming condition (148) is satisfied, which is exactly equivalent to the QR-wireless communication channel. This is an argument that Eq. (151) is not obvious for a QR-wireless communication channel.

Conditions for the QR-channel (e.g., a communication channel that allows sending the IA keys (including injection and encryption key)) satisfying Eq. (130a) as a basic condition of effective QR-channel is now described. For these purposes, embodiments of the technology should satisfy the following conditions:

A. Condition (141) must be satisfied
B. Condition (148) must be satisfied
C. The error-correction code protects against:

$$m < m_o \quad (152)$$

D. Statistical Ensemble (131) must be stationary and ergodic
E. Condition (130a) is satisfied Then, according to Eq. (153), Eq. (151), for $m=m_o$, becomes, $$W_n(m_o) = e^{-\overline{m}} \left(\frac{(\overline{m})^{m_o}}{m_o!}\right) = W_n(0) \frac{(\overline{m})^{m_o}}{m_o!} \quad (153)$$

The QR-channel is defined as a wireless communication channel such that $W_n(m_o)$ is sufficiently small value in order to satisfy conditions: A, B, C, D, E. It should be observed that, in contrast to other (theoretical) conditions, Condition C is an experimental one, which allows avoidance of so-called burst errors.

Condition A is based on Eq. (141), in the form:

$$\overline{m}=nq\ll 1 \quad (154)$$

then, according to Eq. (146a), and approximation (150), the probability of no-errors, $W_n(0)$, is $$W_n(0)=p^n \cong e^{-\overline{m}}=e^{-nq} \quad (155)$$

where q is the probability of error per bit, or BER, and n is the number of bits per data stream, which can include the IA key with OVH, including a header. However, in various embodiments, for the purpose of predictive error analysis, only total number of bits, n, counts.

In order to explain Condition A, we present number of bits, n, in decimal base, in the form:

$$n=10^a \quad (156)$$

where a is (usually) an integer, for simplicity, such as a=3, for example. Then, $n=10^3=1000$. The BER is a small number that can also be presented in decimal basis:

$$q=(BER)=10^{-b} \quad (157)$$

where b is (usually) integer, for simplicity, such as b=5, for example; then, $q=10^{-5}$.

For the sake of illustration, consider the constant value of $W_n(0)$-probability, leading to the following relation:

$$nq=\text{constant}=10^{a-b} \quad (158)$$

thus:

$$\log 10^{(a-b)}=a-b=\text{constant} \quad (159)$$

Figure 55:
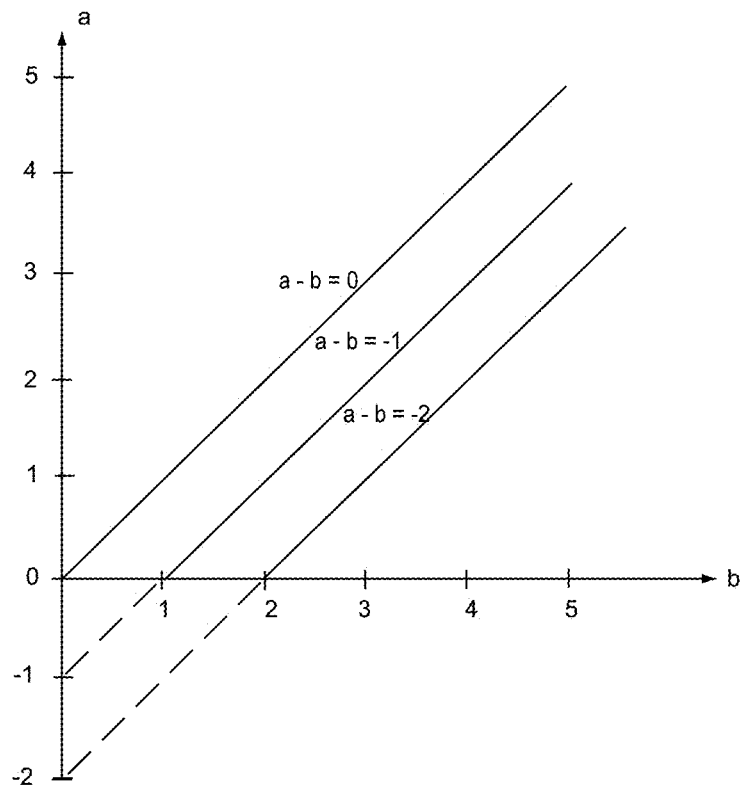
FIG. 55 is a diagram illustrating an example of a necessary condition of probability of a no-error per data stream.

This relation is illustrated in FIG. 55, for: a−b=0; a−b=−1; and a−b=−2. Particularly, FIG. 55 is a diagram illustrating an example of a necessary condition of probability of a no-error per data stream.

In Table 9, the corresponding values of nq and $W_n(0)$ are presented. We see, that, for larger negative number of (a−b), we obtain $W_n(0)$-values closer and closer to 1, with "number of nines" equal to |a−b|. For example, for a−b=−4, we obtain: b=a+4, and, for typical a=3 value, equivalent to n=1000, we obtain b=7, or BER=$10^{-7}$, as shown in Table 10.

TABLE 9

Corresponding Values of nq and $W_n(0)$ for (a − b) − Values

| a − b | 0 | −1 | −2 | −3 | −4 |
|---|---|---|---|---|---|
| nq | 1 | 0.1 | 0.01 | 0.001 | 0.0001 |
| $W_n(0)$ | 0.37 | 0.905 | 0.99 | 0.999 | 0.9999 |

TABLE 10

Corresponding Values of BER for b = a + 4, Defining QR-Channel

| a | 2 | 3 | 4 | 5 | 6 |
|---|---|---|---|---|---|
| BER | $10^{-6}$ | $10^{-7}$ | $10^{-8}$ | $10^{-9}$ | $10^{-10}$ |

According to Table 9, the (a−b)-value defines a QR-channel, the closer $W_n(0)$ gets to 1, the less space is left for (probabilities of) errors. The basic issue then is how long of a data stream can be accommodated for a given BER value (such as BER=$10^{-5}$, for example). Then, b=5, and assuming a "two nines" criterion, for example, leading to $W_n(0)$=0.99, the following can be derived from Table 9:

$$a-b=-2 \Rightarrow a=b-2 \quad (160ab)$$

In the case of b=5, or BER=$10^{-5}$, then a=3, or $n=10^3=1000$. In other words this is the maximum data stream length (1000 bits) that can be accommodated without exceeding the $10^{-5}$ BER value. This is illustrated in Table 10. From this it can be seen that the "two nines" criterion, equivalent to $W_n(0)=0.99$ and BER=$10^{-5}$, can be satisfied only for data streams not longer than $10^3$-bits in length. For α=4, for example $W_n(0)=0.9<0.99$. Therefore, the "two nines" criterion is not satisfied. This is explained in Table 11. For example, for $n=10^3$, $W_n(0)=0.99$ and therefore, the criterion is satisfied. However, for $n=10^5$, $W_n(0)=0.37<0.99$ and the criterion is not satisfied.

TABLE 11

"Two Nines" Criterion of QR-Channel for BER = $10^{-5}$

| a | 3 | 4 | 5 | 6 |
|---|---|---|---|---|
| $W_n(0)$ | 0.99 | 0.9 | 0.37 | 0.000045 |
| n | $10^3$ | $10^4$ | $10^5$ | $10^6$ |
| a − b | −2 | −1 | 0 | 1 |
| nq | $10^{-2}$ | $10^{-1}$ | 1 | 10 |

Figure 56:
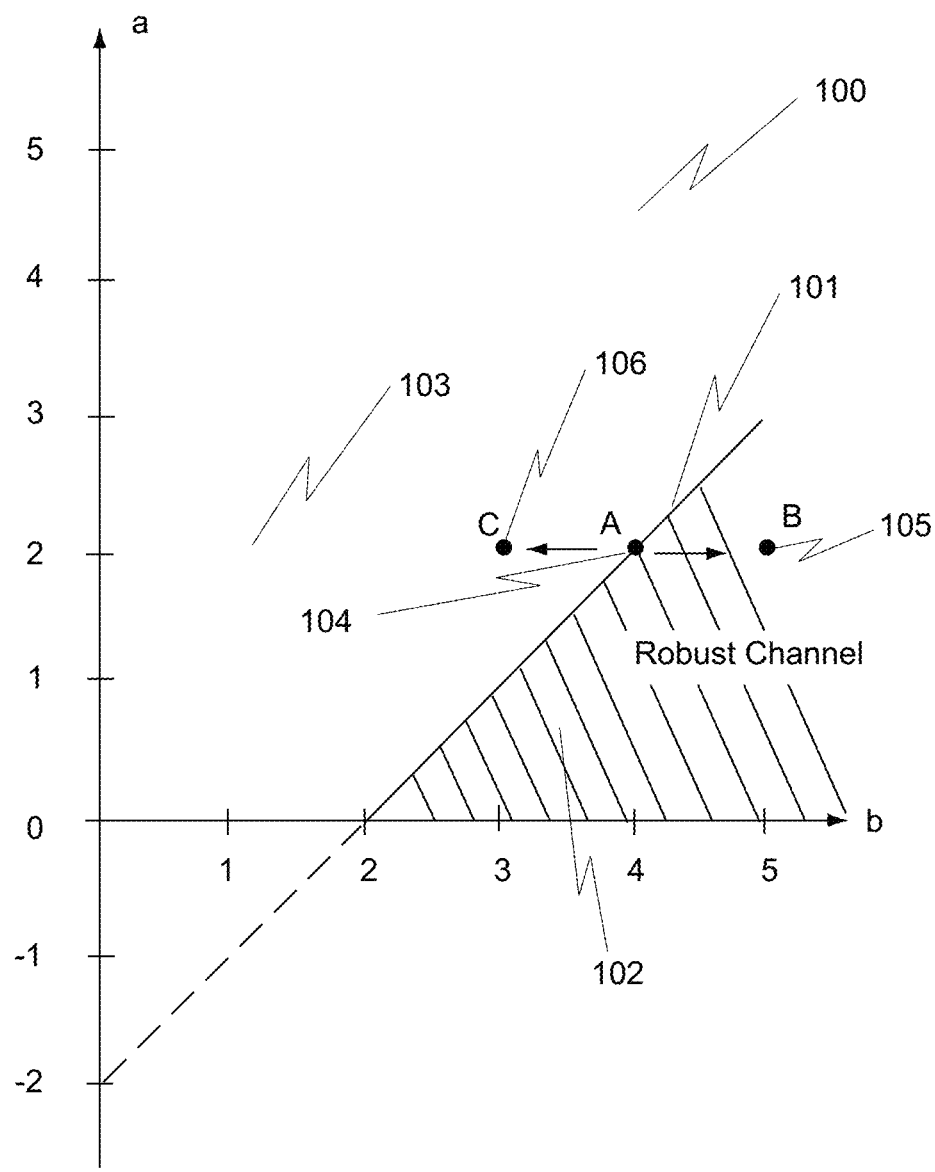
FIG. 56 is a diagram illustrating an example of the "two nines" criterion is illustrated.

In FIG. 56, an example of the "two nines" criterion 2600 is illustrated. The border line 2601 separates the robust channel area 2602 from non-robust channel area 2603. The robust channel area 2602 is illustrated by shading. The border line illustrates Eq. (161a), equivalent to $W_n(0)$-value of 0.99, as in point, A, denoted by 2604. Moving this point to B is equivalent to a transition from a−b=−2 into a−b=−3.

Point B, denoted by 2605, is thus in the robust channel area 2602. In contrast, point C, denoted by 2606, is not in the robust channel area 2602. This is, because, for such point a−b=−1, which is equivalent to a $W_n(0)$-value of 0.9, which is smaller than 0.99.

Condition B is based on Eq. (148), which leads the set of Equations (147) into the following form; assuming, Condition A is satisfied:

$$W_n(1) \cong W_n(0)\overline{m} \cong \overline{m} \quad (161a)$$

$$W_n(2) \cong \frac{1}{2}W_n(0)\overline{m}^2 \cong \frac{\overline{m}^2}{2} \quad (161b)$$

$$W_n(3) \cong \frac{1}{6}W_n(0)\overline{m}^3 \cong \frac{\overline{m}^3}{6} \quad (161c)$$

These equations are essential for the QR-channel. This is because, by applying the error-correcting code (such as FEC-code), the number of errors, m, smaller than $m_o$, according to Eq. (153) can be corrected. For example, for $m_o$=3, the data stream can be protected against one and two (m=1, and m=2) errors. Then, the $W_n(3)$ probability must be small, according to Eq. (162c). According to Table 11, for: $\overline{m}$=nq=0.01, the "two nines" criterion is satisfied, while for $\overline{m}$=0.001, the "three nines" criterion holds, according to Table 9. According to Eq. (162c), for $\overline{m}$=0.001, the probability of three errors, $W_n(3)$, is equal to ($10^{-9}$/6). This is close to $10^{-10}$, which is a very small probability. Table 12 shows this probability for various statistical mean, $\overline{m}$-values.

TABLE 12

Probability of Three Errors for Various Statistical Mean Values

| $\overline{m}$ | 0.1 | 0.01 | 0.001 | 0.0001 |
|---|---|---|---|---|
| $W_n(3)$ | $1.67 \cdot 10^{-4}$ | $1.67 \cdot 10^{-7}$ | $1.67 \cdot 10^{-10}$ | $1.67 \cdot 10^{-13}$ |

This shows that, assuming one and two error corrections, the probability of not-corrected three errors is very low for $\bar{m} \leq 0.01$, which is equivalent to $n=10^3$, for (BER)=$10^{-5}$. Table 13 shows acceptable BER values for various channel robustness levels, characterized by different $W_n(3)$-values, assuming $n=1000$.

TABLE 13

Acceptable (BER)-Values for Different Channel Robustness Levels, Assuming n = 1000

| $W_n(3)$ | $1.67 \cdot 10^{-4}$ | $1.67 \cdot 10^{-7}$ | $1.67 \cdot 10^{-10}$ |
|---|---|---|---|
| $\bar{m}$ | 0.1 | 0.01 | 0.001 |
| (BER) | $10^{-4}$ | $10^{-5}$ | $10^{-6}$ |

Condition D relates to the above-described Weather Anomalous Event System (WAES) and detection by a Weather C2 Sensor of anomalous events by Truthing-based Anomalous Event Software Engineer (TAESE). It is also related to two reference papers, related to C3I (Command, Control, Communication & Intelligence) systems, presented and published by the Physical Optics Corporation. These papers are related to a Digital Decision Support (DDS), presented at SPIE Defense+Security+Sensing (DSS) Symposium; Baltimore, Md., 6-8 May 2014, and entitled Ref. [1]: T. Jannson, T. Forrester, A. Kostrzewski, W. Wang. "Bayesian Truthing and Experimental Validation in Homeland Security and Defense," SPIE Proc. Vol. 9074-21 (2014); and, Ref. [2] T. Jannson, W. Wang, T. Forrester, A. Kostrzewski, C. Veeris, and T. Nielsen, "Decision Generation Tools and Bayesian Inference," SPIE Proc. Vol. 9074-23 (2014).

Because a Weather Anomalous Event System (WAES) can be configured to detect and identify weather anomalous events as described above, and because the Weather Anomalous Event is particular case of A Bayesian anomalous event thus, Bayesian interference applies. In particular, for air turbulences and other weather parameter fluctuations (wind, temperature, pressure, humidity), leading to non-stationary random processes, a goal of the IA system in various embodiments is to prevent IA-key data transmission during non-stationary periods of time. This can result in an increase in the IA of the system. Furthermore, applying condition, A, B, C, D may allow the QA-channel criteria to be preserved.

A further IA-preserving measure that may be implemented is to repeat transmission of highly-secure data a number of times, say, u-times. Then, the $W_n(m_o)$ probability is further reduced by $q^u$-factor, which is an extremely small value.

Condition E is represented by Eq. (130), in which $t_R$ is a threshold time defining a compromising IA-scenario. Thus, one solution is to increase the length of the IA-key, n bits, to the level at which the Eq. (130a) criterion is satisfied; when the IA system can be broken only in a prohibitive amount of time, t, larger than the $t_A$ threshold time. Fortunately, in the case of weather station systems, the $t_A$ value is relatively short (e.g., 2 days, for example). The solution provides optimization between a BER value and an n value, defined by conditions A, B, C, D. Assuming that these two values are (BER)=q, and n value, equivalent to: $\bar{m}$=qn, and fixed, and condition (130a) is not satisfied (i.e., Eq. (130b) is satisfied); then, the error correction (OVH) may be increased in order to correct more errors—in other words, to increase the $m_o$ value to such a level that the following condition is satisfied:

$$W_n(m_o) = e^{-\bar{m}}\left(\frac{(\bar{m})^{m_o}}{m_o!}\right) = W_n(0)\frac{(\bar{m})^{m_o}}{m_o!} \leq T_o \quad (162)$$

where $T_o$ is some threshold value. This is the inverse of the procedure that can be done numerically by using a non-linear look-up table. In good approximation, Eq. (163) is reduced to the following inequality:

$$\frac{(\bar{m})^{m_o}}{m_o!} \leq T_o \quad (163)$$

which should be solved for unknown $m_o$-value, assuming fixed $\bar{m}$-value. For example, for $\bar{m}$=0.01, and $T_o$=$10^{-11}$, then $m_o$=5. In other words up to four errors per bit stream must be corrected in order to satisfy inequality (164). This is shown in Table 14, when various values of $W_n(m_o)$ are tabulated as a look-up table.

TABLE 14

Look-up Table for Various $m_o$-Values, Assuming $\bar{m}$ = 0.01

| $m_O$ | 3 | 4 | 5 |
|---|---|---|---|
| $\dfrac{(\bar{m})^{m_o}}{m_o!}$ | $\dfrac{(0.01)^3}{3!}$ | $\dfrac{(0.01)^4}{4!}$ | $\dfrac{(0.01)^5}{5!}$ |
| $W_n(m_O)$ | $\dfrac{1}{6} \cdot 10^{-6}$ | $\dfrac{1}{24} \cdot 10^{-8}$ | $\dfrac{1}{120} \cdot 10^{-10}$ |

According to this look-up table, for $\bar{m}$=0.01, and threshold value of $10^{-11}$, the $m_o$-value should be, indeed, equal to 5, because, the following relation is satisfied:

$$\frac{1}{24}10^{-8} < T_o < \frac{1}{120} \cdot 10^{-10} \quad (164)$$

RF channels are generally prone to statistical errors and thus can be difficult to control. This can be an important consideration in the case of IA-critical data streams. In particular, the IA-key management against RF-errors can be implemented in various embodiments as an important step for the purpose of the IA-secure RF-channel, which may be a quasi-robust, or QR-channel. As described herein, the QR-channel solution may be based on a Poisson statistical distribution. The Conditions A, B, C, D, E are necessary and sufficient for definition of the QR-channel which is quasi-robust against the RF-errors.

The IA-key management solution is valid for at least the two major application scenarios described immediately below.

The first major application scenario is increasing IA protection. In this scenario, the n-bit length of the IA data stream should be increased, which creates $\bar{m}$ mean error value increasing. In order to mitigate the effect of increasing $\bar{m}$ value, the system can be configured to increase $m_o$ number, where ($m_o$-1) is the number of errors per data stream to be protected by an error correcting code. Conditions A, B, C, D, E, provide an estimate of how much the $m_o$ value should increase. This provides, of course, extra OVH cost, which can be predicted by this method, and which is summarized by the following symbolic relation:

$$IA\nearrow \Rightarrow n\nearrow \Rightarrow \bar{m}\nearrow \Rightarrow m_0\nearrow \quad (165)$$

where: "$\nearrow$" is symbol of increase, and ($m_o$-1) is number of errors to be corrected by the FEC code, for example.

The second major application scenario is a worsening of meteorological conditions. In such circumstances, the BER value increases. Thus, the $\overline{m}$ value increases, which leads to an $m_o$ value increase to compensate for the BER value increase; thus, preserving the IA security level. Accordingly, the situation concludes to the similar outcome as shown in Eq. (166), leading to the following symbolic relation:

$$(BER) \nearrow \Rightarrow \overline{m} \nearrow \Rightarrow m_o \nearrow \qquad (166)$$

In Table 15 Conditions A, B, C, D, E are summarized, as necessary and sufficient conditions of the QR-channel.

Poisson Formula Derivation.

In order to show that this derivation is different from a standard one, the steps for $W_n(3)$ may be repeated in the form:

$$W_n(3) = q^3 p^{n-3} \binom{n}{3} \cong q^3 p^n \frac{n!}{3!(n-3)!} = \qquad (167)$$

$$q^3 p^n \frac{n(n-1)(n-2)}{3!} \cong \cong q^3 p^n n^3 \left(\frac{1}{3!}\right) =$$

$$(\overline{m})^3 (1-q)^n \frac{1}{3!} = (\overline{m})^3 e^{-nq} \frac{1}{3!} = (\overline{m})^3 e^{-\overline{m}} \frac{1}{3!}$$

as it should be.

TABLE 15

Summary of Necessary and Sufficient Conditions for QR-Channel

| No. | Math | Description | Relevant Equation |
|---|---|---|---|
| A | $\overline{m} \ll 1$ | Preliminary condition for statistical error mean value | (141) |
| B | $m \ll n$ | Preliminary condition for probabilities or errors | (148) |
| C | $(m_o - 1)$ | Number of errors to be corrected | (153) |
| D | N/A | Stationarity*) and ergodicity of RF-channel statistics | (131) |
| E | N/A | Integrity**) of QR-channel, defined by threshold time***) | (130ab) |

*) Weather anomalous events do not satisfy this condition.
**) Further protection is by repetition u-times.
***) Time when the code cannot be broken.

Figure 57:
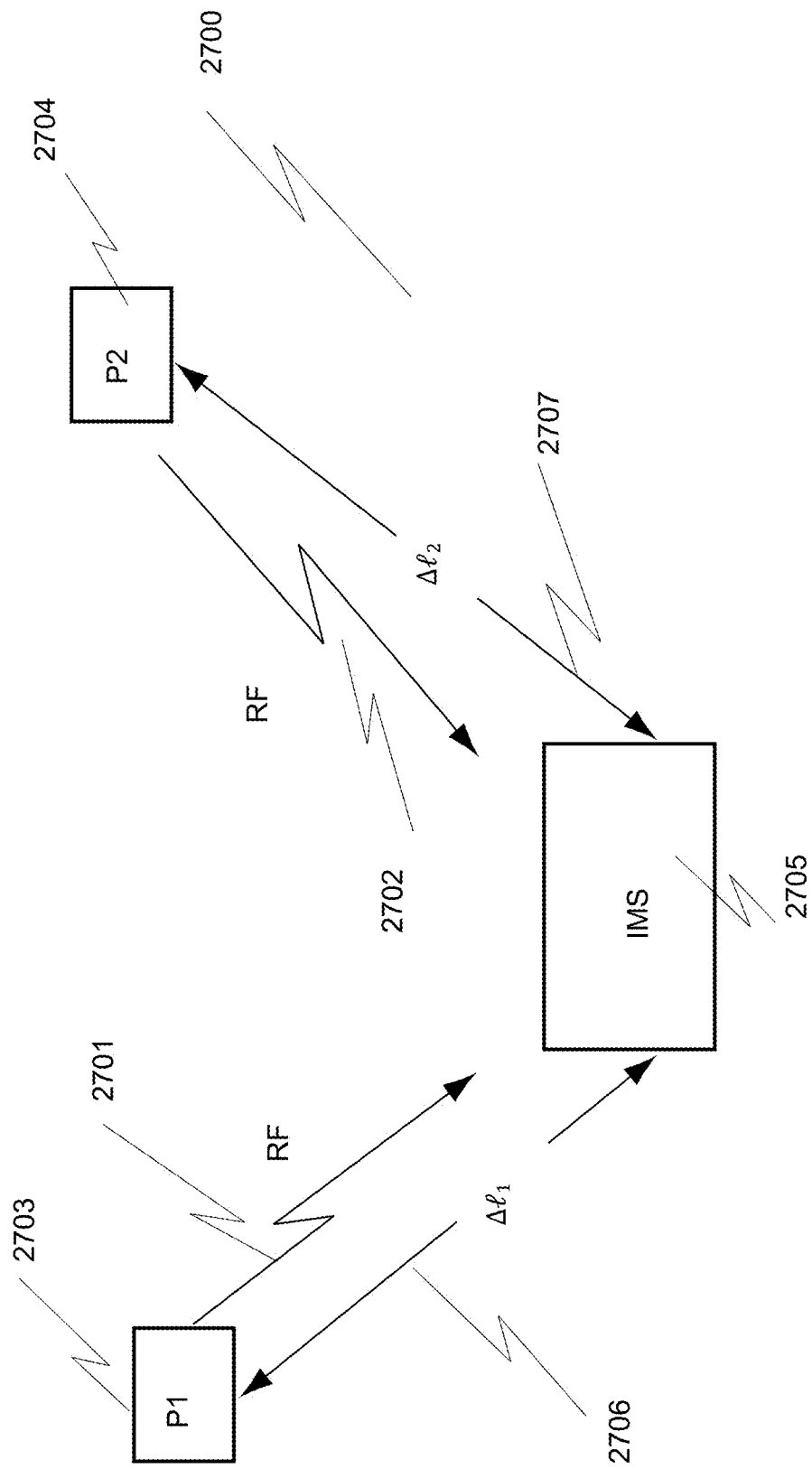
FIG. 57 is a diagram illustrating an example application of an unmanned operation using two IA keys with time synchronization in accordance with one embodiment of the technology disclosed herein.

This document describes various embodiments that can be used to improve time synchronization of the IA-keys. This novel solution, which applies elements of the previous sections, can be especially relevant for injection keys. In such a case, issues may arise with regard to simultaneously using one, two or more keys for unmanned or manned operations. In the case of manned operations, the system can be configured to use one (or more) key to be synchronized with time of human intervention. However, the operation can be an unmanned operation as well. FIG. 57 is a diagram illustrating an example application of an unmanned operation using 2 IA keys with time synchronization 2700 in accordance with one embodiment of the technology disclosed herein. Particularly, in the example illustrated in FIG. 57, two injection keys are needed to activate the system (which in this case is an integrative meteorological system (IMS)). In some embodiments, these keys are injected at the same time and are transmitted (e.g., via RF or other wireless communications) from their respective locations P1, P2. The key locations P1, P2 can be different and separate with respect to each other.

In the embodiment illustrated in FIG. 57, both key locations P1 2703, P2 2704 transmit RF signals 2701, 2702. As noted, these can be transmitted wirelessly such as, for example, via an RF communication link. The distances of transmission from their respective ones of P1 and P2 to IMS 2705 are illustrated as $\Delta l_1$ and $\Delta l_2$, respectively, which are denoted by the reference designations 2706 and 2707, respectively.

One issue that can arise for predictive analysis purposes is that of identifying material sources of latency which are not controllable in order to improve time synchronization. There are a number of candidate sources of latency that can be considered.

Two candidate sources of latency include turbulence and speckle. These two sources are typically not serious sources of latency because, in the $1^{st}$ case, they introduce the non-stationary of stochastic process; and are thus ruled out by Condition D, as in Table 15.

Another issue for consideration is multipath fading. Multipath fading introduces a reduction in communication bandwidth rather than added latency. As long as reduced bandwidth is not too small (i.e., in 10 kbps range), it can be considered as secondary, rather than primary effect.

Second order and higher order dispersion can also be considered as a factor that reduces the effective bandwidth. Generally, for all these effects, general properties of wave motion can be applied. Accordingly, in a qualitative sense, all types of waves (e.g., electromagnetic (including optical) and acoustic) can be considered.

The effects of linear dispersion have been discussed by one of the inventors of the disclosed technology in the paper by T. Jannson, and J. Jannson, "Temporal Self-Imaging Effect in Single-Mode Fibers," J. Opt. Soc. Am., 71, no. 11, pp. 1373-1376, November 1981; and T. Jannson, "Real-Time Fourier Transformation in Dispersive Optical Fibers," Opt. Lett., 8, No. 4, pp. 232-234, April 1983.

The linear dispersion is characterized by the time delay, $\Delta t$, defined by group velocity, $V_g$, defined as:

$$v_g = 1/\dot{\beta}_o \qquad (168)$$

where, $\beta$ is wavenumber, in the form:

$$\beta = \frac{\omega}{c} n \qquad (169)$$

and where $\omega$ is angular frequency ($\omega = 2\pi f$, where f-frequency in Hz), c is the speed of light in a vacuum, n is the refractive index equal to $\sqrt{\in}$, where $\in$ is relative dielectric constant, and $\omega_o$ is the carrier angular frequency, while $\dot{\beta}_0$ is the short form of the $1^{st}$ differential in respect to $\omega_o$ in the form:

$$\dot{\beta}_o = \frac{d\beta}{d\omega} \bigg/ \omega = \omega_o; \beta_o = \beta(\omega_o) \qquad (170ab)$$

Using Eq. (170) and notation as in Eq. (171), $\dot{\beta}_o$ can be written as $$\dot{\beta}_o = \frac{n_o}{c} + \frac{\omega}{c} \dot{n}_o \qquad (171)$$

Thus, knowing dispersion relation:

$$n = n(\omega) \qquad (172)$$

allows computation of $\dot{\beta}_0$ and, then, the group velocity, $v_g$.

Figure 58:
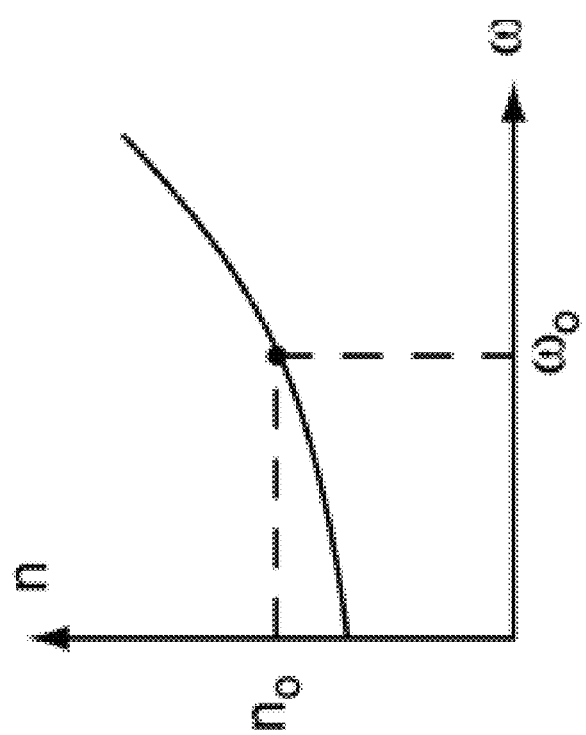
FIG. 58 is a diagram illustrating an example of a typical relation for normal dispersion.

FIG. 58 is a diagram illustrating an example of a typical relation (173) for normal dispersion.

Using Eqs. (169) and (172):

$$\frac{1}{v_g} = \frac{1}{v_{ph}} + \frac{\omega}{c}\dot{n}_o; v_{ph} = \frac{c}{n_o} \tag{173ab}$$

where both terms on the right are positive and $V_{ph}$ is phase velocity; thus, $v_g < V_{ph}$.

According to Eq. (174) (described above), and Eqs. (169-174), the time delays for RF-signals, are $$\delta t_1 = \frac{\Delta l_1}{v_{g1}}; \Delta t_2 = \frac{\Delta l_2}{v_{g2}} \tag{173ab}$$

where $\Delta l_1$ and $\Delta l_2$ can be determined precisely using GPS system. However, group velocities can vary. Assuming $\Delta l_1$ and $\Delta l_2$ values are fixed, a general time delay, At, can be described by:

$$\Delta t = \frac{\Delta \ell}{v_g} = \frac{\text{Constant}}{v_g} \tag{175}$$

then, the relative $\Delta t$-change, $\delta (\Delta t)$, is $$\frac{\delta(\Delta t)}{\Delta t} = \frac{\delta(v_g)}{v_g} \tag{176}$$

Accordingly, if the velocity, $v_g$ changes by 1%, for example, then, the time delay also changes by 1%. However, knowing the dispersion relation (173) allows computation of $\Delta t$ for predictive analysis purposes, which can eliminate this linear dispersion effect.

Another element of the example embodiment relates to injection key management for purposes of time synchronization. With reference again to FIG. 57, where $\Delta l_1$ and $\Delta l_2$ are known and the group velocities, $v_{g1}$ and $v_{g2}$, are also known, both time delays, $\Delta t_1$ and $\Delta t_2$ can be computed. Then, the difference between those delays can be shown as:

$$\tau_{12} = \Delta t_2 - \Delta t_1 \tag{177}$$

where: $\Delta t_2 > \Delta t_1$

For discussion purposes, RF signals 2701, 2702 can be referred to as $RF_1$ and $RF_2$, respectively. With this nomenclature in mind, and given the difference in time delays, the system can be configured to send the $RF_2$ signal earlier than the $RF_1$ signal by an amount of time $\tau_{12}$. The time accuracy, $\delta t$, may be defined by line width, $\Delta \omega$, or $\Delta f$, where. $\Delta \omega = 2\pi \Delta f$. According to the Heisenberg uncertainty relation, $(\Delta f)(\delta t) \sim 1$, and therefore:

$$(\delta t) = \frac{1}{\Delta f} \tag{178}$$

Therefore, both signals $RF_1$ and $RF_2$ should be received by the IMS at the same time or substantially the same time, with $\delta t$-time accuracy. For example, for $\Delta f = 10$ kHz, $\delta t = 0.1$ msec.

Embodiments of the technology disclosed herein can also be implemented. This section introduces a new method for improving time synchronization of IA keys, including the injection keys. In general, time synchronization of critical signals, such as those related to the IA keys, can be instrumental to IA key management and beneficial to improving security.

Figure 59:
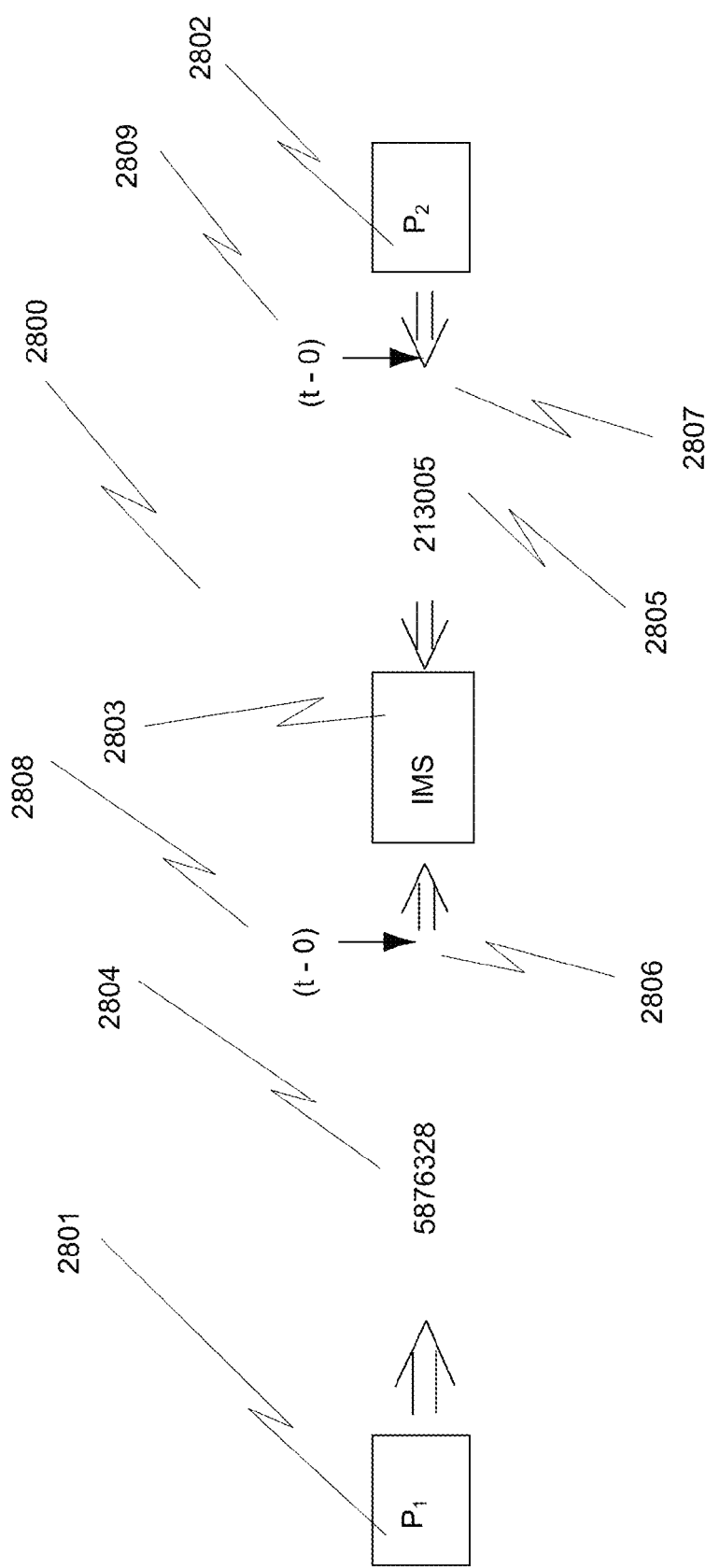
FIG. 59 is a diagram illustrating an example of dotless time synchronization in accordance with one embodiment of the technology disclosed herein.

FIG. 59 is a diagram illustrating an example of dotless time synchronization in accordance with one embodiment of the technology disclosed herein. Particularly, an example geometry of time synchronization, or time sync, is shown in FIG. 59 for a scenario in which the integrative metrological system (IMS) is receiving two synchronization signals, one each from sources $P_1$ and $P_2$.

Embodiments of the disclosed technology can be implemented to utilize Sync Time Counting (STC). In other embodiments, Sync Time Counting can be denoted by $(t-t_o)$ and $(t+t_o)$, where $(t-t_o)$ means, t−3 sec, t−2 sec, t−1 sec, before the zero time t−0; and where $(t+t_o)$ means, t+1 sec, t+2 sec, t+3 sec, after the zero time t−0. The zero time, t−0, may be defined with St-accuracy, e.g., as defined by Eq. (179). We assume that all time delays are controlled within this accuracy including meteorological effects, network latency and other signal processing latencies.

In various embodiments, the system is configured such that it can identify the zero time, t−0, in a precise way. In one embodiment, this is performed using what is referred to herein as the dotless method. The essence of one or more applications of this embodiment is to apply irrational numbers, such as $\pi$, e, $\sqrt{2}$, etc., without dots. This can be done because, in various embodiments the irrational numbers are not relied on for algebraic operations, but are instead used for identification (ID), or authentication purposes. For example, instead of using an e-number, which has a natural logarithmic base in the form: e=2.718281828 . . . , Embodiments can be configured to apply apply a dotless e-number in the form e.=2718281828 . . . , where e. is a dotless e-number. Similarly, the dotless representation of $\pi$ is $\pi$.=3141592654 . . . , and the dotless representation of $\sqrt{2}$ is: $\sqrt{2}$.=1414213562 . . . . In further embodiments, an arbitrary number of digits can be taken into account (here, this number is 10). As these examples serve to illustrate, the dotless method can be implemented using dotless irrational number for IA-purposes. Advantageously, the number of irrational numbers, or "irrationals," is infinite, and each irrational is uniquely defined in any modulo-algebra, such as by modulo-10 algebra, as illustrated in the examples immediately above. Also, the system can be implemented to avoid floating point operations after the dot by removing dots and by reorganizing the irrational number structure in a specific way, depending on number of digits, $n_o$, to be taken into account. For these purposes, the following notation can be adopted:

$$\pi \cdot n_m \tag{179}$$

where, "$\pi$" is the symbol of irrational number, "." is the symbol of "dotless" operation, and "$n_m$" is the number of digits to be taken in modulo-m algebra. Thus, for modulo-10 algebra, modulo-2 (binary) algebra, and modulo-7 algebra, relation (180) becomes, respectively, $$\pi \cdot n_{10}; \pi \cdot n_2; \pi \cdot n_7 \tag{180abc}$$

Assuming, that only four (4) digits are taken, for simplicity, relations (181abc) become, $$\pi \cdot 4_{10}; \pi \cdot 4_2; \pi \cdot 4_7 \tag{180abc}$$

As an example, consider $\sqrt{2}$., in the following decimal form:

$$\sqrt{2} \cdot 4_{10} = 1414 = 1 \cdot 10^3 + 4 \cdot 10^2 + 1 \cdot 10^1 + 4 \cdot 10^0 \quad (182)$$

This number in binary modulo-2 algebra, is $$\sqrt{2} \cdot 4_2 = 1 \cdot 2^{10} + 0 \cdot 2^9 + 1 \cdot 2^8 + 1 \cdot 2^7 + 0 \cdot 2^6 + 0 \cdot 2^5 + + 0 \cdot 2^4 + 0 \cdot 2^3 + 1 \cdot 2^2 + 1 \cdot 2^1 + 0 \cdot 2^0 = 10110000110 \quad (183)$$

For verification, consider $$1414 = 1024 + 256 + 128 + 4 + 2 = 1414 \quad (184)$$

For (more exotic) modulo-7 base (or, septimal base):

$$\sqrt{2} \cdot 4_7 = 4060 = 4 \cdot 7^3 + 0 \cdot 7^2 + 6 \cdot 7^1 + 0 \cdot 7^0 \quad (185)$$

For verification:

$$1414 = 4 \cdot 7^3 + 0 \cdot 7^2 + 6 \cdot 7^1 + 0 \cdot 7^0 == (4)(343) + 0 + (6)(7) + 0 = \quad (186)$$

$$1372 + 42 = 1414$$

According to Eqs. (180-187), the Dotless Method may be considered as applying irrational numbers, or applying irrationals in different modulo algebras for cyber identification and/or authentication.

For camouflage purposes modulo algebra may be applied even higher than 10, purposely for creating ambiguity. This can be deciphered, however, by knowing the symbol $\pi \cdot n_m$. For example, it is known that, $$1414 = \quad (187)$$
$$1 \cdot 11^3 + 0 \cdot 11^2 + 7 \cdot 11^1 + 6 \cdot 11^0 == 1313 + 0 + 77 + 6 = 1414$$

Therefore, for embodiments implementing according to these teachings, the following relation is not ambiguous:

$$\sqrt{2} \cdot 4_{11} = 1076 \quad (188)$$

However, for somebody who sees the number "1076" only, Eq. (189) is highly ambiguous, since, the number of possibilities and irrationals is infinite.

Time synchronization, or TimeSync, for short, can be described as using 2 or more wireless signals from one, two, or more sources, in order to confirm identification or authentication of a friendly party. This friendly party can include, for example, a person or people, a machine, or combination of them.

A process for verifying the identification or authentication of a friendly party in accordance with one embodiment of the technology disclosed herein is now described with reference to FIG. 57. Table 16 illustrates a summary of the dotless timesync steps.

In a first step, the IMS 2705 sends the timesync signatures (TSS) in the form of symbols $\pi \cdot n_m$, which can be the same or different for each source via RF signals 2701, 2702 with ciphertext data modulated or embedded thereon (i.e. Encrypted text) using symmetric or non-symmetric encryption key to sources 2703, 2704.

In a second step, based on the TSS, the sources 2703, 2704 send binary data streams with TSS in plaintext (i.e., non-encrypted text). These data streams can be sent within timesync, in such a way that the TSS should come at the same zero time. The TSS zero-time may be defined by the last digit of the $\pi \cdot n_m$ signature, for example.

In a third step the external verification of the TimeSync is done by verifying whether all TSS signatures come in zero time within a pre-described accuracy.

TABLE 16

Summary of Dotless Timesync Steps

| No. | Description of Steps | Equation |
|---|---|---|
| 1 | Sending RF signals, with timesync signatures, by integrative meterological station (Rx) to sources (Tx), in ciphertext, or plain text | (178) |
| 2 | Re-sending timesync signatures by source (Tx) into integrative meterological station (Rx), in plain text, in proper times, $t - t_0$, in order to obtain them in zero-time: $t - 0$ | $t - t_0, t - 0$ |
| 3 | Experimental verification | |
| 4 | If experimental verification is positive, then the relevant cyber-operation starts | |

In a fourth step, if the experimental verification is positive then, the relevant operation (such as some IA-operation) starts; otherwise, it does not. In another embodiment of step 1, the TSS is known a priori, by sources 2703 and 2704.

FIG. 59 is a diagram illustrating an example of dotless time synchronization 2800 in accordance with one embodiment of the technology disclosed herein. In this example, there are two RF sources $P_1$, $P_2$, denoted as 2801, 2802 and an integrative metrological station (IMS) 2803. RF sources $P_1$, $P_2$, are configured to send TimeSync signatures (TSS) 2804, 2805 to IMS 2803. These TSS signals 2804, 2805 are received by IMS 2803 at zero time t–0. The zero time 2806, 2807 is defined by the last digits of the respective TSS 2804, 2805. The TSS 2804, 2805 symbols may in some embodiments be different symbols and have different lengths as illustrated in the example of FIG. 59.

$P_1$ 2801, $P_2$ 2802 and IMS 2803 have this a priori information. From the perspective of general IA system knowledge, the system can determine that the TSS 2804 and 2805 are dotless irregulars, in the general form of $\pi \cdot 7$ m and $\pi \cdot 6$ m, respectively, but the $\pi$-property (which irregular?) and m-property (which modulo algebra?) is unknown to an adverse party. By positively verifying a priori a known zero-time, the system can confirm this Dotless TimeSync realization 2800. Then, the IMS IA-system can start. Otherwise, in various embodiments it cannot. Thus, in order to start the IA-system, in some embodiments two things happen at once. First, the data streams 2804 and 2805 must be identified by the IMS 2803 as the TSS, which are a priori known to their respective sources 2801, 2802 and to the IMS 2803. Second, their last digits 2806 and 2807 should come at the same zero-time, denoted as 2808 for 2804 and 2809 for 2805 (the difference in notations: 2808 and 2809, instead of single one, is, because, there is uncertainty, $\delta t$ of the zero-time).

The question as to whether this realization is true or false, which in various embodiments can be considered as a statistical Bayesian question, is addressed below.

This document now shows that the Dotless TimeSync Operation can be treated as C2, or rather as a C3I Binary Sensor. The Bayesian Binary Sensor concept has been discussed by T. Jannson, et. al., "Bayesian Truthing and Experimental Validation in Homeland Security and Defense," SPIE Proc. Vol. 9074-21 (2014), a C3I paper, presented in SPIE Defense+Security+Sensing (DSS) Symp., Baltimore, Md., 6-8 May 2014, where C3I means: Command, Control, Communication and Intelligence, while C2 means: Command and Control. In Bayesian Binary Sensor theory, the Figures of Merit (FoMs) are PPV (Positive Predictive Value) and NPV (Negative Predictive Value), the latter FoM defined, as $$(NPV)=p(N|N') \qquad (189)$$

where, the NPV is the inverse conditional (Bayesian) probability, that, under no-alarm, N', the event is not anomalous, N.

In the description above of a Truthing-based Anomalous Event Software Engine (TAESE) embodiments provide Bayesian Binary Cybersensing for detection and identification (ID) of weather anomalous events, and the weather station is presented as an exemplary C2 Weather Sensor System (C2WS2). This document now describes embodiments for the protection of IA-keys, including encryption keys, injection keys, and others. In particular, the Dotless TimeSync operation, summarized in Table 16, above, discusses four (4) operation steps as an example of this operation, to be sure that zero-time, t–0, is, indeed, the moment in time at which two or more TimeSync signatures (TSS) represented by dotless irrationals are received. A question may arise: if the (t–0) time moment is actually the zero-time moment, or whether this dotless timesync zero-time event is true or false.

In order to answer this question, it is important to note that this directly relates to the existence of a quasi-robust RF channel or QR-channel, as defined by criteria A, B, C, D, E described above, and summarized in Table 15. In particular, according to Condition D, the stationarily and ergodicity of the QR-channel is the necessary condition of the QR-channel. Not satisfying this condition creates the possibility of unwanted burst errors that preclude using RF-channel statistics, based on the Poission distribution, as defined by Eq. (163), in which ($m_o$–1) is the number of errors to be corrected as determined by Condition C, Table 15 (for sake of clarity, we assume $m_o$=3; thus ($m_o$–1)=2, for example.)

Therefore, for the purpose of a dotless TimeSync operation, anomalous event, or, rather, weather anomalous event may be defined as the existence of burst RF-errors precluding existence of the QR-channel, thus, making Dotless TimeSync operation and related zero-time event, false.

In order to make the Dotless TimeSync operation effective, it is useful to prove that the probability of a zero-time event is high, i.e., close to unity. The probability of detection and identification of a weather anomalous event is defined by the NPV, as in Eq. (190), while, probability of zero, one, two, . . . , ($m_o$–1) error, is $$P(m_o, n) = \sum_{m=0}^{(m_o-1)} W_n(m) \qquad (190)$$

For example, for $m_o$=3, Eq. (62) becomes $$P(3, n) = \sum_{m=0}^{2} W_n(m) = W_n(0) + W_n(1) + W_n(2) \qquad (191)$$

Using Eq. (192), for small statistical mean values, $\bar{m}$=nq:

$$P(3, n) = W_n(0) + \bar{m} \cdot W_n(0) + \frac{(\bar{m})^2}{2} \cdot W_n(0) = \qquad (192)$$

$$W_n(0)\left(1 + \bar{m} + \frac{\bar{m}^2}{2}\right) = e^{-\bar{m}}\left(1 + \bar{m} + \frac{\bar{m}^2}{2}\right) \cong \cong$$

$$(1 - \bar{m})\left(1 + \bar{m} + \frac{\bar{m}^2}{2}\right) = 1 - \frac{\bar{m}^2}{2} - \frac{\bar{m}^3}{2} \cong 1 - \frac{\bar{m}^2}{2}$$

In order to make the Dotless TimeSync zero-time event true, there should be no burst errors, and, at the same time, all relevant RF errors should be corrected by error-correcting codes, such as, for example, FEC-codes. The 1st condition is defined by the NPV, as in Eq. (190), while the $2^{nd}$ one is defined by the probability P($m_o$,n), in general, and by the probability P(3,n) in particular, for $m_o$=3. Thus, for $m_o$=3, the probability, $P_{C3I}$, that the Dotless TimeSync zero-time event, t–0, is true, is the product of the (NPV) and $P_o$(3,n), in the form:

$$P_{C3I} = (NPV)P(3, n) \cong (NPV)\left(1 - \frac{\bar{m}^2}{2}\right) \qquad (193)$$

For a Truthing-based Anomalous Event Software Engine, and to make the Bayesian Binary Cybersensor effective, the Negative Predictive Value must be close to unity. Accordigly, $$(NPV)=1-a; \ a<<1 \qquad (194ab)$$

and thus, Eq. (194) becomes, $$P_{C3I} = (1 - a)\left(1 - \frac{\bar{m}^2}{2}\right) \qquad (195)$$

For example, assuming that, $$a = \bar{m} = 0.01 \qquad (196)$$

which is a conservative assumption, then $$P_{C3I} = (1-0.01)(1-0.00005) \cong 0.99 \qquad (197)$$

Thus, the $1^{st}$ factor dominates, leading to the probability formula in the form:

$$P_{C3I} = (NPV) \qquad (198)$$

Typical (NPV)-values for Bayesian Inference are extremely close to unity; much closer, in fact, than the PPV values (PPV: Positive Predictive Value). A typical value, for example, can be 0.9999, or even closer to 1. In such a case:

$$P_{C3I} > 0.9999 = 99.99\% \qquad (199)$$

Thus, the probability that the Dotless TimeSync zero-time event is true is almost a certainty, making the Dotless TimeSync approach very effective, indeed.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 60:
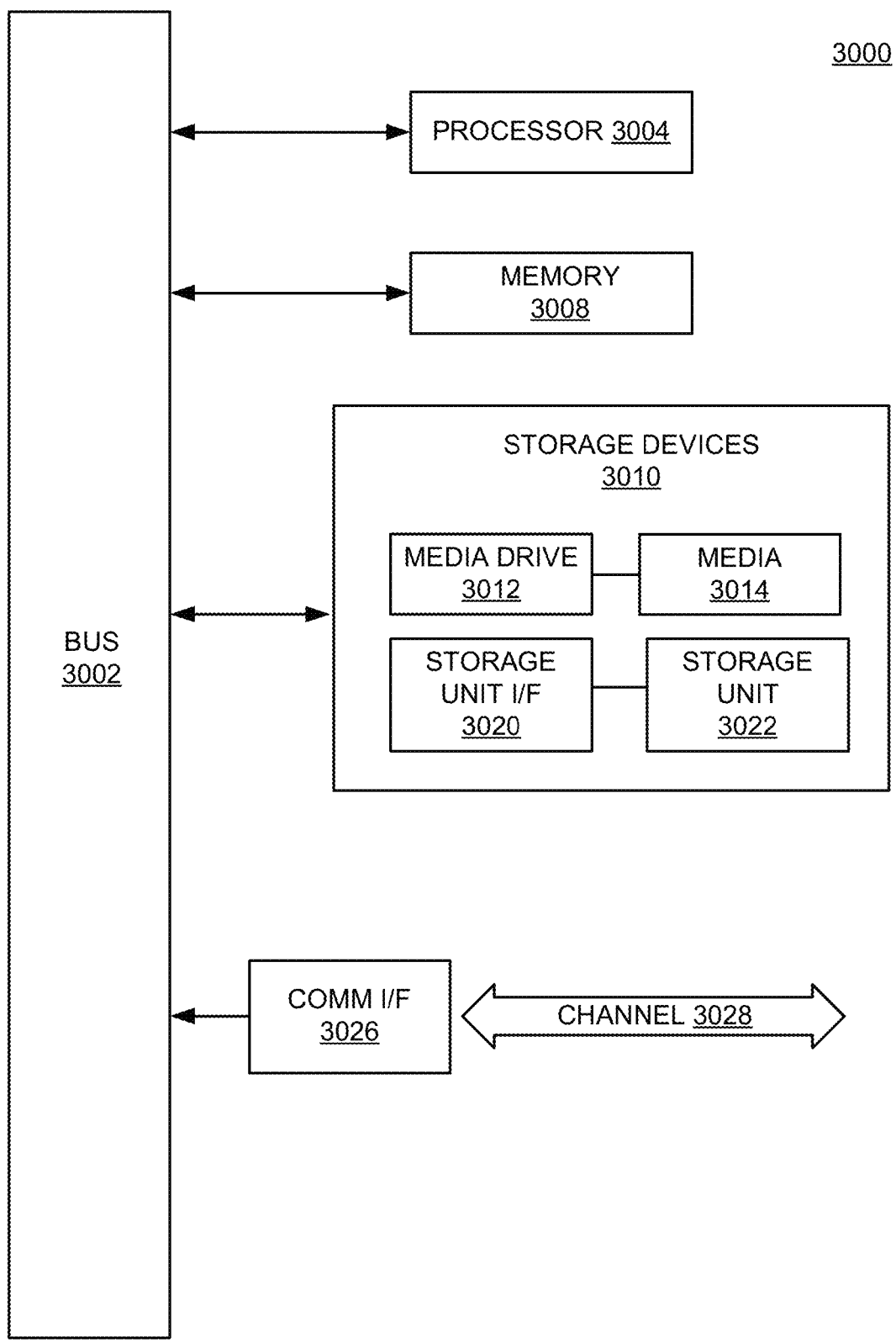
FIG. 60 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 60. Various embodiments are described in terms of this example-computing module 3000. After reading this description, it will become apparent to a person skilled in the relevant art how to implement the technology using other computing modules or architectures.

Referring now to FIG. 60, computing module 3000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 3000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 3000 might include, for example, one or more processors, controllers, control modules, or other processing devices, such as a processor 3004. Processor 3004 might be implemented using a general-purpose or special-purpose processing engine such as, for example, a microprocessor, controller, or other control logic. In the illustrated example, processor 3004 is connected to a bus 3002, although any communication medium can be used to facilitate interaction with other components of computing module 3000 or to communicate externally.

Computing module 3000 might also include one or more memory modules, simply referred to herein as main memory 3008. For example, preferably random access memory (RAM) or other dynamic memory, might be used for storing information and instructions to be executed by processor 3004. Main memory 3008 might also be used for storing temporary variables or other intermediate information during execution of instructions to be executed by processor 3004. Computing module 3000 might likewise include a read only memory ("ROM") or other static storage device coupled to bus 3002 for storing static information and instructions for processor 3004.

The computing module 3000 might also include one or more various forms of information storage mechanism 3010, which might include, for example, a media drive 3012 and a storage unit interface 3020. The media drive 3012 might include a drive or other mechanism to support fixed or removable storage media 3014. For example, a hard disk drive, a floppy disk drive, a magnetic tape drive, an optical disk drive, a CD or DVD drive (R or RW), or other removable or fixed media drive might be provided. Accordingly, storage media 3014 might include, for example, a hard disk, a floppy disk, magnetic tape, cartridge, optical disk, a CD or DVD, or other fixed or removable medium that is read by, written to or accessed by media drive 3012. As these examples illustrate, the storage media 3014 can include a computer usable storage medium having stored therein computer software or data.

In alternative embodiments, information storage mechanism 3010 might include other similar instrumentalities for allowing computer programs or other instructions or data to be loaded into computing module 3000. Such instrumentalities might include, for example, a fixed or removable storage unit 3022 and an interface 3020. Examples of such storage units 3022 and interfaces 3020 can include a program cartridge and cartridge interface, a removable memory (for example, a flash memory or other removable memory module) and memory slot, a PCMCIA slot and card, and other fixed or removable storage units 3022 and interfaces 3020 that allow software and data to be transferred from the storage unit 3022 to computing module 3000.

Computing module 3000 might also include a communications interface 3024. Communications interface 3024 might be used to allow software and data to be transferred between computing module 3000 and external devices. Examples of communications interface 3024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 3024 might typically be carried on signals, which can be electronic, electromagnetic (which includes optical) or other signals capable of being exchanged by a given communications interface 3024. These signals might be provided to communications interface 3024 via a channel 3028. This channel 3028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 3008, storage unit 3020, media 3014, and channel 3028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 3000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. An apparatus for air-drop deployment of a payload comprising instrumentation or equipment, the apparatus comprising:
   an elongate body member having a first end and a second end;
   a mounting ring disposed on and at least partially surrounding a portion of the body member at the first end;
   a fin assembly comprising a plurality of fins attached to the mounting ring;
   a weighted tip at the second end of the body member; and
   a connector at the first end configured to engage the payload;
   wherein the mounting ring comprises a release mechanism and is slidably mounted to the body member, and wherein the release mechanism is configured to maintain the mounting ring at the first end during flight and to release the mounting ring upon impact of the apparatus with a deployment surface, allowing the mounting ring to move from the first end toward the second end upon impact.

2. The apparatus of claim 1, further comprising a ratcheting mechanism connecting the fin assembly to the mounting ring, wherein the ratcheting mechanism allows the fin assembly to pivot from an in-flight position to a deployment position.

3. The apparatus of claim 1, wherein the body member comprises
   a plurality of coaxially arranged sections slidably disposed in an end-to-end arrangement,
   a locking mechanism configured to retain the plurality of coaxially arranged sections in a retracted position; and
   and a spring mechanism applying pressure against the coaxially arranged sections.

4. An apparatus for air-drop deployment of a payload comprising instrumentation or equipment, the apparatus comprising:
   an elongate body member having a first end and a second end;
   a mounting ring disposed on and at least partially surrounding a portion of the body member at the first end;
   a fin assembly comprising a plurality of fins attached to the mounting ring;
   a weighted tip at the second end of the body member; and
   a connector at the first end configured to engage the payload;
   wherein the body member comprises:
   a plurality of coaxially arranged sections slidably disposed in an end-to-end arrangement, a locking mechanism configured to retain the plurality of coaxially arranged sections in a retracted position; and and a spring mechanism applying pressure against the coaxially arranged sections.

5. The apparatus of claim 4, wherein the mounting ring comprises a release mechanism and is slidably mounted to the body member, and wherein the release mechanism is configured to maintain the mounting ring at the first end during flight and to release the mounting ring upon impact of the apparatus with a deployment surface, allowing the mounting ring to move from the first end toward the second end upon impact.

6. The apparatus of claim 4, further comprising a ratcheting mechanism connecting the fin assembly to the mounting ring, wherein the ratcheting mechanism allows the fin assembly to pivot from an in-flight position to a deployment position.

* * * * *